US007548873B2

(12) United States Patent
Veeningen et al.

(10) Patent No.: US 7,548,873 B2
(45) Date of Patent: Jun. 16, 2009

(54) METHOD SYSTEM AND PROGRAM STORAGE DEVICE FOR AUTOMATICALLY CALCULATING AND DISPLAYING TIME AND COST DATA IN A WELL PLANNING SYSTEM USING A MONTE CARLO SIMULATION SOFTWARE

(75) Inventors: Daan Veeningen, Houston, TX (US);
Kris Givens, Stafford, TX (US);
Ganesan Ravichandran, Sugar Land, TX (US); John Jeffers, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 11/053,575

(22) Filed: Feb. 8, 2005

(65) Prior Publication Data
US 2005/0209912 A1 Sep. 22, 2005

Related U.S. Application Data

(63) Continuation-in-part of application No. 10/802,622, filed on Mar. 17, 2004.

(60) Provisional application No. 60/603,685, filed on Aug. 23, 2004.

(51) Int. Cl.
*G06F 9/46* (2006.01)
(52) U.S. Cl. ........................................................ 705/8
(58) Field of Classification Search .................. 705/8
See application file for complete search history.

(56) References Cited

U.S. PATENT DOCUMENTS

| 5,794,720 | A | 8/1998 | Smith et al. | |
|---|---|---|---|---|
| 6,109,368 | A | 8/2000 | Goldman et al. | |
| 6,131,673 | A | 10/2000 | Goldman et al. | |
| 6,408,953 | B1 | 6/2002 | Goldman et al. | |
| 6,612,382 | B2 | 9/2003 | King | |
| 2002/0188534 | A1* | 12/2002 | Brady | 705/32 |
| 2003/0144953 | A1 | 7/2003 | Razum et al. | |
| 2003/0225605 | A1* | 12/2003 | Yokota et al. | 705/7 |
| 2004/0030992 | A1 | 2/2004 | Moisa et al. | |
| 2004/0107133 | A1 | 6/2004 | Pantaleo et al. | |

FOREIGN PATENT DOCUMENTS

JP 2004078569 A * 3/2004

OTHER PUBLICATIONS

Thompson et al. "Gauging the Value of Suppliers' Products: Buyer-Side Applications of Economic Value Pricing Models." Journal of Business & Industrial Marketing, vol. 9, No. 2, pp. 29-40, 1994.*

* cited by examiner

*Primary Examiner*—Susanna M Diaz
(74) *Attorney, Agent, or Firm*—Robert P. Lord; Bryan P. Galloway

(57) ABSTRACT

A method of generating and displaying time and cost data representing the time and the cost to complete a plurality of oilfield related activities in response to a set of engineering results including wellbore geometry and drilling parameters comprises the steps of: (a) assembling a plurality of time data and a plurality of cost data based on the engineering results in response to a plurality of activity templates; and (b) generating a display of the time data and the cost data, the display illustrating the time data and the cost data representing the time and the cost to complete the plurality of oilfield related activities. The display includes a numerical display and a graphical display.

45 Claims, 122 Drawing Sheets

| Mid P% Time | End P% Time | First P% Cost | Mid P% Cost | End P% Cost |
|---|---|---|---|---|
| day | day | K$ | K$ | K$ |
| 39.6 | 63.99 | 1,638 | 2,132 | 2,804 |
| 1.33 | 2.77 | 15 | 30 | 57 |
| 35.9 | 56.76 | 1,585 | 2,035 | 2,634 |
| 1.17 | 1.95 | 24 | 40 | 61 |
| 1.2 | 2.51 | 14 | 27 | 52 |

FIG. 5B

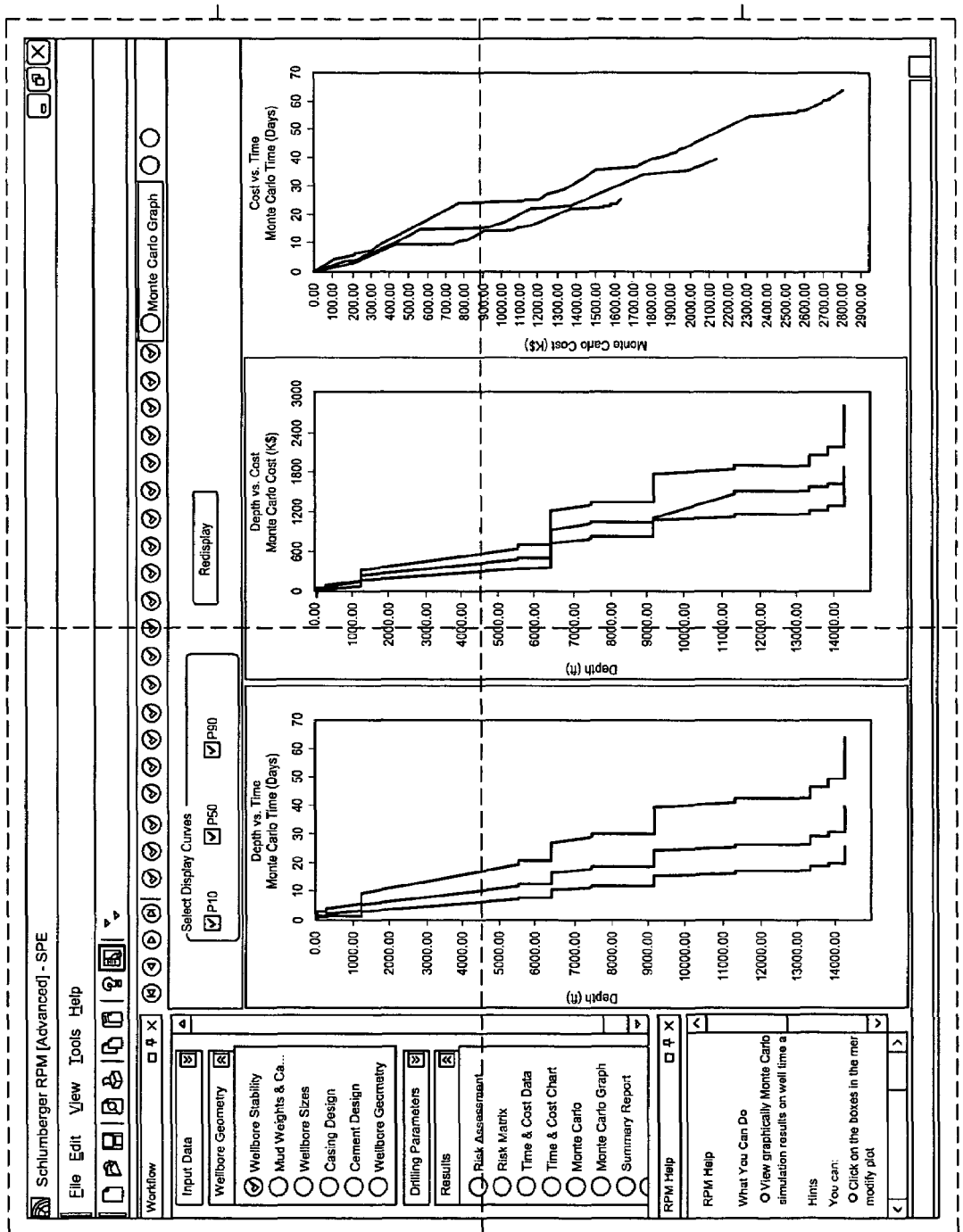

| End MD | Distance | ROP | WOB | RPM | KREV | Excess | Co |
|---|---|---|---|---|---|---|---|
| ft | ft | ft/h | lbm | | | | K$ |
| 3493.24 | 697.24 | 38.50 | 5.00 | 85.00 | 0.00 | 0.00 | |
| 5648.76 | 2155.51 | 30.20 | 10.00 | 120.00 | 130.39 | 0.00 | |
| 7558.20 | 1909.45 | 35.40 | 5.00 | 140.00 | 599.55 | 0.00 | |
| 10481.43 | 2923.23 | 25.00 | 10.00 | 100.00 | 323.64 | 0.00 | |
| 13946.00 | 3464.57 | 30.00 | 10.00 | 100.00 | 701.57 | 0.00 | |
| 14339.70 | 393.70 | 29.90 | 10.00 | 100.00 | 692.91 | 0.00 | |
| 16249.15 | 1909.45 | 35.00 | 5.00 | 120.00 | 94.80 | 0.00 | |
| 16642.85 | 393.70 | 15.00 | 15.00 | 70.00 | 229.13 | 0.00 | |
| 16997.18 | 354.33 | 15.00 | 15.00 | 70.00 | 110.24 | 0.00 | |
| 17361.35 | 364.17 | 15.00 | 15.00 | 70.00 | 99.21 | 0.00 | |
| 17735.37 | 374.02 | 15.00 | 15.00 | 70.00 | 101.97 | 0.00 | |

Drillstring Design

| Weight DC1 | OD DC1 | ID DC1 | LW DC1 | Length DC2 | Weight DC2 | OD DC2 | ID DC2 |
|---|---|---|---|---|---|---|---|
| kg | in | in | kg/m | m | kg | in | in |
| 7826.62 | 9.50 | 2.81 | 329.60 | 27.43 | 3579.01 | 6.75 | 2. |
| 5201.34 | 8.00 | 2.81 | 224.52 | 27.43 | 3491.69 | 6.75 | 2. |
| 2745.49 | 4.75 | 2.25 | 123.84 | 27.43 | 2745.49 | 4.75 | 2. |
| 2649.54 | 4.75 | 2.25 | 123.84 | 27.43 | 1669.89 | 3.50 | 1. |

Wellbore Schematic: 2/23/2004 (KB-Grd: 15.2m)
Schematic-Proposed

Wellbore Schematic, 18 5/8, 15.2-331.6, 350
500

| KEY | OPERATION | ORDER | FILENAME | MIN TIME | AVG TIME | MAX TIME | UNIT ATTRIBUTE | COSTATTRIBU | NPT ATTRIBUTE |
|---|---|---|---|---|---|---|---|---|---|
| 6468efc3- | RIG UP SURFACE EQUIPMENT | 1 | | 0.5 | 1 | 2 | | | CEMENTNPT |
| 3153e0ca | SAFETY MEETING | 2 | | 0.3 | 0.5 | 0.75 | | | CEMENTNPT |
| ceba1b1e | TEST EQUIPMENT | 3 | | 0.3 | 0.5 | 1 | | | CEMENTNPT |
| 4896d9b7 | CIRCULATE | 4 | | 0.75 | 1 | 1.25 | TIMETOCIRCCASING | | CEMENTNPT |
| 11cb1305 | PUMP SPACER | 5 | | 0.75 | 1 | 1.25 | TIMETOCIRCTAIL | | CEMENTNPT |
| a121787d | MIX AND PUMP SLURRY | 6 | | 0.75 | 1 | 1.25 | TIMETOCIRCCEMENTCA | | CEMENTNPT |
| 8508f979- | DISPLACE SLURRY | 7 | | 0.75 | 1 | 1.25 | TIMETOCIRCCASING | | CEMENTNPT |
| 7ad26eef- | SET SEAL ASSEMBLY AND TEST | 8 | | 0.5 | 1 | 1.5 | | WHCOST | WHNPT |
| 7ad26eef- | SET SEAL ASSEMBLY AND TEST | 9 | | 0.5 | 1 | 1.5 | | WHCOST | WHNPT |
| d8042633 | RIG DOWN SURFACE EQUIPMENT | 10 | | 0.25 | 0.5 | 1 | | | CEMENTNPT |

| KEY | OPERATION | ORDER | FILENAME | MIN TIME | AVG TIME | MAX TIME | UNIT ATTRIBUTE | COSTATTRIBU | NPT ATTRIBUTE |
|---|---|---|---|---|---|---|---|---|---|
| 3153e0ca | SAFETY MEETING | 1 | | 0.25 | 0.5 | 0.75 | | | BITRUNNPT |
| be5c11da | PICK UP AND MAKE UP BHA | 2 | | 2 | 3 | 3.5 | | | BITRUNNPT |
| ba41e55b | RUN IN HOLE | 3 | | 0.75 | 1 | 1.25 | TIMETOTRIP | | BITRUNNPT |
| 4896d9b7 | CIRCULATE | 4 | | 1 | 1.25 | 1.5 | TIMETOCIRCMUD | | BITRUNNPT |
| cb60c81f- | DRILL ROTARY | 5 | | 0.75 | 1 | 1.25 | TIMETODRILL | | BITRUNNPT |
| 4896d9b7 | CIRCULATE | 6 | | 1 | 1.25 | 1.5 | TIMETOCIRCMUD | | BITRUNNPT |
| 3f9376b7 | SHORT TRIP | 7 | | 1 | 1.5 | 2 | TIMETOSHORTTRIP | | BITRUNNPT |
| 4896d9b7 | CIRCULATE | 8 | | 1 | 1.25 | 1.5 | TIMETOCIRCMUD | | BITRUNNPT |
| ff61d24d- | PULL OUT OF HOLE | 9 | | 0.75 | 1 | 1.25 | TIMETOTRIP | | BITRUNNPT |
| 617482cb | PULL OUT AND LAY DOWN BHA | 10 | | 2 | 3 | 4 | | | BITRUNNPT |

| | B | C | D | E Drill Conductor | F Drive Conductor | G Jet Conductor | H Cement Conductor | I Drill Surface |
|---|---|---|---|---|---|---|---|---|
| | | | | 1 | 2 | 3 | 4 | 5 |
| 4 | Lognormal | Drill Conductor | 1 | 1 | | | | |
| 5 | Lognormal | Drive Conductor | 2 | 0 | 1 | | | |
| 6 | Lognormal | Jet Conductor | 3 | 0 | 0 | 1 | | |
| 7 | Lognormal | Cement Conductor | 4 | 0 | 0 | 0 | 1 | |
| 8 | Lognormal | Drill Surface | 5 | M | M | M | 0 | 1 |
| 9 | Lognormal | Bit run Surface | 6 | M | M | M | M | M |
| 10 | Lognormal | Open Hole Logging | 7 | 0 | 0 | 0 | 0 | 0 |
| 11 | Lognormal | Cement Surface | 8 | 0 | 0 | 0 | 0 | 0 |
| 12 | Lognormal | Drill Intermediate | 9 | M | M | M | M | 0 |
| 13 | Lognormal | Bit run Intermediate | 10 | M | M | M | M | M |
| 14 | Lognormal | Cement Intermediate | 11 | 0 | 0 | 0 | 0 | 0 |
| 15 | Lognormal | Cement Liner Intermediate | 12 | 0 | 0 | 0 | M | 0 |
| 16 | Lognormal | Cased Hole Logging | 13 | 0 | 0 | 0 | 0 | 0 |

| | | | | | | | | | | | | | | | |
|---|---|---|---|---|---|---|---|---|---|---|---|---|---|---|---|
| Z | Run Conductor | 22 | | | | | | | | | | | | | |
| Y | Circulate | 21 | | | | | | | | | | | | | |
| X | Completion Trip | 20 | | | | | | | | | | | | | |
| W | Log Production Cement | 19 | | | | | | | | | | | | | |
| V | Cement Liner Production | 18 | | | | | | | | | | | | | |
| U | Cement Production | 17 | | | | | | | | | | | | | |
| T | Log Production | 16 | | | | | | | | | | | | | |
| S | Bit Run Production | 15 | | | | | | | | | | | | | |
| R | Drill Production | 14 | | | | | | | | | | | | | |
| Q | Cased Hole Logging | 13 | | | | | | | | | | | | | 1 |
| P | Cement Liner Intermediate | 12 | | | | | | | | | | | | 1 | M |
| O | Cement Intermediate | 11 | | | | | | | | | | | 1 | M | 0 |
| N | Bit Run Intermediate | 10 | | | | | | | | | | 1 | 0 | 0 | 0 |
| M | Drill Intermediate | 9 | | | | | | | | | 1 | M | 0 | 0 | 0 |
| L | Cement Surface | 8 | | | | | | | | 1 | 0 | 0 | M | M | 0 |
| K | Open Hole Logging | 7 | | | | | | | 1 | 0 | 0 | 0 | 0 | 0 | 0 |
| J | Bit Run Surface | 6 | | | | | | 1 | 0 | 0 | M | M | 0 | 0 | 0 |

218

| | | | 14 | M | M | M | M | 0 | 0 |
|---|---|---|---|---|---|---|---|---|---|
| | | | 15 | M | M | M | M | 0 | M |
| 17 | Lognormal | Drill Production | 16 | 0 | 0 | 0 | 0 | M | 0 |
| 18 | Lognormal | Bit Run Production | 17 | 0 | 0 | 0 | 0 | M | 0 |
| 19 | Lognormal | Log Production | 18 | 0 | 0 | 0 | 0 | 0 | 0 |
| 20 | Lognormal | Cement Production | 19 | 0 | 0 | 0 | 0 | 0 | 0 |
| 21 | Lognormal | Cement Liner Production | 20 | 0 | 0 | 0 | 0 | 0 | 0 |
| 22 | Lognormal | Log Production Cement | 21 | -1 | -1 | -1 | -1 | 0 | -1 |
| 23 | Lognormal | Completion Trip | 22 | 0 | 0 | 0 | 0 | 0 | 0 |
| 24 | Lognormal | Circulate | 23 | 0 | 0 | 0 | 0 | 0 | 0 |
| 25 | Lognormal | Run Conductor | 24 | 0 | 0 | 0 | 0 | 0 | 0 |
| 26 | Lognormal | Wiper Trip | 25 | 0 | 0 | 0 | 0 | 0 | 0 |
| 27 | Lognormal | Run Surface | 26 | 0 | 0 | 0 | 0 | 0 | 0 |
| 28 | Lognormal | Install Casing Spool | 27 | 0 | 0 | 0 | 0 | 0 | 0 |
| 29 | Lognormal | Install Surface BOP | 28 | 0 | 0 | 0 | 0 | 0 | 0 |
| 30 | Lognormal | Run Intermediate | 29 | 0 | 0 | 0 | 0 | 0 | 0 |
| 31 | Lognormal | Run Liner Intermediate | 30 | 0 | 0 | 0 | 0 | 0 | 0 |
| 32 | Lognormal | Run Liner Production | 31 | 0 | 0 | 0 | 0 | 0 | 0 |
| 33 | Lognormal | Run Production | 32 | 0 | 0 | 0 | 0 | 0 | 0 |
| 34 | Lognormal | Tube Log Production | 33 | 0 | 0 | 0 | 0 | 0 | 0 |
| 35 | Lognormal | Wiper Trip Assembly | 34 | 0 | 0 | 0 | 0 | 0 | 0 |
| 36 | Lognormal | Pick Up And Make Up Bha | 35 | 0 | 0 | 0 | 0 | 0 | 0 |
| 37 | Lognormal | Run In Hole | 36 | 0 | 0 | 0 | 0 | 0 | 0 |
| 38 | Lognormal | Install Wellhead Equipment | 37 | 0 | 0 | 0 | 0 | 0 | 0 |
| 39 | Lognormal | Test BOP Intermediate | 38 | 0 | 0 | 0 | 0 | 0 | 0 |
| 40 | Lognormal | Test Equipment | | | | | | | |

Correlation Matrix 218

FIG. 37C

| 0.42 | 0.46 | 0.5 | 0.46 | 0.07 | 0.08 |
|---|---|---|---|---|---|
| 1.68 | 1.82 | 1.99 | 1.83 | 0.28 | 0.34 |
| 6.73 | 7.29 | 7.94 | 7.33 | 1.1 | 1.35 |
| 3.37 | 3.64 | 3.97 | 3.67 | 0.55 | 0.67 |
| 1.68 | 1.82 | 1.99 | 1.83 | 0.28 | 0.34 |
| 865.49 | 936.93 | 1021.12 | 942.3 | 86.12 | 105.43 |
| 15.18 | 16.44 | 17.91 | 16.53 | 2.14 | 2.62 |
| 10.19 | 11.03 | 12.02 | 11.1 | 1.69 | 2.06 |
| 0.42 | 0.45 | 0.49 | 0.46 | 0.07 | 0.08 |
| 1.67 | 1.81 | 1.97 | 1.82 | 0.28 | 0.34 |
| 7.1 | 7.68 | 8.37 | 7.73 | 1.17 | 1.44 |
| 1 | 1.09 | 1.18 | 1.09 | 0.17 | 0.2 |
| 4.99 | 5.4 | 5.89 | 5.43 | 0.46 | 0.56 |
| 0.41 | 0.45 | 0.49 | 0.45 | 0.04 | 0.05 |
| 2.7 | 2.92 | 3.19 | 2.94 | 0.25 | 0.3 |
| 0.15 | 0.16 | 0.17 | 0.16 | 0.01 | 0.02 |
| 0.75 | 0.81 | 0.89 | 0.82 | 0.07 | 0.08 |
| 0.98 | 1.06 | 1.16 | 1.07 | 0.09 | 0.11 |
| 91.52 | 99.08 | 107.98 | 99.65 | 9.15 | 11.2 |

| | Task Name | Min Time h | Avg Time h | Max Time h | Min NPT h | Avg NPT h | Max NPT h | Min Cost K$ | Avg Cost K$ | Max Cost K$ | Min NPC K$ | Avg NPC K$ | Max NPC K$ | End Depth ft | Wellbore Sizes in |
|---|---|---|---|---|---|---|---|---|---|---|---|---|---|---|---|
| 1 | ⊟-Total | 848.83 | 1189.89 | 1566.15 | 49.16 | 129.49 | 265.87 | 1,879 | 2,243 | 2,644 | 109 | 243 | 444 | 14236.19 | 8.5 |
| 2 | ⊟-Mobilize Rig Job | 17.75 | 31.15 | 53.75 | 1.78 | 4.73 | 13.44 | 11 | 20 | 34 | 1 | 3 | 8 | 40 | 38 |
| 3 | ⊟-Drill Wellbore Job | 801.1 | 1108.75 | 1434.1 | 44.38 | 117.32 | 232.86 | 1,828 | 2,158 | 2,506 | 104 | 230 | 409 | 14236.19 | 8.5 |
| 4 | ⊟-Conductor | 11.44 | 17.51 | 24.39 | 0.98 | 2.35 | 5.3 | 46 | 50 | 54 | 4 | 7 | 13 | 410.73 | 38 |
| 5 | ⊟-Drive Conductor | 8.18 | 12.07 | 16.46 | 0.82 | 1.81 | 4.12 | 44 | 46 | 49 | 4 | 7 | 12 | 410.73 | 38 |
| 6 | ⊟-Drillout | 3.26 | 5.44 | 7.93 | 0.16 | 0.54 | 1.19 | 2 | 3 | 5 | 0 | 0 | 1 | 410.73 | 38 |
| 7 | ⊟-Surface | 37.61 | 62.78 | 91.95 | 2.54 | 7.45 | 17.22 | 202 | 217 | 235 | 10 | 22 | 37 | 410.73 | 36 |
| 8 | ⊟-Drill Surface | 4.85 | 6.7 | 8.61 | 0.24 | 0.67 | 1.29 | 79 | 80 | 81 | 4 | 8 | 12 | 410.73 | 36 |
| 9 | ⊟-Open Hole Logging | 3.25 | 5 | 7 | 0.33 | 0.75 | 1.75 | 2 | 2 | 4 | 0 | 0 | 1 | 410.73 | 36 |
| 10 | ⊟-Wiper Trip | 5.43 | 8.01 | 10.1 | 0.27 | 0.8 | 1.51 | 3 | 5 | 6 | 0 | 2 | 7 | 410.73 | 36 |
| 11 | ⊟-Run Surface | 3.24 | 6.68 | 11.23 | 0.16 | 0.67 | 1.68 | 44 | 46 | 49 | 2 | 5 | 7 | 410.73 | 36 |
| 12 | ⊟-Cement Surface | 5.28 | 8.9 | 14.88 | 0.26 | 0.89 | 2.23 | 65 | 68 | 71 | 3 | 7 | 11 | 410.73 | 36 |
| 13 | ⊟-Cased Hole Logging | 3.25 | 5 | 7 | 0.33 | 0.75 | 1.75 | 2 | 4 | 4 | 0 | 0 | 3 | 410.73 | 36 |
| 14 | ⊟-Install BOP | 6.75 | 13.5 | 20.25 | 0.68 | 2.03 | 5.06 | 4 | 8 | 13 | 0 | 3 | 11 | 410.73 | 36 |
| 15 | ⊟-Drillout | 3.62 | 5.6 | 8.09 | 0.18 | 0.56 | 1.21 | 2 | 4 | 6 | 0 | 0 | 3 | 410.73 | 36 |
| 16 | ⊟-Conduct FIT or LOT | 1.95 | 3.38 | 4.8 | 0.1 | 0.34 | 0.72 | 1 | 2 | 3 | 0 | 0 | 0 | 410.73 | 36 |
| 17 | ⊟-Intermediate | 231.96 | 317.66 | 406.82 | 12.29 | 32.78 | 63.78 | 505 | 596 | 691 | 27 | 61 | 108 | 6975.7 | 22 |
| 18 | ⊟-Drill Intermediate | 86.06 | 115.54 | 145.01 | 4.3 | 11.55 | 21.75 | 140 | 172 | 204 | 7 | 17 | 31 | 3619.4 | 22 |
| 19 | ⊟-Bit run Intermediate | 95.46 | 128.53 | 161.1 | 4.77 | 12.85 | 24.16 | 103 | 139 | 175 | 5 | 14 | 26 | 6975.7 | 22 |
| 20 | ⊟-Open Hole Logging | 5.01 | 7.34 | 9.93 | 0.5 | 1.1 | 2.48 | 25 | 26 | 28 | 2 | 4 | 7 | 6975.7 | 22 |
| 21 | ⊟-Wiper Trip | 13.23 | 18.4 | 23.07 | 0.66 | 1.84 | 3.46 | 14 | 20 | 25 | 1 | 2 | 4 | 6975.7 | 22 |
| 22 | ⊟-Run Intermediate | 2.35 | 4.5 | 8.75 | 0.12 | 0.45 | 1.31 | 3 | 5 | 9 | 0 | 1 | 1 | 6975.7 | 22 |
| 23 | ⊟-Cement Intermediate | 12.51 | 17.54 | 23.43 | 0.63 | 1.75 | 3.51 | 204 | 209 | 216 | 10 | 21 | 32 | 6975.7 | 22 |
| 24 | ⊟-Cased Hole Logging | 5.01 | 7.34 | 9.93 | 0.5 | 1.1 | 2.48 | 4 | 4 | 6 | 0 | 1 | 2 | 6975.7 | 22 |
| 25 | ⊟-Test BOP Intermediat | 3.75 | 5.5 | 7.75 | 0.38 | 0.83 | 1.94 | 2 | 4 | 8 | 0 | 1 | 2 | 6975.7 | 22 |
| 26 | ⊟-Drillout | 6.49 | 9.42 | 12.85 | 0.32 | 0.94 | 1.93 | 7 | 10 | 14 | 0 | 1 | 2 | 6975.7 | 22 |
| 27 | ⊟-Conduct FIT or LOT | 2.09 | 3.55 | 5.01 | 0.1 | 0.35 | 0.75 | 3 | 4 | 5 | 0 | 0 | 0 | 6975.7 | 22 |
| 28 | ⊟-Intermediate | 302.42 | 410.49 | 521.51 | 15.62 | 41.81 | 80.36 | 512 | 628 | 748 | 27 | 64 | 116 | 9318.22 | 14.75 |
| 29 | ⊟-Drill Intermediate | 47.2 | 63.29 | 79.83 | 2.36 | 6.33 | 11.91 | 129 | 147 | 164 | 6 | 15 | 25 | 8560.34 | 14.75 |
| 30 | ⊟-Bit run Intermediate | 30.37 | 41.02 | 51.17 | 1.52 | 4.1 | 7.68 | 33 | 44 | 55 | 1 | 8 | 8 | 9042.62 | 14.75 |
| 31 | ⊟-Open Hole Logging | 181.32 | 241.97 | 302.13 | 9.07 | 24.2 | 45.32 | 196 | 262 | 327 | 10 | 26 | 49 | 9318.22 | 14.75 |
| 32 | ⊟-Wiper Trip | 3.11 | 4.82 | 6.77 | 0.31 | 0.72 | 1.69 | 20 | 21 | 23 | 2 | 3 | 6 | 9318.22 | 14.75 |
| 33 | ⊟-Run Intermediate | 16.73 | 23 | 28.78 | 0.84 | 2.3 | 4.32 | 18 | 25 | 31 | 1 | 2 | 5 | 9318.22 | 14.75 |
| 34 | ⊟-Cement Intermediate | 3.39 | 4.5 | 8.75 | 0.17 | 0.54 | 1.31 | 94 | 96 | 99 | 5 | 10 | 15 | 9318.22 | 14.75 |
| 35 | ⊟-Cased Hole Logging | 3.11 | 5.39 | 8.23 | 0.31 | 0.72 | 1.23 | 2 | 4 | 6 | 0 | 1 | 1 | 9318.22 | 14.75 |
| 36 | ⊟-Test BOP Intermediat | 3.11 | 4.82 | 6.77 | 0.38 | 0.83 | 1.69 | 9 | 13 | 17 | 1 | 2 | 3 | 9318.22 | 14.75 |
| 37 | ⊟-Drillout | 3.75 | 5.5 | 7.75 | 0.41 | 1.17 | 2.34 | 3 | 5 | 7 | 0 | 0 | 0 | 9318.22 | 14.75 |
| 38 | ⊟-Conduct FIT or LOT | 2.85 | 4.51 | 6.16 | 0.14 | 0.45 | 0.92 | 3 | 5 | 7 | 0 | 0 | 1 | 9318.22 | 14.75 |
| 39 | ⊟-Production | 217.67 | 300.3 | 389.42 | 12.95 | 32.93 | 66.19 | 563 | 666 | 779 | 36 | 75 | 135 | 14236.19 | 8.5 |
| 40 | ⊟-Drill Production | 98.85 | 132.79 | 166.73 | 4.94 | 13.28 | 25.01 | 180 | 225 | 270 | 9 | 23 | 41 | 14082 | 8.5 |
| 41 | ⊟-Bit run Production | 45.52 | 61.22 | 76.41 | 2.28 | 6.12 | 11.46 | 61 | 82 | 102 | 3 | 8 | 15 | 14236.19 | 8.5 |
| 42 | ⊟-Log Production | 10.23 | 14.31 | 18.63 | 1.02 | 2.15 | 4.66 | 94 | 96 | 99 | 4 | 14 | 8 | 14236.19 | 8.5 |
| 43 | ⊟-Wiper Trip Assembly | 22.22 | 30.35 | 37.98 | 1.11 | 3.04 | 5.7 | 30 | 40 | 51 | 1 | 4 | 6 | 14236.19 | 8.5 |
| 44 | ⊟-Run Production | 2.35 | 5.2 | 8 | 0.12 | 0.45 | 1.31 | 6 | 6 | 12 | 0 | 1 | 1 | 14236.19 | 8.5 |
| 45 | ⊟-Cement Production | 3.25 | 8.25 | 13.75 | 0.16 | 0.52 | 1.2 | 76 | 79 | 82 | 4 | 8 | 12 | 14236.19 | 8.5 |
| 46 | ⊟-Set Casing Hanger | 4.1 | 8.9 | 16.63 | 0.21 | 0.83 | 2.06 | 65 | 71 | 78 | 3 | 7 | 12 | 14236.19 | 8.5 |
| 47 | ⊟-Log Production Ceme | 10.23 | 14.31 | 18.63 | 1.02 | 2.15 | 4.66 | 26 | 28 | 54 | 3 | 4 | 8 | 14236.19 | 8.5 |
| 48 | ⊟-Completion Trip | 20.91 | 29.38 | 40.53 | 2.09 | 4.41 | 10.13 | 28 | 39 | 39 | 3 | 4 | 14 | 14236.19 | 8.5 |
| 49 | ⊟-Well Completion Job | 13.73 | 21.14 | 29.55 | 1.37 | 3.17 | 7.39 | 18 | 28 | 39 | 3 | 4 | 10 | 14236.19 | 8.5 |
| 50 | ⊟-Demobilize Rig Job | 16.25 | 26.5 | 48.75 | 1.63 | 4.28 | 12.19 | 22 | 38 | 65 | 2 | 6 | 16 | 14236.19 | 8.5 |

| | Task Name | Min Time | Avg Time | Max Time | Min NPT | Avg NPT |
|---|---|---|---|---|---|---|
| | | h | h | h | h | h |
| 1 | ⊟--Total | 848.83 | 1189.89 | 1566.15 | 49.16 | 129.49 |
| 2 | ⊞--Mobilize Rig Job | 17.75 | 31.5 | 53.75 | 1.78 | 4.73 |
| 3 | ⊟--Drill Wellbore Job | 801.1 | 1108.75 | 1434.1 | 44.38 | 117.32 |
| 4 | ⊟--Conductor | 11.44 | 17.51 | 24.39 | 0.98 | 2.35 |
| 5 | ⊞--Drive Conductor | 8.18 | 12.07 | 16.46 | 0.82 | 1.81 |
| 6 | ⊞--Drillout | 3.26 | 5.44 | 7.93 | 0.16 | 0.54 |
| 7 | ⊟--Surface | 37.61 | 62.78 | 91.95 | 2.54 | 7.45 |
| 8 | ⊞--Drill Surface | 4.85 | 6.7 | 8.61 | 0.24 | 0.67 |
| 9 | ⊞--Open Hole Logging | 3.25 | 5 | 7 | 0.33 | 0.75 |
| 10 | ⊞--Wiper Trip | 5.43 | 8.01 | 10.1 | 0.27 | 0.8 |
| 11 | ⊞--Run Surface | 3.24 | 6.68 | 11.23 | 0.16 | 0.67 |
| 12 | ⊞--Cement Surface | 5.28 | 8.9 | 14.88 | 0.26 | 0.89 |
| 13 | ⊞--Cased Hole Logging | 3.25 | 5 | 7 | 0.33 | 0.75 |
| 14 | ⊞--Install BOP | 6.75 | 13.5 | 20.25 | 0.68 | 2.03 |
| 15 | ⊞--Drillout | 3.62 | 5.6 | 8.09 | 0.18 | 0.56 |
| 16 | ⊞--Conduct FIT or LOT | 1.95 | 3.38 | 4.8 | 0.1 | 0.34 |
| 17 | ⊟--Intermediate | 231.96 | 317.66 | 406.82 | 12.29 | 32.78 |
| 18 | ⊞--Drill Intermediate | 86.06 | 115.54 | 145.01 | 4.3 | 11.55 |
| 19 | ⊞--Bit run Intermediate | 95.46 | 128.53 | 161.1 | 4.77 | 12.85 |
| 20 | ⊞--Open Hole Logging | 5.01 | 7.34 | 9.93 | 0.5 | 1.1 |
| 21 | ⊞--Wiper Trip | 13.23 | 18.4 | 23.07 | 0.66 | 1.84 |
| 22 | ⊞--Run Intermediate | 2.35 | 4.5 | 8.75 | 0.12 | 0.45 |
| 23 | ⊞--Cement Intermediate | 12.51 | 17.54 | 23.43 | 0.63 | 1.75 |
| 24 | ⊞--Cased Hole Logging | 5.01 | 7.34 | 9.93 | 0.5 | 1.1 |

| Max NPT | Min Cost | Avg Cost | Max Cost | Min NPC | Avg NPC | Max NPC | End Depth | Wellbore Sizes |
|---|---|---|---|---|---|---|---|---|
| h | K$ | K$ | K$ | K$ | K$ | K$ | ft | in |
| 265.87 | 1,879 | 2,243 | 2,644 | 109 | 243 | 444 | 14236.19 | 8.5 |
| 13.44 | 11 | 20 | 34 | 1 | 3 | 8 | 40 | 38 |
| 232.86 | 1,828 | 2,158 | 2,506 | 104 | 230 | 409 | 14236.19 | 8.5 |
| 5.3 | 46 | 50 | 54 | 4 | 7 | 13 | 410.73 | 38 |
| 4.12 | 44 | 46 | 49 | 4 | 7 | 12 | 410.73 | 38 |
| 1.19 | 2 | 3 | 5 | 0 | 0 | 1 | 410.73 | 38 |
| 17.22 | 202 | 217 | 235 | 10 | 22 | 37 | 410.73 | 36 |
| 1.29 | 79 | 80 | 81 | 4 | 8 | 12 | 410.73 | 36 |
| 1.75 | 2 | 2 | 4 | 0 | 0 | 1 | 410.73 | 36 |
| 1.51 | 3 | 5 | 6 | 0 | 1 | 1 | 410.73 | 36 |
| 1.68 | 44 | 46 | 49 | 2 | 5 | 7 | 410.73 | 36 |
| 2.23 | 65 | 68 | 71 | 3 | 7 | 11 | 410.73 | 36 |
| 1.75 | 2 | 2 | 4 | 0 | 0 | 1 | 410.73 | 36 |
| 5.06 | 4 | 8 | 13 | 0 | 1 | 3 | 410.73 | 36 |
| 1.21 | 2 | 4 | 5 | 0 | 0 | 1 | 410.73 | 36 |
| 0.72 | 1 | 2 | 3 | 0 | 0 | 0 | 410.73 | 36 |
| 63.78 | 505 | 596 | 691 | 27 | 61 | 108 | 6975.7 | 22 |
| 21.75 | 140 | 172 | 204 | 7 | 17 | 31 | 3619.4 | 22 |
| 24.16 | 103 | 139 | 175 | 5 | 14 | 26 | 6975.7 | 22 |
| 2.48 | 25 | 26 | 28 | 2 | 4 | 7 | 6975.7 | 22 |
| 3.46 | 14 | 20 | 25 | 1 | 2 | 4 | 6975.7 | 22 |
| 1.31 | 3 | 5 | 9 | 0 | 0 | 1 | 6975.7 | 22 |
| 3.51 | 204 | 209 | 216 | 10 | 21 | 32 | 6975.7 | 22 |
| 2.48 | 2 | 4 | 6 | 0 | 1 | 1 | 6975.7 | 22 |

| | | | | | | | |
|---|---|---|---|---|---|---|---|
| 1.94 | 4 | 6 | 8 | 0 | 1 | 2 | 6975.7 | 22 |
| 1.93 | 7 | 10 | 14 | 0 | 1 | 2 | 6975.7 | 22 |
| 0.75 | 2 | 4 | 5 | 0 | 0 | 1 | 6975.7 | 22 |
| 80.36 | 512 | 628 | 748 | 27 | 64 | 116 | 9318.22 | 14.75 |
| 11.91 | 129 | 147 | 164 | 6 | 15 | 25 | 8560.34 | 14.75 |
| 7.68 | 33 | 44 | 55 | 2 | 4 | 8 | 9042.62 | 14.75 |
| 45.32 | 196 | 262 | 327 | 10 | 26 | 49 | 9318.22 | 14.75 |
| 1.69 | 20 | 21 | 23 | 2 | 3 | 6 | 9318.22 | 14.75 |
| 4.32 | 18 | 25 | 31 | 1 | 2 | 5 | 9318.22 | 14.75 |
| 1.31 | 3 | 5 | 9 | 0 | 0 | 1 | 9318.22 | 14.75 |
| 1.23 | 94 | 96 | 99 | 5 | 10 | 15 | 9318.22 | 14.75 |
| 1.69 | 2 | 4 | 6 | 0 | 1 | 1 | 9318.22 | 14.75 |
| 1.94 | 4 | 6 | 8 | 0 | 1 | 2 | 9318.22 | 14.75 |
| 2.34 | 9 | 13 | 17 | 0 | 1 | 3 | 9318.22 | 14.75 |
| 0.92 | 3 | 5 | 7 | 0 | 0 | 1 | 9318.22 | 14.75 |
| 66.19 | 563 | 666 | 779 | 36 | 75 | 135 | 14236.19 | 8.5 |
| 25.01 | 180 | 225 | 270 | 9 | 23 | 41 | 14082 | 8.5 |
| 11.46 | 61 | 82 | 102 | 3 | 8 | 15 | 14236.19 | 8.5 |
| 4.66 | 94 | 96 | 99 | 9 | 14 | 25 | 14236.19 | 8.5 |
| 5.7 | 30 | 40 | 51 | 1 | 4 | 8 | 14236.19 | 8.5 |
| 1.31 | 3 | 6 | 12 | 0 | 1 | 2 | 14236.19 | 8.5 |
| 1.2 | 76 | 79 | 82 | 4 | 8 | 12 | 14236.19 | 8.5 |
| 2.06 | 65 | 71 | 78 | 3 | 7 | 12 | 14236.19 | 8.5 |
| 4.66 | 26 | 28 | 31 | 3 | 4 | 8 | 14236.19 | 8.5 |
| 10.13 | 28 | 39 | 54 | 3 | 6 | 14 | 14236.19 | 8.5 |
| 7.39 | 18 | 28 | 39 | 2 | 4 | 10 | 14236.19 | 8.5 |
| 12.19 | 22 | 38 | 65 | 2 | 6 | 16 | 14236.19 | 8.5 |

| | | | |
|---|---|---|---|
| 15 | Assemble Equipm | 1.67 | 1.81 | 1 |
| 16 | Drive Conductor | 7.1 | 7.68 | 8 |
| 17 | Disassemble Equi | 1 | 1.09 | 1 |
| 18 | ⊟ Drillout | | | |
| 19 | Safety Meeting | 4.99 | 5.4 | 5 |
| 20 | Pick Up And Make | 0.41 | 0.45 | 0 |
| 21 | Run In Hole | 2.7 | 2.92 | 3 |
| 22 | Circulate | 0.15 | 0.16 | 0 |
| 23 | Drillout Conductor | 0.75 | 0.81 | 0 |
| 24 | ⊟ Surface | 0.98 | 1.06 | 1 |
| 25 | ⊟ Drill Surface | 91.52 | 99.08 | 107 |
| 26 | Drill Rotary | 34.16 | 36.98 | 4 |
| 27 | Circulate | 23.04 | 24.94 | 27 |
| 28 | Short Trip | 2.58 | 2.8 | 3 |
| 29 | Circulate | 2.37 | 2.57 | 3 |
| 30 | Pull Out Of Hole | 2.58 | 2.8 | 3 |
| 31 | Pull Out And Lay | 0.89 | 0.96 | 1 |
| 32 | ⊟ Wiper Trip | 2.7 | 2.92 | 3 |
| 33 | Safety Meeting | 10.47 | 11.34 | 12 |
| 34 | Pick Up And Make | 0.43 | 0.46 | 0 |
| 35 | Run In Hole | 2.51 | 2.72 | 2 |
| 36 | Circulate | 1.45 | 1.57 | 1 |
| 37 | Pull Out Of Hole | 2.58 | 2.79 | 3 |
| 38 | Pull Out And Lay | 0.81 | 0.87 | 0 |
| 39 | ⊟ Run Surface | 2.69 | 2.91 | 3 |
| 40 | Clear Rig Floor | 9.87 | 10.69 | 11 |
| | | 0.53 | 0.58 | 0 |

Formation Evaluation

Results
- Risk Index
- Risk Map
- Time & Cost
- Time & Cost Chart
- Monte Carlo Advanced
- Monte Carlo Chart
- Analysis Report
- Summary Report
- Montage Quicktips

| | Task Name | Min Time h | Avg Time h | Max Time h | Min NPT h | Avg NPT h | Max NPT h | Min Cost K$ | Avg Cost K$ | Max Cost K$ | Min NPC K$ | Avg NPC K$ | Max NPC K$ | End Depth ft | Wellbore Sizes in |
|---|---|---|---|---|---|---|---|---|---|---|---|---|---|---|---|
| 1 | ⊟-Total | 848.83 | 1189.89 | 1566.15 | 49.16 | 129.49 | 265.87 | 1,879 | 2,243 | 2,644 | 109 | 243 | 444 | 14236.19 | 8.5 |
| 2 | ⊞-Mobilize Rig Job | 17.75 | 31.5 | 53.75 | 1.78 | 4.73 | 13.44 | 11 | 20 | 34 | 1 | 3 | 8 | | 38 |
| 3 | ⊟-Drill Wellbore Job | 801.1 | 1108.75 | 1434.1 | 44.38 | 117.32 | 232.86 | 1,828 | 2,158 | 2,506 | 104 | 230 | 409 | 14236.19 | 8.5 |
| 4 | ⊟-Conductor | 11.44 | 17.51 | 24.39 | 0.98 | 2.35 | 5.3 | 46 | 50 | 54 | 7 | 13 | 38 | 410.73 | 38 |
| 5 | ⊞-Drive Conductor | 8.18 | 12.07 | 16.46 | 0.82 | 1.81 | 4.12 | 44 | 46 | 49 | 4 | 7 | 7 | 410.73 | 38 |
| 6 | ⊞-Drillout | 3.26 | 5.44 | 7.93 | 0.16 | 0.54 | 1.19 | 2 | 3 | 5 | 4 | 7 | 12 | 410.73 | 38 |
| 7 | ⊟-Surface | 37.61 | 62.78 | 91.95 | 2.54 | 7.45 | 17.22 | 202 | 217 | 235 | 0 | 0 | 0 | 410.73 | 36 |
| 8 | ⊞-Drill Surface | 4.85 | 6.7 | 8.61 | 0.24 | 0.67 | 1.29 | 79 | 80 | 81 | 4 | 22 | 37 | 410.73 | 36 |
| 9 | ⊞-Open Hole Logging | 3.25 | 5 | 7 | 0.33 | 0.75 | 1.75 | 2 | 2 | 4 | 0 | 8 | 12 | 410.73 | 36 |
| 10 | ⊞-Wiper Trip | 5.43 | 8.01 | 10.1 | 0.27 | 0.8 | 1.51 | 3 | 5 | 6 | 0 | 0 | 0 | 410.73 | 36 |
| 11 | ⊞-Run Surface | 3.24 | 6.68 | 11.23 | 0.16 | 0.67 | 1.68 | 44 | 46 | 49 | 2 | 5 | 7 | 410.73 | 36 |
| 12 | ⊞-Cement Surface | 5.28 | 8.9 | 14.88 | 0.26 | 0.89 | 2.23 | 65 | 68 | 71 | 3 | 5 | 11 | 410.73 | 36 |
| 13 | ⊞-Cased Hole Logging | 3.25 | 5 | 7 | 0.33 | 0.75 | 1.75 | 2 | 2 | 4 | 0 | 0 | 0 | 410.73 | 36 |
| 14 | ⊞-Install BOP | 6.75 | 13.5 | 20.25 | 0.68 | 2.03 | 5.06 | 4 | 8 | 13 | 0 | 1 | 3 | 410.73 | 36 |
| 15 | ⊞-Drillout | 3.62 | 5.6 | 8.09 | 0.18 | 0.56 | 1.21 | 2 | 4 | 5 | 0 | 0 | 0 | 410.73 | 36 |
| 16 | ⊞-Conduct FIT or LOT | 1.95 | 3.38 | 4.8 | 0.1 | 0.34 | 0.72 | 1 | 2 | 3 | 0 | 0 | 0 | 410.73 | 36 |
| 17 | ⊟-Intermediate | 231.96 | 317.66 | 406.82 | 12.29 | 32.78 | 63.78 | 505 | 596 | 691 | 27 | 61 | 108 | 6975.7 | 22 |
| 18 | ⊞-Drill Intermediate | 86.06 | 115.54 | 145.01 | 4.3 | 11.55 | 21.75 | 140 | 172 | 204 | 7 | 17 | 31 | 3619.4 | 22 |
| 19 | ⊞-Bit run Intermediate | 95.46 | 128.53 | 161.1 | 4.77 | 12.85 | 24.16 | 103 | 139 | 175 | 5 | 14 | 26 | 6975.7 | 22 |
| 20 | ⊞-Open Hole Logging | 5.01 | 7.34 | 9.93 | 0.5 | 1.1 | 2.48 | 25 | 26 | 28 | 2 | 4 | 7 | 6975.7 | 22 |
| 21 | ⊞-Wiper Trip | 13.23 | 18.4 | 23.07 | 0.66 | 1.84 | 3.46 | 14 | 20 | 25 | 1 | 2 | 4 | 6975.7 | 22 |
| 22 | ⊞-Run Intermediate | 2.35 | 4.5 | 6.75 | 0.12 | 0.45 | 1.31 | 3 | 5 | 9 | 0 | 1 | 2 | 6975.7 | 22 |
| 23 | ⊞-Cement Intermediate | 12.51 | 17.54 | 23.43 | 0.63 | 1.75 | 3.51 | 204 | 209 | 216 | 10 | 21 | 32 | 6975.7 | 22 |
| 24 | ⊞-Cased Hole Logging | 5.01 | 7.34 | 9.93 | 0.5 | 1.1 | 2.48 | 2 | 4 | 6 | 0 | 1 | 1 | 6975.7 | 22 |
| 25 | ⊞-Test BOP Intermediat | 3.75 | 5.5 | 7.75 | 0.38 | 0.83 | 1.94 | 4 | 6 | 8 | 0 | 1 | 2 | 6975.7 | 22 |
| 26 | ⊞-Drillout | 6.49 | 9.42 | 12.85 | 0.32 | 0.94 | 1.93 | 7 | 10 | 14 | 0 | 1 | 1 | 6975.7 | 22 |
| 27 | ⊞-Conduct FIT or LOT | 2.09 | 3.55 | 5.01 | 0.1 | 0.35 | 0.75 | 4 | 6 | 8 | 0 | 1 | 2 | 6975.7 | 22 |
| 28 | ⊟-Intermediate | 302.42 | 410.49 | 521.51 | 15.62 | 41.81 | 80.36 | 512 | 628 | 748 | 27 | 64 | 116 | 9318.22 | 14.75 |
| 29 | ⊞-Drill Intermediate | 47.2 | 63.29 | 79.83 | 2.36 | 6.33 | 11.91 | 129 | 147 | 164 | 6 | 15 | 25 | 8560.34 | 14.75 |
| 30 | ⊞-Bit run Intermediate | 30.377 | 41.02 | 51.17 | 1.52 | 4.1 | 7.68 | 33 | 44 | 55 | 2 | 4 | 8 | 9042.62 | 14.75 |
| 31 | ⊞-Open Hole Logging | 181.32 | 241.97 | 302.13 | 9.07 | 24.2 | 45.32 | 196 | 262 | 327 | 10 | 26 | 49 | 9318.22 | 14.75 |
| 32 | ⊞-Wiper Trip | 3.11 | 4.82 | 6.77 | 0.31 | 0.72 | 1.69 | 20 | 21 | 23 | 2 | 3 | 6 | 9318.22 | 14.75 |
| 33 | ⊞-Run Intermediate | 16.73 | 23 | 28.78 | 0.84 | 2.3 | 4.32 | 18 | 25 | 31 | 1 | 2 | 5 | 9318.22 | 14.75 |
| 34 | ⊞-Cement Intermediate | 2.35 | 4.5 | 8.75 | 0.12 | 0.45 | 1.31 | 3 | 9 | 12 | 0 | 1 | 1 | 9318.22 | 14.75 |
| 35 | ⊞-Cased Hole Logging | 3.39 | 5.39 | 8.23 | 0.17 | 0.54 | 1.23 | 94 | 96 | 99 | 5 | 10 | 15 | 9318.22 | 14.75 |
| 36 | ⊞-Test BOP Intermediat | 3.11 | 4.82 | 6.77 | 0.31 | 0.72 | 1.69 | 4 | 4 | 6 | 0 | 1 | 1 | 9318.22 | 14.75 |
| 37 | ⊞-Drillout | 3.75 | 5.5 | 7.75 | 0.38 | 0.83 | 1.94 | 9 | 13 | 17 | 0 | 2 | 3 | 9318.22 | 14.75 |
| 38 | ⊞-Conduct FIT or LOT | 8.24 | 11.68 | 15.63 | 0.41 | 1.17 | 2.34 | 3 | 5 | 7 | 0 | 0 | 0 | 9318.22 | 14.75 |
| 39 | ⊞-Drillout | 2.85 | 4.51 | 6.16 | 0.14 | 0.45 | 0.92 | 5 | 6 | 7 | 0 | 1 | 1 | 9318.22 | 14.75 |
| 40 | ⊟-Production | 217.67 | 300.3 | 389.42 | 12.95 | 32.93 | 66.19 | 563 | 666 | 779 | 36 | 75 | 135 | 14236.19 | 8.5 |
| 41 | ⊞-Drill Production | 98.85 | 132.79 | 166.73 | 4.94 | 13.28 | 25.01 | 180 | 225 | 270 | 9 | 23 | 41 | 14082 | 8.5 |
| 42 | ⊞-Bit run Production | 45.52 | 61.22 | 76.41 | 2.28 | 6.12 | 11.46 | 61 | 82 | 102 | 3 | 8 | 15 | 14236.19 | 8.5 |
| 43 | ⊞-Log Production | 10.23 | 14.31 | 18.63 | 1.02 | 2.15 | 4.66 | 94 | 96 | 99 | 9 | 14 | 25 | 14236.19 | 8.5 |
| 44 | ⊞-Wiper Trip Assembly | 22.22 | 30.35 | 37.98 | 1.11 | 3.04 | 5.7 | 30 | 40 | 51 | 1 | 4 | 8 | 14236.19 | 8.5 |
| 45 | ⊞-Run Production | 2.35 | 4.5 | 8.75 | 0.12 | 0.45 | 1.31 | 3 | 6 | 9 | 0 | 1 | 2 | 14236.19 | 8.5 |
| 46 | ⊞-Cement Production | 3.25 | 5.2 | 8 | 0.16 | 0.52 | 1.2 | 76 | 79 | 82 | 4 | 8 | 12 | 14236.19 | 8.5 |
| 47 | ⊞-Set Casing Hanger | 4.1 | 8.25 | 13.75 | 0.21 | 0.83 | 2.06 | 65 | 71 | 78 | 3 | 7 | 12 | 14236.19 | 8.5 |
| 48 | ⊞-Log Production Ceme | 10.23 | 14.31 | 18.63 | 1.02 | 1.17 | 4.66 | 26 | 28 | 30 | 3 | 6 | 10 | 14236.19 | 8.5 |
| 49 | ⊞-Completion Trip | 20.91 | 29.38 | 40.53 | 2.09 | 4.41 | 10.13 | 28 | 39 | 54 | 3 | 8 | 14 | 14236.19 | 8.5 |
| 50 | ⊞-Well Completion Job | 13.73 | 21.14 | 29.55 | 1.37 | 3.17 | 7.39 | 18 | 28 | 39 | 2 | 4 | 10 | 14236.19 | 8.5 |
| 51 | ⊞-Demobilize Rig Job | 16.25 | 28.5 | 48.75 | 1.63 | 4.28 | 12.19 | 22 | 38 | 65 | 2 | 6 | 16 | 14236.19 | 8.5 |

208

| | Task Name | Min Time h | Avg Time h | Max Time h | Min NPT h | Avg NPT h |
|---|---|---|---|---|---|---|
| 1 | ⊟ Total | 848.83 | 1189.89 | 1566.15 | 49.16 | 129.49 |
| 2 | ⊞ Mobilize Rig Job | 17.75 | 31.5 | 53.75 | 1.78 | 4.73 |
| 3 | ⊟ Drill Wellbore Job | 801.1 | 1108.75 | 1434.1 | 44.38 | 117.32 |
| 4 | ⊟ Conductor | 11.44 | 17.51 | 24.39 | 0.98 | 2.35 |
| 5 | ⊞ Drive Conductor | 8.18 | 12.07 | 16.46 | 0.82 | 1.81 |
| 6 | ⊞ Drillout | 3.26 | 5.44 | 7.93 | 0.16 | 0.54 |
| 7 | ⊟ Surface | 37.61 | 62.78 | 91.95 | 2.54 | 7.45 |
| 8 | ⊞ Drill Surface | 4.85 | 6.7 | 8.61 | 0.24 | 0.67 |
| 9 | ⊞ Open Hole Logging | 3.25 | 5 | 7 | 0.33 | 0.75 |
| 10 | ⊞ Wiper Trip | 5.43 | 8.01 | 10.1 | 0.27 | 0.8 |
| 11 | ⊞ Run Surface | 3.24 | 6.68 | 11.23 | 0.16 | 0.67 |
| 12 | ⊞ Cement Surface | 5.28 | 8.9 | 14.88 | 0.26 | 0.89 |
| 13 | ⊞ Cased Hole Logging | 3.25 | 5 | 7 | 0.33 | 0.75 |
| 14 | ⊞ Install BOP | 6.75 | 13.5 | 20.25 | 0.68 | 2.03 |
| 15 | ⊞ Drillout | 3.62 | 5.6 | 8.09 | 0.18 | 0.56 |
| 16 | ⊞ Conduct FIT or LOT | 1.95 | 3.38 | 4.8 | 0.1 | 0.34 |
| 17 | ⊟ Intermediate | 231.96 | 317.66 | 406.82 | 12.29 | 32.78 |
| 18 | ⊞ Drill Intermediate | 86.06 | 115.54 | 145.01 | 4.3 | 11.55 |
| 19 | ⊞ Bit run Intermediate | 95.46 | 128.53 | 161.1 | 4.77 | 12.85 |
| 20 | ⊞ Open Hole Logging | 5.01 | 7.34 | 9.93 | 0.5 | 1.1 |
| 21 | ⊞ Wiper Trip | 13.23 | 18.4 | 23.07 | 0.66 | 1.84 |
| 22 | ⊞ Run Intermediate | 2.35 | 4.5 | 8.75 | 0.12 | 0.45 |
| 23 | ⊞ Cement Intermediate | 12.51 | 17.54 | 23.43 | 0.63 | 1.75 |
| 24 | ⊞ Cased Hole Logging | 5.01 | 7.34 | 9.93 | 0.5 | 1.1 |

FIG.50A

| Max NPT | Min Cost | Avg Cost | Max Cost | Min NPC | Avg NPC | Max NPC | End Depth | Wellbore Sizes |
|---|---|---|---|---|---|---|---|---|
| h | K$ | K$ | K$ | K$ | K$ | K$ | ft | in |
| 265.87 | 1,879 | 2,243 | 2,644 | 109 | 243 | 444 | 14236.19 | 8.5 |
| 13.44 | 11 | 20 | 34 | 1 | 3 | 8 | 40 | 38 |
| 232.86 | 1,828 | 2,158 | 2,506 | 104 | 230 | 409 | 14236.19 | 8.5 |
| 5.3 | 46 | 50 | 54 | 4 | 7 | 13 | 410.73 | 38 |
| 4.12 | 44 | 46 | 49 | 4 | 7 | 12 | 410.73 | 38 |
| 1.19 | 2 | 3 | 5 | 0 | 0 | 1 | 410.73 | 38 |
| 17.22 | 202 | 217 | 235 | 10 | 22 | 37 | 410.73 | 36 |
| 1.29 | 79 | 80 | 81 | 4 | 8 | 12 | 410.73 | 36 |
| 1.75 | 2 | 2 | 4 | 0 | 0 | 1 | 410.73 | 36 |
| 1.51 | 3 | 5 | 6 | 0 | 1 | 1 | 410.73 | 36 |
| 1.68 | 44 | 46 | 49 | 2 | 5 | 7 | 410.73 | 36 |
| 2.23 | 65 | 68 | 71 | 3 | 7 | 11 | 410.73 | 36 |
| 1.75 | 2 | 2 | 4 | 0 | 0 | 1 | 410.73 | 36 |
| 5.06 | 4 | 8 | 13 | 0 | 1 | 3 | 410.73 | 36 |
| 1.21 | 2 | 4 | 5 | 0 | 0 | 1 | 410.73 | 36 |
| 0.72 | 1 | 2 | 3 | 0 | 0 | 0 | 410.73 | 36 |
| 63.78 | 505 | 596 | 691 | 27 | 61 | 108 | 6975.7 | 22 |
| 21.75 | 140 | 172 | 204 | 7 | 17 | 31 | 3619.4 | 22 |
| 24.16 | 103 | 139 | 175 | 5 | 14 | 26 | 6975.7 | 22 |
| 2.48 | 25 | 26 | 28 | 2 | 4 | 7 | 6975.7 | 22 |
| 3.46 | 14 | 20 | 25 | 1 | 2 | 4 | 6975.7 | 22 |
| 1.31 | 3 | 5 | 9 | 0 | 0 | 1 | 6975.7 | 22 |
| 3.51 | 204 | 209 | 216 | 10 | 21 | 32 | 6975.7 | 22 |
| 2.48 | 2 | 4 | 6 | 0 | 1 | 1 | 6975.7 | 22 |

FIG.50B

|    |                          |        |        |        |       |       |
|----|--------------------------|--------|--------|--------|-------|-------|
| 25 | ⊞ Test BOP Intermediat   | 3.75   | 5.5    | 7.75   | 0.38  | 0.83  |
| 26 | ⊞ Drillout               | 6.49   | 9.42   | 12.85  | 0.32  | 0.94  |
| 27 | ⊞ Conduct FIT or LOT     | 2.09   | 3.55   | 5.01   | 0.1   | 0.35  |
| 28 | ⊟ Intermediate           | 302.42 | 410.49 | 521.51 | 15.62 | 41.81 |
| 29 | ⊞ Drill Intermediate     | 47.2   | 63.29  | 79.83  | 2.36  | 6.33  |
| 30 | ⊞ Bit run Intermediate   | 30.37  | 41.02  | 51.17  | 1.52  | 4.1   |
| 31 | ⊞ Bit run Intermediate   | 181.32 | 241.97 | 302.13 | 9.07  | 24.2  |
| 32 | ⊞ Open Hole Logging      | 3.11   | 4.82   | 6.77   | 0.31  | 0.72  |
| 33 | ⊞ Wiper Trip             | 16.73  | 23     | 28.78  | 0.84  | 2.3   |
| 34 | ⊞ Run Intermediate       | 2.35   | 4.5    | 8.75   | 0.12  | 0.45  |
| 35 | ⊞ Cement Intermediate    | 3.39   | 5.39   | 8.23   | 0.17  | 0.54  |
| 36 | ⊞ Cased Hole Logging     | 3.11   | 4.82   | 6.77   | 0.31  | 0.72  |
| 37 | ⊞ Test BOP Intermediat   | 3.75   | 5.5    | 7.75   | 0.38  | 0.83  |
| 38 | ⊞ Drillout               | 8.24   | 11.68  | 15.63  | 0.41  | 1.17  |
| 39 | ⊞ Conduct FIT or LOT     | 2.85   | 4.51   | 6.16   | 0.14  | 0.45  |
| 40 | ⊟ Production             | 217.67 | 300.3  | 389.42 | 12.95 | 32.93 |
| 41 | ⊞ Drill Production       | 98.85  | 132.79 | 166.73 | 4.94  | 13.28 |
| 42 | ⊞ Bit run Production     | 45.52  | 61.22  | 76.41  | 2.28  | 6.12  |
| 43 | ⊞ Log Production         | 10.23  | 14.31  | 18.63  | 1.02  | 2.15  |
| 44 | ⊞ Wiper Trip Assembly    | 22.22  | 30.35  | 37.98  | 1.11  | 3.04  |
| 45 | ⊞ Run Production         | 2.35   | 4.5    | 8.75   | 0.12  | 0.45  |
| 46 | ⊞ Cement Production      | 3.25   | 5.2    | 8      | 0.16  | 0.52  |
| 47 | ⊞ Set Casing Hanger      | 4.1    | 8.25   | 13.75  | 0.21  | 0.83  |
| 48 | ⊞ Log Production Ceme    | 10.23  | 14.31  | 18.63  | 1.02  | 2.15  |
| 49 | ⊞ Completion Trip        | 20.91  | 29.38  | 40.53  | 2.09  | 4.41  |
| 50 | ⊞ Well Completion Job    | 13.73  | 21.14  | 29.55  | 1.37  | 3.17  |
| 51 | ⊞ Demobilize Rig Job     | 16.25  | 28.5   | 48.75  | 1.63  | 4.28  |

| | | | | | | | |
|---|---|---|---|---|---|---|---|
| 1.94 | 4 | 6 | 8 | 0 | 1 | 2 | 22 |
| 1.93 | 7 | 10 | 14 | 0 | 1 | 2 | 22 |
| 0.75 | 2 | 4 | 5 | 0 | 0 | 1 | 22 |
| 80.36 | 512 | 628 | 748 | 27 | 64 | 116 | 14.75 |
| 11.91 | 129 | 147 | 164 | 6 | 15 | 25 | 14.75 |
| 7.68 | 33 | 44 | 55 | 2 | 4 | 8 | 14.75 |
| 45.32 | 196 | 262 | 327 | 10 | 26 | 49 | 14.75 |
| 1.69 | 20 | 21 | 23 | 2 | 3 | 6 | 14.75 |
| 4.32 | 18 | 25 | 31 | 1 | 2 | 5 | 14.75 |
| 1.31 | 3 | 5 | 9 | 0 | 0 | 1 | 14.75 |
| 1.23 | 94 | 96 | 99 | 5 | 10 | 15 | 14.75 |
| 1.69 | 2 | 4 | 6 | 0 | 1 | 1 | 14.75 |
| 1.94 | 4 | 6 | 8 | 0 | 1 | 2 | 14.75 |
| 2.34 | 9 | 13 | 17 | 0 | 1 | 3 | 14.75 |
| 0.92 | 3 | 5 | 7 | 0 | 0 | 1 | 14.75 |
| 66.19 | 563 | 666 | 779 | 36 | 75 | 135 | 8.5 |
| 25.01 | 180 | 225 | 270 | 9 | 23 | 41 | 8.5 |
| 11.46 | 61 | 82 | 102 | 3 | 8 | 15 | 8.5 |
| 4.66 | 94 | 96 | 99 | 9 | 14 | 25 | 8.5 |
| 5.7 | 30 | 40 | 51 | 1 | 4 | 8 | 8.5 |
| 1.31 | 3 | 6 | 12 | 0 | 1 | 2 | 8.5 |
| 1.2 | 76 | 79 | 82 | 4 | 8 | 12 | 8.5 |
| 2.06 | 65 | 71 | 78 | 3 | 7 | 12 | 8.5 |
| 4.66 | 26 | 28 | 31 | 3 | 4 | 8 | 8.5 |
| 10.13 | 28 | 39 | 54 | 3 | 6 | 14 | 8.5 |
| 7.39 | 18 | 28 | 39 | 2 | 4 | 10 | 8.5 |
| 12.19 | 22 | 38 | 65 | 2 | 6 | 16 | 8.5 |

| | |
|---|---|
| 6975.7 | |
| 6975.7 | |
| 6975.7 | |
| 9318.22 | |
| 8560.34 | |
| 9042.62 | |
| 9318.22 | |
| 9318.22 | |
| 9318.22 | |
| 9318.22 | |
| 9318.22 | |
| 9318.22 | |
| 9318.22 | |
| 9318.22 | |
| 9318.22 | |
| 14236.19 | |
| 14082 | |
| 14236.19 | |
| 14236.19 | |
| 14236.19 | |
| 14236.19 | |
| 14236.19 | |
| 14236.19 | |
| 14236.19 | |
| 14236.19 | |
| 14236.19 | |
| 14236.19 | |

*FIG.50D*

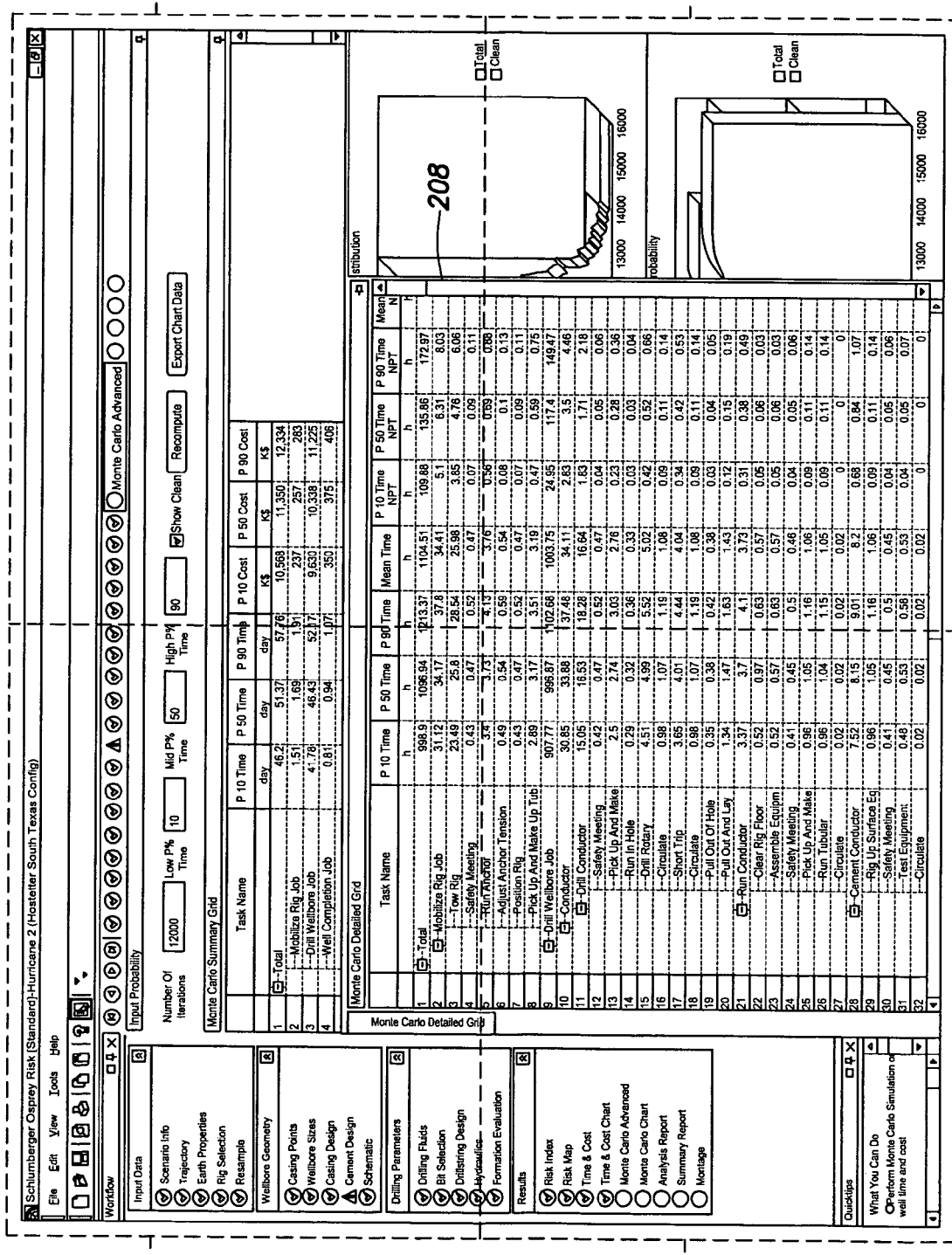

| | | | |
|---|---|---|---|
| 5 | —Run Anchor | 3.4 | 3.73 |
| 6 | —Adjust Anchor Tension | 0.49 | 0.54 |
| 7 | —Position Rig | 0.43 | 0.47 |
| 8 | —Pick Up And Make Up Tub | 2.89 | 3.17 |
| 9 | ⊟-Drill Wellbore Job | 907.77 | 996.87 |
| 10 | ⊟-Conductor | 30.85 | 33.88 |
| 11 | ⊟-Drill Conductor | 15.05 | 16.53 |
| 12 | —Safety Meeting | 0.42 | 0.47 |
| 13 | —Pick Up And Make | 2.5 | 2.74 |
| 14 | —Run In Hole | 0.29 | 0.32 |
| 15 | —Drill Rotary | 4.51 | 4.99 |
| 16 | —Circulate | 0.98 | 1.07 |
| 17 | —Short Trip | 3.65 | 4.01 |
| 18 | —Circulate | 0.98 | 1.07 |
| 19 | —Pull Out Of Hole | 0.35 | 0.38 |
| 20 | —Pull Out And Lay | 1.34 | 1.47 |
| 21 | ⊟-Run Conductor | 3.37 | 3.7 |
| 22 | —Clear Rig Floor | 0.52 | 0.97 |
| 23 | —Assemble Equipm | 0.52 | 0.57 |
| 24 | —Safety Meeting | 0.41 | 0.45 |
| 25 | —Pick Up And Make | 0.96 | 1.05 |
| 26 | —Run Tubular | 0.96 | 1.04 |
| 27 | —Circulate | 0.02 | 0.02 |
| 28 | ⊟-Cement Conductor | 7.52 | 8.15 |
| 29 | —Rig Up Surface Eq | 0.96 | 1.05 |
| 30 | —Safety Meeting | 0.41 | 0.45 |
| 31 | —Test Equipment | 0.48 | 0.53 |
| 32 | —Circulate | 0.02 | 0.02 |

Formation Evaluation

Results
- Risk Index
- Risk Map
- Time & Cost
- Time & Cost Chart
- Monte Carlo Advanced
- Monte Carlo Chart
- Analysis Report
- Summary Report
- Montage

Quicktips

What You Can Do
○ Perform Monte Carlo Simulation of well time and cost

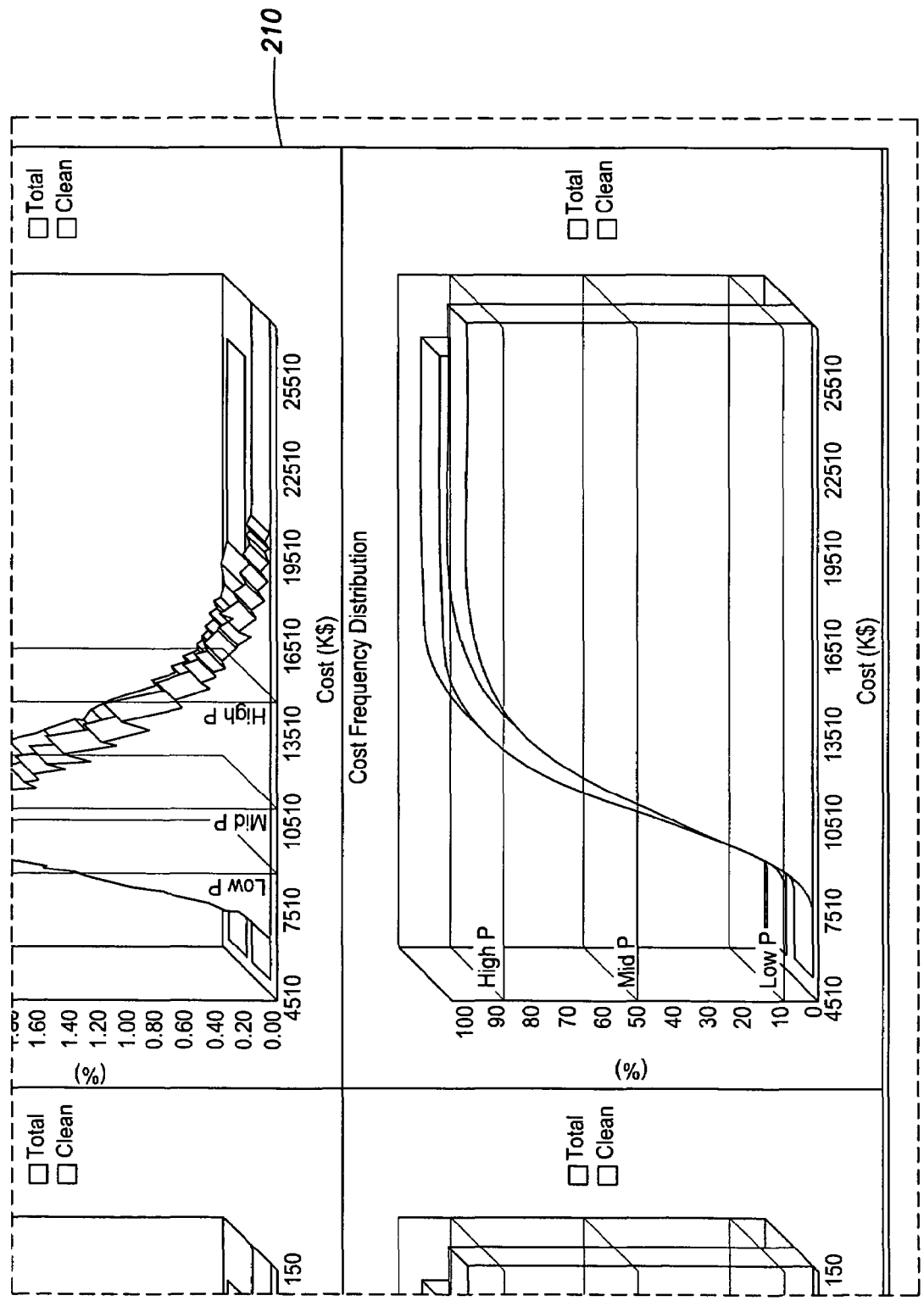

FIG.53

| | | |
|---|---|---|
| 5 | Run Anchor | 3.4 3.73 |
| 6 | Adjust Anchor Tension | 0.49 0.54 |
| 7 | Position Rig | 0.43 0.47 |
| 8 | Pick Up And Make Up Tub | 2.89 3.17 |
| 9 | ⊟-Drill Wellbore Job | 907.77 996.87 |
| 10 | ⊟-Conductor | 30.85 33.88 |
| 11 | ⊟-Drill Conductor | 15.05 16.53 |
| 12 | Safety Meeting | 0.42 0.47 |
| 13 | Pick Up And Make | 2.5 2.74 |
| 14 | Run In Hole | 0.29 0.32 |
| 15 | Drill Rotary | 4.51 4.99 |
| 16 | Circulate | 0.98 1.07 |
| 17 | Short Trip | 3.65 4.01 |
| 18 | Circulate | 0.98 1.07 |
| 19 | Pull Out Of Hole | 0.35 0.38 |
| 20 | Pull Out And Lay | 1.34 1.47 |
| 21 | ⊟-Run Conductor | 3.37 3.7 |
| 22 | Clear Rig Floor | 0.52 0.97 |
| 23 | Assemble Equipm | 0.52 0.57 |
| 24 | Safety Meeting | 0.41 0.45 |
| 25 | Pick Up And Make | 0.96 1.05 |
| 26 | Run Tubular | 0.96 1.04 |
| 27 | Circulate | 0.02 0.02 |
| 28 | ⊟-Cement Conductor | 7.52 8.15 |
| 29 | Rig Up Surface Eq | 0.96 1.05 |
| 30 | Safety Meeting | 0.41 0.45 |
| 31 | Test Equipment | 0.48 0.53 |
| 32 | Circulate | 0.02 0.02 |

Formation Evaluation

Results
- Risk Index
- Risk Map
- Time & Cost
- Time & Cost Chart
- Monte Carlo Advanced
- Monte Carlo Chart
- Analysis Report
- Summary Report
- Montage

Quicktips

What You Can Do
○ Perform Monte Carlo Simulation of well time and cost

METHOD SYSTEM AND PROGRAM STORAGE DEVICE FOR AUTOMATICALLY CALCULATING AND DISPLAYING TIME AND COST DATA IN A WELL PLANNING SYSTEM USING A MONTE CARLO SIMULATION SOFTWARE

CROSS REFERENCE TO RELATED APPLICATIONS

This application is a 'continuation-in-part' application of prior pending application Ser. No. 10/802,622 filed Mar. 17, 2004, entitled 'Method and Apparatus and Program Storage Device Including an Integrated Well Planning Workflow Control System With Process Dependencies'; and this application is a Utility application of Provisional application Ser. No. 60/603,685 filed Aug. 23, 2004.

BACKGROUND

This subject matter relates to an Automatic Well Planning Software System including an advanced probabilistic Monte Carlo algorithm adapted to be stored in a computer system, such as a personal computer, for automatically calculating and generating a time and cost data display, including time and cost data, which is adapted to be illustrated in a window display of a computer system in response to a plurality of activity templates, and for automatically calculating and generating a lognormal distribution display, including time and cost data, adapted to be illustrated in a window display of a computer system in response to a correlation matrix.

The 'oil well drilling process' which includes a process for determining the time to drill an oil well, or a gas well or an injection well or a water well, including its associated cost is a manually subjective process that is based heavily on previous personal experience. In addition, an included process for calculating a probabilistic time and cost of a single well is even more complicated, and few users attempt to make these calculations since the method of making these calculations involves preparing self made spreadsheets. The use of self made spreadsheets usually lacks consistency from well-to-well and from user-to-user.

This specification discloses an 'Automatic Well Planning Software System' including an advanced probabilistic 'Automatic Well Planning Monte Carlo Simulation Software' that represents an automated process adapted for automatically generating and displaying time and cost data associated with oilfield related activities, the display of time and cost data including a numerical display and a graphical display. The 'Automatic Well Planning Software System' represents an automatic process for integrating both wellbore construction and planning workflow accounting for process interdependencies. The automated process is based on a drilling simulator, the process representing a highly interactive process which is encompassed in a software system that: (1) allows well construction practices to be tightly linked to geological and geomechanical models, (2) enables asset teams to plan realistic well trajectories by automatically generating cost estimates with a risk assessment, thereby allowing quick screening and economic evaluation of prospects, (3) enables asset teams to quantify the value of additional information by providing insight into the business impact of project uncertainties, (4) reduces the time required for drilling engineers to assess risks and create "probabilistic time and cost estimates" which are faithful to an engineered well design, and (5) permits drilling engineers to immediately assess the business impact and associated risks of applying new technologies, new procedures, or different approaches to a well design. Discussion of these points illustrate the application of the workflow and verify the value, speed, and accuracy of this integrated well planning and decision-support tool.

SUMMARY

One aspect of the present invention involves a program storage device readable by a machine tangibly embodying a program of instructions executable by the machine to perform method steps for generating and displaying time and cost data representing a time and a cost to complete a plurality of activities in response to a set of engineering results, the method steps comprising: (a) assembling a plurality of time data and a plurality of cost data associated with a plurality of activities in response to a set of engineering results; and (b) generating a display of the time and cost data, the display illustrating a set of time data and a set of cost data representing a time and a cost to complete the plurality of activities.

Another aspect of the present invention involves a method of generating and displaying time and cost data representing a time and a cost to complete a plurality of activities in response to a set of engineering results, comprising the steps of: (a) assembling a plurality of time data and a plurality of cost data associated with a plurality of activities in response to a set of engineering results; and (b) generating a display of the time and cost data, the display illustrating a set of time data and a set of cost data representing a time and a cost to complete the plurality of activities.

Another aspect of the present invention involves a system for generating and displaying time and cost data representing a time and a cost to complete a plurality of activities in response to a set of engineering results, comprising: first apparatus adapted for assembling a plurality of time data and a plurality of cost data associated with a plurality of activities in response to a set of engineering results; and second apparatus adapted for generating a display of the time and cost data, the display illustrating a set of time data and a set of cost data representing a time and a cost to complete the plurality of activities.

Another aspect of the present invention involves a method of well planning, comprising the step of: implementing and practicing features adapted for well planning, the implementing and practicing step being selected from a group consisting of: implementing and practicing a risk assessment feature, implementing and practicing a bit selection feature, implementing and practicing a drillstring design feature, implementing and practicing a workflow control feature, and implementing and practicing a monte carlo feature.

Another aspect of the present invention involves a program storage device readable by a machine tangibly embodying a program of instructions executable by the machine to perform a method step for well planning, the method step comprising: implementing and practicing features adapted for well planning, the implementing and practicing step being selected from a group consisting of: implementing and practicing a risk assessment feature, implementing and practicing a bit selection feature, implementing and practicing a drillstring design feature, implementing and practicing a workflow control feature, and implementing and practicing a monte carlo feature.

Another aspect of the present invention involves a system adapted for well planning, comprising: apparatus adapted for implementing and practicing features associated with well planning, the well planning features being selected from a group consisting of: a risk assessment feature, a bit selection feature, a drillstring design feature, a workflow control feature, and a monte carlo feature.

Further scope of applicability will become apparent from the detailed description presented hereinafter. It should be understood, however, that the detailed description and the specific examples, while representing a preferred embodiment, are given by way of illustration only, since various changes and modifications within the spirit and scope of the 'Automatic Well Planning Monte Carlo Simulation Software' as described and claimed in this specification will become obvious to one skilled in the art from a reading of the following detailed description.

BRIEF DESCRIPTION OF THE DRAWINGS

A full understanding will be obtained from the detailed description of the preferred embodiment presented hereinbelow, and the accompanying drawings, which are given by way of illustration only and are not intended to be limitative, and wherein:

FIG. 3 including

FIG. 4 including

Figure 5:
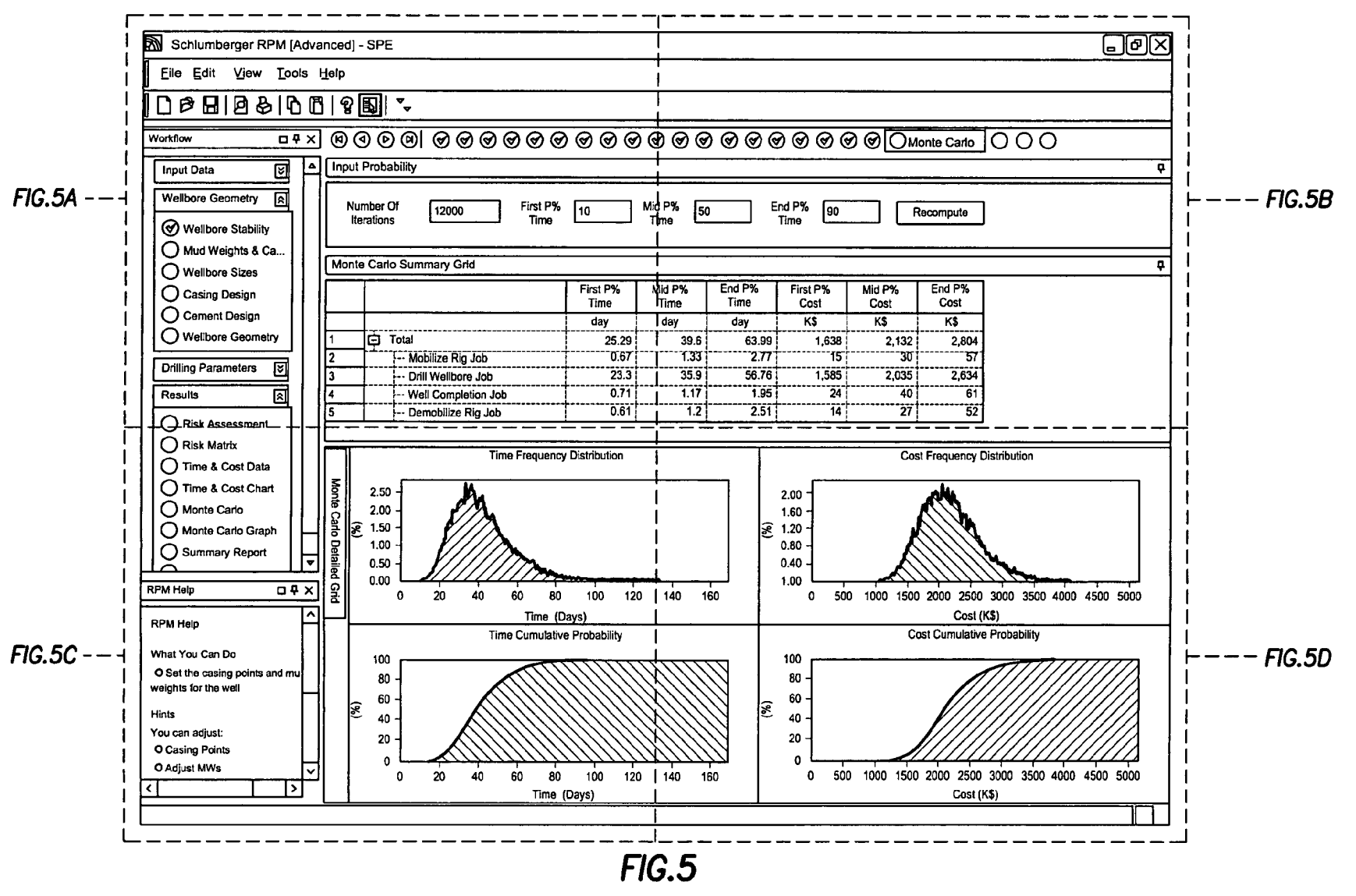
Figure 5A:
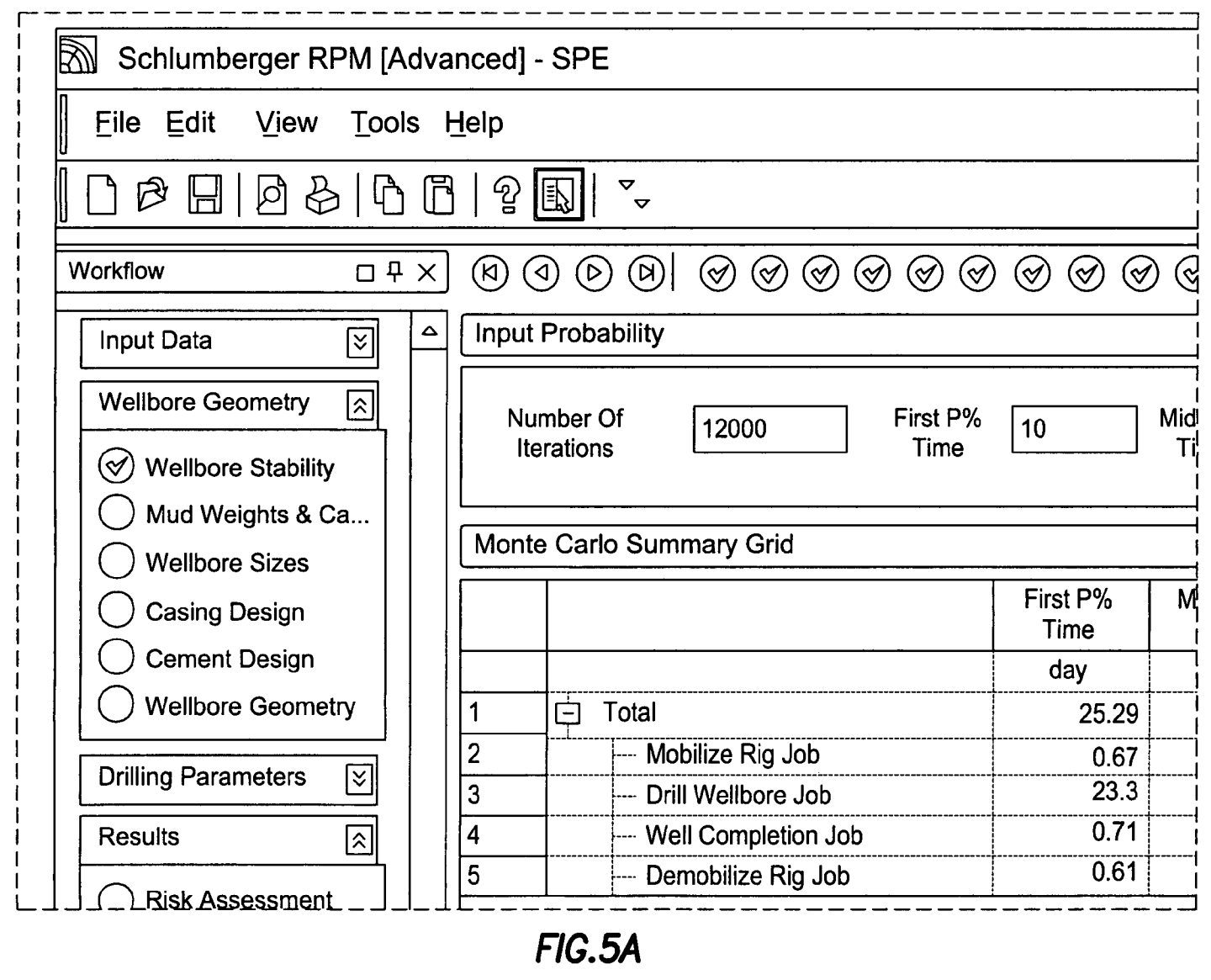

FIG. 5 including FIGS. 5A, 5B, 5C, and 5D illustrates a Monte Carlo time and cost distribution;

FIG. 6 including

FIGS. 34 and 35 illustrate examples of activity templates which forms a part of the input data;

FIG. 52 illustrates an example of the graphical display 23 of FIG. 30 which is generated and displayed in response to the execution of the 'Automatic Well Planning Monte Carlo Simulation Software' of FIGS. 30 and 31;

DETAILED DESCRIPTION

Figure 1:
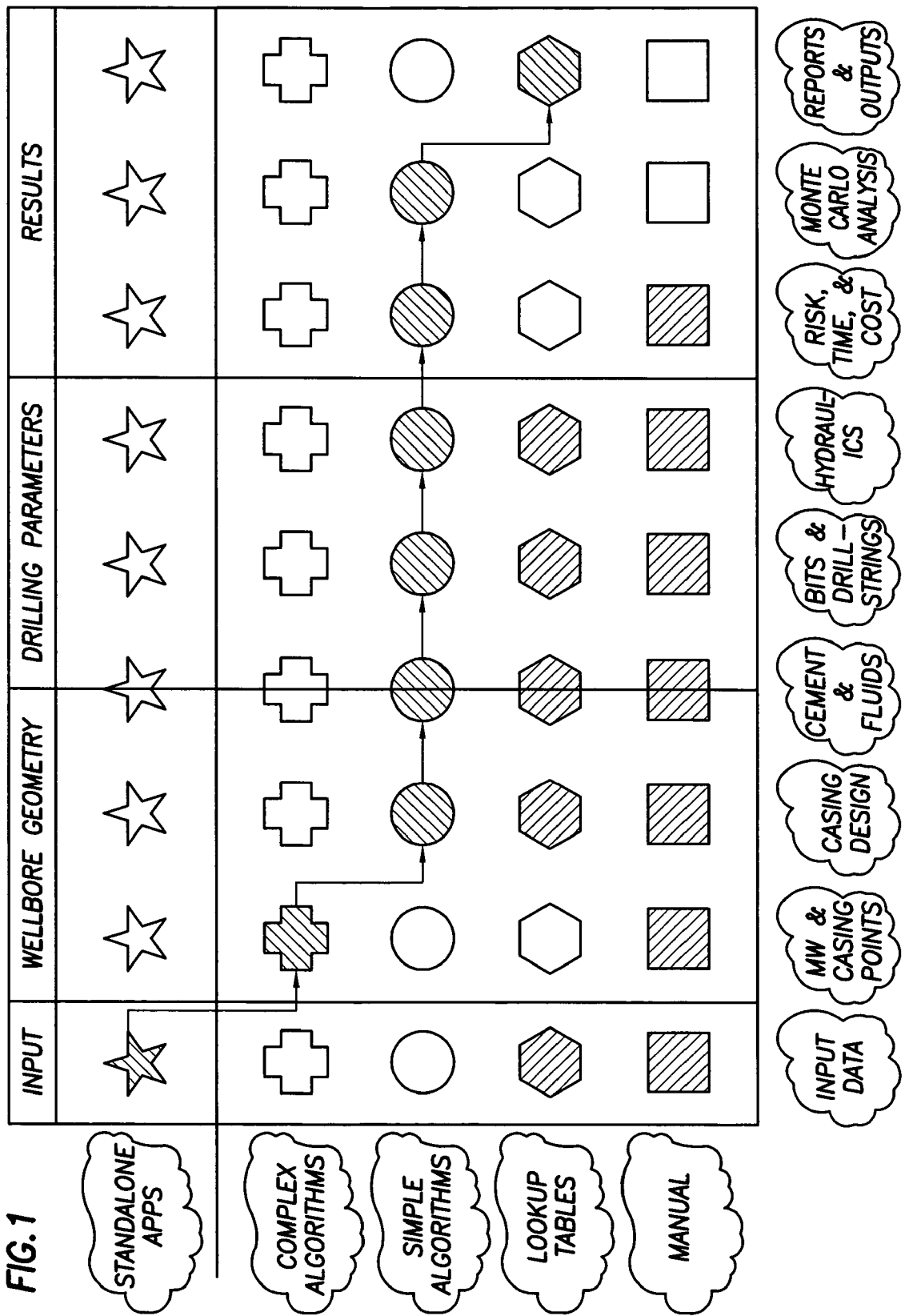
FIG. 1 illustrates a software architecture schematic indicating a modular nature to support custom workflows.

An 'Automatic Well Planning Software System' includes an 'Automatic Well Planning Monte Carlo Simulation Software' system. The 'Automatic Well Planning Monte Carlo Simulation Software' system includes an advanced 'Probabilistic Monte Carlo simulation software' that performs a probabilistic Monte Carlo simulation for automatically generating a very detailed activity plan that includes a probabilistic time and cost calculation for the entire well construction process. The probabilistic Monte Carlo simulation performed by the 'Automatic Well Planning Monte Carlo Simulation Software' takes into account a correlation between more than 50 different activities and calculates a non-productive time which is then correlated to derive the total time and the total cost. As a result, a time and cost forecast, which previously required highly experienced people, is now provided automatically by an 'Automatic Well Planning Monte Carlo Simulation Software' System.

Based on automatically calculated wellbore geometry and drilling parameters, the 'Automatic Well Planning Monte Carlo Simulation Software' includes an advanced probabilistic Monte Carlo simulation software that performs a probabilistic Monte Carlo simulation by: (1) constructing, from individual 'activity templates', an activity plan which includes a plurality of 'summary activities', (2) for each 'summary activity' on an activity plan, calculating or deriving a minimum and maximum time-duration and a cost for each such 'summary activity' from the specifications in the activity templates, (3) then, assigning a lognormal distribution function to each of the 'summary activities', and assigning correlations to the various 'summary activities', (4) calculating, by a Monte Carlo engine, the 'total time' to perform each 'summary activity' including calculating a nonproductive time (NPT) and a 'clean time' (which does not include the NPT) which elapses during the performance of each 'summary activity', (5) calculating, by the Monte Carlo engine, the costs associated with the productive time (or 'clean time') and the costs associated with the nonproductive time (NPT), and (6) displaying, on a recorder or display device of a computer system, a set of probabilistic results, the display of the set of probabilistic results including a numerical display 21 (e.g., FIGS. 24, 25, 31, 32), a graphical display 23 (e.g., FIGS. 26-30, and 33), a time versus depth display, a cost versus depth display, a time versus cost display.

Automatic Well Planning Software System

An 'Automatic Well Planning Software System' is a "smart" tool for rapid creation of a detailed drilling operational plan that provides economics and risk analysis. The user inputs trajectory and earth properties parameters; the system uses this data and various catalogs to calculate and deliver an optimum well design thereby generating a plurality of outputs, such as: a 'wellbore geometry', such as casing points, casing sizes, and cement tops; 'drilling parameters', such as drilling fluid, drill string, and drill bits, etc; drill string design; casing seats; mud weights; bit selection and use; hydraulics; and the other essential factors for the drilling task. System tasks are arranged in a single workflow in which the output of one task is included as input to the next. The user can modify most outputs, which permits fine-tuning of the input values for the next task. The 'Automatic Well Planning Software System' has two primary user groups: (1) Geoscientist: Works with trajectory and earth properties data; the 'Automatic Well Planning Software System' provides the necessary drilling engineering calculations; this allows the user to scope drilling candidates rapidly in terms of time, costs, and risks; and (2) Drilling engineer: Works with wellbore geometry and drilling parameter outputs to achieve optimum activity plan and risk assessment; Geoscientists typically provide the trajectory and earth properties data. The scenario, which consists of the entire process and its output, can be exported for sharing with other users for peer review or as a communication tool to facilitate project management between office and field. Variations on a scenario can be created for use in business decisions. The 'Automatic Well Planning Software System' can also be used as a training tool for geoscientists and drilling engineers.

The 'Automatic Well Planning Software System' will enable the entire well construction workflow to be run through quickly. In addition, the 'Automatic Well Planning Software System' can ultimately be updated and re-run in a time-frame that supports operational decision making. The entire replanning process must be fast enough to allow users to rapidly iterate to refine well plans through a series of what-if scenarios.

The decision support algorithms provided by the 'Automatic Well Planning Software System' would link geological and geomechanical data with the drilling process (casing points, casing design, cement, mud, bits, hydraulics, etc) to produce estimates and a breakdown of the well time, costs, and risks. This will allow interpretation variations, changes, and updates of the Earth Model to be quickly propogated through the well planning process.

The software associated with the aforementioned 'Automatic Well Planning Software System' accelerates the prospect selection, screening, ranking, and well construction workflows. The target audiences are two fold: those who generate drilling prospects, and those who plan and drill those prospects. More specifically, the target audiences include: Asset Managers, Asset Teams (Geologists, Geophysicists, Reservoir Engineers, and Production Engineers), Drilling Managers, and Drilling Engineers.

Asset Teams will use the software associated with the 'Automatic Well Planning Software System' as a scoping tool for cost estimates, and assessing mechanical feasibility, so that target selection and well placement decisions can be made more knowledgeably, and more efficiently. This process will encourage improved subsurface evaluation and provide a better appreciation of risk and target accessibility. Since the system can be configured to adhere to company or local design standards, guidelines, and operational practices, users will be confident that well plans are technically sound.

Drilling Engineers will use the software associated with the 'Automatic Well Planning Software System' for rapid scenario planning, risk identification, and well plan optimization. It will also be used for training, in planning centers, universities, and for looking at the drilling of specific wells, electronically drilling the well, scenario modeling and 'what-if' exercises, prediction and diagnosis of events, post-drilling review and knowledge transfer.

The software associated with the 'Automatic Well Planning Software System' will enable specialists and vendors to demonstrate differentiation amongst new or competing technologies. It will allow operators to quantify the risk and business impact of the application of these new technologies or procedures.

Therefore, the 'Automatic Well Planning Software System' will: (1) dramatically improve the efficiency of the well planning and drilling processes by incorporating all available data and well engineering processes in a single predictive well construction model, (2) integrate predictive models and analytical solutions for wellbore stability, mud weights & casing seat selection, tubular & hole size selection, tubular design, cementing, drilling fluids, bit selection, rate of penetration, BHA design, drillstring design, hydraulics, risk identification, operations planning, and probabilistic time and cost estimation, all within the framework of a mechanical earth model, (3) easily and interactively manipulate variables and intermediate results within individual scenarios to produce sensitivity analyses. As a result, when the 'Automatic Well Planning Software System' is utilized, the following results will be achieved: (1) more accurate results, (2) more effective use of engineering resources, (3) increased awareness, (4) reduced risks while drilling, (5) decreased well costs, and (6) a standard methodology or process for optimization through iteration in planning and execution. As a result, during the implementation of the 'Automatic Well Planning Software System', the emphasis was placed on architecture and usability.

In connection with the implementation of the 'Automatic Well Planning Software System', the software development effort was driven by the requirements of a flexible architecture which must permit the integration of existing algorithms and technologies with commercial-off-the-shelf (COTS) tools for data visualization. Additionally, the workflow demanded that the product be portable, lightweight and fast, and require a very small learning curve for users. Another key requirement was the ability to customize the workflow and configuration based on proposed usage, user profile and equipment availability.

The software associated with the 'Automatic Well Planning Software System' was developed using the 'Ocean' framework owned by Schlumberger Technology Corporation. This framework uses Microsoft's .NET technologies to provide a software development platform which allows for easy integration of COTS software tools with a flexible architecture that was specifically designed to support custom workflows based on existing drilling algorithms and technologies.

Referring to FIG. 1, a software architecture schematic is illustrated indicating the 'modular nature' for supporting custom workflows. FIG. 1 schematically shows the modular architecture that was developed to support custom workflows. This provides the ability to configure the application based on the desired usage. For a quick estimation of the time, cost and risk associated with the well, a workflow consisting of lookup tables and simple algorithms can be selected. For a more detailed analysis, complex algorithms can be included in the workflow.

In addition to customizing the workflow, the software associated with the 'Automatic Well Planning Software System' was designed to use user-specified equipment catalogs for its analysis. This ensures that any results produced by the software are always based on local best practices and available equipment at the project site. From a usability perspective, application user interfaces were designed to allow the user to navigate through the workflow with ease.

Figure 2:
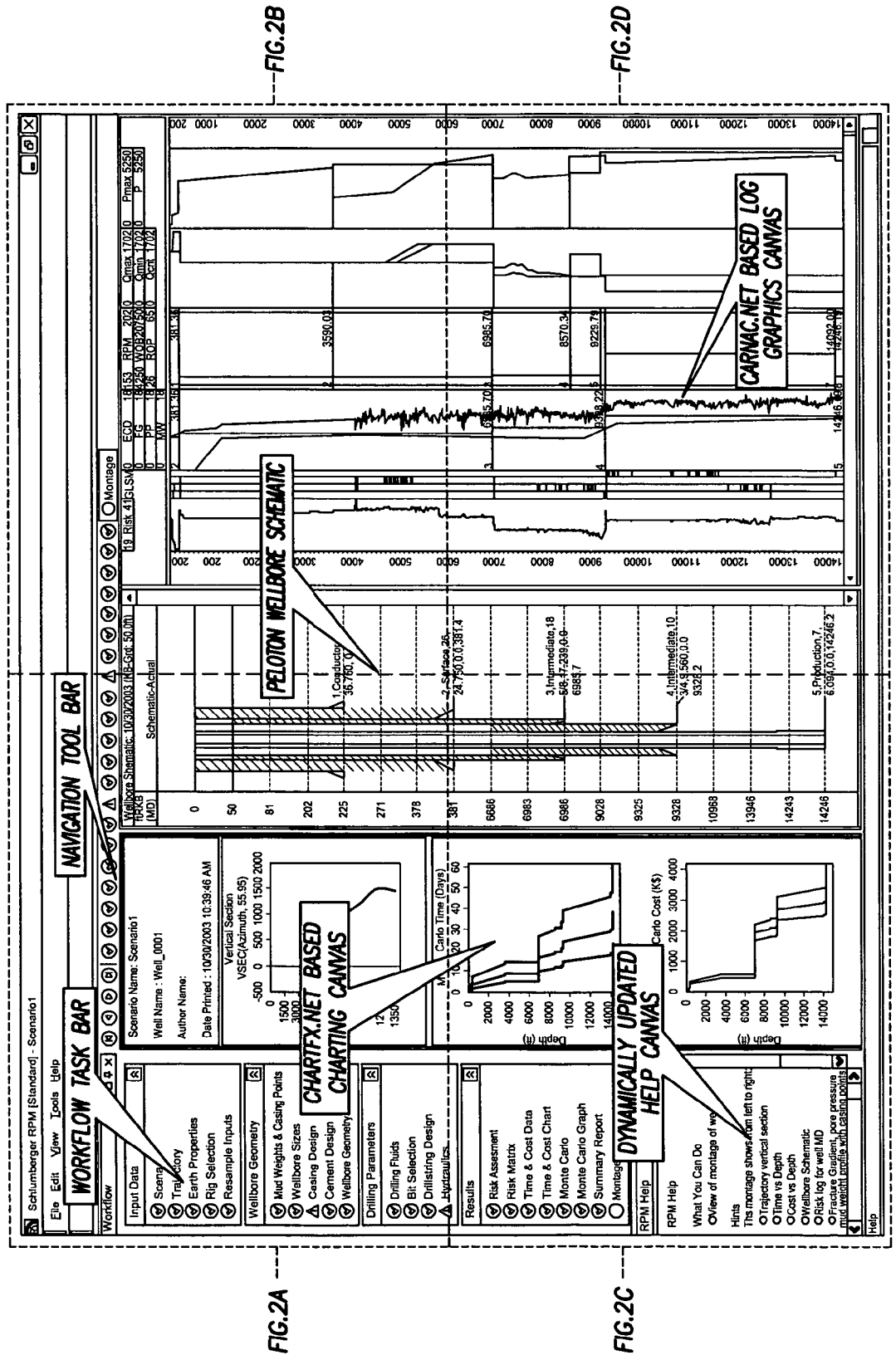
FIG. 2 including
Figure 2A:
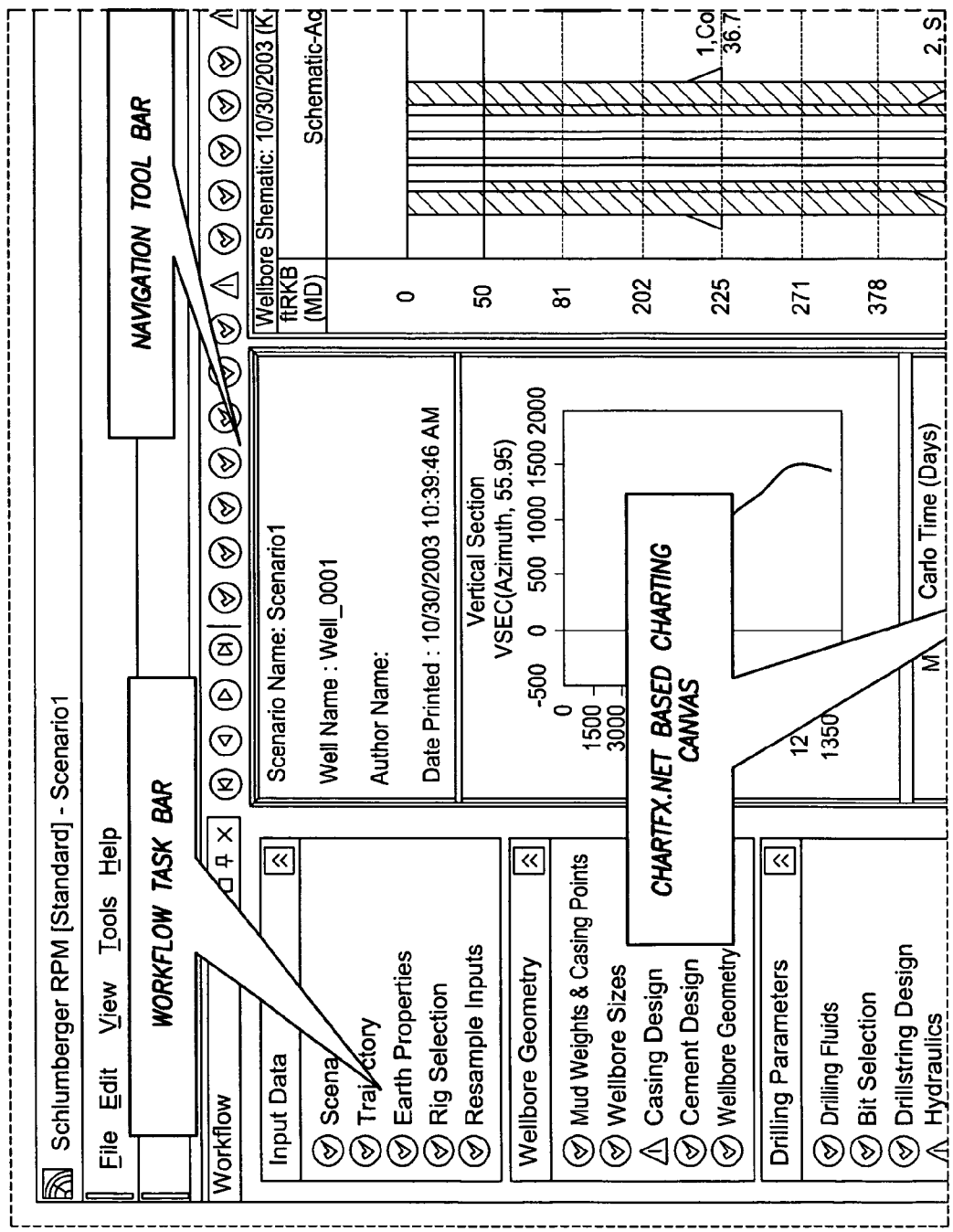
FIGS. 2A, 2B, 2C, and 2D illustrates a typical task view consisting of workflow, help and data canvases.
Figure 2B:
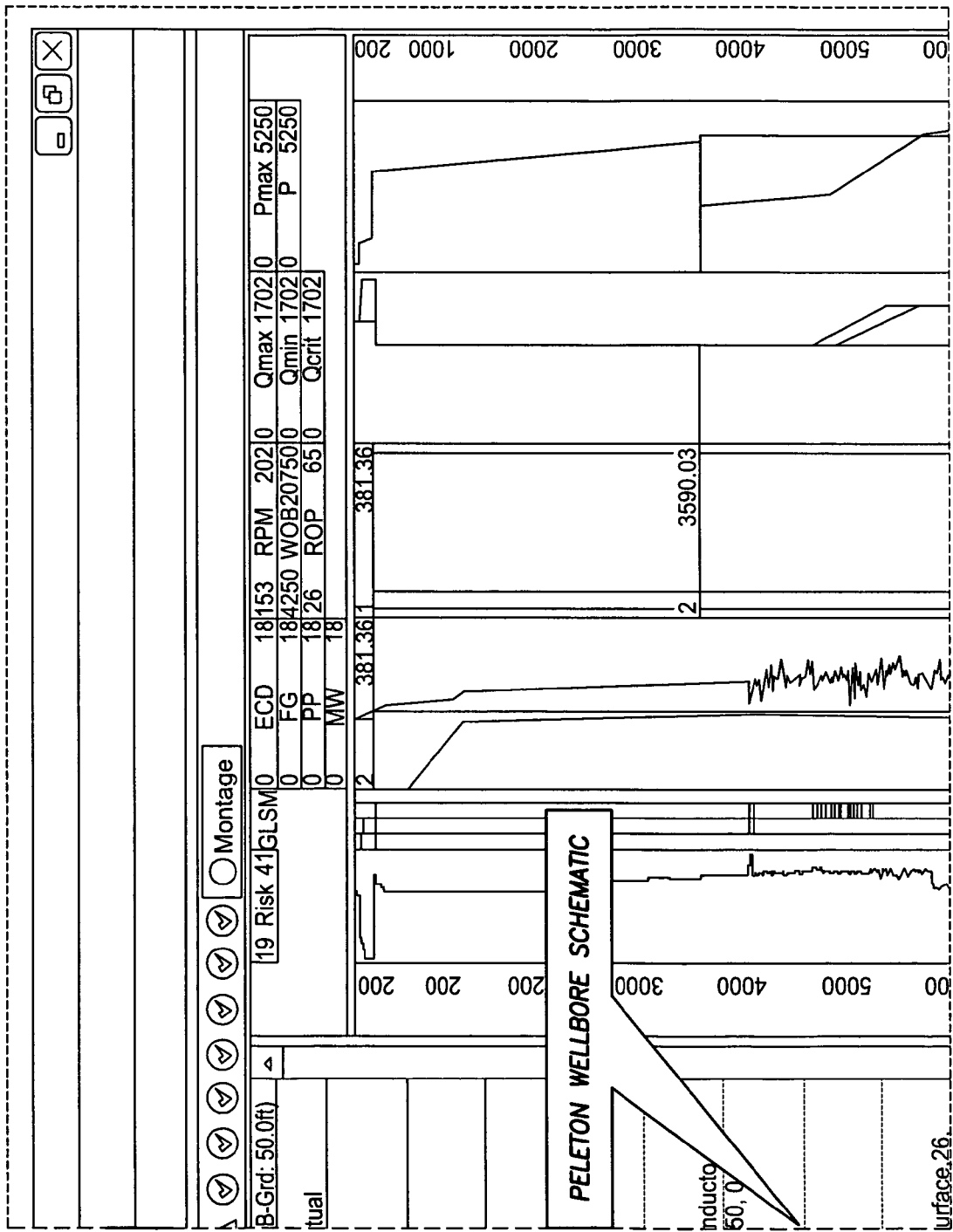
Figure 2C:
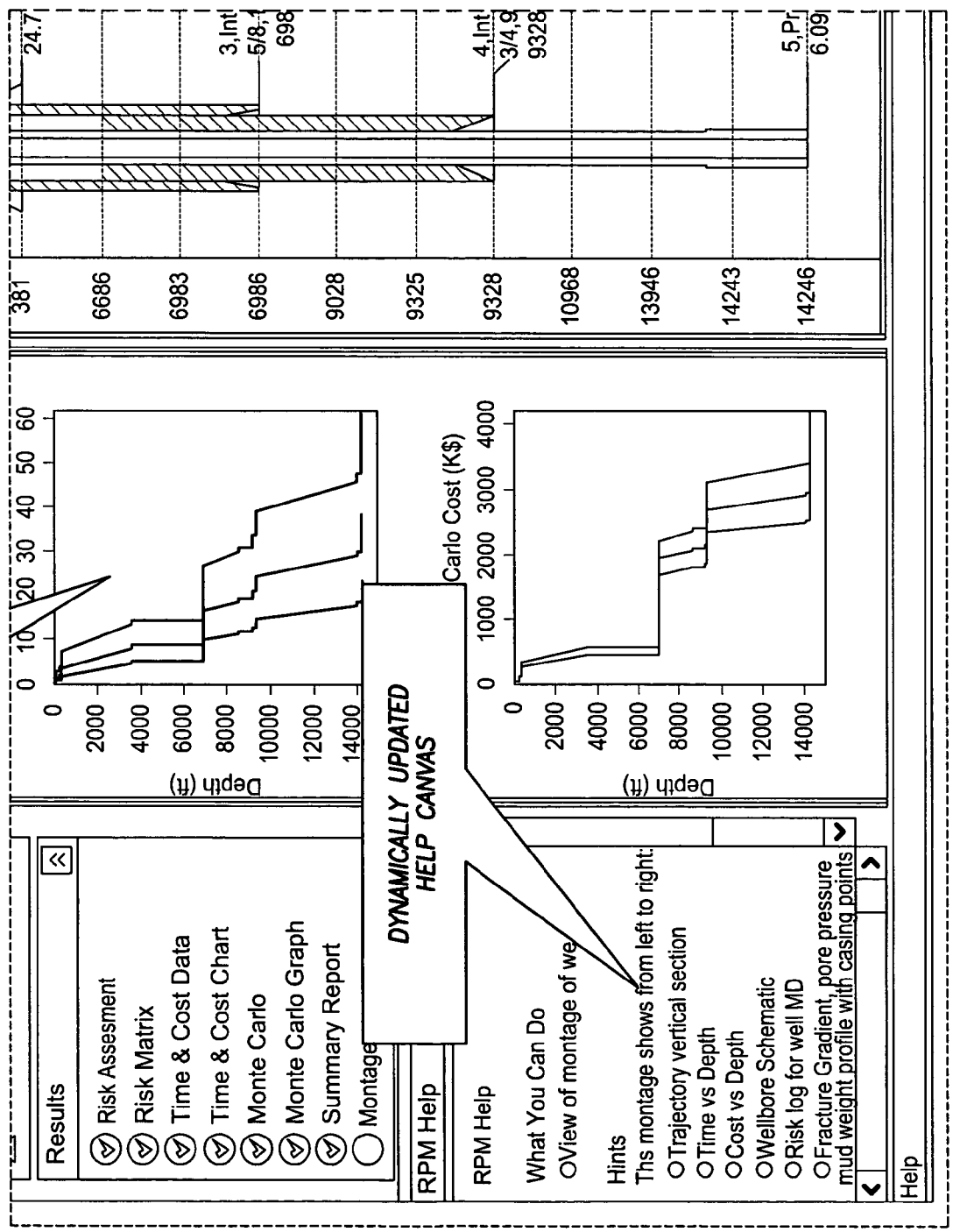
Figure 2D:
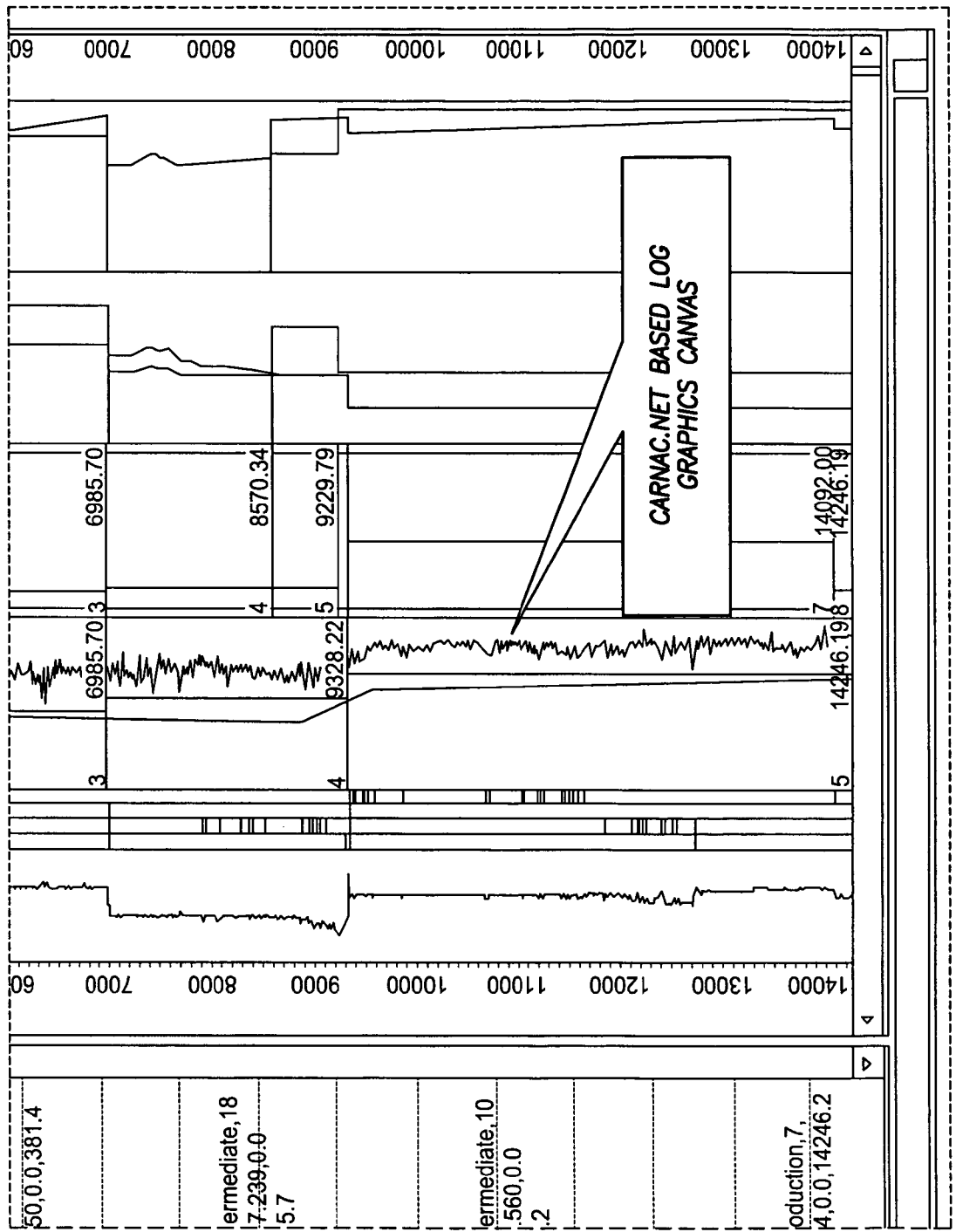
Figure 3A:
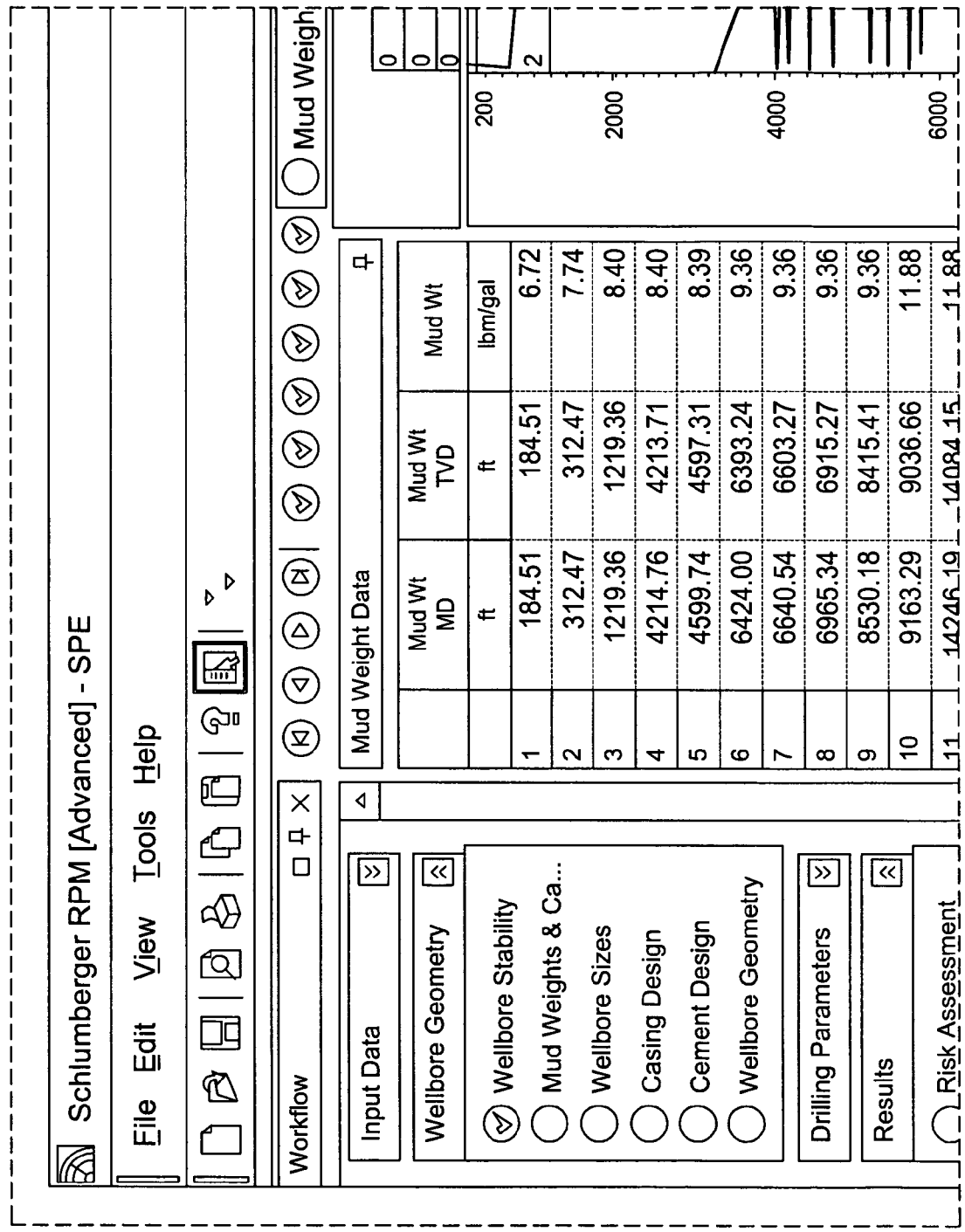
FIGS. 3A, 3B, 3C, and 3D illustrates wellbore stability, mud weights, and casing points.
Figure 3B:
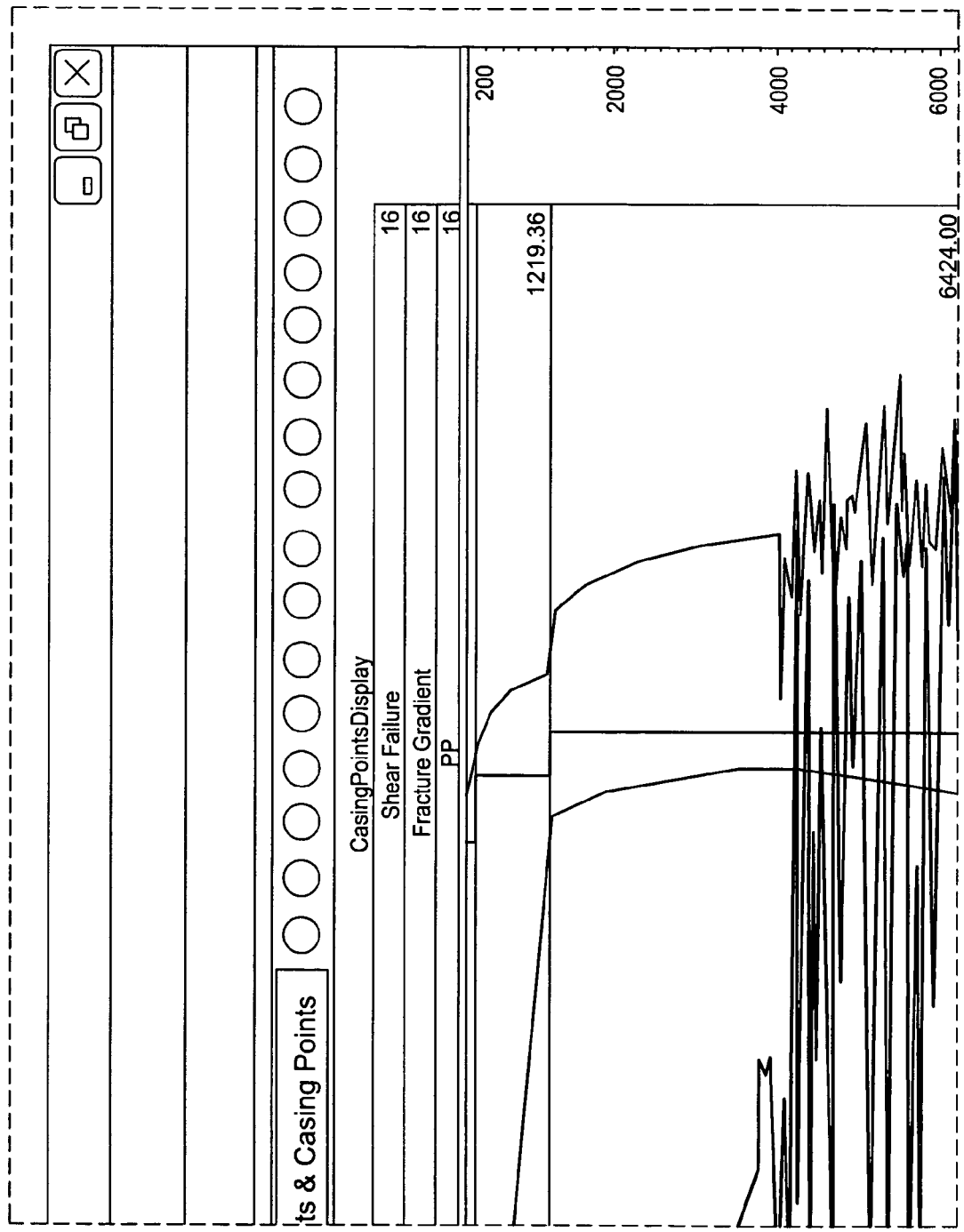
Figure 3C:
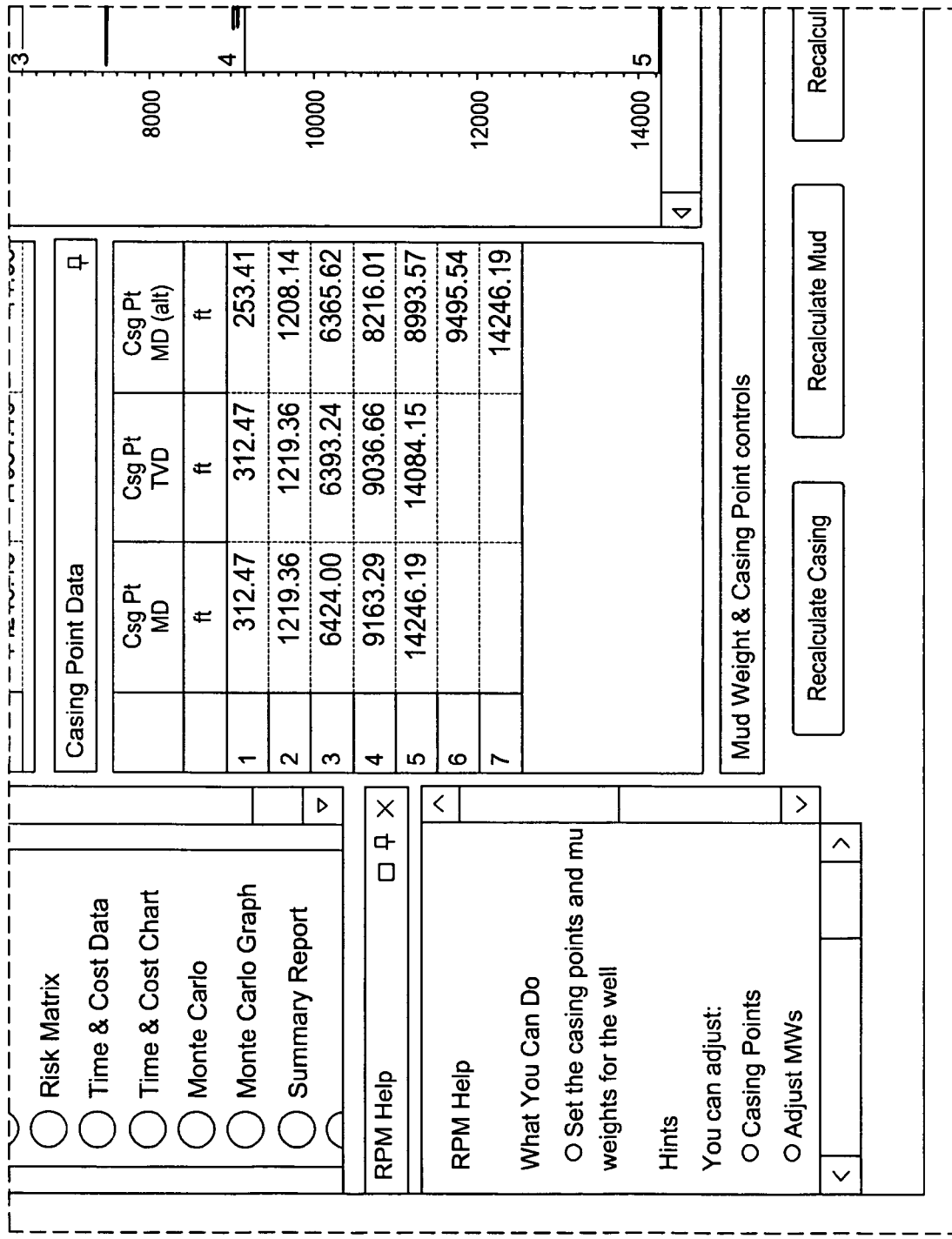
Figure 3D:
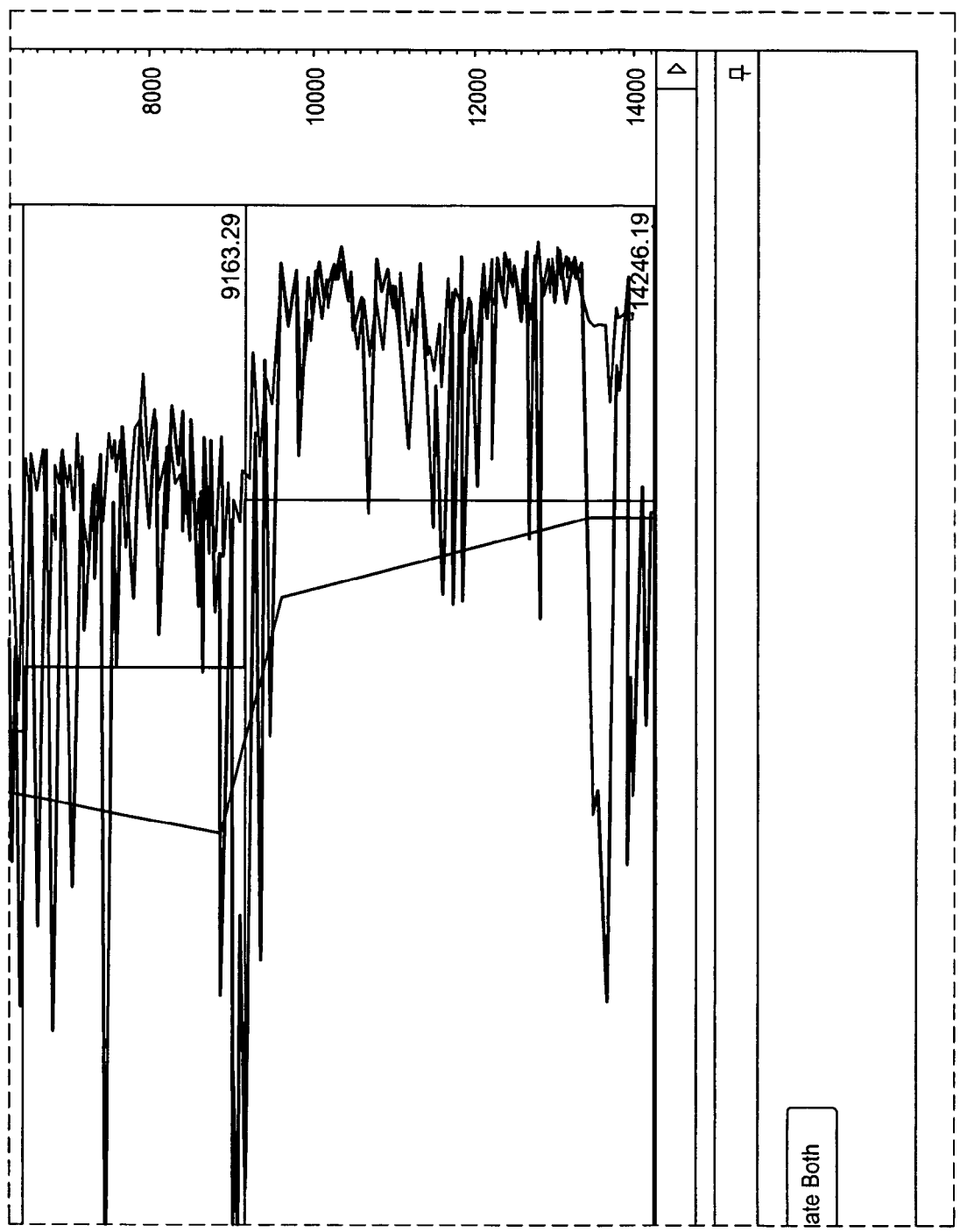
Figure 4A:
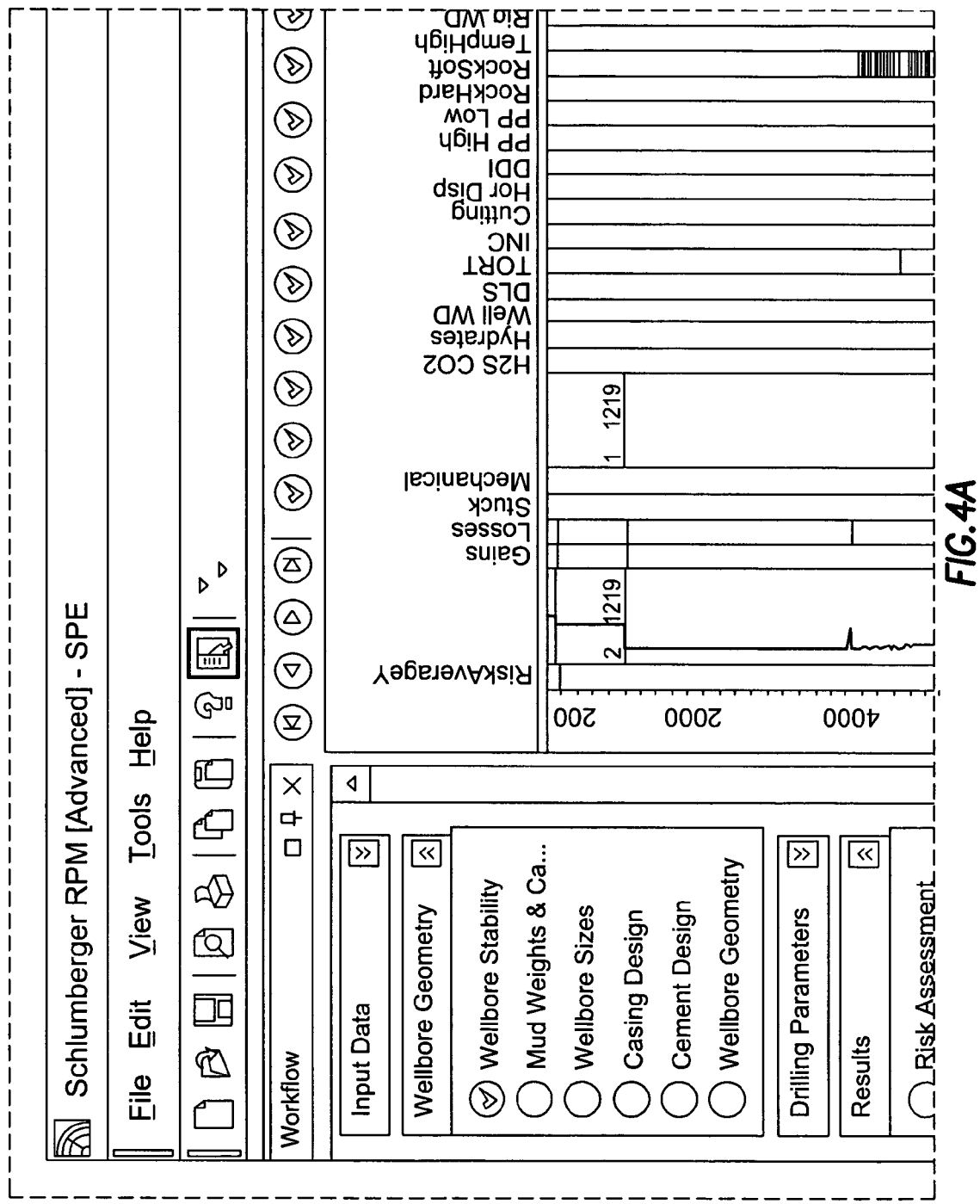
FIGS. 4A, 4B, 4C, and 4D illustrates risk assessment.
Figure 4B:
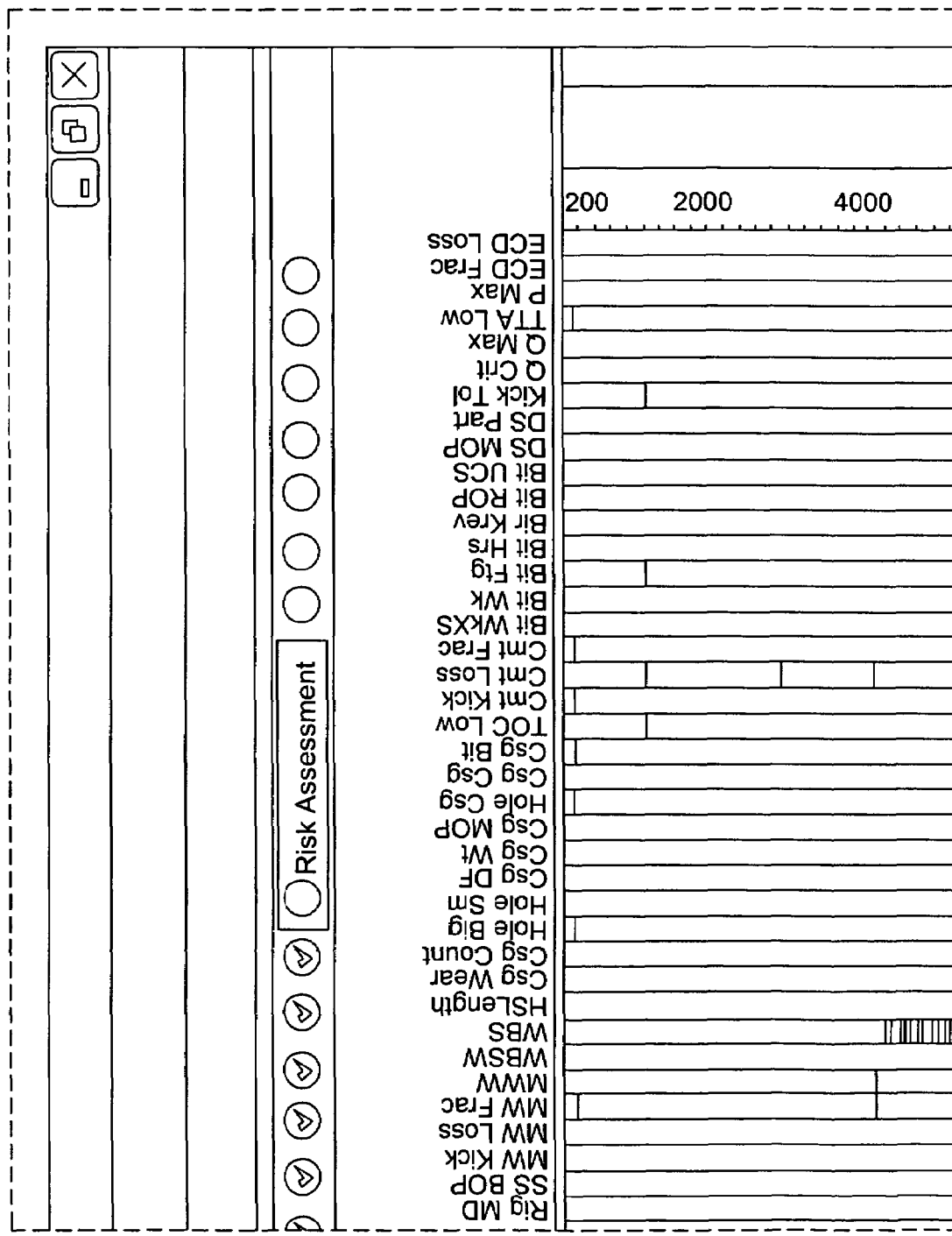
Figure 4C:
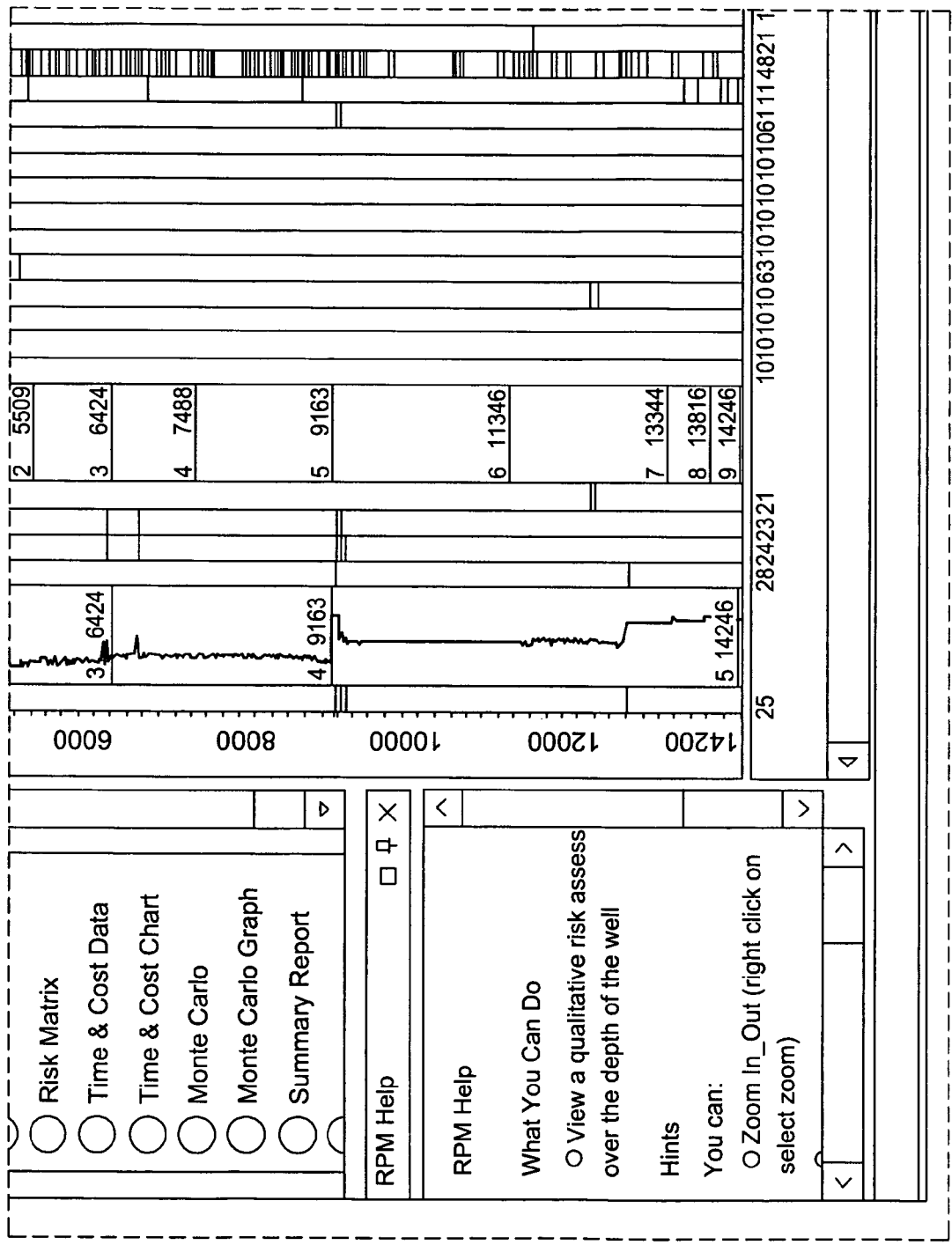
Figure 4D:
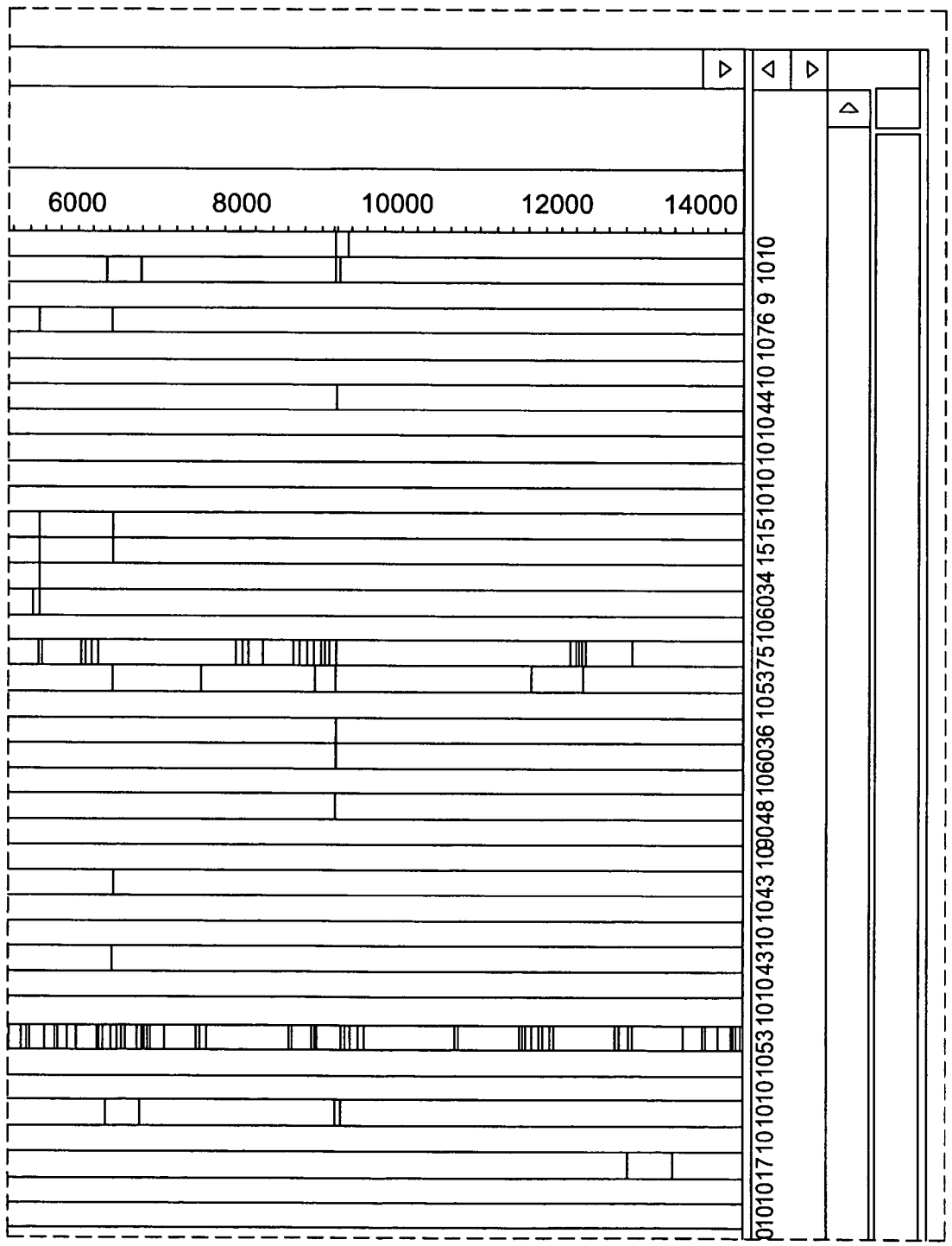

Referring to FIG. 2, a typical task view consisting of workflow, help and data canvases is illustrated. FIG. 2 shows a typical task view with its associated user canvases. A typical task view consists of a workflow task bar, a dynamically updating help canvas, and a combination of data canvases based on COTS tools like log graphics, Data Grids, Wellbore Schematic and charting tools. In any task, the user has the option to modify data through any of the canvases; the application then automatically synchronizes the data in the other canvases based on these user modifications.

The modular nature of the software architecture associated with the 'Automatic Well Planning Software System' also allows the setting-up of a non-graphical workflow, which is key to implementing advanced functionality, such as batch processing of an entire field, and sensitivity analysis based on key parameters, etc.

Basic information for a scenario, typical of well header information for the well and wellsite, is captured in the first task. The trajectory (measured depth, inclination, and azimuth) is loaded and the other directional parameters like true vertical depth and dogleg severity are calculated automatically and graphically presented to the user.

The 'Automatic Well Planning Software System' requires the loading of either geomechanical earth properties extracted from an earth model, or, at a minimum, pore pressure, fracture gradient, and unconfined compressive strength. From this input data, the 'Automatic Well Planning Software System' automatically selects the most appropriate rig and associated properties, costs, and mechanical capabilities. The rig properties include parameters like derrick rating to evaluate risks when running heavy casing strings, pump characteristics for the hydraulics, size of the BOP, which influences the sizes of the casings, and very importantly the daily rig rate and spread rate. The user can select a different rig than what the 'Automatic Well Planning Software System' proposed and can modify any of the technical specifications suggested by the software.

Other wellbore stability algorithms (which are offered by Schlumberger Technology Corporation) calculate the predicted shear failure and the fracture pressure as a function of depth and display these values with the pore pressure. The 'Automatic Well Planning Software System' then proposes automatically the casing seats and maximum mud weight per hole section using customizable logic and rules. The rules include safety margins to the pore pressure and fracture gradient, minimum and maximum lengths for hole sections and limits for maximum overbalance of the drilling fluid to the pore pressure before a setting an additional casing point. The 'Automatic Well Planning Software System' evaluates the casing seat selection from top-to-bottom and from bottom-to-top and determines the most economic variant. The user can change, insert, or delete casing points at any time, which will reflect in the risk, time, and cost for the well.

Referring to FIG. 3, a display showing wellbore stability, mud weights, and casing points is illustrated.

The wellbore sizes are driven primarily by the production tubing size. The preceding casing and hole sizes are determined using clearance factors. The wellbore sizes can be restricted by additional constraints, such as logging requirements or platform slot size. Casing weights, grades, and connection types are automatically calculated using traditional biaxial design algorithms and simple load cases for burst, collapse and tension. The most cost effective solution is chosen when multiple suitable pipes are found in the extensive tubular catalog. Non-compliance with the minimum required design factors are highlighted to the user, pointing out that a manual change of the proposed design may be in order. The 'Automatic Well Planning Software System' allows full strings to be replaced with liners, in which case, the liner overlap and hanger cost are automatically suggested while all strings are redesigned as necessary to account for changes in load cases. The cement slurries and placement are automatically proposed by the 'Automatic Well Planning Software System'. The lead and tail cement tops, volumes, and densities are suggested. The cementing hydrostatic pressures are validated against fracture pressures, while allowing the user to modify the slurry interval tops, lengths, and densities. The cost is derived from the volume of the cement job and length of time required to place the cement.

The 'Automatic Well Planning Software System' proposes the proper drilling fluid type including rheology properties that are required for hydraulic calculations. A sophisticated scoring system ranks the appropriate fluid systems, based on operating environment, discharge legislation, temperature, fluid density, wellbore stability, wellbore friction and cost. The system is proposing not more than 3 different fluid systems for a well, although the user can easily override the proposed fluid systems.

A new and novel algorithm used by the 'Automatic Well Planning Software System' selects appropriate bit types that are best suited to the anticipated rock strengths, hole sizes, and drilled intervals. For each bit candidate, the footage and bit life is determined by comparing the work required to drill the rock interval with the statistical work potential for that bit. The most economic bit is selected from all candidates by evaluating the cost per foot which takes into account the rig rate, bit cost, tripping time and drilling performance (ROP). Drilling parameters like string surface revolutions and weight on bit are proposed based on statistical or historical data.

In the 'Automatic Well Planning Software System', the bottom hole assembly (BHA) and drillstring is designed based on the required maximum weight on bit, inclination, directional trajectory and formation evaluation requirements in the hole section. The well trajectory influences the relative weight distribution between drill collars and heavy weight drill pipe. The BHA components are automatically selected based on the hole size, the internal diameter of the preceding casings, and bending stress ratios are calculated for each component size transition. Final kick tolerances for each hole section are also calculated as part of the risk analysis.

The minimum flow rate for hole cleaning is calculated using Luo's[2] and Moore's[3] criteria considering the wellbore geometry, BHA configuration, fluid density and rheology, rock density, and ROP. The bit nozzles total flow area (TFA) are sized to maximize the standpipe pressure within the liner operating pressure envelopes. Pump liner sizes are selected based on the flow requirements for hole cleaning and corresponding circulating pressures. The Power Law rheology model is used to calculate the pressure drops through the circulating system, including the equivalent circulating density (ECD).

Referring to FIG. 4, a display showing 'Risk Assessment' is illustrated.

In FIG. 4, in the 'Automatic Well Planning Software System', drilling event 'risks' are quantified in a total of 54 'risk categories' of which the user can customize the risk thresholds. These 'risk categories' are disclosed in prior pending application Ser. No. 10/802,524 filed Mar. 17, 2004 and Ser. No. 10/802,613 filed Mar. 17, 2004, the disclosures of which is incorporated by reference into this specification. The risk categories are plotted as a function of depth and color coded to aid a quick visual interpretation of potential trouble spots. Further risk assessment is achieved by grouping these categories in the following categories: 'gains', 'losses', 'stuck pipe', and 'mechanical problems'. The total risk log curve can be displayed along the trajectory to correlate drilling risks with geological markers. Additional risk analysis views display the "actual risk" as a portion of the "potential risk" for each design task.

The 'Automatic Well Planning Software System' includes an 'Automatic Well Planning Monte Carlo Simulation software' 20c1 which is disclosed in this specification with reference to FIGS. 9-37. The 'Automatic Well Planning Monte Carlo Simulation software' 20c1 of this specification of FIGS. 9-37 includes a detailed operational activity plan which is automatically assembled from customizable templates. The duration for each activity is calculated based on the engineered results of the previous tasks and Non-Productive Time (NPT) can be included. The activity plan specifies a range (minimum, average, and maximum) of time and cost for each activity and lists the operations sequentially as a function of depth and hole section. This information is graphically presented in the time vs depth and cost vs depth graphs.

Figure 5C:
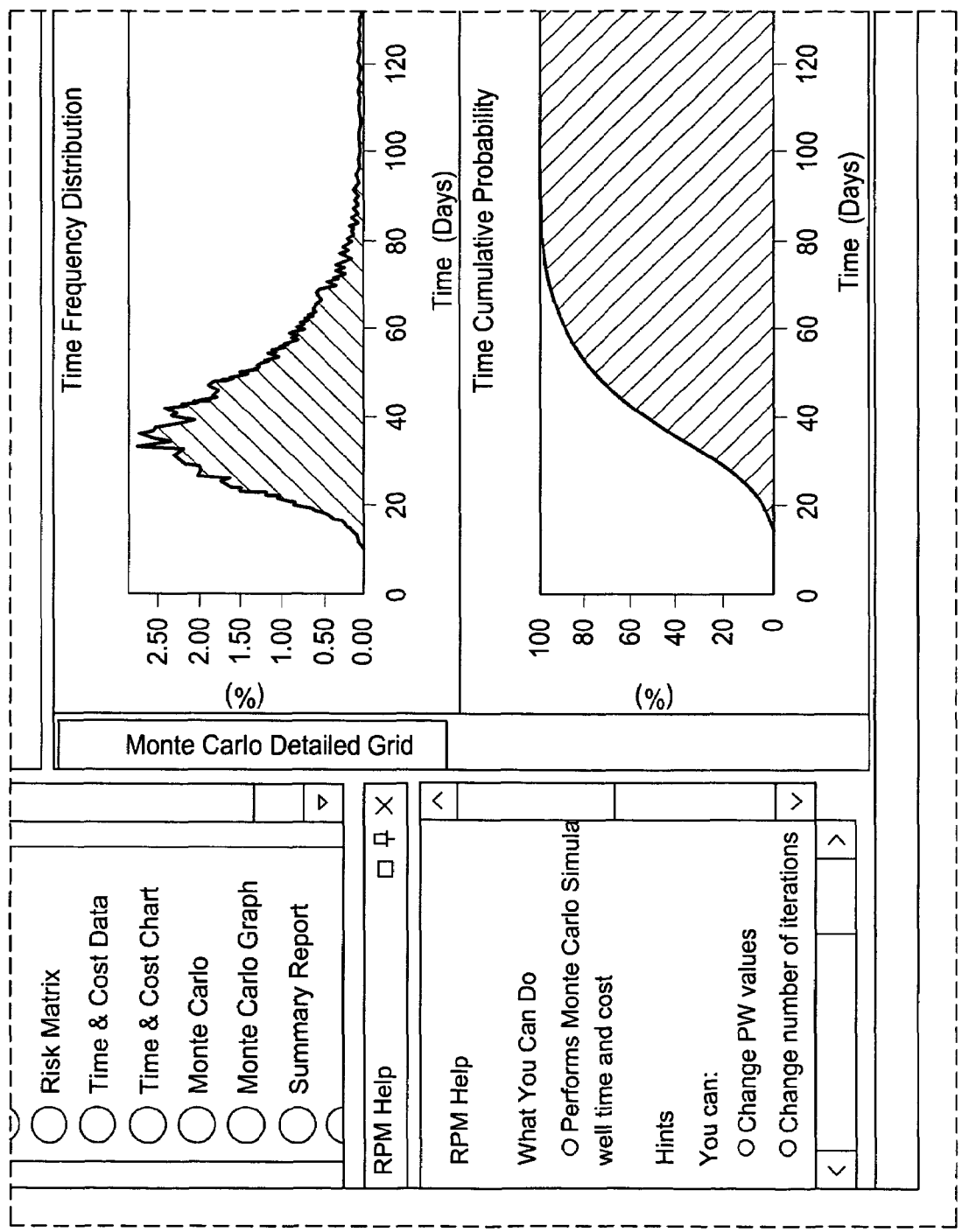
Figure 5D:
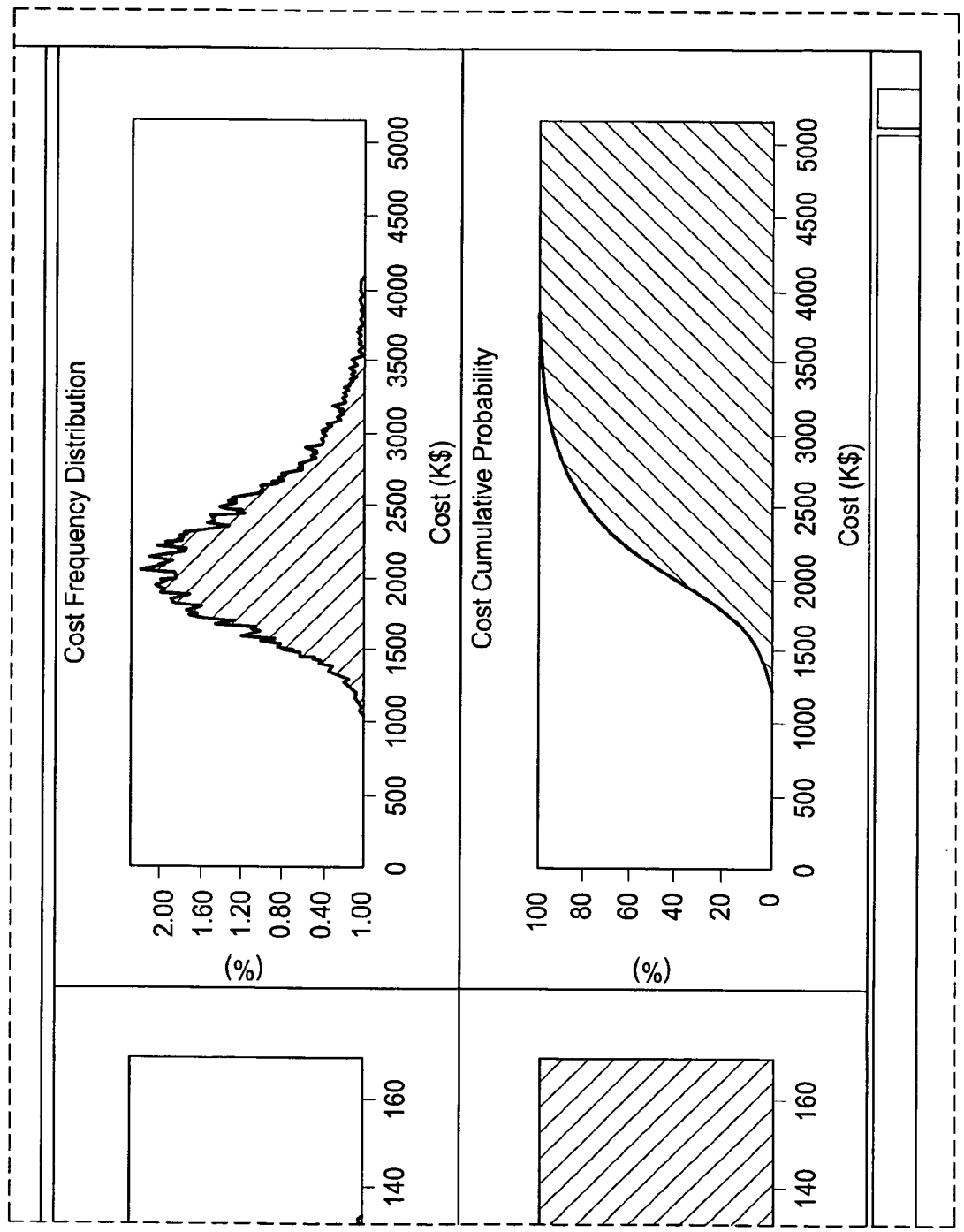
Figure 6A:
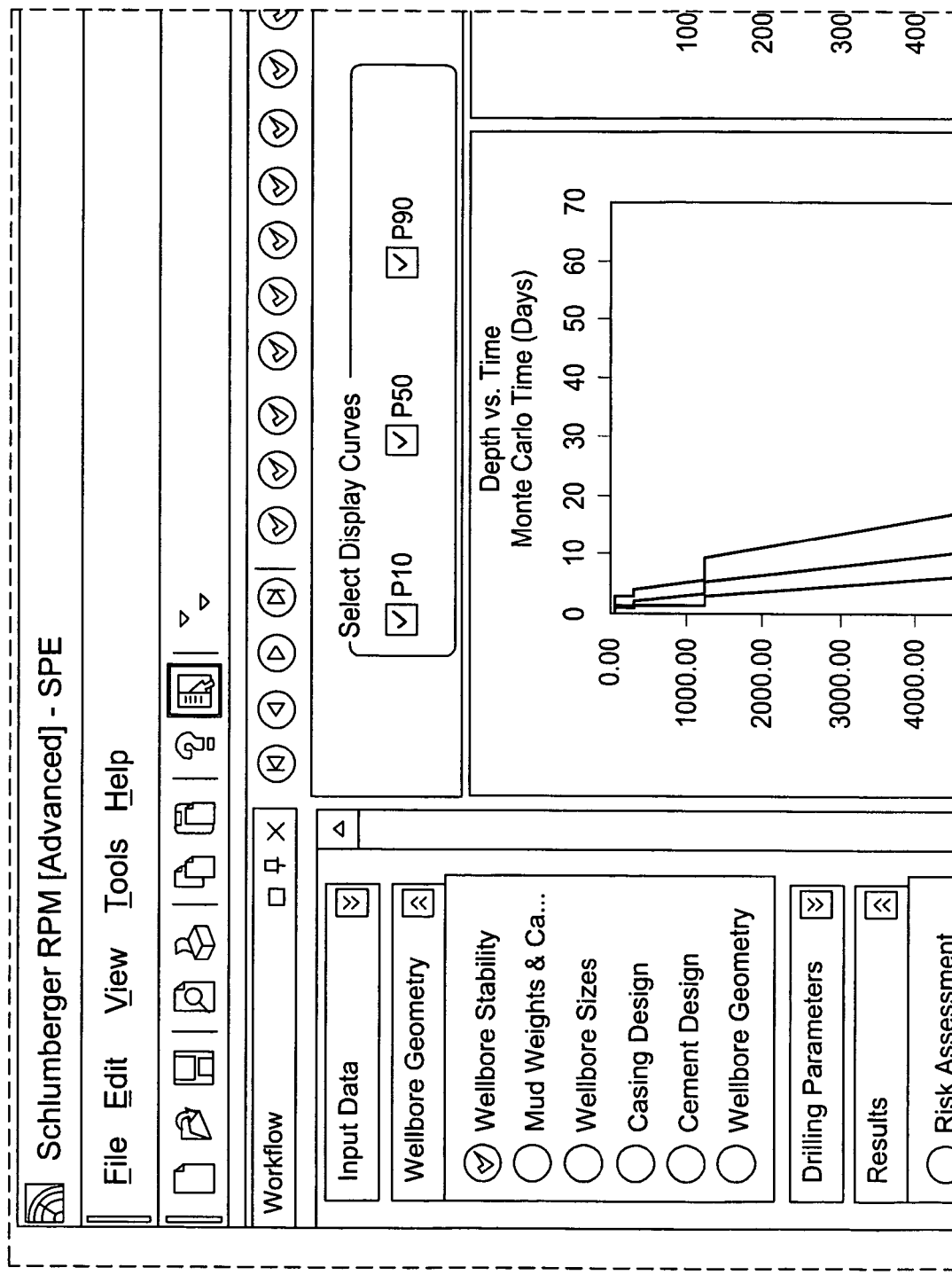
FIGS. 6A, 6B, 6C, and 6D illustrates a probabilistic time and cost vs. depth.
Figure 6B:
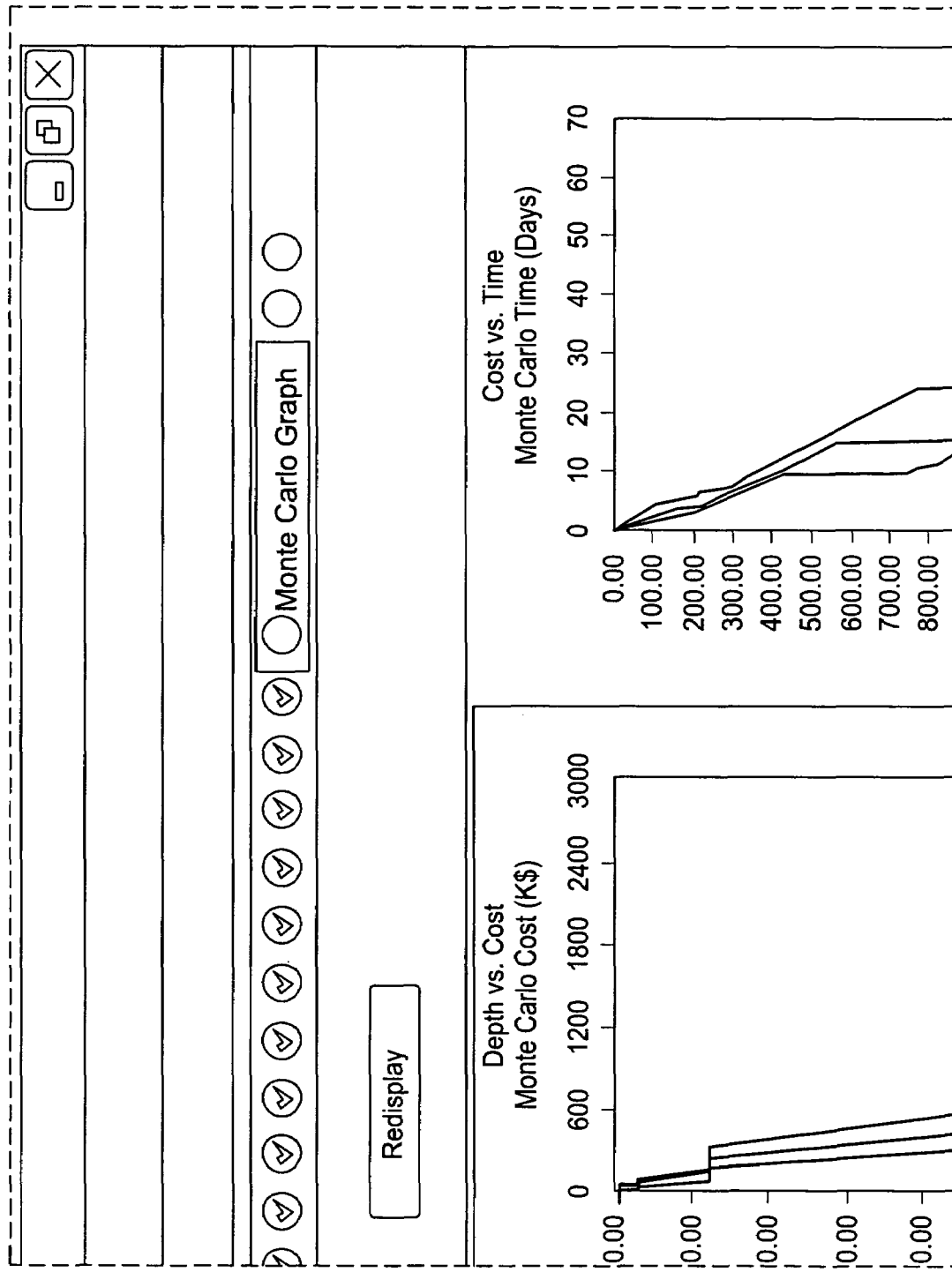
Figure 6C:
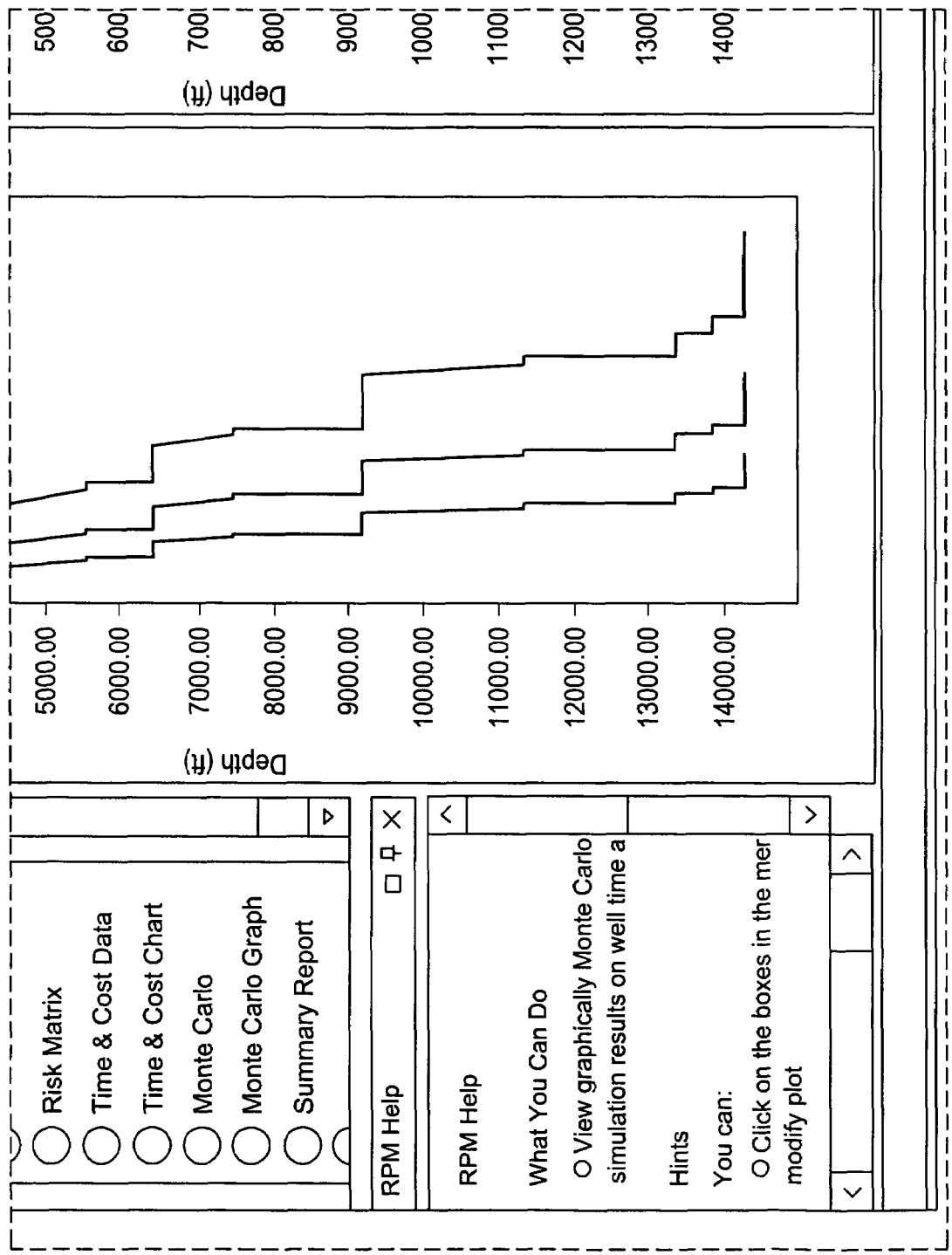
Figure 6D:
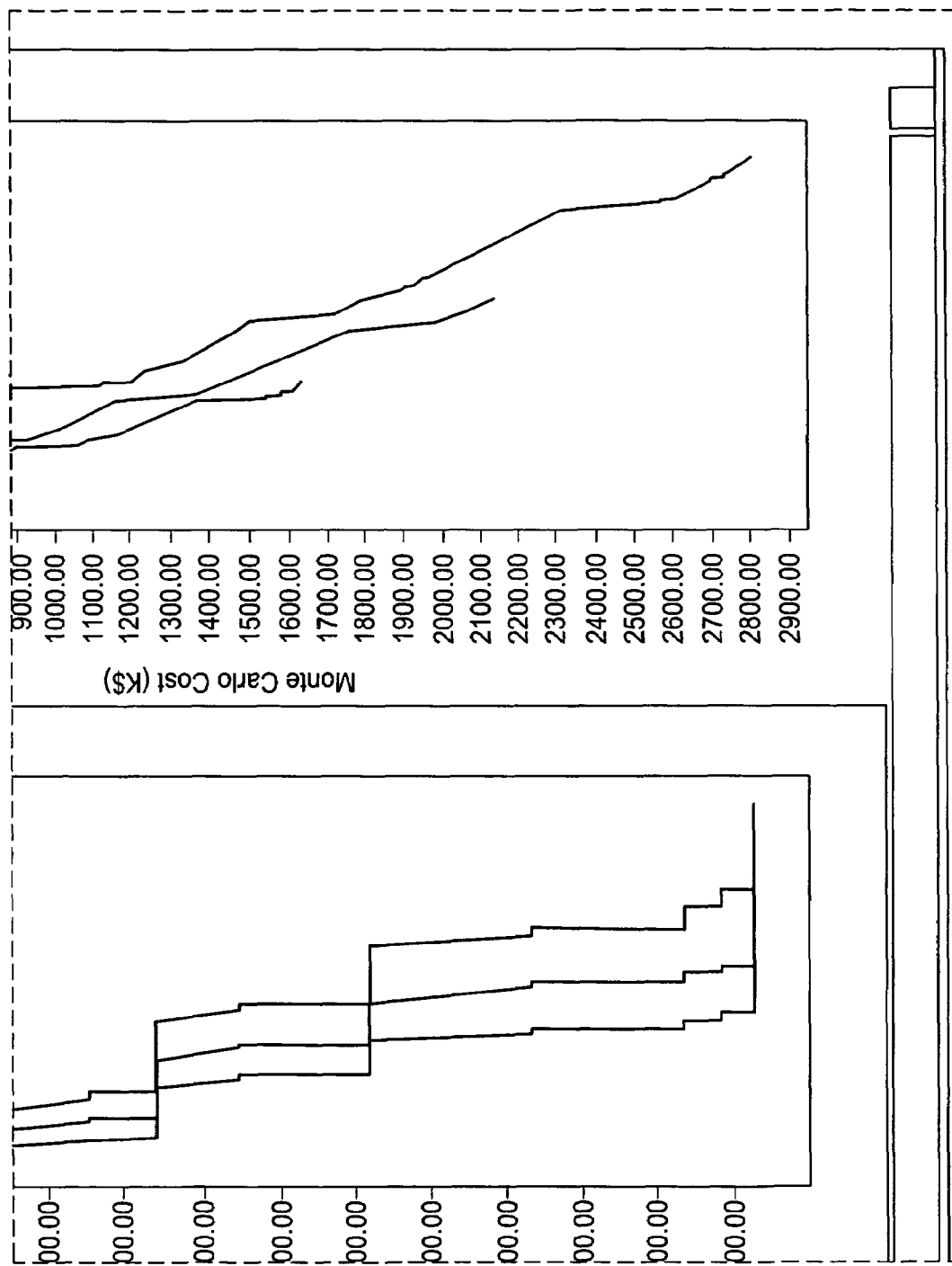

Referring to FIG. 5, in connection with the 'Automatic Well Planning Monte Carlo Simulation software' 20c1 of this specification of FIGS. 9-37, a display showing Monte Carlo time and cost distributions is illustrated. In FIG. 5, the 'Automatic Well Planning Monte Carlo Simulation software' 20c1 of FIGS. 9-36 uses Monte Carlo simulation to reconcile all of the range of time and cost data to produce probabilistic time and cost distributions.

Referring to FIG. 6, in connection with the 'Automatic Well Planning Monte Carlo Simulation software' 20c1 of this specification of FIGS. 9-37, a display showing Probabilistic time and cost vs. depth is illustrated. In FIG. 6, this probabilistic analysis, used by the 'Automatic Well Planning Monte Carlo Simulation software' 20c1 of this specification, allows quantifying the P10, P50 and P90 probabilities for time and cost.

Figure 7:
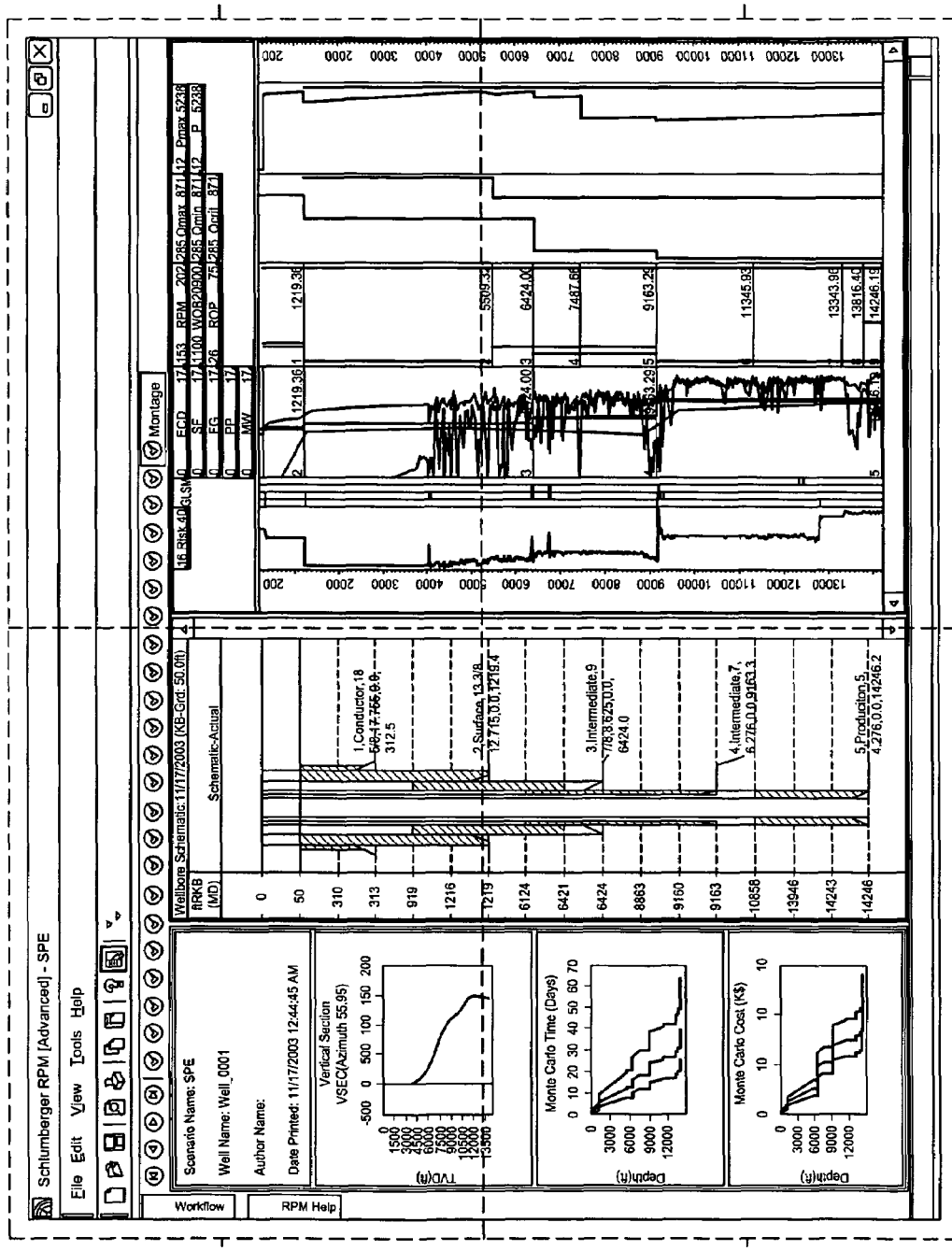
FIG. 7 including
Figure 7A:
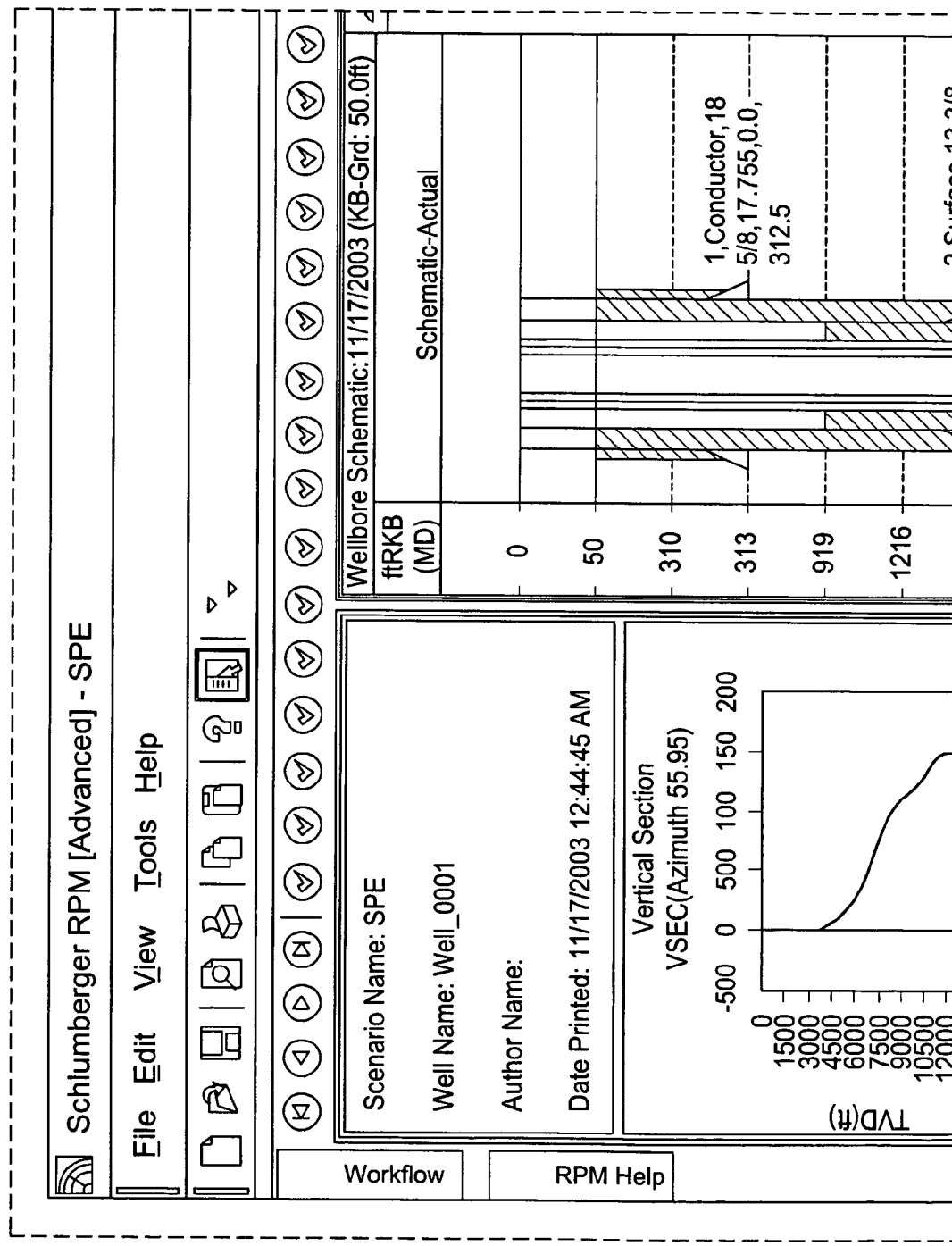
FIGS. 7A, 7B, 7C, and 7D illustrates a summary montage.
Figure 7B:
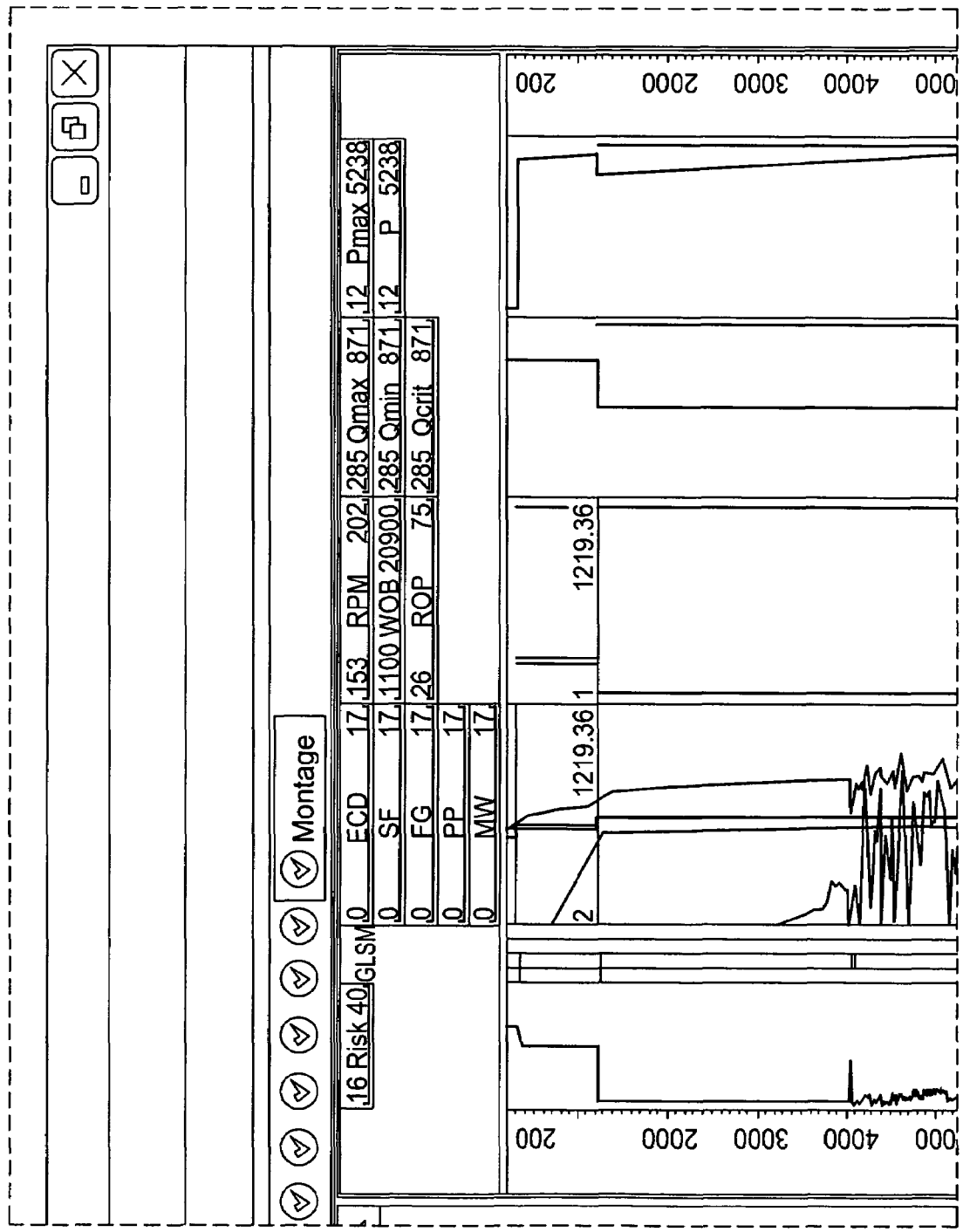
Figure 7C:
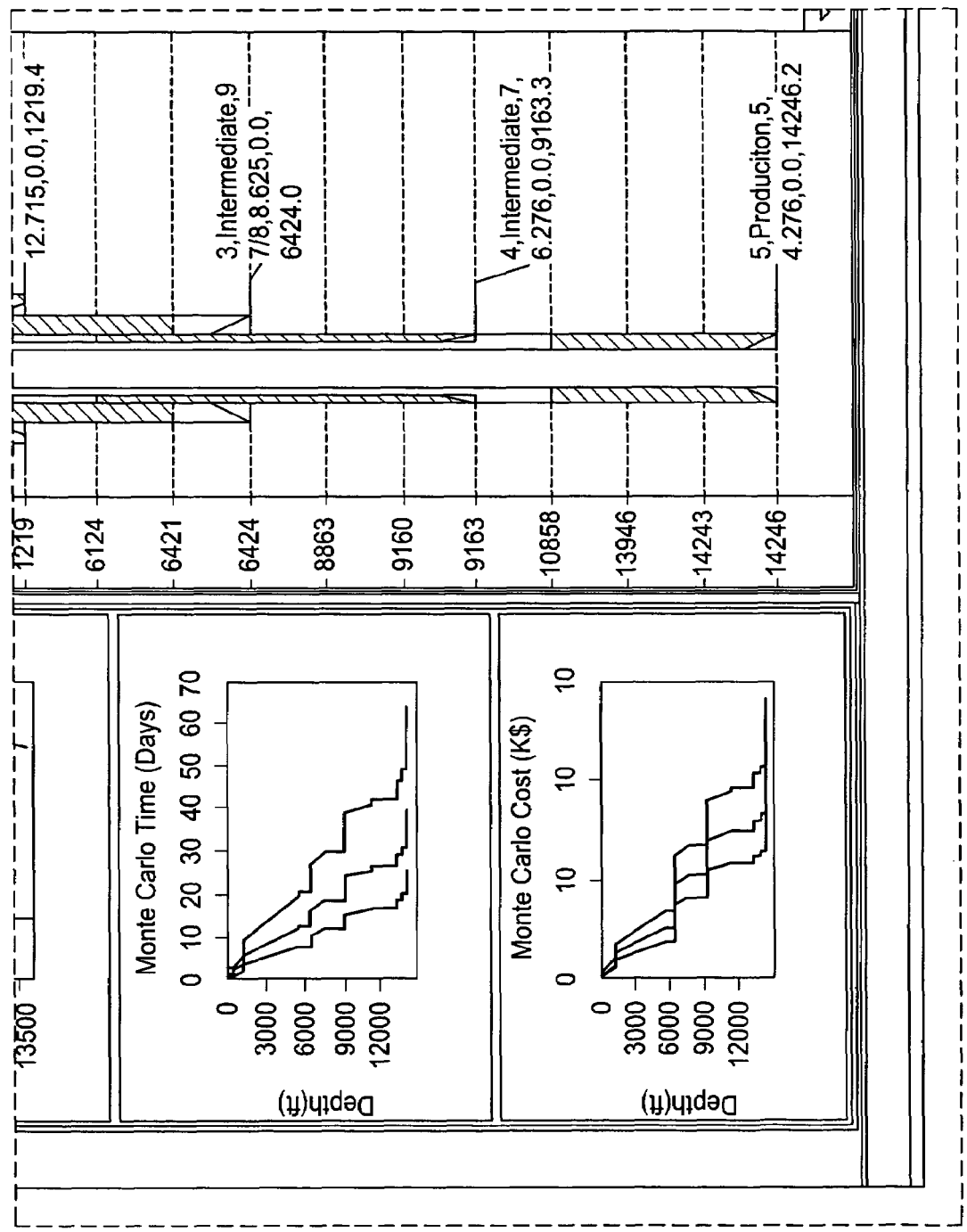
Figure 7D:
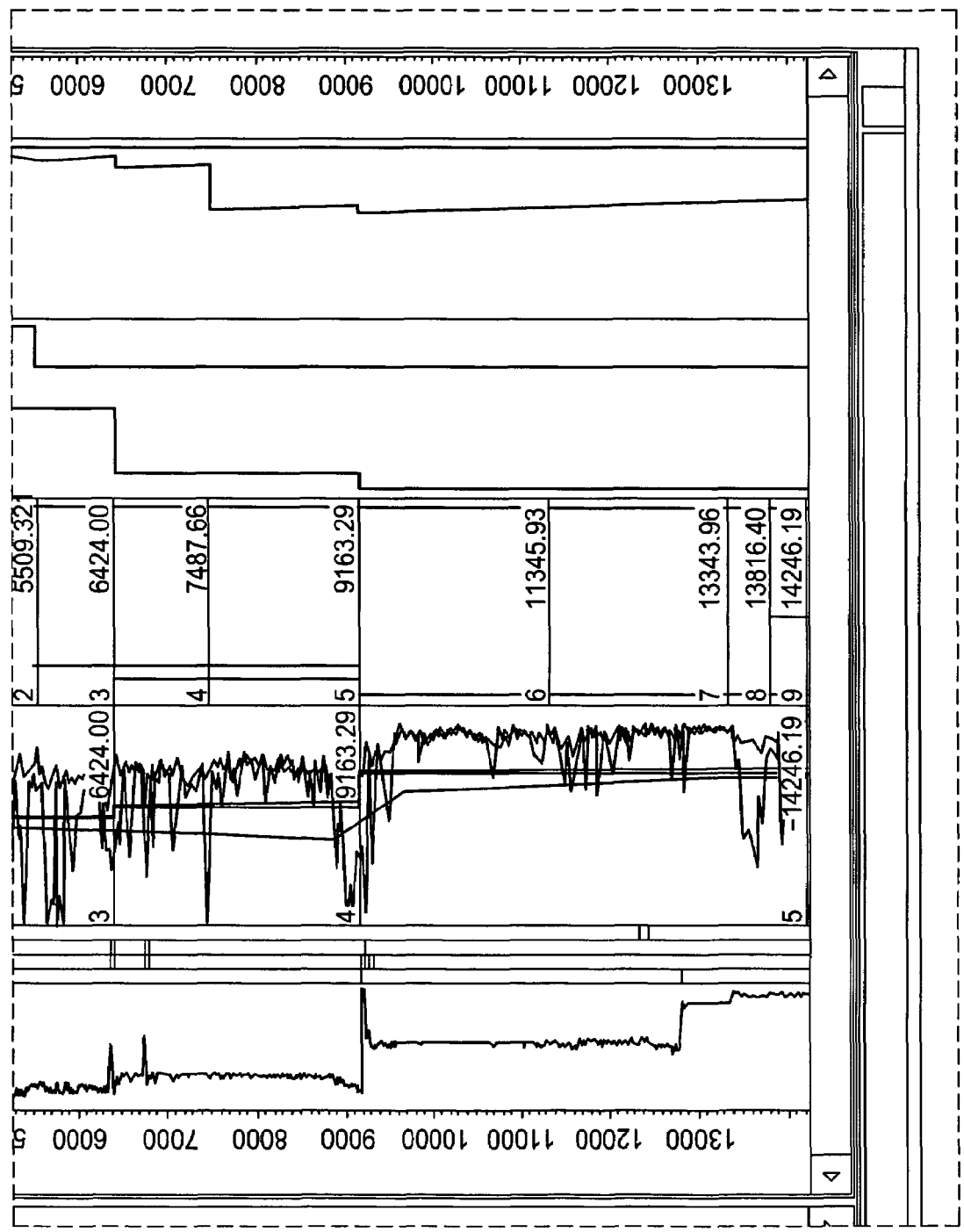

Referring to FIG. 7, a display showing a summary montage is illustrated. In FIG. 7, a comprehensive summary report and a montage display, utilized by the 'Automatic Well Planning Software System', can be printed or plotted in large scale and are also available as a standard result output.

Using its expert system and logic, the 'Automatic Well Planning Software System' automatically proposes sound technical solutions and provides a smooth path through the well planning workflow. Graphical interaction with the results of each task allows the user to efficiently fine-tune the results. In just minutes, asset teams, geoscientists, and drilling engineers can evaluate drilling projects and economics using probabilistic cost estimates based on solid engineering fundamentals instead of traditional, less rigorous estimation methods. The testing program combined with feedback received from other users of the program during the development of the software package made it possible to draw the following conclusions: (1) The 'Automatic Well Planning Software System' can be installed and used by inexperienced users with a minimum amount of training and by referencing the documentation provided, (2) The need for good earth property data enhances the link to geological and geomechanical models and encourages improved subsurface interpretation; it can also be used to quantify the value of acquiring additional information to reduce uncertainty, (3) With a minimum amount of input data, the 'Automatic Well Planning Software System' can create reasonable probabilistic time and cost estimates faithful to an engineered well design; based on the field test results, if the number of casing points and rig rates are accurate, the results will be within 20% of a fully engineered well design and AFE, (4) With additional customization and localization, predicted results compare to within 10% of a fully engineered well design AFE, (5) Once the 'Automatic Well Planning Software System' has been localized, the ability to quickly run new scenarios and assess the business impact and associated risks of applying new technologies, procedures or approaches to well designs is readily possible, (6) The speed of the 'Automatic Well Planning Software System' allows quick iteration and refinement of well plans and creation of different 'what if' scenarios for sensitivity analysis, (7) The 'Automatic Well Planning Software System' provides consistent and transparent well cost estimates to a process that has historically been arbitrary, inconsistent, and opaque; streamlining the workflow and eliminating human bias provides drilling staff the confidence to delegate and empower non-drilling staff to do their own scoping estimates, (8) The 'Automatic Well Planning Software System' provides unique understanding of drilling risk and uncertainty enabling more realistic economic modeling and improved decision making, (9) The risk assessment accurately identifies the type and location of risk in the wellbore enabling drilling engineers to focus their detailed engineering efforts most effectively, (10) It was possible to integrate and automate the well construction planning workflow based on an earth model and produce technically sound usable results, (11) The project was able to extensively use COTS technology to accelerate development of the software, and (12) The well engineering workflow interdependencies were able to be mapped and managed by the software.

The following nomenclature was used in this specification:

| | |
|---|---|
| RT = | Real-Time, usually used in the context of real-time data (while drilling). |
| G&G = | Geological and Geophysical |
| SEM = | Shared Earth Model |
| MEM = | Mechanical Earth Model |
| NPT = | Non Productive Time, when operations are not planned, or due to operational difficulties, the progress of the well has be delayed, also often referred to as Trouble Time. |
| NOT = | Non Optimum Time, when operations take longer than they should for various reasons. |
| WOB = | Weight on bit |
| ROP = | Rate of penetration |
| RPM = | Revolutions per minute |
| BHA = | Bottom hole assembly |
| SMR = | Software Modification Request |
| BOD = | Basis of Design, document specifying the requirements for a well to be drilled. |
| AFE = | Authorization for Expenditure |

REFERENCES (1) Booth, J., Bradford, I. D. R., Cook, J. M., Dowell, J. D., Ritchie, G., Tuddenham, I.: 'Meeting Future Drilling Planning and Decision Support Requirements: A New Drilling Simulator', IADC/SPE 67816 presented at the 2001 IADC/SPE Drilling Conference, Amsterdam, The Netherlands, 27 February-1 March.

(2) Luo, Y., Bern, P. A. and Chambers, B. D.: 'Flow-Rate Predictions for Cleaning Deviated Wells', paper IADC/SPE 23884 presented at the 1992 IADC/SPE Drilling Conference, New Orleans, La., February 18-21.

(3) Moore and Chien theory is published in 'Applied Drilling Engineering', Bourgoyne, A. T., Jr, et al., SPE Textbook Series Vol2.

A functional specification associated with the overall 'Automatic Well Planning Software System' (termed a 'use case') will be set forth in the following paragraphs. This functional specification relates to the overall 'Automatic Well Planning Software System'.

The following defines information that pertains to this particular 'use case'. Each piece of information is important in understanding the purpose behind the 'use Case'.

| | |
|---|---|
| Goal In Context: | Describe the full workflow for the low level user |
| Scope: | N/A |
| Level: | Low Level |
| Pre-Condition: | Geological targets pre-defined |
| Success End Condition: | Probability based time estimate with cost and risk |
| Failed End Condition: | Failure in calculations due to assumptions or if distribution of results is too large |
| Primary Actor: | Well Engineer |
| Trigger Event: | N/A |

Main Success Scenario—This Scenario describes the steps that are taken from trigger event to goal completion when everything works without failure. It also describes any required cleanup that is done after the goal has been reached. The steps are listed below:

1. User opens program, and system prompts user whether to open an old file or create a new one. User creates new model and system prompts user for well information (well name, field, country, coordinates). System prompts user to insert earth model. Window with different options appears and user selects data level. Secondary window appears where file is loaded or data inserted manually. System displays 3D view of earth model with key horizons, targets, anti-targets, markers, seismic, etc.

2. System prompts user for a well trajectory. The user either loads from a file or creates one for the 'Automatic Well Planning Software System'. System generates 3D view of trajectory in the earth model and 2D views, both plan and vertical section. User prompted to verify trajectory and modify if needed via direct interaction with 3D window.

3. The system will extract mechanical earth properties (PP, FG, WBS, lithology, density, strength, min/max horizontal stress, etc.) for every point along the trajectory and store it. These properties will either come from a populated mechanical earth model, from interpreted logs applied to this trajectory, or manually entered.

4. The system will prompt the user for the rig constraints. Rig specification options will be offered and the user will choose either the type of rig and basic configurations or insert data manually for a specific drilling unit.

5. The system will prompt the user to enter pore pressure data, if applicable, otherwise taken from the mechanical earth model previously inserted and a MW window will be generated using PP, FG, and WBS curves. The MW window will be displayed and allow interactive modification.
6. The system will automatically divide the well into hole/casing sections based on kick tolerance and trajectory sections and then propose a mud weight schedule. These will be displayed on the MW window and allow the user to interactively modify their values. The casing points can also be interactively modified on the 2D and 3D trajectory displays
7. The system will prompt the user for casing size constraints (tubing size, surface slot size, evaluation requirements), and based on the number of sections generate the appropriate hole size—casing size combinations. The hole/casing circle chart will be used, again allowing for interaction from the user to modify the hole/casing size progression.
8. The system will successively calculate casing grades, weights/wall thickness and connections based on the sizes selected and the depths. User will be able to interact and define availability of types of casing.
9. The system will generate a basic cementing program, with simple slurry designs and corresponding volumes.
10. The system will display the wellbore schematic based on the calculations previously performed and this interface will be fully interactive, allowing the user to click and drag hole & casing sizes, top & bottom setting depths, and recalculating based on these selections. System will flag user if the selection is not feasible.
11. The system will generate the appropriate mud types, corresponding rheology, and composition based on the lithology, previous calculations, and the users selection.
12. The system will successively split the well sections into bit runs, and based on the rock properties will select drilling bits for each section with ROP and drilling parameters.
13. The system will generate a basic BHA configuration, based on the bit section runs, trajectory and rock properties.
14. The system will run a hole cleaning calculation, based on trajectory, wellbore geometry, BHA composition and MW characteristics.
15. The system will do an initial hydraulics/ECD calculation using statistical ROP data. This data will be either selected or user defined by the system based on smart table lookup.
16. Using the data generated on the first hydraulics calculation, the system will perform an ROP simulation based on drilling bit characteristics and rock properties.
17. The system will run a successive hydraulics/ECD calculation using the ROP simulation data. System will flag user if parameters are not feasible.
18. The system will calculate the drilling parameters and display them on a multi display panel. This display will be exportable, portable, and printable.
19. The system will generate an activity planning sequence using default activity sequences for similar hole sections and end conditions. This sequence will be fully modifiable by the user, permitting modification in sequence order and duration of the event. This sequence will be in the same standard as the Well Operations or Drilling Reporting software and will be interchangeable with the Well Operations or Drilling Reporting software. The durations of activities will be populated from tables containing default "best practice" data or from historical data from the well operations or from the drilling reporting software.
20. The system will generate time vs. depth curve based on the activity planning details. The system will create a best, mean, and worst set of time curves using combinations of default and historical data. These curves will be exportable to other documents and printable.
21. The system will prompt the user to select probability points such as P10, P50, P90 and then run a Monte Carlo simulation to generate a probability distribution curve for the scenario highlighting the user selected reference points and corresponding values of time. The system will provide this as frequency data or cumulative probability curves. These curves will be again exportable and printable.
22. The system will generate a cost plan using default cost templates that are pre-configured by users and can be modified at this point. Many of the costs will reference durations of the entire well, hole sections, or specific activities to calculate the applied cost. The system will generate P10, P50, and P90 cost vs. depth curves.
23. The system will generate a summary of the well plan, in word format, along with the main display graphs. The user will select all that should be exported via a check box interface. The system will generate a large one-page summary of the whole process. This document will be as per a standard Well Operations Program template.

Figure 8:
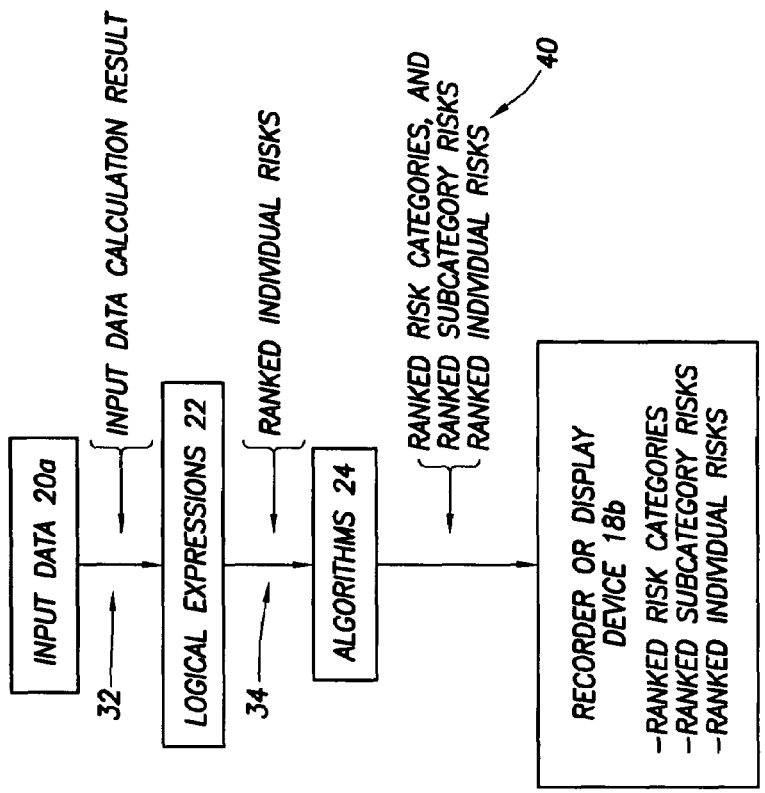
FIG. 8 illustrates a workflow in an 'Automatic Well Planning Software System'.

Referring to FIG. 8, as can be seen on the left side of the displays illustrated in FIGS. 2 through 6, the 'Automatic Well Planning Software System' includes a plurality of 'tasks'. Each of those tasks are illustrated in FIG. 8. These 'tasks' will be discussed again below with reference to FIGS. 20-28 when the 'Automatic Well Planning Workflow Control System software' is discussed. In FIG. 8, those plurality of 'tasks' are divided into four groups: (1) Input task 10, where input data is provided, (2) Wellbore Geometry task 12 and Drilling Parameters task 14, where calculations are performed, and (3) a Results task 16, where a set of results are calculated and presented to a user. The Input task 10 includes the following sub-tasks: (1) scenario information, (2) trajectory, (3) Earth properties, (4) Rig selection, (5) Resample Data. The Wellbore Geometry task 12 includes the following sub-tasks: (1) Wellbore stability, (2) Mud weights and casing points, (3) Wellbore sizes, (4) Casing design, (5) Cement design, (6) Wellbore geometry. The Drilling Parameters task 14 includes the following sub-tasks: (1) Drilling fluids, (2) Bit selection 14a, (3) Drillstring design 14b, (4) Hydraulics. The Results task 16 includes the following sub-tasks: (1) Risk Assessment 16a, (2) Risk Matrix, (3) Time and cost data, (4) Time and cost chart, (5) Monte Carlo, (6) Monte Carlo graph, (7) Summary report, and (8) montage.

Recalling that the Results task 16 of FIG. 8 includes a 'Risk Assessment' sub-task 16a, the 'Risk Assessment' sub-task 16a will be discussed in detail in the following paragraphs with reference to FIGS. 9A, 9B, and 10.

Automatic Well Planning Software System—Risk Assessment sub-task 16a—Software

Identifying the risks associated with drilling a well is probably the most subjective process in well planning today. This is based on a person recognizing part of a technical well design that is out of place relative to the earth properties or mechanical equipment to be used to drill the well. The identification of any risks is brought about by integrating all of the well, earth, and equipment information in the mind of a person and mentally sifting through all of the information, mapping the interdependencies, and based solely on personal experience extracting which parts of the project pose what potential risks to the overall success of that project. This is tremendously sensitive to human bias, the individual's ability to remember and integrate all of the data in their mind, and the individuals experience to enable them to recognize the conditions that trigger each drilling risk. Most people are not equipped to do this and those that do are very inconsistent unless strict process and checklists are followed. There are some drilling risk software systems in existence today, but they all require the same human process to identify and assess the likelihood of each individual risks and the consequences. They are simply a computer system for manually recording the results of the risk identification process.

The Risk Assessment sub-task 16a associated with the 'Automatic Well Planning Software System' is a system that will automatically assess risks associated with the technical well design decisions in relation to the earth's geology and geomechanical properties and in relation to the mechanical limitations of the equipment specified or recommended for use.

Risks are calculated in four ways: (1) by 'Individual Risk Parameters', (2) by 'Risk Categories', (3) by 'Total Risk', and (4) the calculation of 'Qualitative Risk Indices' for each.

Individual Risk Parameters are calculated along the measured depth of the well and color coded into high, medium, or low risk for display to the user. Each risk will identify to the user: an explanation of exactly what is the risk violation, and the value and the task in the workflow controlling the risk. These risks are calculated consistently and transparently allowing users to see and understand all of the known risks and how they are identified. These risks also tell the users which aspects of the well justify further engineering effort to investigate in more detail.

Group/category risks are calculated by incorporating all of the individual risks in specific combinations. Each individual risk is a member of one or more Risk Categories. Four principal Risk Categories are defined as follows: (1) Gains, (2) Losses, (3) Stuck, and (4) Mechanical; since these four Rick Categories are the most common and costly groups of troublesome events in drilling worldwide.

The Total Risk for a scenario is calculated based on the cumulative results of all of the group/category risks along both the risk and depth axes.

Risk indexing—Each individual risk parameter is used to produce an individual risk index which is a relative indicator of the likelihood that a particular risk will occur. This is purely qualitative, but allows for comparison of the relative likelihood of one risk to another—this is especially indicative when looked at from a percentage change. Each Risk Category is used to produce a category risk index also indicating the likelihood of occurrence and useful for identifying the most likely types of trouble events to expect. Finally, a single risk index is produced for the scenario that is specifically useful for comparing the relative risk of one scenario to another.

The 'Automatic Well Planning Software System' is capable of delivering a comprehensive technical risk assessment, and it can do this automatically. Lacking an integrated model of the technical well design to relate design decisions to associated risks, the 'Automatic Well Planning Software System' can attribute the risks to specific design decisions and it can direct users to the appropriate place to modify a design choice in efforts to modify the risk profile of the well.

Figure 9A:
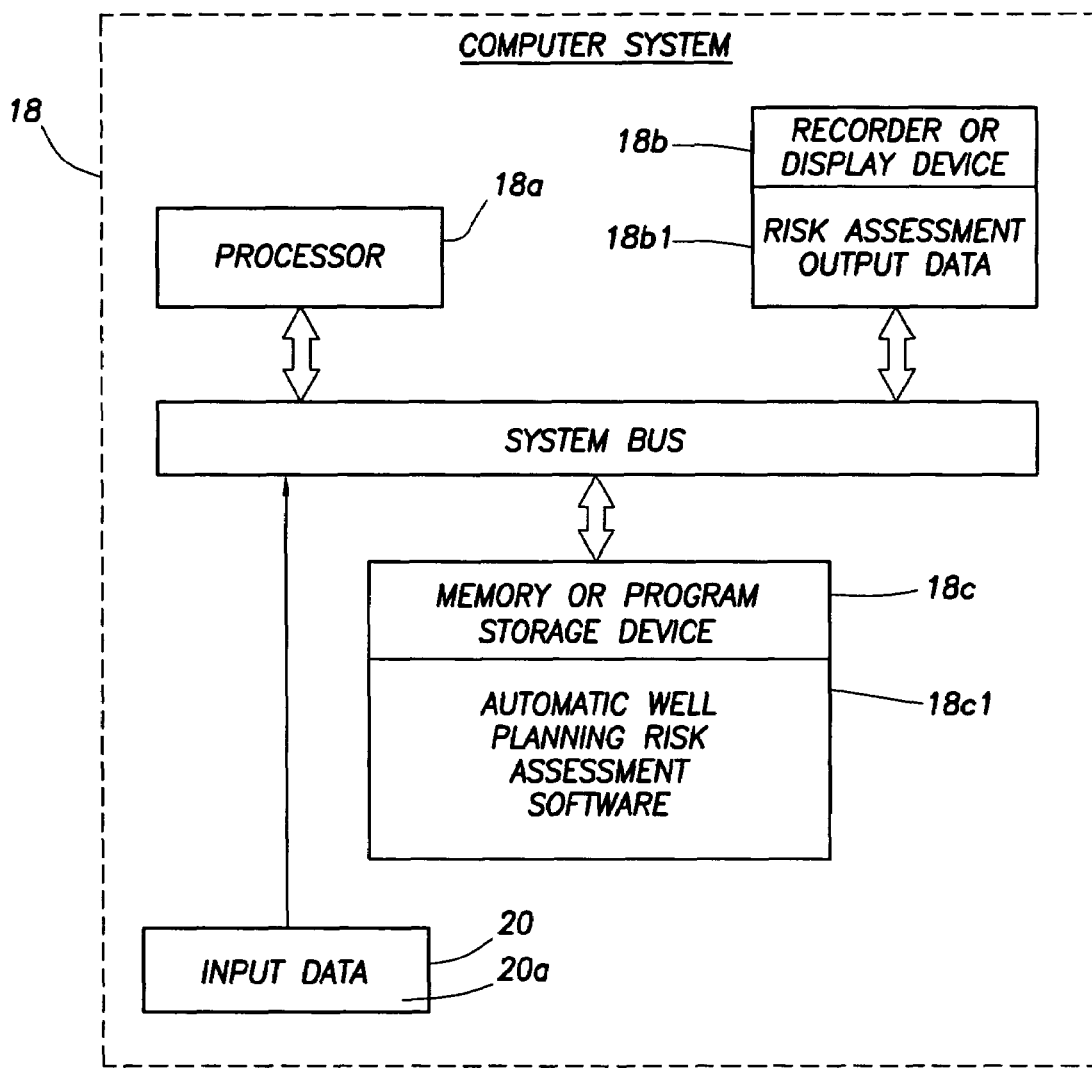
FIG. 9A illustrates a computer system which stores an Automatic Well Planning Risk Assessment Software.

Referring to FIG. 9A, a Computer System 18 is illustrated. The Computer System 18 includes a Processor 18a connected to a system bus, a Recorder or Display Device 18b connected to the system bus, and a Memory or Program Storage Device 18c connected to the system bus. The Recorder or Display Device 18b is adapted to display 'Risk Assessment Output Data' 18b1. The Memory or Program Storage Device 18c is adapted to store an 'Automatic Well Planning Risk Assessment Software' 18c1. The 'Automatic Well Planning Risk Assessment Software' 18c1 is originally stored on another 'program storage device', such as a hard disk; however, the hard disk was inserted into the Computer System 18 and the 'Automatic Well Planning Risk Assessment Software' 18c1 was loaded from the hard disk into the Memory or Program Storage Device 18c of the Computer System 18 of FIG. 9A. In addition, a Storage Medium 20 containing a plurality of 'Input Data' 20a is adapted to be connected to the system bus of the Computer System 18, the 'Input Data' 20a being accessible to the Processor 18a of the Computer System 18 when the Storage Medium 20 is connected to the system bus of the Computer System 18. In operation, the Processor 18a of the Computer System 18 will execute the Automatic Well Planning Risk Assessment Software 18c1 stored in the Memory or Program Storage Device 18c of the Computer System 18 while, simultaneously, using the 'Input Data' 20a stored in the Storage Medium 20 during that execution. When the Processor 18a completes the execution of the Automatic Well Planning Risk Assessment Software 18c1 stored in the Memory or Program Storage Device 18c (while using the 'Input Data' 20a), the Recorder or Display Device 18b will record or display the 'Risk Assessment Output Data' 18b1, as shown in FIG. 9A. For example the 'Risk Assessment Output Data' 18b1 can be displayed on a display screen of the Computer System 18, or the 'Risk Assessment Output Data' 18b1 can be recorded on a printout which is generated by the Computer System 18. The Computer System 18 of FIG. 9A may be a personal computer (PC). The Memory or Program Storage Device 18c is a computer readable medium or a program storage device which is readable by a machine, such as the processor 18a. The processor 18a may be, for example, a microprocessor, microcontroller, or a mainframe or workstation processor. The Memory or Program Storage Device 18c, which stores the 'Automatic Well Planning Risk Assessment Software' 18c1, may be, for example, a hard disk, ROM, CD-ROM, DRAM, or other RAM, flash memory, magnetic storage, optical storage, registers, or other volatile and/or non-volatile memory.

Figure 9B:
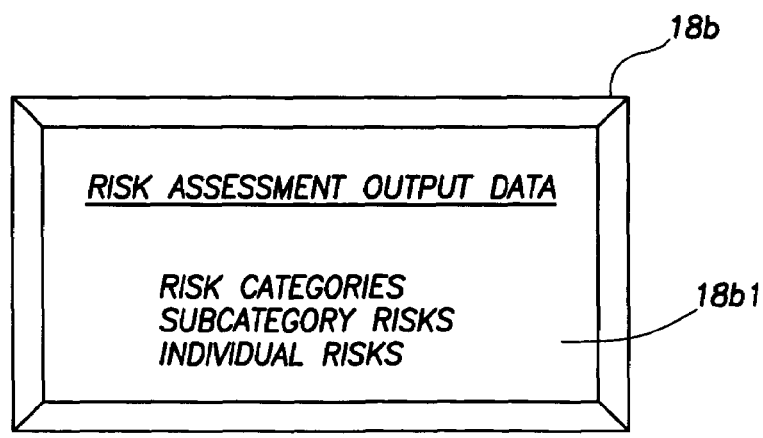
FIG. 9B illustrates a display as shown on a Recorder or Display device of the Computer System of FIG. 9A.

Referring to FIG. 9B, a larger view of the Recorder or Display Device 18b of FIG. 9A is illustrated. In FIG. 9B, the 'Risk Assessment Output Data' 18b1 includes: a plurality or Risk Categories, (2) a plurality of Subcategory Risks (each of which have been ranked as either a High Risk or a Medium Risk or a Low Risk), and (3) a plurality of Individual Risks (each of which have been ranked as either a High Risk or a Medium Risk or a Low Risk). The Recorder or Display Device 18b of FIG. 9B will display or record the 'Risk Assessment Output Data' 18b1 including the Risk Categories, the Subcategory Risks, and the Individual Risks.

Figure 10:
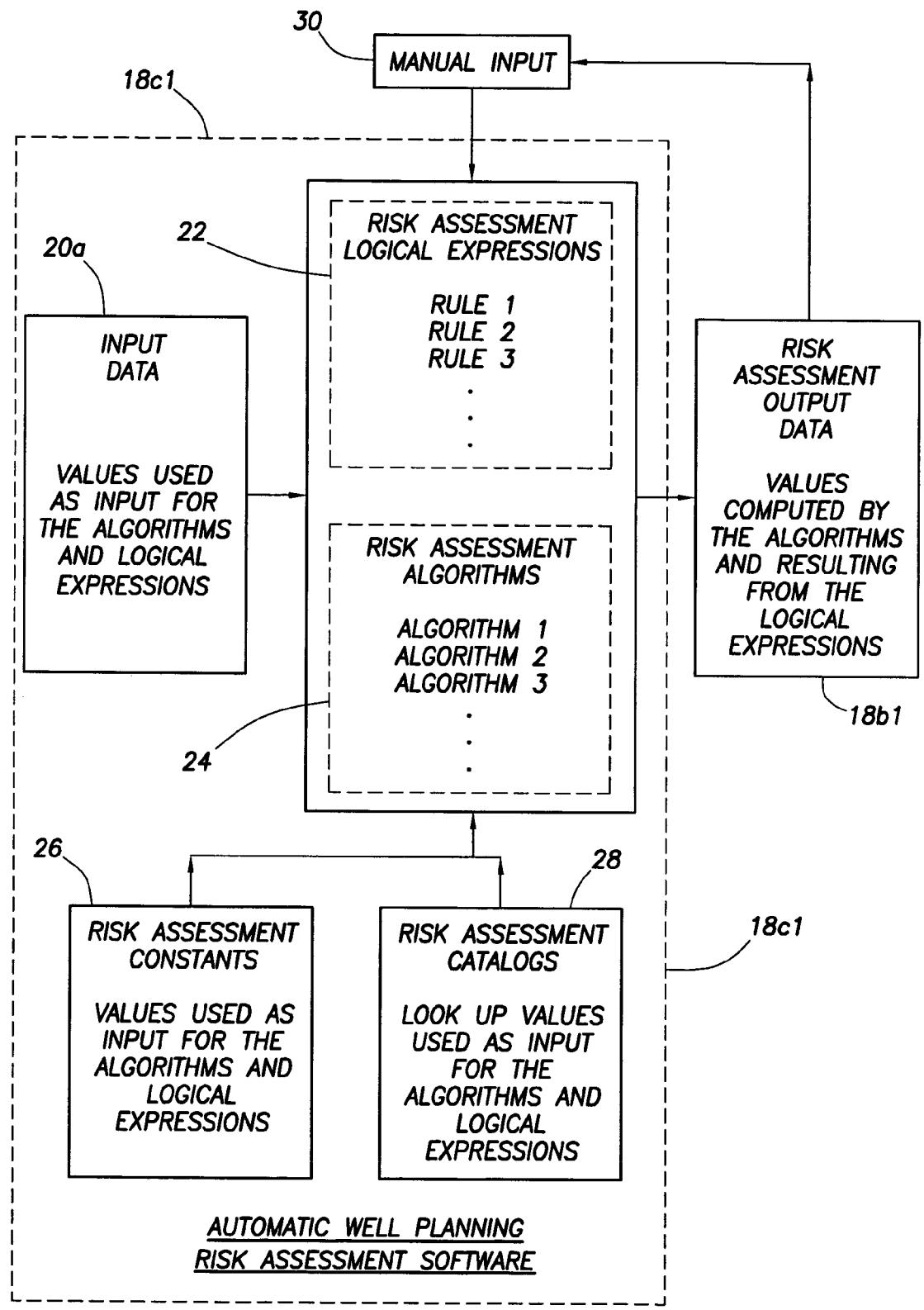
FIG. 10 illustrates a detailed construction of the Automatic Well Planning Risk Assessment Software stored in the Computer System of FIG. 9A.

Referring to FIG. 10, a detailed construction of the 'Automatic Well Planning Risk Assessment Software' 18c1 of FIG. 9A is illustrated. In FIG. 10, the 'Automatic Well Planning Risk Assessment Software' 18c1 includes a first block which stores the Input Data 20a, a second block 22 which stores a plurality of Risk Assessment Logical Expressions 22; a third block 24 which stores a plurality of Risk Assessment Algorithms 24, a fourth block 26 which stores a plurality of Risk Assessment Constants 26, and a fifth block 28 which stores a plurality of Risk Assessment Catalogs 28. The Risk Assessment Constants 26 include values which are used as input for the Risk Assessment Algorithms 24 and the Risk Assessment Logical Expressions 22. The Risk Assessment Catalogs 28 include look-up values which are used as input by the Risk Assessment Algorithms 24 and the Risk Assessment Logical Expressions 22. The 'Input Data' 20a includes values which are used as input for the Risk Assessment Algorithms 24 and the Risk Assessment Logical Expressions 22. The 'Risk Assessment Output Data' 18b1 includes values which are computed by the Risk Assessment Algorithms 24 and which result from the Risk Assessment Logical Expressions 22. In operation, referring to FIGS. 9 and 10, the Processor 18a of the Computer System 18 of FIG. 9A executes the Automatic Well Planning Risk Assessment Software 18c1 by executing the Risk Assessment Logical Expressions 22 and the Risk Assessment Algorithms 24 of the Risk Assessment Software 18c1 while, simultaneously, using the 'Input Data' 20a, the Risk Assessment Constants 26, and the values stored in the Risk Assessment Catalogs 28 as 'input data' for the Risk Assessment Logical Expressions 22 and the Risk Assessment Algorithms 24 during that execution. When that execution by the Processor 18a of the Risk Assessment Logical Expressions 22 and the Risk Assessment Algorithms 24 (while using the 'Input Data' 20a, Constants 26, and Catalogs 28) is completed, the 'Risk Assessment Output Data' 18b1 will be generated as a 'result'. That 'Risk Assessment Output Data' 18b1 is recorded or displayed on the Recorder or Display Device 18b of the Computer System 18 of FIG. 9A. In addition, that 'Risk Assessment Output Data' 18b1 can be manually input, by an operator, to the Risk Assessment Logical Expressions block 22 and the Risk Assessment Algorithms block 24 via a 'Manual Input' block 30 shown in FIG. 10.

Input Data 20a

The following paragraphs will set forth the 'Input Data' 20a which is used by the 'Risk Assessment Logical Expressions' 22 and the 'Risk Assessment Algorithms' 24. Values of the Input Data 20a that are used as input for the Risk Assessment Algorithms 24 and the Risk Assessment Logical Expressions 22 are as follows:

Casing Point Depth
Measured Depth
True Vertical Depth
Mud Weight
Measured Depth
ROP
Pore Pressure
Static Temperature
Pump Rate
Dog Leg Severity
ECD
Inclination
Hole Size
Casing Size
Easting-westing
Northing-Southing
Water Depth
Maximum Water Depth
Maximum well Depth
Kick Tolerance
Drill Collar 1 Weight
Drill Collar 2 Weight
Drill Pipe Weight
Heavy Weight Weight
Drill Pipe Tensile Rating
Upper Wellbore Stability Limit
Lower Wellbore Stability Limit
Unconfined Compressive Strength
Bit Size
Mechanical drilling energy (UCS integrated over distance drilled by the bit)
Ratio of footage drilled compared to statistical footage
Cumulative UCS
Cumulative Excess UCS
Cumulative UCS Ratio
Average UCS of rock in section
Bit Average UCS of rock in section
Statistical Bit Hours
Statistical Drilled Footage for the bit
RPM
On Bottom Hours
Calculated Total Bit Revolutions
Time to Trip
Critical Flow Rate
Maximum Flow Rate in hole section
Minimum Flow Rate in hole section
Flow Rate
Total Nozzle Flow Area of bit
Top Of Cement
Top of Tail slurry
Length of Lead slurry
Length of Tail slurry
Cement Density Of Lead
Cement Density Of Tail slurry
Casing Weight per foot
Casing Burst Pressure
Casing Collapse Pressure
Casing Type Name
Hydrostatic Pressure of Cement column
Start Depth
End Depth
Conductor
Hole Section Begin Depth
Openhole Or Cased hole completion
Casing Internal Diameter
Casing Outer Diameter
Mud Type
Pore Pressure without Safety Margin
Tubular Burst Design Factor
Casing Collapse Pressure Design Factor
Tubular Tension Design Factor
Derrick Load Rating
Drawworks Rating
Motion Compensator Rating
Tubular Tension rating
Statistical Bit ROP
Statistical Bit RPM
Well Type
Maximum Pressure
Maximum Liner Pressure Rating
Circulating Pressure
Maximum UCS of bit
Air Gap
Casing Point Depth
Presence of H2S
Presence of CO2
Offshore Well
Flow Rate Maximum Limit Risk Assessment Constants 26

The following paragraphs will set forth the 'Risk Assessment Constants' 26 which are used by the 'Risk Assessment Logical Expressions' 22 and the 'Risk Assessment Algorithms' 24. Values of the Constants 26 that are used as input data for Risk Assessment Algorithms 24 and the Risk Assessment Logical Expressions 22 are as follows:

Maximum Mud Weight Overbalance to Pore Pressure
Minimum Required Collapse Design Factor
Minimum Required Tension Design Factor
Minimum Required Burst Design Factor
Rock density
Seawater density Risk Assessment Catalogs 28

The following paragraphs will set forth the 'Risk Assessment Catalogs' 28 which are used by the 'Risk Assessment Logical Expressions' 22 and the 'Risk Assessment Algorithms' 24. Values of the Catalogs 28 that are used as input data for Risk Assessment Algorithms 24 and the Risk Assessment Logical Expressions 22 include the following:

- Risk Matrix Catalog
- Risk Calculation Catalog
- Drillstring component catalog
- Drill Bit Catalog
- Clearance Factor Catalog
- Drill Collar Catalog
- Drill Pipes Catalog
- Minimum and maximum flow rate catalog
- Pump catalog
- Rig Catalog
- Constants and variables Settings catalog
- Tubular Catalog Risk Assessment Output Data 18b1

The following paragraphs will set forth the 'Risk Assessment Output Data' 18b1 which are generated by the 'Risk Assessment Algorithms' 24. The 'Risk Assessment Output Data' 18b1, which is generated by the 'Risk Assessment Algorithms' 24, includes the following types of output data: (1) Risk Categories, (2) Subcategory Risks, and (3) Individual Risks. The 'Risk Categories', 'Subcategory Risks', and 'Individual Risks' included within the 'Risk Assessment Output Data' 18b1 comprise the following:

The following 'Risk Categories' are calculated:
- Individual Risk
- Average Individual Risk
- Subcategory Risk
- Average Subcategory Risk
- Total risk
- Average total risk
- Potential risk for each design task
- Actual risk for each design task The following 'Subcategory Risks' are calculated
- Gains risks
- Losses risks
- Stuck Pipe risks
- Mechanical risks The following 'Individual Risks' are calculated
- H2S and CO2,
- Hydrates,
- Well water depth,
- Tortuosity,
- Dogleg severity,
- Directional Drilling Index,
- Inclination,
- Horizontal displacement,
- Casing Wear,
- High pore pressure,
- Low pore pressure,
- Hard rock,
- Soft Rock,
- High temperature,
- Water-depth to rig rating,
- Well depth to rig rating,
- mud weight to kick,
- mud weight to losses,
- mud weight to fracture,
- mud weight window,
- Wellbore stability window,
- wellbore stability,
- Hole section length,
- Casing design factor,
- Hole to casing clearance,
- casing to casing clearance,
- casing to bit clearance,
- casing linear weight,
- Casing maximum overpull,
- Low top of cement,
- Cement to kick,
- cement to losses,
- cement to fracture,
- Bit excess work,
- Bit work,
- Bit footage,
- bit hours,
- Bit revolutions,
- Bit ROP,
- Drillstring maximum overputt,
- Bit compressive strength,
- Kick tolerance,
- Critical flow rate,
- Maximum flow rate,
- Small nozzle area,
- Standpipe pressure,
- ECD to fracture,
- ECD to losses,
- Subsea BOP,
- Large Hole,
- Small Hole,
- Number of casing strings,
- Drillstring parting,
- Cuttings.

Risk Assessment Logical Expressions 22

The following paragraphs will set forth the 'Risk Assessment Logical Expressions' 22. The 'Risk Assessment Logical Expressions' 22 will: (1) receive the 'Input Data 20a' including a 'plurality of Input Data calculation results' that has been generated by the 'Input Data 20a'; (2) determine whether each of the 'plurality of Input Data calculation results' represent a high risk, a medium risk, or a low risk; and (3) generate a 'plurality of Risk Values' (also known as a 'plurality of Individual Risks'), in response thereto, each of the plurality of Risk Values/plurality of Individual Risks representing a 'an Input Data calculation result' that has been 'ranked' as either a 'high risk', a 'medium risk', or a 'low risk'.

The Risk Assessment Logical Expressions 22 include the following:

Task: Scenario
Description: H2S and CO2 present for scenario indicated by user (per well)
Short Name: H2S_CO2
Data Name: H2S
Calculation: H2S and CO2 check boxes checked yes
Calculation Name: CalculateH2S_CO2
High: Both selected
Medium: Either one selected
Low: Neither selected
Unit: unitless Task: Scenario
Description: Hydrate development (per well)
Short Name: Hydrates
Data Name: Water Depth
Calculation: =Water Depth
Calculation Name: CalculateHydrates
High: >=3000
Medium: >=2000

Low: <2000
Unit: ft
Task: Scenario
Description: Hydrate development (per well)
Short Name: Well_WD
Data Name: Water Depth
Calculation: =WaterDepth
Calculation Name: CalculateHydrates
High: >=5000
Medium: >=1000
Low: <1000
Unit: ft
Task: Trajectory
Description: Dogleg severity (per depth)
Short Name: DLS
Data Name: Dog Leg Severity
Calculation: NA
Calculation Name: CalculateRisk
High: >=6
Medium: >=4
Low: <4
Unit: deg/100 ft
Task: Trajectory
Description: Tortuosity (per depth)
Short Name: TORT
Data Name: Dog Leg Severity
Calculation: Summation of DLS
Calculation Name: CalculateTort
High: >=90
Medium: >=60
Low: <60
Unit: deg
Task: Trajectory
Description: Inclination (per depth)
Short Name: INC
Data Name: Inclination
Calculation: NA
Calculation Name: CalculateRisk
High: >=65
Medium: >=40
Low: <40
Unit: deg
Task: Trajectory
Description: Well inclinations with difficult cuttings transport conditions (per depth)
Short Name: Cutting
Data Name: Inclination
Calculation: NA
Calculation Name: CalculateCutting
High: >=45
Medium: >65
Low: <45
Unit: deg
Task: Trajectory
Description: Horizontal to vertical ratio (per depth)
Short Name: Hor_Disp
Data Name: Inclination
Calculation: =Horizontal Displacement/True Vertical Depth
Calculation Name: CalculateHor Disp
High: >=1.0
Medium: >=0.5
Low: <0.5
Unit: Ratio
Task: Trajectory
Description: Directional Drillability Index (per depth) Fake Threshold
Short Name: DDI
Data Name: Inclination
Calculation: =Calculate DDI using Resample data
Calculation Name: CalculateDDI
High: >6.8
Medium: >=6.0
Low: <6.0
Unit: unitless
Task: EarthModel
Description: High or supernormal Pore Pressure (per depth)
ShortName: PP_High
Data Name: Pore Pressure without Safety Margin
Calculation: =PP
Calculation Name: CalculateRisk
High: >=16
Medium: >=12
Low: <12
Unit: ppg
Task: EarthModel
Description: Depleted or subnormal Pore Pressure (per depth)
Short Name: PP_Low
Data Name: Pore Pressure without Safety Margin
Calculation: =Pore Pressure without Safety Margin
Calculation Name: CalculateRisk
High: <=8.33
Medium: <=8.65
Low: >8.65
Unit: ppg
Task: EarthModel
Description: Superhard rock (per depth)
Short Name: RockHard
Data Name: Unconfined Compressive Strength
Calculation: =Unconfined Compressive Strength
Calculation Name: CalculateRisk
High: >=25
Medium: >=16
Low: <16
Unit: kpsi
Task: EarthModel
Description: Gumbo (per depth)
Short Name: RockSoft
Data Name: Unconfined Compressive Strength
Calculation: =Unconfined Compressive Strength
Calculation Name: CalculateRisk
High: <=2
Medium: <=4
Low: >4
Unit: kpsi
Task: EarthModel
Description: High Geothermal Temperature (per depth)
Short Name: TempHigh
Data Name: StaticTemperature
Calculation: =Temp
Calculation Name: CalculateRisk
High: >=280
Medium: >=220
Low: <220
Unit: degF
Task: RigConstraint
Description: Water depth as a ratio to the maximum water depth rating of the rig (per depth)
Short Name: Rig_WD
Data Name:
Calculation: =WD, Rig WD rating
Calculation Name: CalculateRig_WD
High: >=0.75
Medium: >=0.5

Low: <0.5
Unit: Ratio
Task: RigConstraint
Description: Total measured depth as a ratio to the maximum depth rating of the rig (per depth)
Short Name: Rig_MD
Data Name:
Calculation: =MD/Rig MD rating
Calculation Name: CalculateRig_MD
High: >=0.75
Medium: >=0.5
Low: <0.5
Unit: Ratio
Task: RigConstraint
"Description: Subsea BOP or wellhead (per well), not quite sure how to compute it"
Short Name: SS_BOP
Data Name: Water Depth
Calculation: =
Calculation Name: CalculateHydrates
High: >=3000
Medium: >=1000
Low: <1000
Unit: ft
Task: MudWindow
Description: Kick potential where Mud Weight is too low relative to Pore Pressure (per depth)
Short Name: MW_Kick
Data Name:
Calculation: =Mud Weight—Pore Pressure
Calculation Name: CalculateMW_Kick
High: <=0.3
Medium: <=0.5
Low: >0.5
Unit: ppg
Task: MudWindow
Description: Loss potential where Hydrostatic Pressure is too high relative to Pore
Pressure (per depth)
Short Name: MW_Loss
Data Name:
Calculation: =Hydrostatic Pressure—Pore Pressure
Calculation Name: CalculateMW_Loss
"PreCondition: =Mud Type (HP-WBM, ND-WBM, D-WBM)"
High: >=2500
Medium: >=2000
Low: <2000
Unit: psi
Task: MudWindow
Description: Loss potential where Hydrostatic Pressure is too high relative to Pore Pressure (per depth)
Short Name: MW_Loss
Data Name:
Calculation: =Hydrostatic Pressure—Pore Pressure
Calculation Method: CalculateMW_Loss
"PreCondition: =Mud Type (OBM, MOBM, SOBM)"
High: >=2000
Medium: >=1500
Low: <1500
Unit: psi
Task: MudWindow
Description: Loss potential where Mud Weight is too high relative to Fracture Gradient (per depth)
Short Name: MW_Frac
Data Name:
Calculation: =Upper Bound—Mud Weight
Calculation Method: CalculateMW_Frac
High: <=0.2
Medium: <=0.5
Low: >0.5
Unit: ppg
Task: MudWindow
Description: Narrow mud weight window (per depth)
Short Name: MWW
Data Name:
Calculation: =Upper Wellbore Stability Limit—Pore Pressure without Safety Margin
Calculation Method: CalculateMWW
High: <=0.5
Medium: <=1.0
Low: >1.0
Unit: ppg
Task: MudWindow
Description: Narrow wellbore stability window (per depth)
Short Name: WBSW
Data Name:
Calculation: =Upper Bound—Lower Bound
Calculation Method: CalculateWBSW
"PreCondition: =Mud Type (OBM, MOBM, SOBM)"
High: <=0.3
Medium: <=0.6
Low: >0.6
Unit: ppg
Task: MudWindow
Description: Narrow wellbore stability window (per depth)
Short Name: WBSW
Data Name:
Calculation: =Upper Bound—Lower Bound
Calculation Method: CalculateWBSW
"PreCondition: =Mud Type (HP-WBM, ND-WBM, D-WBM)"
High: <=0.4
Medium: <=0.8
Low: >0.8
Unit: ppg
Task: MudWindow
Description: Wellbore Stability (per depth)
Short Name: WBS
Data Name: Pore Pressure without Safety Margin
Calculation: =Pore Pressure without Safety Margin
Calculation Method: CalculateWBS
High: LB>=MW>=PP
Medium: MW>=LB>=PP
Low: MW>=PP>=LB
Unit: unitless
Task: MudWindow
Description: Hole section length (per hole section)
Short Name: HSLength
Data Name:
Calculation: =HoleEnd−HoleStart
Calculation Method: CalculateHSLength
High: >=8000
Medium: >=7001
Low: <7001
Unit: ft
Task: MudWindow
Description: Dogleg severity at Casing points for casing wear (per hole section)
Short Name: Csg_Wear
Data Name: Dog Leg Severity
Calculation: =Hole diameter
Calculation Method: CalculateCsg_Wear
High: >=4

Medium: >=3
Low: <3
Unit: deg/100 ft
Task: MudWindow
Description: Number of Casing strings (per hole section)
Short Name: Csg_Count
Data Name: Casing Point Depth
Calculation: =Number of Casing strings
Calculation Method: CalculateCsg_Count
High: >=6
Medium: >=4
Low: <4
Unit: unitless
Task: WellboreSizes
Description: Large Hole size (per hole section)
Short Name: Hole_Big
Data Name: Hole Size
Calculation: =Hole diameter
Calculation Method: CalculateHoleSectionRisk
High: >=24
Medium: >=18.625
Low: <18.625
Unit: in
Task: WellboreSizes
Description: Small Hole size (per hole section)
Short Name: Hole_Sm
Data Name: Hole Size
Calculation: =Hole diameter
Calculation Method: CalculateHole_Sm
PreCondition: Onshore
High: <=4.75
Medium: <=6.5
Low: >6.5
Unit: in
Task: WellboreSizes
Description: Small Hole size (per hole section)
Short Name: Hole_Sm
Data Name: Hole Size
Calculation: =Hole diameter
Calculation Method: CalculateHole_Sm
PreCondition: Offshore
High: <=6.5
Medium: <=7.875
Low: >7.875
Unit: in
Task: TubularDesign
"Description: Casing Design Factors for Burst, Collapse, & Tension (per hole section), DFb,c,t<=1.0 for High, DFb,c,t<=1.1 for Medium, DFb,c,t>1.1 for Low"
Short Name: Csg_DF
Data Name:
Calculation: =DF/Design Factor
Calculation Method: CalculateCsg_DF
High: <=1.0
Medium: <=1.1
Low: >1.1
Unit: unitless
Task: TubularDesign
Description: Casing string weight relative to rig lifting capabilities (per casing string)
Short Name: Csg_Wt
Data Name:
Calculation: =CasingWeight/RigMinRating
Calculation Method: CalculateCsg_Wt
High: >=0.95
Medium: <0.95
Low: <0.8

Unit: Ratio
Task: TubularDesign
Description: Casing string allowable Margin of Overpull (per casing string)
Short Name: Csg_MOP
Data Name:
Calculation: =Tubular Tension rating-CasingWeight
Calculation Method: CalculateCsg_MOP
High: <=50
Medium: <=100
Low: >100
Unit: klbs
Task: WellboreSizes
Description: Clearance between hole size and casing max OD (per hole section)
Short Name: Hole_Csg
Data Name:
Calculation: =Area of hole size Area of casing size (max OD)
Calculation Method: CalculateHole_Csg
High: <=1.1
Medium: <=1.25
Low: >1.25
Unit: Ratio
Task: WellboreSizes
Description:
Short Name: Csg_Csg
DataName:
Calculation: =CainsgID/NextMaxCasingSize
Calculation Method: CalculateCsg_Csg
High: <=1.05
Medium: <=1.1
Low: >1.1
Unit: Ratio
Task: WellboreSizes
Description: Clearance between casing inside diameter and subsequent bit size (per bit run)
Short Name: Csg_Bit
Data Name:
Calculation: =CainsgID/NextBit Size
Calculation Method: CalculateCsg_Bit
High: <=1.05
Medium: <=1.1
Low: >1.1
Unit: Ratio
Task: CementDesign
Description: Cement height relative to design guidelines for each string type (per hole section)
Short Name: TOC_Low
Data Name:
Calculation: =CasingBottomDepth—TopDepthOfCement
Calculation Method: CalculateTOC_Low
High: <=0.75
Medium: <=1.0
Low: >1.0
Unit: Ratio
Task: CementDesign
Description: Kick potential where Hydrostatic Pressure is too low relative to Pore Pressure (per depth)
Short Name: Cmt_Kick
Data Name:
Calculation: =(Cementing Hydrostatic Pressure—Pore Pressure)/TVD
Calculation Method: CalculateCmt_Kick
High: <=0.3
Medium: <=0.5
Low: >0.5

Unit: ppg
Task: CementDesign
Description: Loss potential where Hydrostatic Pressure is too high relative to Pore Pressure (per depth)
Short Name: Cmt_Loss
Data Name:
Calculation: =Cementing Hydrostatic Pressure—Pore Pressure
Calculation Method: CalculateCmt_Loss
High: >=2500
Medium: >=2000
Low: <2000
Unit: psi
Task: CementDesign
Description: Loss potential where Hydrostatic Pressure is too high relative to Fracture Gradient (per depth)
Short Name: Cmt_Frac
Data Name:
Calculation: =(UpperBound—Cementing Hydrostatic Pressure)/TVD
Calculation Method: CalculateCmt_Frac
High: <=0.2
Medium: <=0.5
Low: >0.5
Unit: ppg
Task: BitsSelection
Description: Excess bit work as a ratio to the Cumulative Mechanical drilling energy (UCS integrated over distance drilled by the bit)
Short Name: Bit_WkXS
Data Name: CumExcessCumulative UCSRatio
Calculation: =CumExcess/Cumulative UCS
Calculation Method: CalculateBitSectionRisk
High: >=0.2
Medium: >=0.1
Low: <0.1
Unit: Ratio
Task: BitsSelection
Description: Cumulative bit work as a ratio to the bit catalog average Mechanical drilling energy (UCS integrated over distance drilled by the bit)
Short Name: Bit_Wk
Data Name:
Calculation: =Cumulative UCS/ Mechanical drilling energy (UCS integrated over distance drilled by the bit)
Calculation Method: CalculateBit_Wk
High: >=1.5
Medium: >=1.25
Low: <1.25
Unit: Ratio
Task: BitsSelection
Description: Cumulative bit footage as a ratio to the bit catalog average footage (drilled length) (per depth)
Short Name: Bit_Ftg
Data Name: Ratio of footage drilled compared to statistical footage
Calculation: =Ratio of footage drilled compared to statistical footage
Calculation Method: CalculateBitSectionRisk
High: >=2
Medium: >=1.5
Low: <1.5
Unit: Ratio
Task: BitsSelection
Description: Cumulative bit hours as a ratio to the bit catalog average hours (on bottom rotating time) (per depth)
Short Name: Bit_Hrs
Data Name: Bit_Ftg
Calculation: =On Bottom Hours/Statistical Bit Hours
Calculation Method: CalculateBit_Hrs
High: >=2
Medium: >=1.5
Low: <1.5
Unit: Ratio
Task: BitsSelection
Description: Cumulative bit Krevs as a ratio to the bit catalog average Krevs (RPM*hours) (per depth)
Short Name: Bit_Krev
Data Name:
Calculation: =Cumulative Krevs, Bit average Krevs
Calculation Method: CalculateBit_Krev
High: >=2
Medium: >=1.5
Low: <1.5
Unit: Ratio
Task: BitsSelection
Description: Bit ROP as a ratio to the bit catalog average ROP (per bit run)
Short Name: Bit_ROP
Data Name:
Calculation: =ROP/Statistical Bit ROP
Calculation Method: CalculateBit_ROP
High: >=1.5
Medium: >=1.25
Low: <1.25
Unit: Ratio
Task: BitsSelection
Description: UCS relative to Bit UCS and Max Bit UCS (per depth)
Short Name: Bit_UCS
Data Name:
Calculation: =UCS
Calculation Method: CalculateBit_UCS
High: UCS>=Max Bit UCS>=Bit UCS
Medium: Max Bit UCS>=UCS>=Bit UCS
Low: Max Bit UCS>=Bit UCS>=UCS
Unit: Ratio
Task: DrillstringDesign
Description: Drillstring allowable Margin of Overpull (per bit run)
Short Name: DS_MOP
Data Name:
Calculation: =MOP
Calculation Method: CalculateDS_MOP
High: <=50
Medium: <=100
Low: >100
Unit: klbs
Task: DrillstringDesign
"Description: Potential parting of the drillstrings where required tension approaches mechanical tension limits of drill pipe, heavy weight, drill pipe, drill collars, or connections (per bit run)"
Short Name: DS_Part
Data Name:
Calculation: =Required Tension (including MOP)/Tension limit of drilling component (DP)
Calculation Method: CalculateDS_Part
High: >=0.9
Medium: >=0.8
Low: >0.8
Unit: ratio
Task: DrillstringDesign
Description: Kick Tolerance (per hole section)

Short Name: Kick_Tol
Data Name: Bit_UCS
"Calculation: NA (already calculated), Exploration/Development"
Calculation Method: CalculateKick_Tol
PreCondition: Exporation
High: <=50
Medium: <=100
Low: >100
Unit: bbl
Task: DrillstringDesign
Description: Kick Tolerance (per hole section)
Short Name: Kick_Tol
DataName: Bit_UCS
"Calculation: NA (already calculated), Exploration/Development"
Calculation Method: CalculateKick_Tol
PreCondition: Development
High: <=25
Medium: <=50
Low: >50
Unit: bbl
Task: Hydraulics
Description: Flow rate for hole cleaning (per depth)
Short Name: Q_Crit
"Data Name: Flow Rate, Critical Flow Rate"
Calculation: =Flow Rate/Critical Flow Rate
Calculation Method: CalculateQ_Crit
High: <=1.0
Medium: <=1.1
Low: >1.1
Unit: Ratio
Task: Hydraulics
Description: Flow rate relative to pump capabilities(per depth)
Short Name: Q_Max
Data Name: Bit_UCS
Calculation: =Q/Qmax
Calculation Method: CalculateQ_Max
High: >=1.0
Medium: >=0.9
Low: <0.9
Unit: Ratio
Task: Hydraulics
"Description: TFA size relative to minimum TFA (per bit run), 0.2301=3 of 10/32 inch, 0.3313=3 of 12/32 inch"
Short Name: TFA_Low
Data Name: Bit_UCS
Calculation: TFA
Calculation Method: CalculateTFA_Low
High: <=0.2301
Medium: <=0.3313
Low: >0.3313
Unit: inch
Task: Hydraulics
Description: Circulating pressure relative to rig and pump maximum pressure (per depth)
Short Name: P_Max
Data Name: Bit_UCS
Calculation: P_Max
Calculation Method: CalculateP_Max
High: >=1.0
Medium: >=0.9
Low: <0.9
Unit: Ratio
Task: Hydraulics Description: Loss potential where ECD is too high relative to Fracture Gradient (per depth)
Short Name: ECD_Frac
Data Name: Bit_UCS
Calculation: UpperBound-ECD
Calculation Method: CalculateECD_Frac
High: <=0.0
Medium: <=0.2
Low: >0.2
Unit: ppg
Task: Hydraulics
Description: Loss potential where ECD is too high relative to Pore Pressure (per depth)
Short Name: ECD_Loss
Data Name: Bit_UCS
Calculation: =ECD−Pore Pressure
Calculation Method: CalculateECD_Loss
"PreCondition: Mud Type (HP-WBM, ND-WBM, D-WBM)"
High: >=2500
Medium: >=2000
Low: <2000
Unit: psi
Task: Hydraulics
Description: Loss potential where ECD is too high relative to Pore Pressure (per depth)
Short Name: ECD_Loss
Data Name: Bit_UCS
Calculation: =ECD−Pore Pressure
Calculation Method: CalculateECD_Loss
"PreCondition: Mud Type (OBM, MOBM, SOBM)"
High: >=2000
Medium: >=1500
Low: <1500
Unit: psi Risk Assessment Algorithms 24

Recall that the 'Risk Assessment Logical Expressions' 22 will: (1) receive the 'Input Data 20a' including a 'plurality of Input Data calculation results' that has been generated by the 'Input Data 20a'; (2) determine whether each of the 'plurality of Input Data calculation results' represent a high risk, a medium risk, or a low risk; and (3) generate a plurality of Risk Values/plurality of Individual Risks in response thereto, where each of the plurality of Risk Values/plurality of Individual Risks represents a 'an Input Data calculation result' that has been 'ranked' as either a 'high risk', a 'medium risk', or a 'low risk'. For example, recall the following task:

Task: Hydraulics
Description: Loss potential where ECD is too high relative to Pore Pressure (per depth)
Short Name: ECD_Loss
Data Name: Bit_UCS
Calculation: =ECD−Pore Pressure
Calculation Method: CalculateECD_Loss
"PreCondition: Mud Type (OBM, MOBM, SOBM)"
High: >=2000
Medium: >=1500
Low: <1500
Unit: psi When the Calculation 'ECD−Pore Pressure' associated with the above referenced Hydraulics task is >=2000, a 'high' rank is assigned to that calculation; but if the Calculation 'ECD−Pore Pressure' is >=1500, a 'medium' rank is assigned to that calculation, but if the Calculation 'ECD−Pore Pressure' is <1500, a 'low' rank is assigned to that calculation.

Therefore, the 'Risk Assessment Logical Expressions' 22 will rank each of the 'Input Data calculation results' as either a 'high risk' or a 'medium risk' or a 'low risk' thereby generating a 'plurality of ranked Risk Values', also known as a 'plurality of ranked Individual Risks'. In response to the 'plurality of ranked Individual Risks' received from the Logical Expressions 22, the 'Risk Assessment Logical Algorithms' 24 will then assign a 'value' and a 'color' to each of the plurality of ranked Individual Risks received from the Logical Expressions 22, where the 'value' and the 'color' depends upon the particular ranking (i.e., the 'high risk' rank, or the 'medium risk' rank, or the 'low risk' rank) that is associated with each of the plurality of ranked Individual Risks. The 'value' and the 'color' is assigned, by the 'Risk Assessment Algorithms' 24, to each of the plurality of Individual Risks received from the Logical Expressions 22 in the following manner:

Risk Calculation #1—Individual Risk Calculation:

Referring to the 'Risk Assessment Output Data' 18*b*1 set forth above, there are fifty-four (54) 'Individual Risks' currently specified. For an 'Individual Risk':

a High risk=90,
a Medium risk=70, and
a Low risk=10
High risk color code=Red
Medium risk color code=Yellow
Low risk color code=Green If the 'Risk Assessment Logical Expressions' 22 assigns a 'high risk' rank to a particular 'Input Data calculation result', the 'Risk Assessment Algorithms' 24 will then assign a value '90' to that 'Input Data calculation result' and a color 'red' to that 'Input Data calculation result'.

If the 'Risk Assessment Logical Expressions' 22 assigns a 'medium risk' rank to a particular 'Input Data calculation result', the 'Risk Assessment Algorithms' 24 will then assign a value '70' to that 'Input Data calculation result' and a color 'yellow' to that 'Input Data calculation result'.

If the 'Risk Assessment Logical Expressions' 22 assigns a 'low risk' rank to a particular 'Input Data calculation result', the 'Risk Assessment Algorithms' 24 will then assign a value '10' to that 'Input Data calculation result' and a color 'green' to that 'Input Data calculation result'.

Therefore, in response to the 'Ranked Individual Risks' from the Logical Expressions 22, the Risk Assessment Algorithms 24 will assign to each of the 'Ranked Individual Risks' a value of 90 and a color 'red' for a high risk, a value of 70 and a color 'yellow' for the medium risk, and a value of 10 and a color 'green' for the low risk. However, in addition, in response to the 'Ranked Individual Risks' from the Logical Expressions 22, the Risk Assessment Algorithms 24 will also generate a plurality of ranked 'Risk Categories' and a plurality of ranked 'Subcategory Risks'

Referring to the 'Risk Assessment Output Data' 18*b*1 set forth above, the 'Risk Assessment Output Data' 18*b*1 includes: (1) eight 'Risk Categories', (2) four 'Subcategory Risks', and (3) fifty-four (54) 'Individual Risks' [that is, 54 individual risks plus 2 'gains' plus 2 'losses' plus 2 'stuck' plus 2 'mechanical' plus 1 'total'=63 risks].

The eight 'Risk Categories' include the following: (1) an Individual Risk, (2) an Average Individual Risk, (3) a Risk Subcategory (or Subcategory Risk), (4) an Average Subcategory Risk, (5) a Risk Total (or Total Risk), (6) an Average Total Risk, (7) a potential Risk for each design task, and (8) an Actual Risk for each design task.

Recalling that the 'Risk Assessment Algorithms' 24 have already established and generated the above referenced 'Risk Category (1)' [i.e., the plurality of ranked Individual Risks'] by assigning a value of 90 and a color 'red' to a high risk 'Input Data calculation result', a value of 70 and a color 'yellow' to a medium risk 'Input Data calculation result', and a value of 10 and a color 'green' to a low risk 'Input Data calculation result', the 'Risk Assessment Algorithms' 24 will now calculate and establish and generate the above referenced 'Risk Categories (2) through (8)' in response to the plurality of Risk Values/plurality of Individual Risks received from the 'Risk Assessment Logical Expressions' 22 in the following manner:

Risk Calculation #2—Average Individual Risk:

The average of all of the 'Risk Values' is calculated as follows:

$$\text{Average individual risk} = \frac{\sum_{i}^{n} Riskvalue_i}{n}$$

In order to determine the 'Average Individual Risk', sum the above referenced 'Risk Values' and then divide by the number of such 'Risk Values', where i=number of sample points. The value for the 'Average Individual Risk' is displayed at the bottom of the colored individual risk track.

Risk Calculation #3—Risk Subcategory

Referring to the 'Risk Assessment Output Data' 18*b*1 set forth above, the following 'Subcategory Risks' are defined: (a) gains, (b) losses, (c) stuck and (d) mechanical, where a 'Subcategory Risk' (or 'Risk Subcategory') is defined as follows:

$$\text{Risk Subcategory} = \frac{\sum_{j}^{n} (Riskvalue_j \times severity_j \times N_j)}{\sum_{j} (severity_j \times N_j)}$$

j=number of individual risks,
$0 \leq Severity \leq 5$, and
$N_j$=either 1 or 0 depending on whether the Risk Value$_j$ contributes to the sub category
Severity$_j$=from the risk matrix catalog.
Red risk display for Risk Subcategory$\geq 40$
Yellow risk display for $20 \leq$ Risk Subcategory $\leq 40$
Green risk display for Risk Subcategory<20

Risk Calculation #4—Average Subcategory risk:

$$\text{Average subcategory risk} = \frac{\sum_{i}^{n} (\text{Risk } Subcategory_i \times \text{risk } multiplier_i)}{\sum_{1}^{n} \text{risk } multiplier_i}$$

n=number of sample points.

The value for the average subcategory risk is displayed at the bottom of the colored subcategory risk track.

Risk Multiplier=3 for Risk Subcategory>40,
Risk Multiplier=2 for $20 \leq$ Risk Subcategory<40
Risk Multiplier=1 for Risk Subcategory<20

Risk Calculation #5—Total Risk

The total risk calculation is based on the following categories: (a) gains, (b) losses, (c) stuck, and (d) mechanical.

$$\text{Risk Total} = \frac{\sum_{1}^{4} \text{Risk subcategory}_k}{4}$$

where k=number of subcategories
Red risk display for Risk total≦40
Yellow risk display for 20≦Risk Total<40
Green risk display for Risk Total<20

Risk Calculation #6—Average Total Risk $$\text{Average total risk} = \frac{\sum_{i}^{n}(\text{Risk Subcategory}_i \times \text{risk multiplier}_i)}{\sum_{1}^{n} \text{risk multiplier}_i}$$

n=number of sample points.
Risk Multiplier=3 for Risk Subcategory≧40,
Risk Multiplier=2 for 20≦Risk Subcategory<40
Risk Multiplier=1 for Risk Subcategory<20

The value for the average total risk is displayed at the bottom of the colored total risk track.

Risk calculation #7—Risks per design task:

The following 14 design tasks have been defined: Scenario, Trajectory, Mechanical Earth Model, Rig, Wellbore stability, Mud weight and casing points, Wellbore Sizes, Casing, Cement, Mud, Bit, Drillstring, Hydraulics, and Time design. There are currently 54 individual risks specified.

Risk calculation #7A—Potential maximum risk per design task $$\text{Potential Risk}_k = \frac{\sum_{j=1}^{55}(90 \times \text{Severity}_{k,j} \times N_{k,j})}{\sum_{j=1}^{55}(\text{Severity}_{k,j} \times N_{k,j})}$$

k=index of design tasks, there are 14 design tasks,
$N_j$=either 0 or 1 depending on whether the Risk Value$_j$ contributes to the design task.
0≦Severity≦5

Risk calculation #7B—Actual risk per design task $$\text{Actual Risk}_k = \frac{\sum_{j=1}^{55}(\text{Average Individual Risk}_j \times \text{Severity}_{,j} \times N_{k,j})}{\sum_{j=1}^{55}(\text{Severity}_{,j} \times N_{k,j})}$$

k=index of design tasks, there are 14 design tasks
$N_{k,j} \in [0, \ldots, M]$
0≦Severity$_j$≦5

The 'Severity' in the above equations are defined as follows:

| Risk | Severity |
| --- | --- |
| H2S_CO2 | 2.67 |
| Hydrates | 3.33 |
| Well_WD | 3.67 |
| DLS | 3 |
| TORT | 3 |
| Well_MD | 4.33 |
| INC | 3 |
| Hor_Disp | 4.67 |
| DDI | 4.33 |
| PP_High | 4.33 |
| PP_Low | 2.67 |
| RockHard | 2 |
| RockSoft | 1.33 |
| TempHigh | 3 |
| Rig_WD | 5 |
| Rig_MD | 5 |
| SS_BOP | 3.67 |
| MW_Kick | 4 |
| MW_Loss | 3 |
| MW_Frac | 3.33 |
| MWW | 3.33 |
| WBS | 3 |
| WBSW | 3.33 |
| HSLength | 3 |
| Hole_Big | 2 |
| Hole_Sm | 2.67 |
| Hole_Csg | 2.67 |
| Csg_Csg | 2.33 |
| Csg_Bit | 1.67 |
| Csg_DF | 4 |
| Csg_Wt | 3 |
| Csg_MOP | 2.67 |
| Csg_Wear | 1.33 |
| Csg_Count | 4.33 |
| TOC_Low | 1.67 |
| Cmt_Kick | 3.33 |
| Cmt_Loss | 2.33 |
| Cmt_Frac | 3.33 |
| Bit_Wk | 2.33 |
| Bit_WkXS | 2.33 |
| Bit_Ftg | 2.33 |
| Bit_Hrs | 2 |
| Bit_Krev | 2 |
| Bit_ROP | 2 |
| Bit_UCS | 3 |
| DS_MOP | 3.67 |
| DS_Part | 3 |
| Kick_Tol | 4.33 |
| Q_Crit | 2.67 |
| Q_Max | 3.33 |
| Cutting | 3.33 |
| P_Max | 4 |
| TFA_Low | 1.33 |
| ECD_Frac | 4 |
| ECD_Loss | 3.33 |

Figure 11:
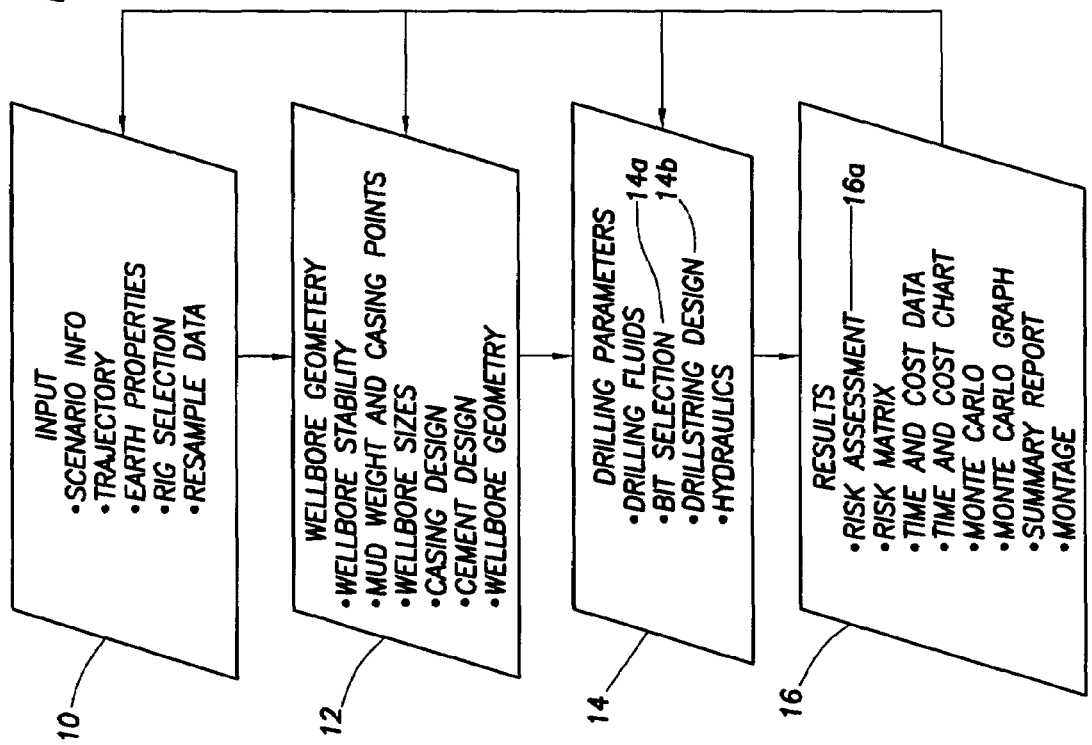
FIG. 11 illustrates a block diagram representing a construction of the Automatic Well Planning Risk Assessment software of FIG. 10 which is stored in the Computer System of FIG. 9A.

Refer now to FIG. 11 which will be used during the following functional description.

A functional description of the operation of the 'Automatic Well Planning Risk Assessment Software' 18c1 will be set forth in the following paragraphs with reference to FIGS. 1 through 11 of the drawings.

The Input Data 20a shown in FIG. 9A will be introduced as 'input data' to the Computer System 18 of FIG. 9A. The Processor 18a will execute the Automatic Well Planning Risk Assessment Software 18c1, while using the Input Data 20a, and, responsive thereto, the Processor 18a will generate the Risk Assessment Output Data 18b1, the Risk Assessment Output Data 18b1 being recorded or displayed on the Recorder or Display Device 18b in the manner illustrated in FIG. 9B. The Risk Assessment Output Data 18b1 includes the 'Risk Categories', the 'Subcategory Risks', and the 'Individual Risks'. When the Automatic Well Planning Risk Assessment Software 18c1 is executed by the Processor 18a of FIG. 9A, referring to FIGS. 10 and 11, the Input Data 20a (and the Risk Assessment Constants 26 and the Risk Assessment Catalogs 28) are collectively provided as 'input data' to the Risk Assessment Logical Expressions 22. Recall that the Input Data 20a includes a 'plurality of Input Data Calculation results'. As a result, as denoted by element numeral 32 in FIG. 11, the 'plurality of Input Data Calculation results' associated with the Input Data 20a will be provided directly to the Logical Expressions block 22 in FIG. 11. During that execution of the Logical Expressions 22 by the Processor 18a, each of the 'plurality of Input Data Calculation results' from the Input Data 20a will be compared with each of the 'logical expressions' in the Risk Assessment Logical Expressions block 22 in FIG. 11. When a match is found between an 'Input Data Calculation result' from the Input Data 20a and an 'expression' in the Logical Expressions block 22, a 'Risk Value' or 'Individual Risk' 34 will be generated (by the Processor 18a) from the Logical Expressions block 22 in FIG. 11. As a result, since a 'plurality of Input Data Calculation results' 32 from the Input Data 20a have been compared with a 'plurality of expressions' in the Logical Expressions' block 22 in FIG. 11, the Logical Expressions block 22 will generate a plurality of Risk Values/plurality of Individual Risks 34 in FIG. 11, where each of the plurality of Risk Values/plurality of Individual Risks on line 34 in FIG. 11 that are generated by the Logical Expressions block 22 will represent an 'Input Data Calculation result' from the Input Data 20a that has been ranked as either a 'High Risk', or a 'Medium Risk', or a 'Low Risk' by the Logical Expressions block 22. Therefore, a 'Risk Value' or 'Individual Risk' is defined as an 'Input Data Calculation result' from the Input Data 20a that has been matched with one of the 'expressions' in the Logical Expressions 22 and ranked, by the Logical Expressions block 22, as either a 'High Risk', or a 'Medium Risk', or a 'Low Risk'. For example, consider the following 'expression' in the Logical Expressions' 22:

Task: MudWindow
Description: Hole section length (per hole section)
Short Name: HSLength
Data Name:
Calculation: =HoleEnd−HoleStart
Calculation Method: CalculateHSLength
High: >=8000
Medium: >=7001
Low: <7001

The 'Hole End−HoleStart' calculation is an 'Input Data Calculation result' from the Input Data 20a. The Processor 18a will find a match between the 'Hole End−HoleStart Input Data Calculation result' originating from the Input Data 20a and the above identified 'expression' in the Logical Expressions 22. As a result, the Logical Expressions block 22 will 'rank' the 'Hole End−HoleStart Input Data Calculation result' as either a 'High Risk', or a 'Medium Risk', or a 'Low Risk' depending upon the value of the 'Hole End−HoleStart Input Data Calculation result'.

When the 'Risk Assessment Logical Expressions' 22 ranks the 'Input Data calculation result' as either a 'high risk' or a 'medium risk' or a 'low risk' thereby generating a plurality of ranked Risk Values/plurality of ranked Individual Risks, the 'Risk Assessment Logical Algorithms' 24 will then assign a 'value' and a 'color' to that ranked 'Risk Value' or ranked 'Individual Risk', where the 'value' and the 'color' depends upon the particular ranking (i.e., the 'high risk' rank, or the 'medium risk' rank, or the 'low risk' rank) that is associated with that 'Risk Value' or 'Individual Risk'. The 'value' and the 'color' is assigned, by the 'Risk Assessment Logical Algorithms' 24, to the ranked 'Risk Values' or ranked 'Individual Risks' in the following manner:

a High risk=90,
a Medium risk=70, and
a Low risk=10
High risk color code=Red
Medium risk color code=Yellow
Low risk color code=Green If the 'Risk Assessment Logical Expressions' 22 assigns a 'high risk' rank to the 'Input Data calculation result' thereby generating a ranked 'Individual Risk', the 'Risk Assessment Logical Algorithms' 24 assigns a value '90' to that ranked 'Risk Value' or ranked 'Individual Risk' and a color 'red' to that ranked 'Risk Value' or that ranked 'Individual Risk'. If the 'Risk Assessment Logical Expressions' 22 assigns a 'medium risk' rank to the 'Input Data calculation result' thereby generating a ranked 'Individual Risk', the 'Risk Assessment Logical Algorithms' 24 assigns a value '70' to that ranked 'Risk Value' or ranked 'Individual Risk' and a color 'yellow' to that ranked 'Risk Value' or that ranked 'Individual Risk'. If the 'Risk Assessment Logical Expressions' 22 assigns a 'low risk' rank to the 'Input Data calculation result' thereby generating a ranked 'Individual Risk', the 'Risk Assessment Logical Algorithms' 24 assigns a value '10' to that ranked 'Risk Value' or ranked 'Individual Risk' and a color 'green' to that ranked 'Risk Value' or that ranked 'Individual Risk'.

Therefore, in FIG. 11, a plurality of ranked Individual Risks (or ranked Risk Values) is generated, along line 34, by the Logical Expressions block 22, the plurality of ranked Individual Risks (which forms a part of the 'Risk Assessment Output Data' 18b1) being provided directly to the 'Risk Assessment Algorithms' block 24. The 'Risk Assessment Algorithms' block 24 will receive the plurality of ranked Individual Risks' from line 34 and, responsive thereto, the 'Risk Assessment Algorithms' 24 will: (1) generate the 'Ranked Individual Risks' including the 'values' and 'colors' associated therewith in the manner described above, and, in addition, (2) calculate and generate the 'Ranked Risk Categories' 40 and the 'Ranked Subcategory Risks' 40 associated with the 'Risk Assessment Output Data' 18b1. The 'Ranked Risk Categories' 40 and the 'Ranked Subcategory Risks' 40 and the 'Ranked Individual Risks' 40 can now be recorded or displayed on the Recorder or Display device 18b. Recall that the 'Ranked Risk Categories' 40 include: an Average Individual Risk, an Average Subcategory Risk, a Risk Total (or Total Risk), an Average Total Risk, a potential Risk for each design task, and an Actual Risk for each design task. Recall that the 'Ranked Subcategory Risks' 40 include: a Risk Subcategory (or Subcategory Risk).

As a result, recalling that the 'Risk Assessment Output Data' 18b1 includes 'one or more Risk Categories' and 'one or more Subcategory Risks' and 'one or more Individual Risks', the 'Risk Assessment Output Data' 18b1, which includes the Risk Categories 40 and the Subcategory Risks 40 and the Individual Risks 40, can now be recorded or displayed on the Recorder or Display Device 18b of the Computer System 18 shown in FIG. 9A.

As noted earlier, the 'Risk Assessment Algorithms' 24 will receive the 'Ranked Individual Risks' from the Logical Expressions 22 along line 34 in FIG. 11; and, responsive thereto, the 'Risk Assessment Algorithms' 24 will (1) assign the 'values' and the 'colors' to the 'Ranked Individual Risks' in the manner described above, and, in addition, (2) calculate and generate the 'one or more Risk Categories' 40 and the 'one or more Subcategory Risks' 40 by using the following equations (set forth above).

The average Individual Risk is calculated from the 'Risk Values' as follows:

$$\text{Average individual risk} = \frac{\sum_{i}^{n} Riskvalue_i}{n}$$

The Subcategory Risk, or Risk Subcategory, is calculated from the 'Risk Values' and the 'Severity', as defined above, as follows:

$$\text{Risk Subcategory} = \frac{\sum_{j}^{n} (Riskvalue_j \times severity_j \times N_j)}{\sum_{j} (severity_j \times N_j)}$$

The Average Subcategory Risk is calculated from the Risk Subcategory in the following manner, as follows:

$$\text{Average subcategory risk} = \frac{\sum_{i}^{n} (Risk\ Subcategory_i \times risk\ multiplier_i)}{\sum_{1}^{n} risk\ multiplier_i}$$

The Risk Total is calculated from the Risk Subcategory in the following manner, as follows:

$$\text{Risk Total} = \frac{\sum_{1}^{4} Risk\ subcategory_k}{4}$$

The Average Total Risk is calculated from the Risk Subcategory in the following manner, as follows:

$$\text{Average total risk} = \frac{\sum_{i}^{n} (Risk\ Subcategory_i \times risk\ multiplier_i)}{\sum_{i}^{n} risk\ multiplier_i}$$

The Potential Risk is calculated from the Severity, as defined above, as follow:

$$\text{Potential } Risk_k = \frac{\sum_{j=1}^{55} (90 \times Severity_{k,j} \times N_{k,j})}{\sum_{j=1}^{55} (Severity_{k,j} \times N_{k,j})}$$

The Actual Risk is calculated from the Average Individual Risk and the Severity (defined above) as follows:

$$\text{Actual } Risk_k = \frac{\sum_{j=1}^{55} (Average\ Individual\ Risk_j \times Severity_j \times N_{k,j})}{\sum_{j=1}^{55} (Severity_j \times N_{k,j})}$$

Recall that the Logical Expressions block 22 will generate a 'plurality of Risk Values/Ranked Individual Risks' along line 34 in FIG. 11, where each of the 'plurality of Risk Values/Ranked Individual Risks' generated along line 34 represents a received 'Input Data Calculation result' from the Input Data 20a that has been 'ranked' as either a 'High Risk', or a 'Medium Risk', or a 'Low Risk' by the Logical Expressions 22. A 'High Risk' will be assigned a 'Red' color, and a 'Medium Risk' will be assigned a 'Yellow' color, and a 'Low Risk' will be assigned a 'Green' color. Therefore, noting the word 'rank' in the following, the Logical Expressions block 22 will generate (along line 34 in FIG. 11) a 'plurality of ranked Risk Values/ranked Individual Risks'.

In addition, in FIG. 11, recall that the 'Risk Assessment Algorithms' block 24 will receive (from line 34) the 'plurality of ranked Risk Values/ranked Individual Risks' from the Logical Expressions block 22. In response thereto, noting the word 'rank' in the following, the 'Risk Assessment Algorithms' block 24 will generate: (1) the 'one or more Individual Risks having 'values' and 'colors' assigned thereto, (2) the 'one or more ranked Risk Categories' 40, and (3) the 'one or more ranked Subcategory Risks' 40. Since the 'Risk Categories' and the 'Subcategory Risks' are each 'ranked', a 'High Risk' (associated with a Risk Category 40 or a Subcategory Risk 40) will be assigned a 'Red' color, and a 'Medium Risk' will be assigned a 'Yellow' color, and a 'Low Risk' will be assigned a 'Green' color. In view of the above 'rankings' and the colors associated therewith, the 'Risk Assessment Output Data' 18b1, including the 'ranked' Risk Categories 40 and the 'ranked' Subcategory Risks 40 and the 'ranked' Individual Risks 38, will be recorded or displayed on the Recorder or Display Device 18b of the Computer System 18 shown in FIG. 9A in the manner illustrated in FIG. 9B.

Automatic Well Planning Software System—Bit Selection Sub-Task 14a

In FIG. 8, the Bit Selection sub-task 14a is illustrated.

The selection of Drill bits is a manual subjective process based heavily on personal, previous experiences. The experience of the individual recommending or selecting the drill bits can have a large impact on the drilling performance for the better or for the worse. The fact that bit selection is done primarily based on personal experiences and uses little information of the actual rock to be drilled makes it very easy to choose the incorrect bit for the application.

The Bit Selection sub-task 14a utilizes an 'Automatic Well Planning Bit Selection software' to automatically generate the required drill bits to drill the specified hole sizes through the specified hole section at unspecified intervals of earth. The 'Automatic Well Planning Bit Selection software' includes a piece of software (called an 'algorithm') that is adapted for automatically selecting the required sequence of drill bits to drill each hole section (defined by a top/bottom depth interval and diameter) in the well. It uses statistical processing of historical bit performance data and several specific Key Performance Indicators (KPI) to match the earth properties and rock strength data to the appropriate bit while optimizing the aggregate time and cost to drill each hole section. It determines the bit life and corresponding depths to pull and replace a bit based on proprietary algorithms, statistics, logic, and risk factors.

Figure 12:
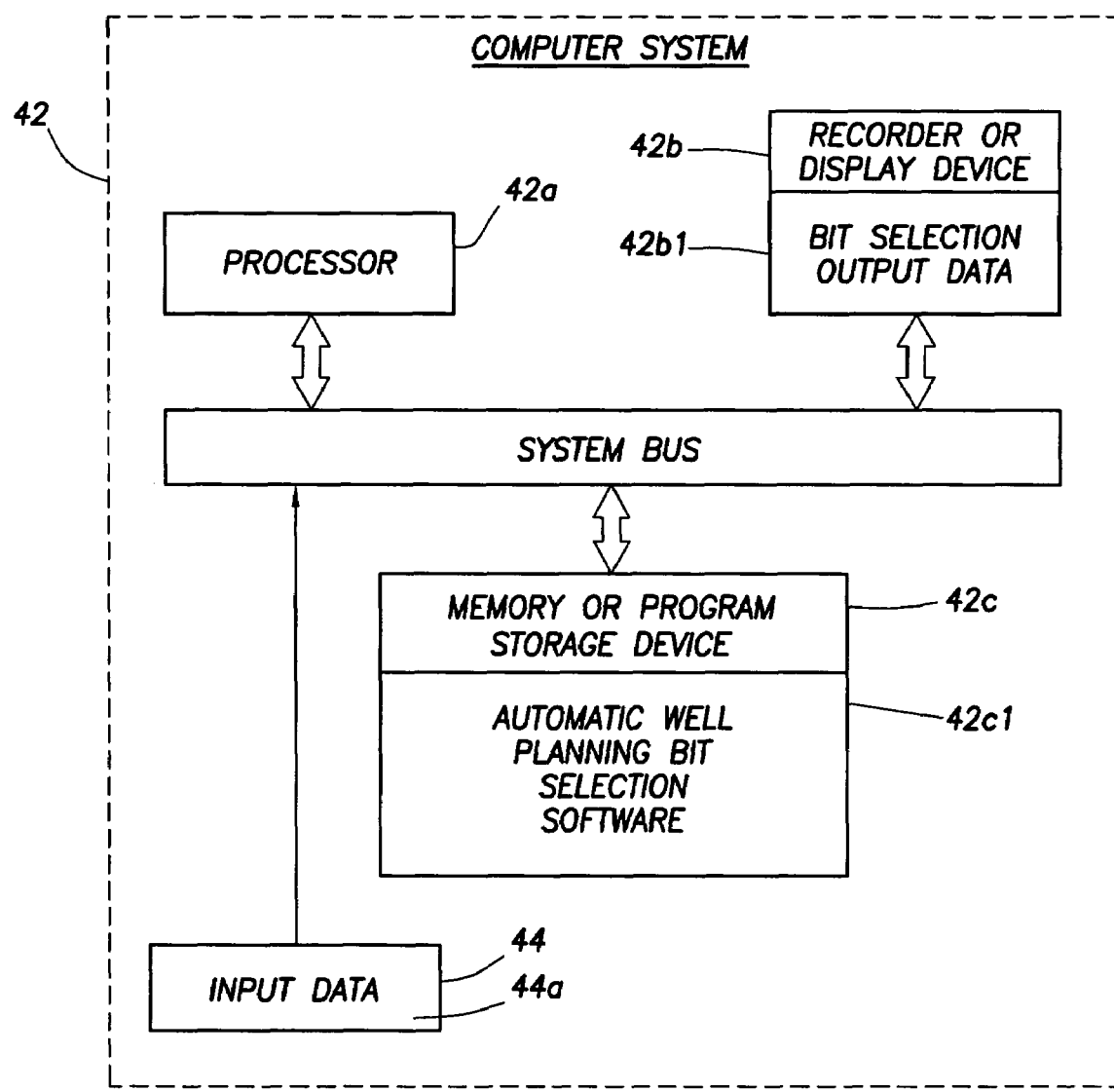
FIG. 12 illustrates a Computer System which stores an Automatic Well Planning Bit Selection software.

Referring to FIG. 12, a Computer System 42 is illustrated. The Computer System 42 includes a Processor 42a connected to a system bus, a Recorder or Display Device 42b connected to the system bus, and a Memory or Program Storage Device 42c connected to the system bus. The Recorder or Display Device 42b is adapted to display 'Bit Selection Output Data' 42b1. The Memory or Program Storage Device 42c is adapted to store an 'Automatic Well Planning Bit selection Software' 42c1. The 'Automatic Well Planning Bit selection Software' 42c1 is originally stored on another 'program storage device', such as a hard disk; however, the hard disk was inserted into the Computer System 42 and the 'Automatic Well Planning Bit selection Software' 42c1 was loaded from the hard disk into the Memory or Program Storage Device 42c of the Computer System 42 of FIG. 12. In addition, a Storage Medium 44 containing a plurality of 'Input Data' 44a is adapted to be connected to the system bus of the Computer System 42, the 'Input Data' 44a being accessible to the Processor 42a of the Computer System 42 when the Storage Medium 44 is connected to the system bus of the Computer System 42. In operation, the Processor 42a of the Computer System 42 will execute the Automatic Well Planning Bit selection Software 42c1 stored in the Memory or Program Storage Device 42c of the Computer System 42 while, simultaneously, using the 'Input Data' 44a stored in the Storage Medium 44 during that execution. When the Processor 42a completes the execution of the Automatic Well Planning Bit selection Software 42c1 stored in the Memory or Program Storage Device 42c (while using the 'Input Data' 44a), the Recorder or Display Device 42b will record or display the 'Bit selection Output Data' 42b1, as shown in FIG. 12. For example the 'Bit selection Output Data' 42b1 can be displayed on a display screen of the Computer System 42, or the 'Bit selection Output Data' 42b1 can be recorded on a printout which is generated by the Computer System 42. The 'Input Data' 44a and the 'Bit Selection Output Data' 42b1 will be discussed and specifically identified in the following paragraphs of this specification. The 'Automatic Well Planning Bit Selection software' 42c1 will also be discussed in the following paragraphs of this specification. The Computer System 42 of FIG. 12 may be a personal computer (PC). The Memory or Program Storage Device 42c is a computer readable medium or a program storage device which is readable by a machine, such as the processor 42a. The processor 42a may be, for example, a microprocessor, a microcontroller, or a mainframe or workstation processor. The Memory or Program Storage Device 42c, which stores the 'Automatic Well Planning Bit selection Software' 42c1, may be, for example, a hard disk, ROM, CD-ROM, DRAM, or other RAM, flash memory, magnetic storage, optical storage, registers, or other volatile and/or non-volatile memory.

Figure 13:
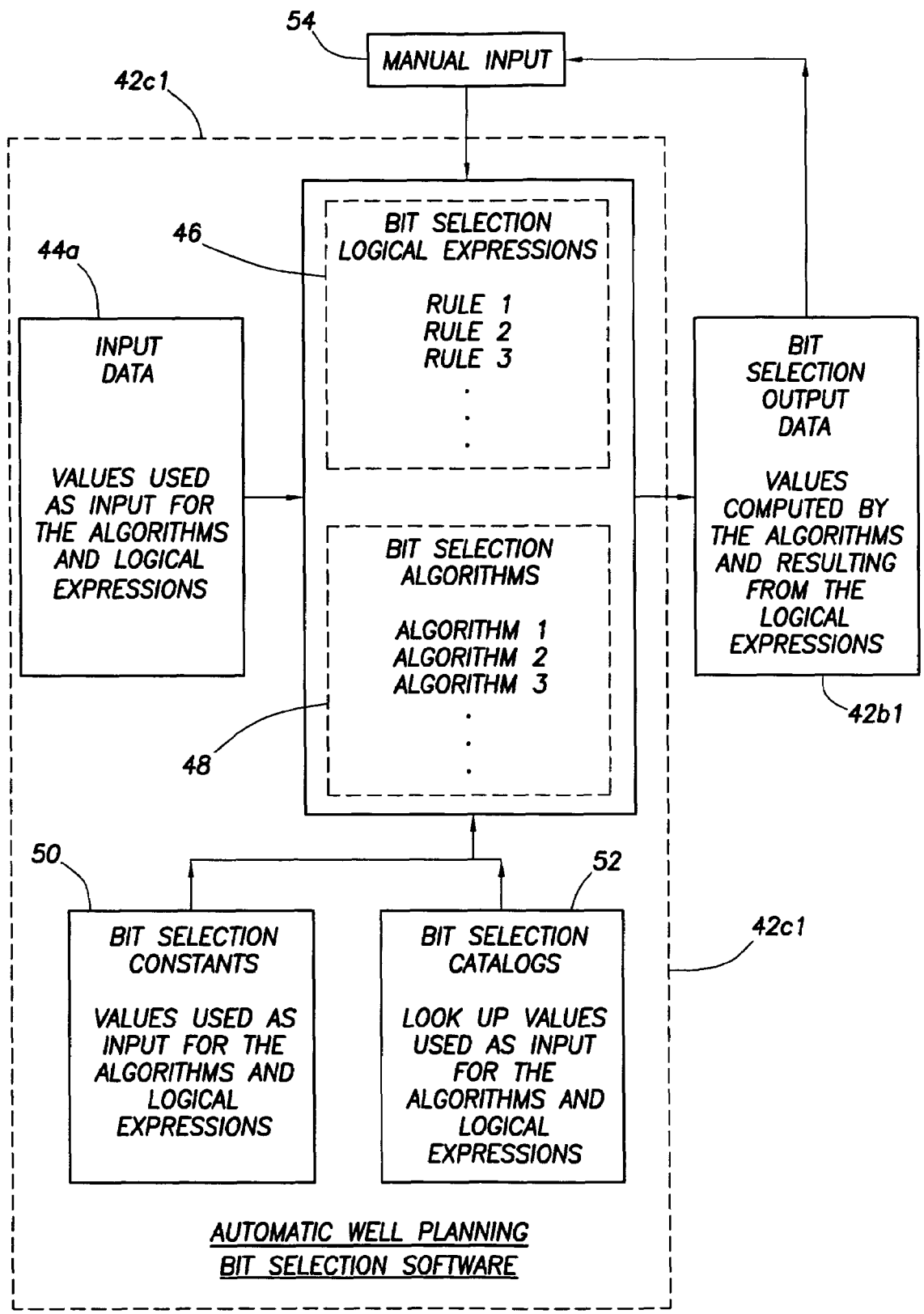
FIG. 13 illustrates a detailed construction of the Automatic Well Planning Bit Selection Software stored in the Computer System of FIG. 12.

Referring to FIG. 13, a detailed construction of the 'Automatic Well Planning Bit selection Software' 42c1 of FIG. 12 is illustrated. In FIG. 13, the 'Automatic Well Planning Bit selection Software' 42c1 includes a first block which stores the Input Data 44a, a second block 46 which stores a plurality of Bit selection Logical Expressions 46; a third block 48 which stores a plurality of Bit selection Algorithms 48, a fourth block 50 which stores a plurality of Bit selection Constants 50, and a fifth block 52 which stores a plurality of Bit selection Catalogs 52. The Bit selection Constants 50 include values which are used as input for the Bit selection Algorithms 48 and the Bit selection Logical Expressions 46. The Bit selection Catalogs 52 include look-up values which are used as input by the Bit selection Algorithms 48 and the Bit selection Logical Expressions 46. The 'Input Data' 44a includes values which are used as input for the Bit selection Algorithms 48 and the Bit selection Logical Expressions 46. The 'Bit selection Output Data' 42b1 includes values which are computed by the Bit selection Algorithms 48 and which result from the Bit selection Logical Expressions 46. In operation, referring to FIGS. 12 and 13, the Processor 42a of the Computer System 42 of FIG. 12 executes the Automatic Well Planning Bit selection Software 42c1 by executing the Bit selection Logical Expressions 46 and the Bit selection Algorithms 48 of the Bit selection Software 42c1 while, simultaneously, using the 'Input Data' 44a, the Bit selection Constants 50, and the values stored in the Bit selection Catalogs 52 as 'input data' for the Bit selection Logical Expressions 46 and the Bit selection Algorithms 48 during that execution. When that execution by the Processor 42a of the Bit selection Logical Expressions 46 and the Bit selection Algorithms 48 (while using the 'Input Data' 44a, Constants 50, and Catalogs 52) is completed, the 'Bit selection Output Data' 42b1 will be generated as a 'result'. The 'Bit selection Output Data' 42b1 is recorded or displayed on the Recorder or Display Device 42b of the Computer System 42 of FIG. 12. In addition, that 'Bit selection Output Data' 42b1 can be manually input, by an operator, to the Bit selection Logical Expressions block 46 and the Bit selection Algorithms block 48 via a 'Manual Input' block 54 shown in FIG. 13.

Input Data 44a

The following paragraphs will set forth the 'Input Data' 44a which is used by the 'Bit Selection Logical Expressions' 46 and the 'Bit Selection Algorithms' 48. Values of the Input Data 44a that are used as input for the Bit Selection Algorithms 48 and the Bit Selection Logical Expressions 46 include the following:
Measured Depth
Unconfined Compressive Strength
Casing Point Depth
Hole Size
Conductor
Casing Type Name
Casing Point
Day Rate Rig
Spread Rate Rig
Hole Section Name Bit Selection Constants 50

The 'Bit Selection Constants' 50 are used by the 'Bit selection Logical Expressions' 46 and the 'Bit selection Algorithms' 48. The values of the 'Bit Selection Constants 50 that are used as input data for Bit selection Algorithms 48 and the Bit selection Logical Expressions 46 include the following:
Trip Speed Bit Selection Catalogs 52

The 'Bit selection Catalogs' 52 are used by the 'Bit selection Logical Expressions' 46 and the 'Bit selection Algorithms' 48. The values of the Catalogs 52 that are used as input data for Bit selection Algorithms 48 and the Bit selection Logical Expressions 46 include the following: Bit Catalog Bit Selection Output Data 42b1

The 'Bit selection Output Data' 42b1 is generated by the 'Bit selection Algorithms' 48. The 'Bit selection Output Data' 42b1, that is generated by the 'Bit selection Algorithms' 48, includes the following types of output data:
Measured Depth
Cumulative Unconfined Compressive Strength (UCS)
Cumulative Excess UCS
Bit Size
Bit Type
Start Depth
End Depth
Hole Section Begin Depth
Average UCS of rock in section
Maximum UCS of bit
BitAverage UCS of rock in section
Footage
Statistical Drilled Footage for the bit
Ratio of footage drilled compared to statistical footage
Statistical Bit Hours
On Bottom Hours
Rate of Penetration (ROP)
Statistical Bit Rate of Penetration (ROP)

Mechanical drilling energy (UCS integrated over distance drilled by the bit)
Weight On Bit
Revolutions per Minute (RPM)
Statistical Bit RPM
Calculated Total Bit Revolutions
Time to Trip
Cumulative Excess as a ration to the Cumulative UCS
Bit Cost
Hole Section Name Bit Selection Logical Expressions 46

The following paragraphs will set forth the 'Bit selection Logical Expressions' 46. The 'Bit selection Logical Expressions' 46 will: (1) receive the 'Input Data 44a', including a 'plurality of Input Data calculation results' that has been generated by the 'Input Data 44a'; and (2) evaluate the 'Input Data calculation results' during the processing of the 'Input Data'.

The Bit Selection Logical Expressions 46, which evaluate the processing of the Input Data 44a, include the following:
Verify the hole size and filter out the bit sizes that do not match the hole size.
Check if the bit is not drilling beyond the casing point.
Check the cumulative mechanical drilling energy for the bit run and compare it with the statistical mechanical drilling energy for that bit, and assign the proper risk to the bit run.
Check the cumulative bit revolutions and compare it with the statistical bit revolutions for that bit type and assign the proper risk to the bit run.
Verify that the encountered rock strength is not outside the range of rock strengths that is optimum for the selected bit type.
Extend footage by 25% in case the casing point could be reached by the last selected bit.

Bit Selection Algorithms 48

The following paragraphs will set forth the 'Bit Selection Algorithms' 48. The 'Bit Selection Algorithms' 48 will receive the output from the 'Bit Selection Logical Expressions' 46 and process that 'output from the Bit Selection Logical Expressions 46' in the following manner:
Read variables and constants
Read catalogs
Build cumulative rock strength curve from casing point to casing point.

$$CumUCS = \int_{start}^{end} (UCS) d\text{ft}$$

Determine the required hole size
Find the bit candidates that match the closest unconfined compressive strength of the rock to drill.
Determine the end depth of the bit by comparing the historical drilling energy with the cumulative rock strength curve for all bit candidates.
Calculate the cost per foot for each bit candidate taking into accounts the rig rate, trip speed and drilling rate of penetration.

$$TOT\ Cost = (RIG\ RATE + SPREAD\ RATE)$$

$$\left(T\_TripIn + \frac{footage}{ROP} + T\_Trip\right) + Bit\ Cost$$

Evaluate which bit candidate is most economic.
Calculate the remaining cumulative rock strength to casing point.
Repeat step 5 to 9 until the end of the hole section
Build cumulative UCS
Select bits—display bit performance and operating parameters
Remove sub-optimum bits
Find most economic bit based on cost per foot Refer now to FIGS. 14A and 14B which will be used during the following functional description.

A functional description of the operation of the 'Automatic Well Planning Bit Selection Software' 42c1 will be set forth in the following paragraphs with reference to FIGS. 1 through 14B of the drawings.

Recall that the selection of Drill bits is a manual subjective process based heavily on personal, previous experiences. The experience of the individual recommending or selecting the drill bits can have a large impact on the drilling performance for the better or for the worse. The fact that bit selection is done primarily based on personal experiences and uses little information of the actual rock to be drilled makes it very easy to choose the incorrect bit for the application. Recall that the Bit Selection sub-task 14a utilizes an 'Automatic Well Planning Bit Selection software' 42c1 to automatically generate the required roller cone drill bits to drill the specified hole sizes through the specified hole section at unspecified intervals of earth. The 'Automatic Well Planning Bit Selection software' 42c1 includes the 'Bit Selection Logical Expressions' 46 and the 'Bit Selection Algorithms' 48 that are adapted for automatically selecting the required sequence of drill bits to drill each hole section (defined by a top/bottom depth interval and diameter) in the well. The 'Automatic Well Planning Bit Selection software' 42c1 uses statistical processing of historical bit performance data and several specific Key Performance Indicators (KPI) to match the earth properties and rock strength data to the appropriate bit while optimizing the aggregate time and cost to drill each hole section. It determines the bit life and corresponding depths to pull and replace a bit based on proprietary algorithms, statistics, logic, and risk factors.

Figure 14A:
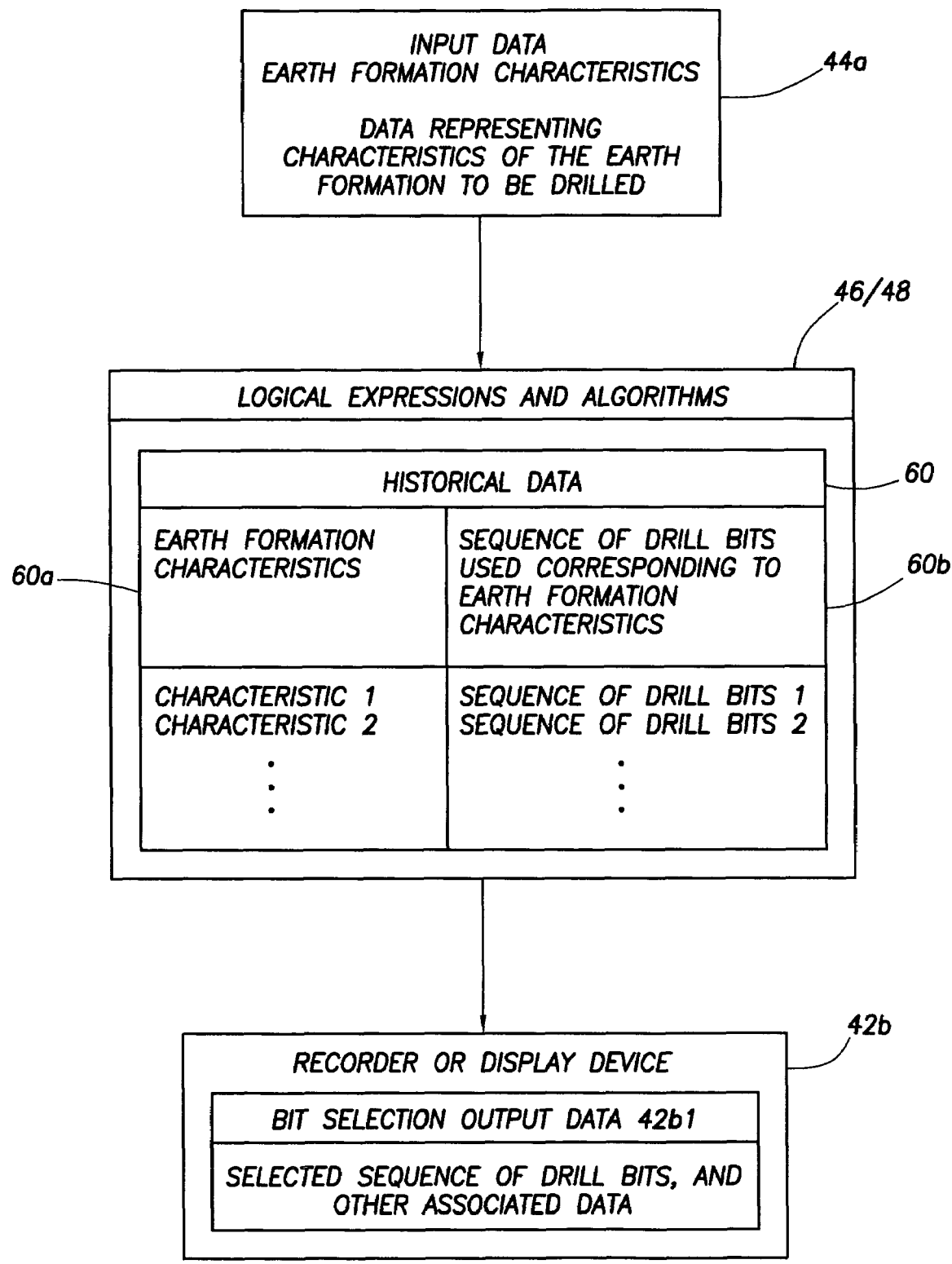
FIGS. 14A and 14B illustrate block diagrams representing a functional operation of the Automatic Well Planning Bit Selection software of FIG. 13.
Figure 15:
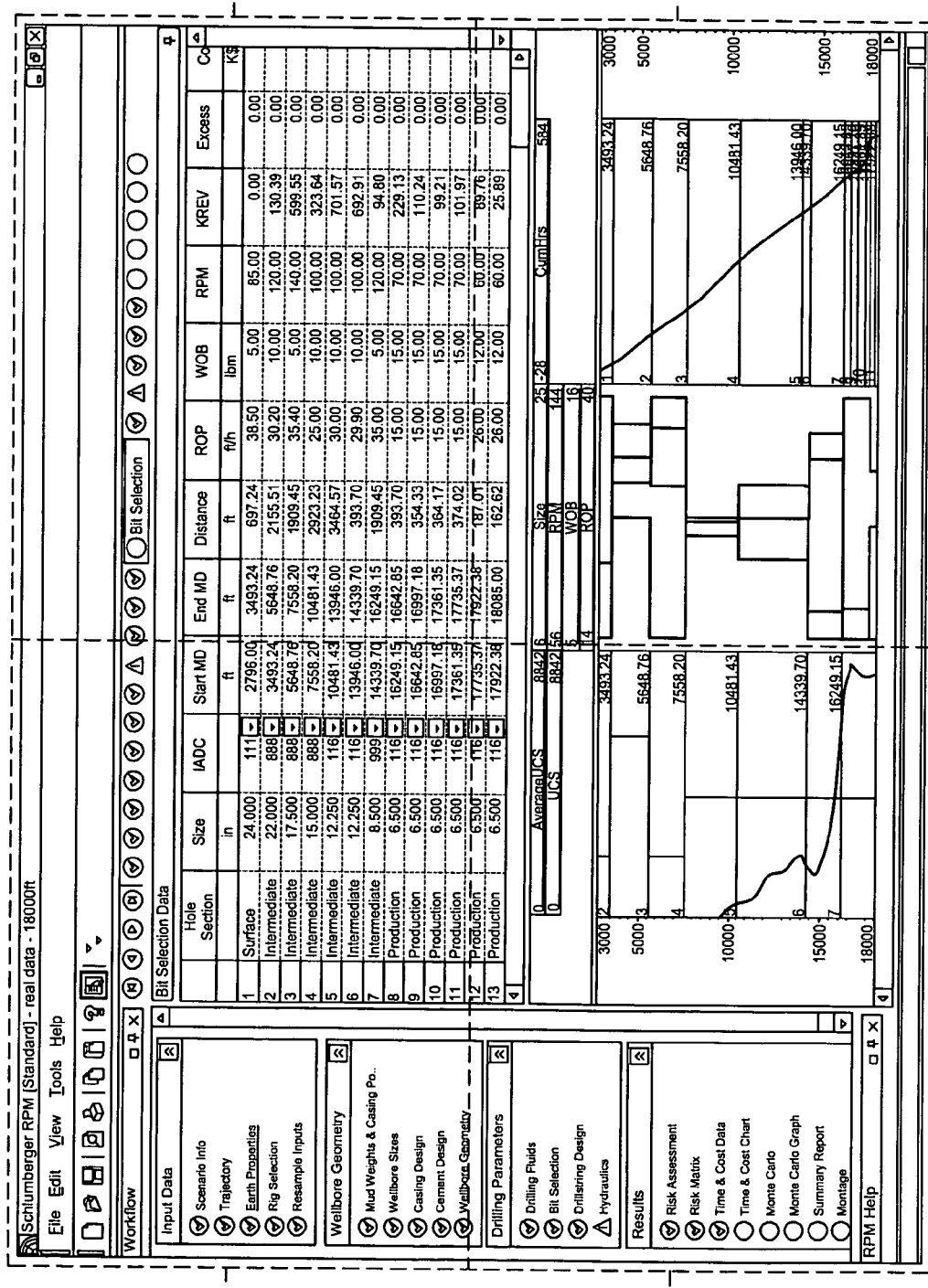
FIG. 15 illustrates a Bit Selection display which is generated by a Recorder or Display device associated with the Computer System of FIG. 12 which stores the Automatic Well Planning Bit Selection software.
Figure 15A:
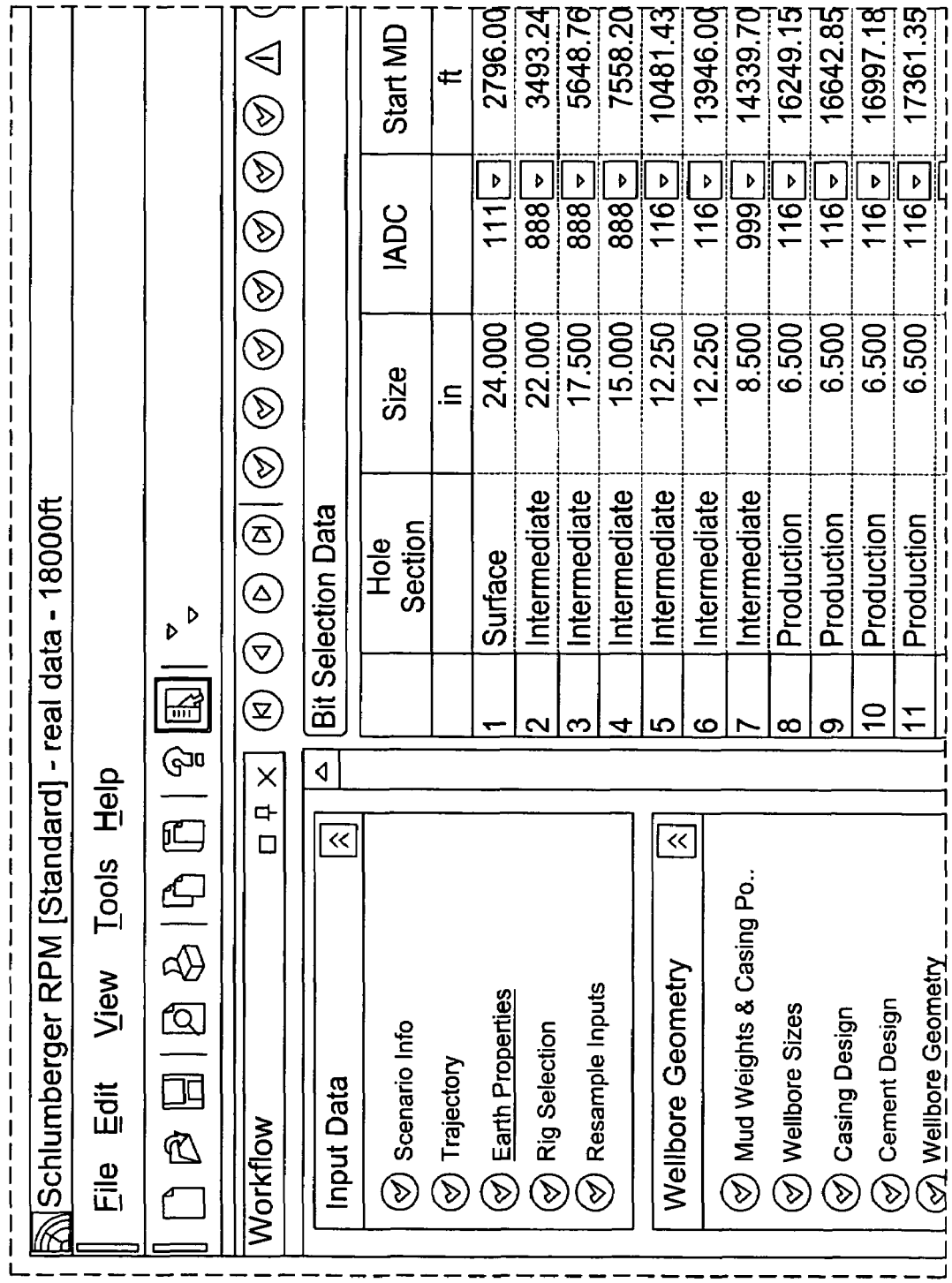
Figure 15C:
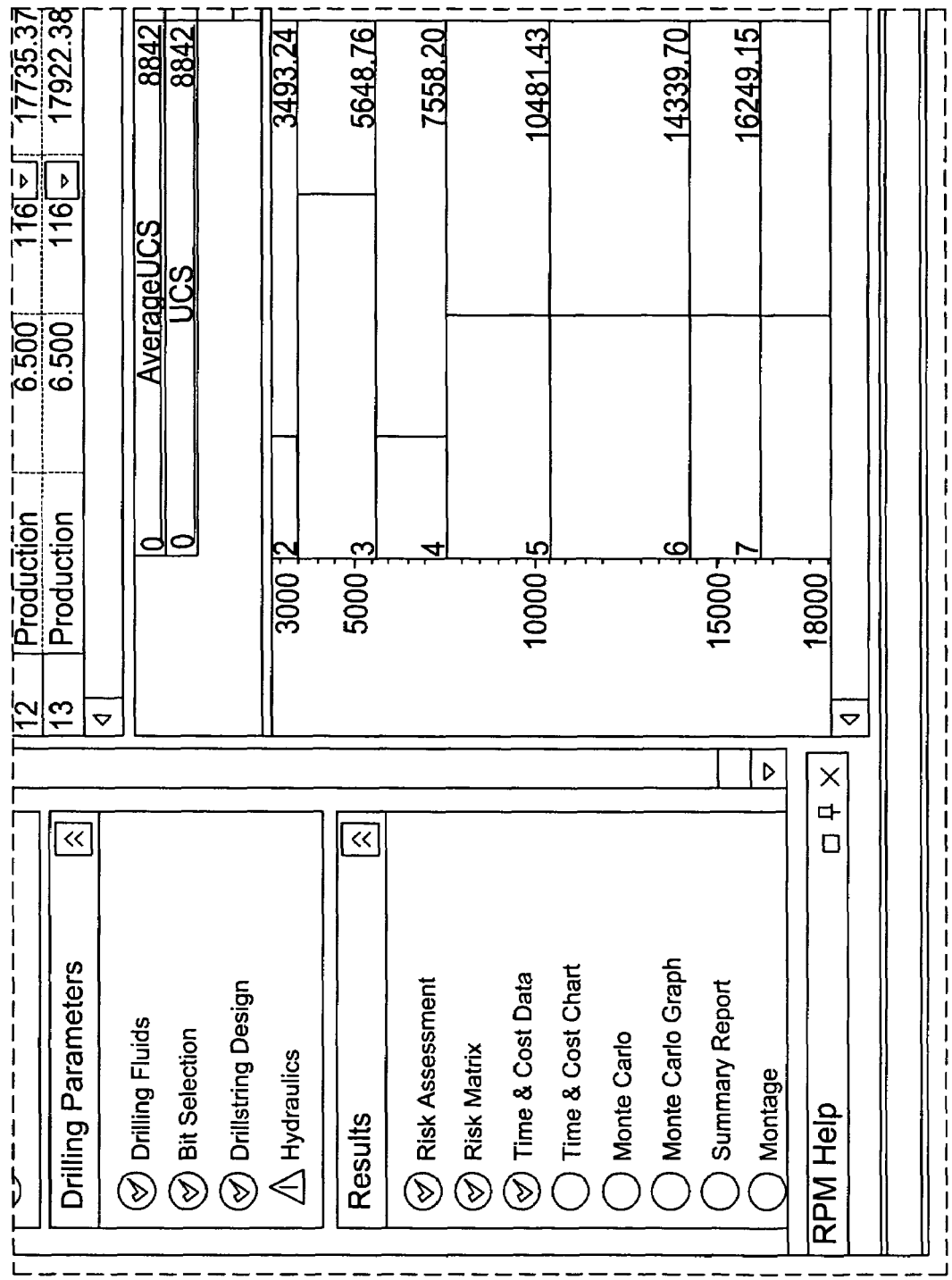
Figure 15D:
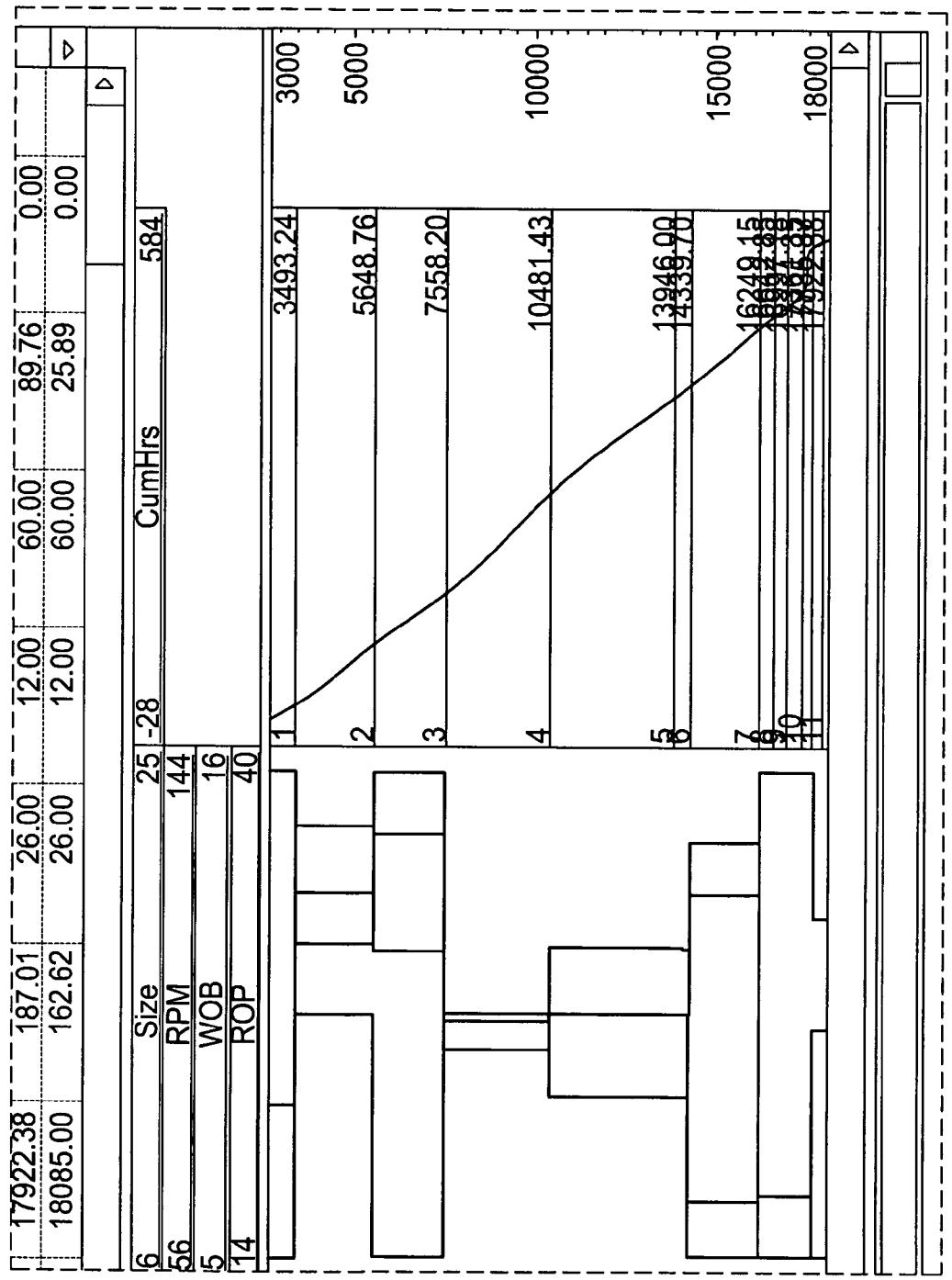

In FIG. 14A, the Input Data 44a represents a set of Earth formation characteristics, where the Earth formation characteristics are comprised of data representing characteristics of a particular Earth formation 'To Be Drilled'. The Logical Expressions and Algorithms 46/48 are comprised of Historical Data 60, where the Historical Data 60 can be viewed as a table consisting of two columns: a first column 60a including 'historical Earth formation characteristics', and a second column 60b including 'sequences of drill bits used corresponding to the historical Earth formation characteristics'. The Recorder or Display device 42b will record or display 'Bit Selection Output Data' 42b, where the 'Bit Selection Output Data' 42b is comprised of the 'Selected Sequence of Drill Bits, and other associated data'. In operation, referring to FIG. 14A, the Input Data 44a represents a set of Earth formation characteristics associated with an Earth formation 'To Be Drilled'. The 'Earth formation characteristics (associated with a section of Earth Formation 'to be drilled') corresponding to the Input Data 44a' is compared with each 'characteristic in column 60a associated with the Historical Data 60' of the Logical Expressions and Algorithms 46/48. When a match (or a substantial match) is found between the 'Earth formation characteristics (associated with a section of Earth Formation 'to be drilled') corresponding to the Input Data 44a' and a 'characteristic in column 60a associated with the Historical Data 60', a 'Sequence of Drill Bits' (called a 'selected sequence of drill bits') corresponding to that 'characteristic in column 60a associated with the Historical Data 60' is generated as an output from the Logical Expressions and Algorithms block 46/48 in FIG. 14A. The aforementioned 'selected sequence of drill bits along with other data associated with the selected sequence of drill bits'. is generated as an 'output' by the Recorder or Display device 42*b* of the Computer System 42 in FIG. 12. See FIG. 15 for an example of that 'output'. The 'output' can be a 'display' (as illustrated in FIG. 15) that is displayed on a computer display screen, or it can be an 'output record' printed by the Recorder or Display device 42*b*.

The functions discussed above with reference to FIG. 14A, pertaining to the manner by which the 'Logical Expressions and Algorithms' 46/48 will generate the 'Bit Selection Output Data' 42*b*1 in response to the 'Input Data' 44*a*, will be discussed in greater detail below with reference to FIG. 14B.

Figure 14B:
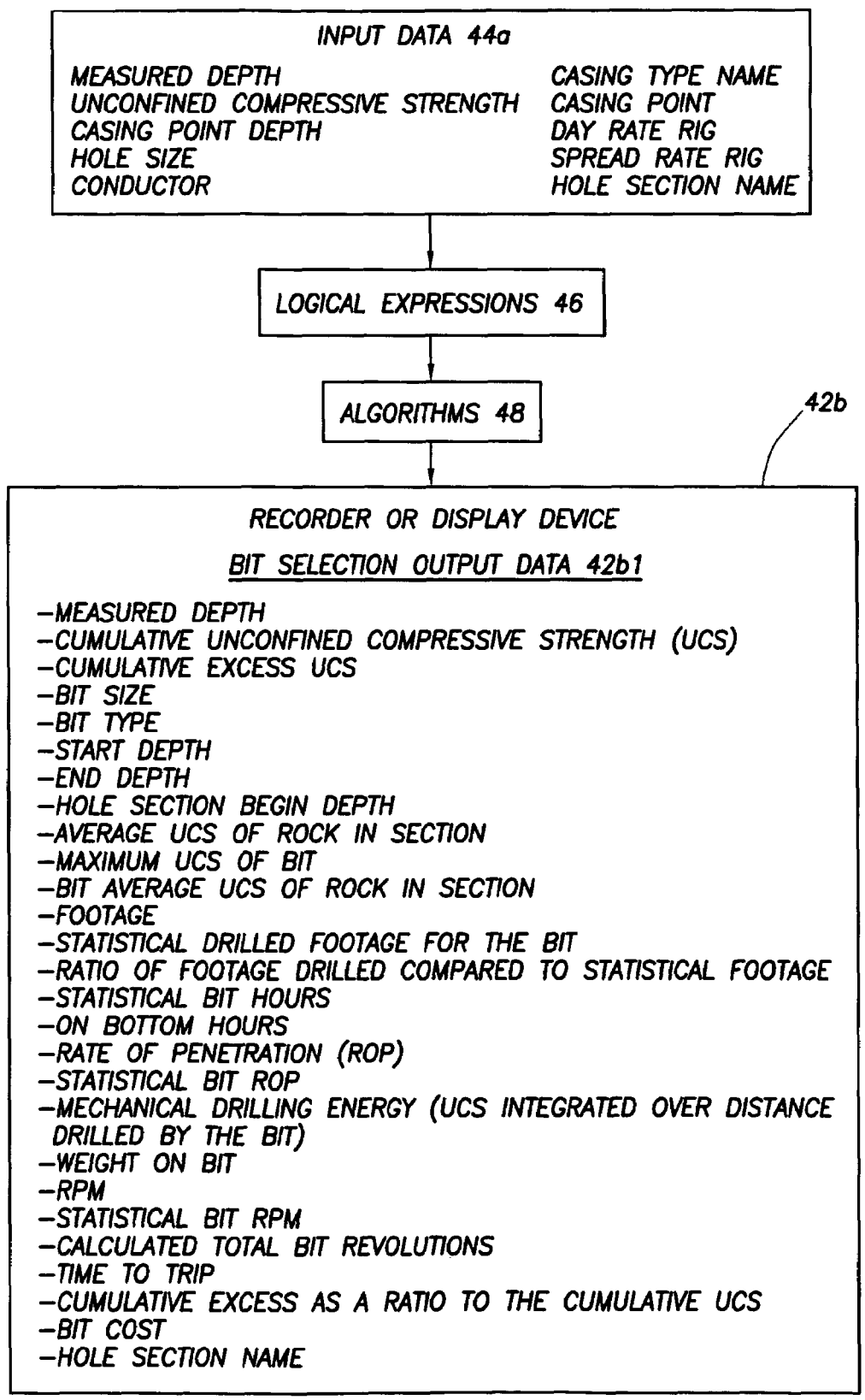

In FIG. 14B, recall that the Input Data 44*a* represents a set of 'Earth formation characteristics', where the 'Earth formation characteristics' are comprised of data representing characteristics of a particular Earth formation 'To Be Drilled'. As a result, the Input Data 44*a* is comprised of the following specific data: Measured Depth, Unconfined Compressive Strength, Casing Point Depth, Hole Size, Conductor, Casing Type Name, Casing Point, Day Rate Rig, Spread Rate Rig, and Hole Section Name.

In FIG. 14B, recall that the Logical Expressions 46 and Algorithms 48 will respond to the Input Data 44*a* by generating a set of 'Bit Selection Output Data' 42*b*1, where the 'Bit Selection Output Data' 42*b*1 represents the aforementioned 'selected drill bit along with other data associated with the selected drill bit'. As a result, the 'Bit Selection Output Data' 42*b*1 is comprised of the following specific data: Measured Depth, Cumulative Unconfined Compressive Strength (UCS), Cumulative Excess UCS, Bit Size, Bit Type, Start Depth, End Depth, Hole Section Begin Depth, Average UCS of rock in section, Maximum UCS of bit, Bit Average UCS of rock in section, Footage, Statistical Drilled Footage for the bit, Ratio of footage drilled compared to statistical footage, Statistical Bit Hours, On Bottom Hours, Rate of Penetration (ROP), Statistical Bit Rate of Penetration (ROP), Mechanical drilling energy (UCS integrated over distance drilled by the bit), Weight On Bit, Revolutions per Minute (RPM), Statistical Bit RPM, Calculated Total Bit Revolutions, Time to Trip, Cumulative Excess as a ration to the Cumulative UCS, Bit Cost, and Hole Section Name.

In order to generate the 'Bit Selection Output Data' 42*b*1 in response to the 'Input Data' 44*a*, the Logical Expressions 46 and the Algorithms 48 must perform the following functions, which are set forth in the following paragraphs.

The Bit Selection Logical Expressions 46 will perform the following functions. The Bit Selection Logical Expressions 46 will: (1) Verify the hole size and filter out the bit sizes that do not match the hole size, (2) Check if the bit is not drilling beyond the casing point, (3) Check the cumulative mechanical drilling energy for the bit run and compare it with the statistical mechanical drilling energy for that bit, and assign the proper risk to the bit run, (4) Check the cumulative bit revolutions and compare it with the statistical bit revolutions for that bit type and assign the proper risk to the bit run, (5) Verify that the encountered rock strength is not outside the range of rock strengths that is optimum for the selected bit type, and (6) Extend footage by 25% in case the casing point could be reached by the last selected bit.

The Bit Selection Algorithms 48 will perform the following functions. The Bit Selection Algorithms 48 will: (1) Read variables and constants, (2) Read catalogs, (3) Build cumulative rock strength curve from casing point to casing point, using the following equation:

$$CumUCS = \int_{start}^{end} (UCS) d\,\text{ft},$$

Determine the required hole size, (5) Find the bit candidates that match the closest unconfined compressive strength of the rock to drill, (6) Determine the end depth of the bit by comparing the historical drilling energy with the cumulative rock strength curve for all bit candidates, (7) Calculate the cost per foot for each bit candidate taking into accounts the rig rate, trip speed and drilling rate of penetration by using the following equation:

$$TOT \text{ Cost} = (\text{RIG RATE} + \text{SPREAD RATE})$$
$$\left(T\_TripIn + \frac{\text{footage}}{ROP} + T\_Trip\right) + \text{Bit Cost}$$

Evaluate which bit candidate is most economic, (9) Calculate the remaining cumulative rock strength to casing point, (10) Repeat step 5 to 9 until the end of the hole section, (11) Build cumulative UCS, (12) Select bits—display bit performance and operating parameters, (13) Remove sub-optimum bits, and (14) Find the most economic bit based on cost per foot.

The following discussion set forth in the following paragraphs will describe how the 'Automatic Well Planning Bit Selection software' will generate a 'Selected Sequence of Drill Bits' in response to 'Input Data'.

The 'Input Data' is loaded, the 'Input Data' including the 'trajectory' data and Earth formation property data. The main characteristic of the Earth formation property data, which was loaded as input data, is the rock strength. The 'Automatic Well Planning Bit Selection' software has calculated the casing points, and the number of 'hole sizes' is also known. The casing sizes are known and, therefore, the wellbore sizes are also known. The number of 'hole sections' are known, and the size of the 'hole sections' are also known. The drilling fluids are also known. The most important part of the 'input data' is the 'hole section length', the 'hole section size', and the 'rock hardness' (also known as the 'Unconfined Compressive Strength' or 'UCS') associated with the rock that exists in the hole sections. In addition, the 'input data' includes 'historical bit performance data'. The 'Bit Assessment Catalogs' include: bit sizes, bit-types, and the relative performance of the bit types. The 'historical bit performance data' includes the footage that the bit drills associated with each bit-type. The 'Automatic Well Planning Bit Selection software' starts by determining the average rock hardness that the bit-type can drill. The bit-types have been classified in the 'International Association for Drilling Contractors (IADC)' bit classification. Therefore, there exists a 'classification' for each 'bit-type'. We assign an 'average UCS' (that is, an 'average rock strength') to the bit-type. In addition, we assign a minimum and a maximum rock strength to each of the bit-types. Therefore, each 'bit type' has been assigned the following information: (1) the 'softest rock that each bit type can drill', (2) the 'hardest rock that each bit type can drill', and (3) the 'average or the optimum hardness that each bit type can drill'. All 'bit sizes' associated with the 'bit types' are examined for the wellbore 'hole section' that will be drilled (electronically) when the 'Automatic Well Planning Bit Selection software' is executed. Some 'particular bit types', from the Bit Selection Catalog, will filtered-out because those 'particular bit types' do not have the appropriate size for use in connection with the hole section that we are going to drill (electronically). As a result, a 'list of bit candidates' is generated. When the drilling of the rock (electronically—in the software) begins, for each foot of the rock, a 'rock strength' is defined, where the 'rock strength' has units of 'pressure' in 'psi'. For each foot of rock that we (electronically) drill, the 'Automatic Well Planning Bit Selection software' will perform a mathematical integration to determine the 'cumulative rock strength' by using the following equation:

$$CumUCS = \int_{start}^{end} (UCS) d\,\text{ft}$$

where:
'CumUCS' is the 'cumulative rock strength', and
'UCS' (Unconfined Compressive Strength') is the 'average rock strength' per
'bit candidate', and
'd' is the drilling distance using that 'bit candidate'.

Thus, if the 'average rock strength/foot' is 1000 psi/foot, and we drill 10 feet of rock, then, the 'cumulative rock strength' is (1000 psi/foot)(10 feet)=10000 psi 'cumulative rock strength'. If the next 10 feet of rock has an 'average rock strength/foot' of 2000 psi/foot, that next 10 feet will take (2000 psi/foot)(10 feet)=20000 psi 'cumulative rock strength'; then, when we add the 10000 psi 'cumulative rock strength' that we already drilled, the resultant 'cumulative rock strength' for the 20 feet equals 30000 psi. Drilling (electronically—in the software) continues. At this point, compare the 30000 psi 'cumulative rock strength' for the 20 feet of drilling with the 'statistical performance of the bit'. For example, if, for a 'particular bit', the 'statistical performance of the bit' indicates that, statistically, 'particular bit' can drill fifty (50) feet in a 'particular rock', where the 'particular rock' has 'rock strength' of 1000 psi/foot. In that case, the 'particular bit' has a 'statistical amount of energy that the particular bit is capable of drilling' which equals (50 feet) (1000 psi/foot)=50000 psi. Compare the previously calculated 'cumulative rock strength' of 30000 psi with the aforementioned 'statistical amount of energy that the particular bit is capable of drilling' of 50000 psi. Even though 'actual energy' (the 30000 psi) was used to drill the first 20 feet of the rock, there still exists a 'residual energy' in the 'particular bit' (the 'residual energy' being the difference between 50000 psi and 30000 psi). As a result, from 20 feet to 30 feet, we use the 'particular bit' to drill once again (electronically—in the software) an additional 10 feet. Assume the 'rock strength' is 2000 psi. Determine the 'cumulative rock strength' by multiplying (2000 psi/foot)(10 additional feet)=20000 psi. Therefore, the 'cumulative rock strength' for the additional 10 feet is 20000 psi. Add the 20000 psi 'cumulative rock strength' (for the additional 10 feet) to the previously calculated 30000 psi 'cumulative rock strength' (for the first 20 feet) that we already drilled. The result will yield a 'resultant cumulative rock strength' of 50000 psi' associated with 30 feet of drilling. Compare the aforementioned 'resultant cumulative rock strength' of 50000 psi with the 'statistical amount of energy that the particular bit is capable of drilling' of 50000 psi. As a result, there is only one conclusion: the bit life of the 'particular bit' ends and terminates at 50000 psi; and, in addition, the 'particular bit' can drill up to 30 feet. If the aforementioned 'particular bit' is 'bit candidate A', there is only one conclusion: 'bit candidate A' can drill 30 feet of rock. We now go to the next 'bit candidate' for the same size category and repeat the same process. We continue to drill (electronically—in the software) from point A to point B in the rock, and integrate the energy as previously described (as 'footage' in units of 'psi') until the life of the bit has terminated. The above mentioned process is repeated for each 'bit candidate' in the aforementioned 'list of bit candidates'. We now have the 'footage' computed (in units of psi) for each 'bit candidate' on the 'list of bit candidates'. The next step involves selecting which bit (among the 'list of bit candidates') is the 'optimum bit candidate'. One would think that the 'optimum bit candidate' would be the one with the maximum footage. However, how fast the bit drills (i.e., the Rate of Penetration or ROP) is also a factor. Therefore, a cost computation or economic analysis must be performed. In that economic analysis, when drilling, a rig is used, and, as a result, rig time is consumed which has a cost associated therewith, and a bit is also consumed which also has a certain cost associated therewith. If we (electronically) drill from point A to point B, it is necessary to first run into the hole where point A starts, and this consumes 'tripping time'. Then, drilling time is consumed. When (electronic) drilling is done, pull the bit out of the hole from point B to the surface, and additional rig time is also consumed. Thus, a 'total time in drilling' can be computed from point A to point B, that 'total time in drilling' being converted into 'dollars'. To those 'dollars', the bit cost is added. This calculation will yield: a 'total cost to drill that certain footage (from point A to B)'. The 'total cost to drill that certain footage (from point A to B)' is normalized by converting the 'total cost to drill that certain footage (from point A to B)' to a number which represents 'what it costs to drill one foot'. This operation is performed for each bit candidate. At this point, the following evaluation is performed: 'which bit candidate drills the cheapest per foot'. Of all the 'bit candidates' on the 'list of bit candidates', we select the 'most economic bit candidate'. Although we computed the cost to drill from point A to point B, it is now necessary to consider drilling to point C or point D in the hole. In that case, the Automatic Well Planning Bit Selection software will conduct the same steps as previously described by evaluating which bit candidate is the most suitable in terms of energy potential to drill that hole section; and, in addition, the software will perform an economic evaluation to determine which bit candidate is the cheapest. As a result, when (electronically) drilling from point A to point B to point C, the 'Automatic Well Planning Bit Selection software' will perform the following functions: (1) determine if 'one or two or more bits' are necessary to satisfy the requirements to drill each hole section, and, responsive thereto, (2) select the 'optimum bit candidates' associated with the 'one or two or more bits' for each hole section.

In connection with the Bit Selection Catalogs 52, the Catalogs 52 include a 'list of bit candidates'. The 'Automatic Well Planning Bit Selection software' will disregard certain bit candidates based on: the classification of each bit candidate and the minimum and maximum rock strength that the bit candidate can handle. In addition, the software will disregard the bit candidates which are not serving our purpose in terms of (electronically) drill from point A to point B. If rocks are encountered which have a UCS which exceeds the UCS rating for that 'particular bit candidate', that 'particular bit candidate' will not qualify. In addition, if the rock strength is considerably less than the minimum rock strength for that 'particular bit candidate', disregard that 'particular bit candidate'.

In connection with the Input Data 44a, the Input Data 44a includes the following data: which hole section to drill, where the hole starts and where it stops, the length of the entire hole, the size of the hole in order to determine the correct size of the bit, and the rock strength (UCS) for each foot of the hole section. In addition, for each foot of rock being drilled, the following data is known: the rock strength (UCS), the trip speed, the footage that a bit drills, the minimum and maximum UCS for which that the bit is designed, the Rate of Penetration (ROP), and the drilling performance. When selecting the bit candidates, the 'historical performance' of the 'bit candidate' in terms of Rate of Penetration (ROP) is known. The drilling parameters are known, such as the 'weight on bit' or WOB, and the Revolutions per Minute (RPM) to turn the bit is also known.

In connection with the Bit Selection Output Data 42b1, since each bit drills a hole section, the output data includes a start point and an end point in the hole section for each bit. The difference between the start point and the end point is the 'distance that the bit will drill'. Therefore, the output data further includes the 'distance that the drill bit will drill'. In addition, the output data includes: the 'performance of the bit in terms of Rate of Penetration (ROP)' and the 'bit cost'.

In summary, the Automatic Well Planning Bit Selection software 42c1 will: (1) suggest the right type of bit for the right formation, (2) determine longevity for each bit, (3) determine how far can that bit drill, and (3) determine and generate 'bit performance' data based on historical data for each bit.

Referring to FIG. 15, the 'Automatic Well Planning Bit Selection Software' 42c1 will generate the display illustrated in FIG. 15, the display of FIG. 15 illustrating 'Bit Selection Output Data 42b1' representing the selected sequence of drill bits which are selected by the 'Automatic Well Planning Bit Selection Software' 42c1.

Automatic Well Planning Software System—Drill String Design Sub-Task 14b

In FIG. 8, the Drillstring Design sub-task 14b is illustrated.

Designing a drillstring is not terribly complex, but it is very tedious. The sheer number of components, methods, and calculations required to ensure the mechanical suitability of stacking one component on top of another component is quite cumbersome. Add to this fact that a different drillstring is created for every hole section and often every different bit run in the drilling of a well and the amount of work involved can be large and prone to human error.

The 'Automatic Well Planning Drillstring Design software' includes an algorithm for automatically generating the required drillstrings to support the weight requirements of each bit, the directional requirements of the trajectory, the mechanical requirements of the rig and drill pipe, and other general requirements for the well, i.e. formation evaluation. The resulting drillstrings are accurate enough representations to facilitate calculations of frictional pressure losses (hydraulics), mechanical friction (torque & drag), and cost (BHA components for directional drilling and formation evaluation).

Figure 16:
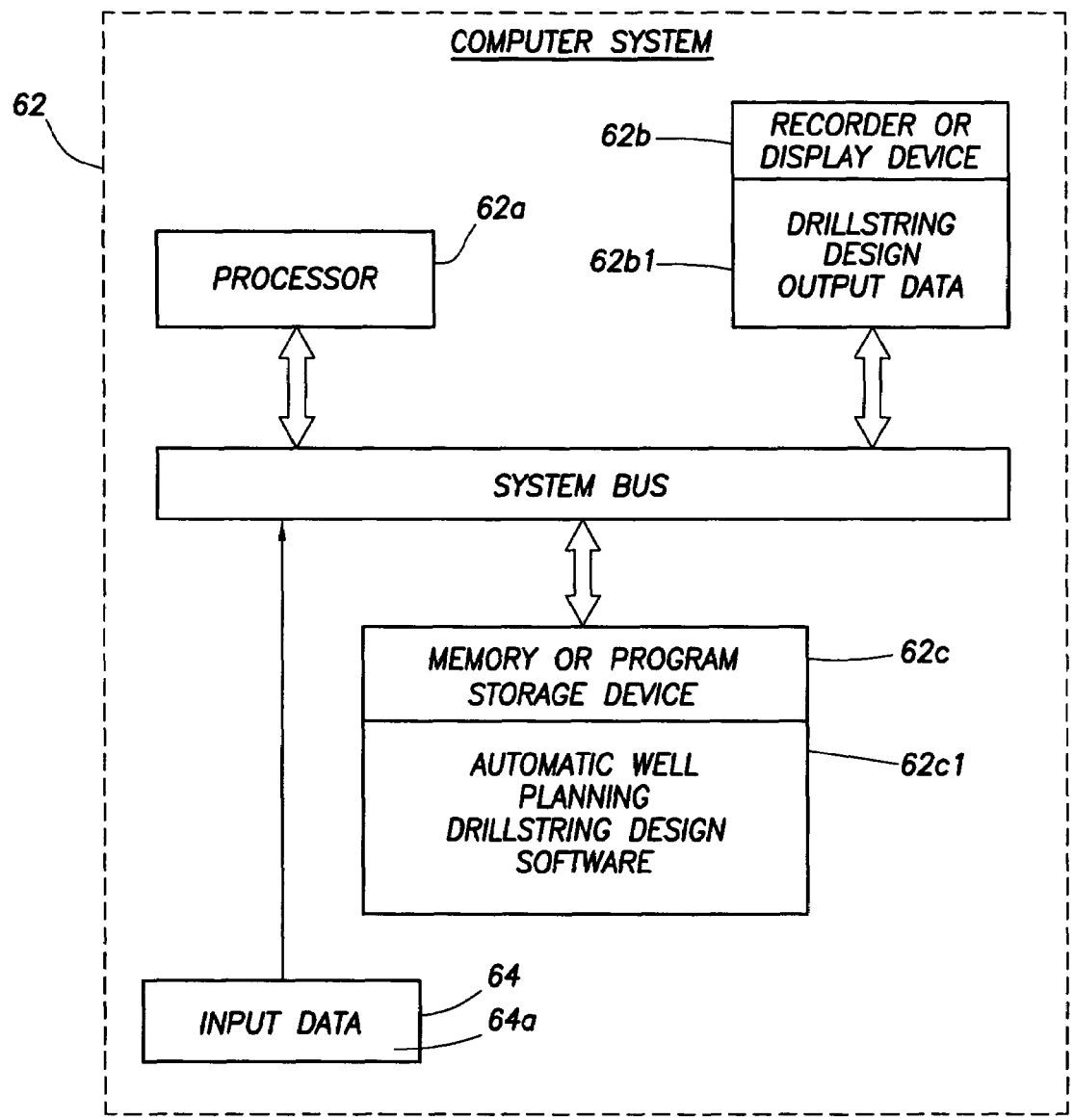
FIG. 16 illustrates a Computer System which stores an Automatic Well Planning Drillstring Design software.

Referring to FIG. 16, a Computer System 62 is illustrated. The Computer System 62 includes a Processor 62a connected to a system bus, a Recorder or Display Device 62b connected to the system bus, and a Memory or Program Storage Device 62c connected to the system bus. The Recorder or Display Device 62b is adapted to display 'Drillstring Design Output Data' 62b1. The Memory or Program Storage Device 62c is adapted to store an 'Automatic Well Planning Drillstring Design Software' 62c1. The 'Automatic Well Planning Drillstring Design Software' 62c1 is originally stored on another 'program storage device', such as a hard disk; however, the hard disk was inserted into the Computer System 62 and the 'Automatic Well Planning Drillstring Design Software' 62c1 was loaded from the hard disk into the Memory or Program Storage Device 62c of the Computer System 62 of FIG. 16. In addition, a Storage Medium 64 containing a plurality of 'Input Data' 64a is adapted to be connected to the system bus of the Computer System 62, the 'Input Data' 64a being accessible to the Processor 62a of the Computer System 62 when the Storage Medium 64 is connected to the system bus of the Computer System 62. In operation, the Processor 62a of the Computer System 62 will execute the Automatic Well Planning Drillstring Design Software 62c1 stored in the Memory or Program Storage Device 62c of the Computer System 62 while, simultaneously, using the 'Input Data' 64a stored in the Storage Medium 64 during that execution. When the Processor 62a completes the execution of the Automatic Well Planning Drillstring Design Software 62c1 stored in the Memory or Program Storage Device 62c (while using the 'Input Data' 64a), the Recorder or Display Device 62b will record or display the 'Drillstring Design Output Data' 62b1, as shown in FIG. 16. For example the 'Drillstring Design Output Data' 62b1 can be displayed on a display screen of the Computer System 62, or the 'Drillstring Design Output Data' 62b1 can be recorded on a printout which is generated by the Computer System 62. The 'Input Data' 64a and the 'Drillstring Design Output Data' 62b1 will be discussed and specifically identified in the following paragraphs of this specification. The 'Automatic Well Planning Drillstring Design software' 62c1 will also be discussed in the following paragraphs of this specification. The Computer System 62 of FIG. 16 may be a personal computer (PC). The Memory or Program Storage Device 62c is a computer readable medium or a program storage device which is readable by a machine, such as the processor 62a. The processor 62a may be, for example, a microprocessor, a microcontroller, or a mainframe or workstation processor. The Memory or Program Storage Device 62c, which stores the 'Automatic Well Planning Drillstring design Software' 62c1, may be, for example, a hard disk, ROM, CD-ROM, DRAM, or other RAM, flash memory, magnetic storage, optical storage, registers, or other volatile and/or non-volatile memory.

Figure 17:
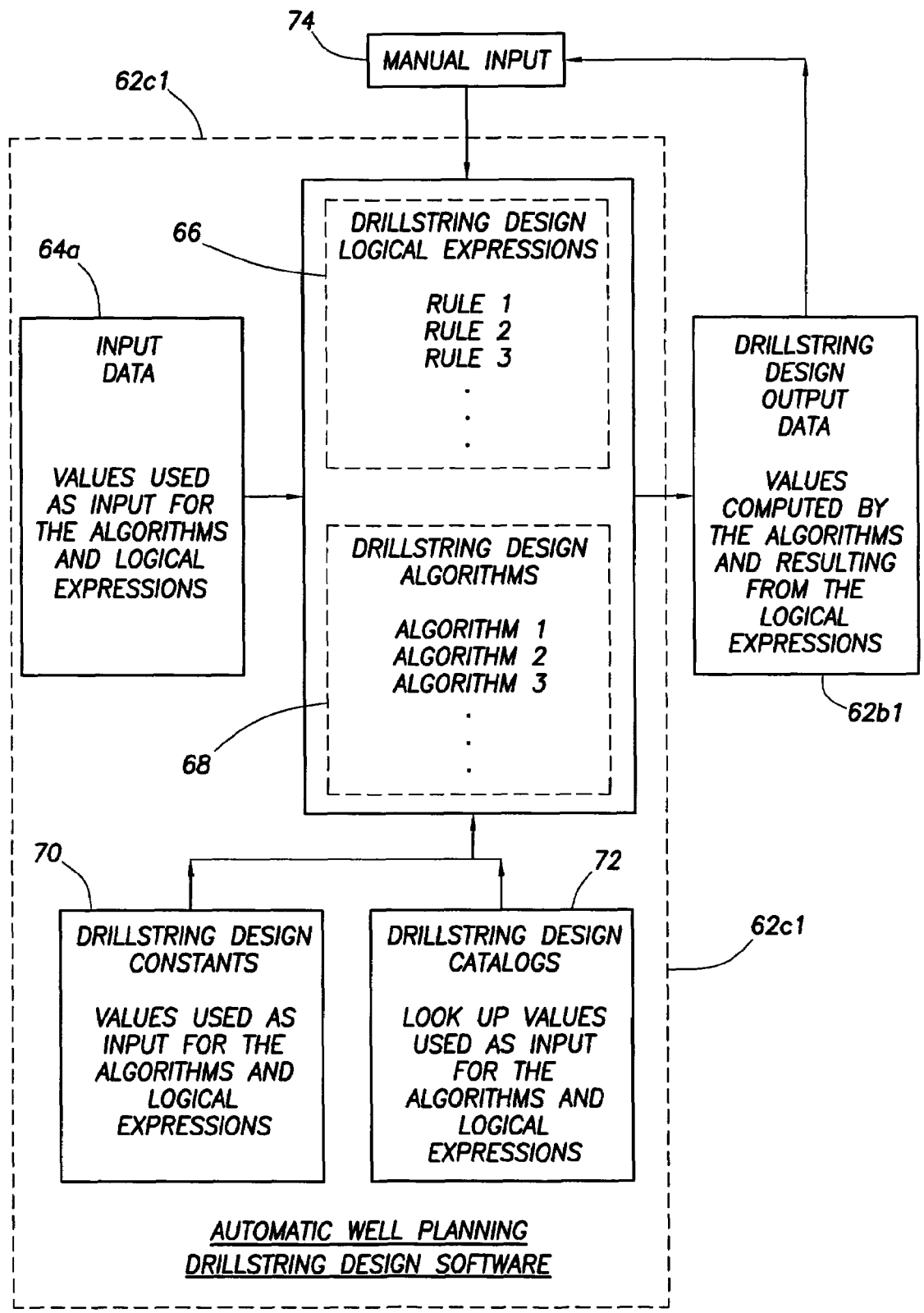
FIG. 17 illustrates a detailed construction of the Automatic Well Planning Drillstring Design Software stored in the Computer System of FIG. 16.

Referring to FIG. 17, a detailed construction of the 'Automatic Well Planning Drillstring Design Software' 62c1 of FIG. 16 is illustrated. In FIG. 17, the 'Automatic Well Planning Drillstring Design Software' 62c1 includes a first block which stores the Input Data 64a, a second block 66 which stores a plurality of Drilistring Design Logical Expressions 66; a third block 68 which stores a plurality of Drillstring Design Algorithms 68, a fourth block 70 which stores a plurality of Drillstring Design Constants 70, and a fifth block 72 which stores a plurality of Drillstring Design Catalogs 72. The Drillstring Design Constants 70 include values which are used as input for the Drillstring Design Algorithms 68 and the Drillstring Design Logical Expressions 66. The Drillstring Design Catalogs 72 include look-up values which are used as input by the Drillstring Design Algorithms 68 and the Drillstring Design Logical Expressions 66. The 'Input Data' 64a includes values which are used as input for the Drillstring Design Algorithms 68 and the Drillstring Design Logical Expressions 66. The 'Drillstring Design Output Data' 62b1 includes values which are computed by the Drillstring Design Algorithms 68 and which result from the Drillstring Design Logical Expressions 66. In operation, referring to FIGS. 16 and 17, the Processor 62a of the Computer System 62 of FIG. 16 executes the Automatic Well Planning Drillstring Design Software 62*c*1 by executing the Drillstring Design Logical Expressions 66 and the Drillstring Design Algorithms 68 of the Drillstring design Software 62*c*1 while, simultaneously, using the 'Input Data' 64*a*, the Drillstring Design Constants 70, and the values stored in the Drillstring Design Catalogs 72 as 'input data' for the Drilistring Design Logical Expressions 66 and the Drillstring Design Algorithms 68 during that execution. When that execution by the Processor 62*a* of the Drillstring Design Logical Expressions 66 and the Drillstring Design Algorithms 68 (while using the 'Input Data' 64*a*, Constants 70, and Catalogs 72) is completed, the 'Drillstring Design Output Data' 62*b*1 will be generated as a 'result'. The 'Drillstring Design Output Data' 62*b*1 is recorded or displayed on the Recorder or Display Device 62*b* of the Computer System 62 of FIG. 16. In addition, that 'Drillstring Design Output Data' 62*b*1 can be manually input, by an operator, to the Drillstring Design Logical Expressions block 66 and the Drillstring Design Algorithms block 68 via a 'Manual Input' block 74 shown in FIG. 17.

Input Data 64*a*

The following paragraphs will set forth the 'Input Data' 64*a* which is used by the 'Drillstring Design Logical Expressions' 66 and the 'Drillstring Design Algorithms' 68. Values of the Input Data 64*a* that are used as input for the Drillstring Design Algorithms 68 and the Drillstring Design Logical Expressions 66 include the following:
Measured Depth
True Vertical Depth
Weight On Bit
Mud Weight
Mud Weight Measured Depth
Inclination
Casing Point Depth
Hole Size
Footage
ROP
Time to Trip
Dog Leg Severity
True Vertical Depth
Pore Pressure without Safety Margin
Bit Size
Upper Wellbore Stability Limit
Lower Wellbore Stability Limit
Openhole Or Cased hole completion
BOP Location
Casing Type Name
Hole Section Name
Conductor
Start Depth
End Depth
On Bottom Hours
Statistical Drilled Footage for the bit
Cumulative UCS
Casing Point
Casing Size
Casing Burst Pressure
Casing Collapse Pressure
Casing Connector
Casing Cost
Casing Grade
Casing Weight per foot
Casing Outer Diameter
Casing Internal Diameter
Air Gap
Casing Top Measure Depth
Water Depth
Top of Tail slurry
Top Of Cement
Mud Volume
Offshore Well Drillstring Design Constants 70

The 'Drillstring Design Constants' 70 are used by the 'Drillstring Design Logical Expressions' 66 and the 'Drillstring Design Algorithms' 68. The values of the 'Drillstring Design Constants 70 that are used as input data for Drillstring Design Algorithms 68 and the Drillstring Design Logical Expressions 66 include the following:
Design Factor
Stand Length
Safety Margin Kick Tolerance
Minimum well inclination flag
Minimum well dogleg severity flag
Gravitation constant
Mud surface volume Drillstring Design Catalogs 72

The 'Drillstring Design Catalogs' 72 are used by the 'Drillstring Design Logical Expressions' 66 and the 'Drillstring Design Algorithms' 68. The values of the Catalogs 72 that are used as input data for Drillstring Design Algorithms 68 and the Drillstring Design Logical Expressions 66 include the following:
Drill Pipe Catalog
Drill Collar Catalog File
Heavy Weight Drill Pipe Catalog File
Drill Pipe Catalog File
BHA Catalog File
Required overpull Drillstring Design Output Data 62*b*1

The 'Drillstring Design Output Data' 62*b*1 is generated by the 'Drillstring Design Algorithms' 68. The 'Drillstring Design Output Data' 62*b*1, that is generated by the 'Drillstring Design Algorithms' 68, includes the following types of output data:
Hole Section Begin Depth
Drill Collar 1 Length
Drill Collar 1 Weight
Drill Collar 1
Drill Collar 1 OD
Drill Collar 1 ID
Drill Collar 2 Length
Drill Collar 2 Weight
Drill Collar 2
Drill Collar 2 OD
Drill Collar 2 ID
Heavy Weight Length
Heavy Weight Weight
Heavy Weight
Heavy Weight OD
Heavy Weight ID
Drill Pipe Length
Drill Pipe Weight
Pipe
Pipe OD
Pipe ID
Drill Pipe Tensile Rating
BHA tools
Duration
Kick Tolerance
Drill Collar 1 Linear Weight
Drill Collar 2 Linear Weight
Heavy Weight Linear Weight Drill Pipe Linear Weight
DC OD
DC ID
DC Linear Weight
HW OD
HW ID
HW Linear Weight
DP OD
DPID
DP Linear Weight Drillstring Design Logical Expressions 66

The following paragraphs will set forth the 'Drillstring Design Logical Expressions' 66. The 'Drillstring Design Logical Expressions' 66 will: (1) receive the 'Input Data 64a', including a 'plurality of Input Data calculation results' that has been generated by the 'Input Data 64a'; and (2) evaluate the 'Input Data calculation results' during the processing of the 'Input Data' 64a. A better understanding of the following 'Drillstring Design Logical Expressions 66' will be obtained in the paragraphs to follow when a 'functional description' is presented.

The Drillstring Design Logical Expressions 66, which evaluate the processing of the Input Data 64a, include the following:

Check that all drill string components will fit into the wellbore geometry, including after manual alteration of component size.

The first stand consists of a combination of a Positive Displacement Motor (PDM), a Measurement While Drilling (MWD) device, a Logging While Drilling (LWD) tool, and/or drill collars, and is named DC1. The actual configuration is based on the maximum inclination and dogleg severity in the hole section, using the following rules:

A PDM is required when the inclination and dogleg exceed the threshold values.

A MWD is required when the PDM is selected.

A LWD is suggested in the last hole section

Drillstring Design Algorithms 68

The following paragraphs will set forth the 'Drillstring Design Algorithms' 68. The 'Drillstring Design Algorithms' 68 will receive the output from the 'Drillstring Design Logical Expressions' 66 and process that 'output from the Drillstring Design Logical Expressions 66' in the following manner. DC is an acronym for 'Drill Collar', HW is an acronym for 'Heavy Weight', and DP is an acronym for 'Drill Pipe'. DC1 is 'Drill Coller 1', and DC2 is 'Drill Collar 2'. A better understanding of the following 'Drillstring Design Algorithms 68' will be obtained in the paragraphs to follow when a 'functional description' is presented. In the following, DF is a 'design factor' and 'WFT' is a 'weight/foot'.

(1) Read variables and constants;
(2) Read catalogs;
(3) Determine Outer Diameter DC1, DC2, HW and DP:
  (a) DC1 Outer diameter is obtained from table by using the Hole Size,
  (b) DP,
    Use Stiffness Ratio to Determine the Outer Diameter.
    $DP_{OD}$=Obtained from table by using the Hole Size (Bit Diameter)
    $DP_{OD}$<=$DC1_{OD}$,
  (c) DC2,
    Use Stiffness Ratio to Determine the Outer Diameter.
    $SR=Z_{BIG}/Z_{SMALL}$
    $Z=(\Pi/32)((OD^4-ID^4)/OD)$
    $SR<3.5$
    $DC2_{OD}$<=$DC1_{OD}$ & $DC2_{OD}$>=$DP_{OD}$,
  (d) HW,
    Use Stiffness Ratio to Determine the Outer Diameter.
    $SR=Z_{BIG}/Z_{SMALL}$
    $Z=(\Pi/32)((OD^4-ID^4)/OD)$
    $SR<3.5$
    $HW_{OD}$<=$DC2_{OD}$ & $HW_{OD}$>=$DP_{OD}$,
  (e) $DP_{OD}$<=$HW_{OD}$;
(4) Determine the maximum weight on bit used in the hole section;
(5) Determine Weight of DC1, DC2 and HW, where 'θ' is used for the wellbore inclination, and 'DF' is the Design Factor:

$$HW_w = \frac{WOB(DF)}{K_b * COS(\theta)} \left(\frac{5+\theta}{100}\right),$$

$$DC1_w + DC2_w = \frac{WOB(DF)}{K_b * COS(\theta)} \left(\frac{95-\theta}{100}\right), \text{ or}$$

$$DC1_w + DC2_w = \frac{WOB(DF)}{K_b * COS(\theta)} - HW_w,$$

$DC1_W = DC1_L * DC1_{WFT}$,
$DC2_W = (DC1+DC2) - DC1$;

(6) Determine Length of DC1, DC2, HW, DP:
  (a) $DC1 = DC1_L = 90$ Feet=1 Stand=3 Joint,
  (b) $DC2 = DC2_L = DC2_W/DC2_{WFT}$,
  (c) $HW-HW_L = HW_W/HW_{WFT}$,
  (d) $DP-DP_L$=(Bit Section Length)−($DC1_L-DC2_L-HW_L$);
(7) Determine the tensile Risk:
  (a) Take the rating of the top most Drill Pipe (Premium 80%),
  (b) Tensile Risk=(($\Sigma(W_{Components})* K_b$)+Min. Overpull)/(Pipe Tensile Rating* 0.8);
(8) Calculate cost, based on the duration to drill the section; and
(9) Calculate the kick tolerance volume and assign risk based on the well type.

Figure 18:
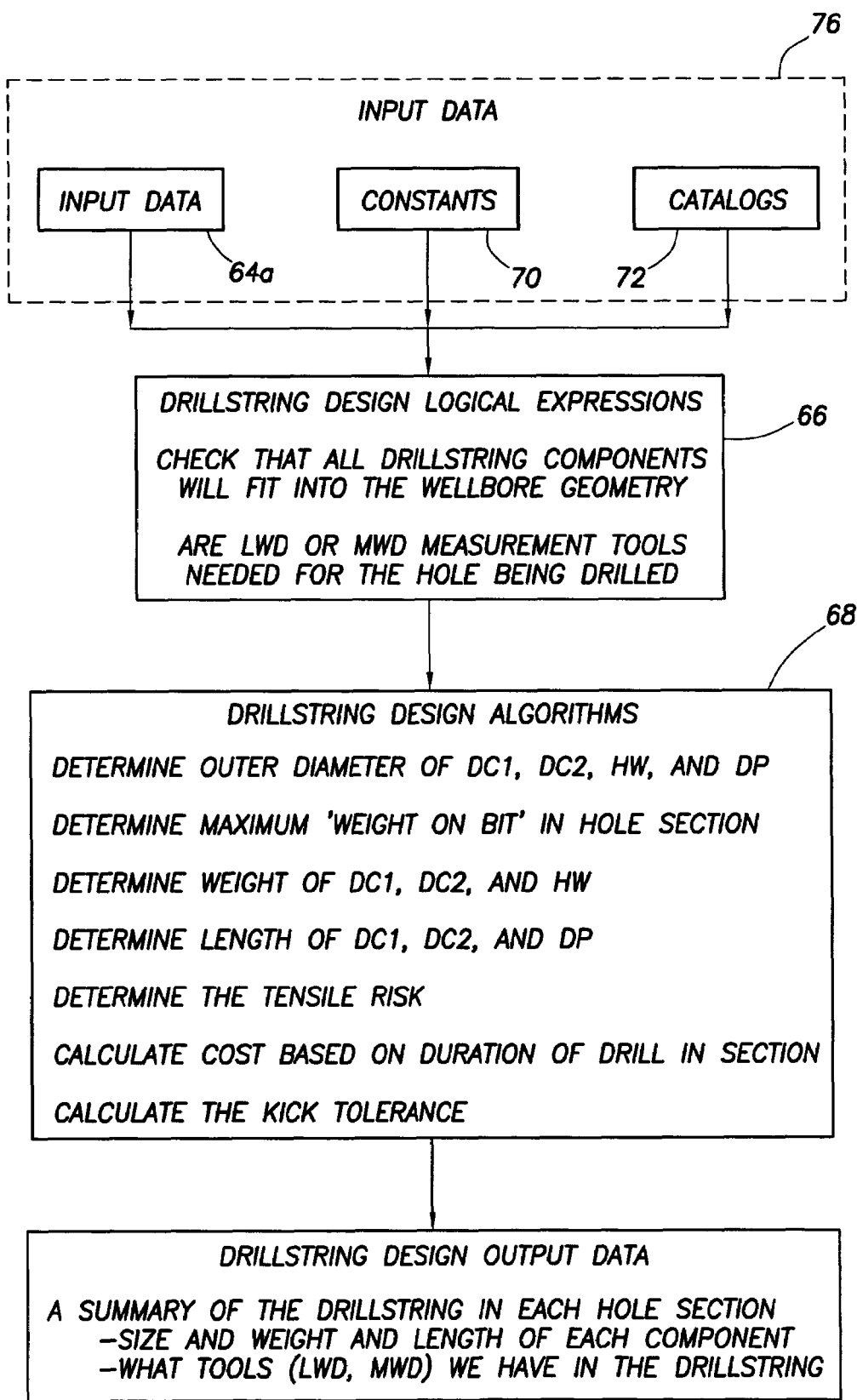
FIG. 18 illustrates a more detailed construction of the Automatic Well Planning Drillstring Design software system of FIGS. 16 and 17 including the Drillstring Design Algorithms and Logical Expressions.

Refer to FIG. 18 which will be used during the following functional description.

In FIG. 18, the Input Data 76 includes the 'Input Data' 64a, the Constants 70, and the Catalogs 72. The Input Data 76 will be provided as 'input data' to the Drillstring Design Logical Expressions 66. The Drillstring Design Logical Expressions 66 will: check that all drillstring components will fit into the wellbore geometry, and determine whether LWD or MWD measurement tools are needed for the hole being drilled. Then, the Drillstring Design Algorithms 68 will: determine the outer diameter for Drill Collar 1 (DC1), Drill Collar 2 (DC2), the Heavy Weights (HW), and the Drill Pipe (DP); determine the maximum 'Weight on Bit' in the hole section; determine the weight of DC1, DC2, and HW; determine the length of DC1, DC2, HW, and DP; determine the tensile risk; calculate the cost based on during of the drill in the section; and calculate the kick tolerance. Then, the Drillstring Design Output Data 62b1 will be generated and recorded or displayed on the 'recorder or display device' 62b in FIG. 16, the Drillstring Design Output Data 62b1 including: a summary of the drill string in each hole section, where that summary includes (1) size and weight and length of each components in the drill string, and (2) what tools (e.g., LWD, and MWD) exist in the drill string. A better understanding of the above referenced 'Drillstring Design Algorithms 68' will be obtained in connection with the 'functional description' which is presented in the following paragraphs.

Figure 19:
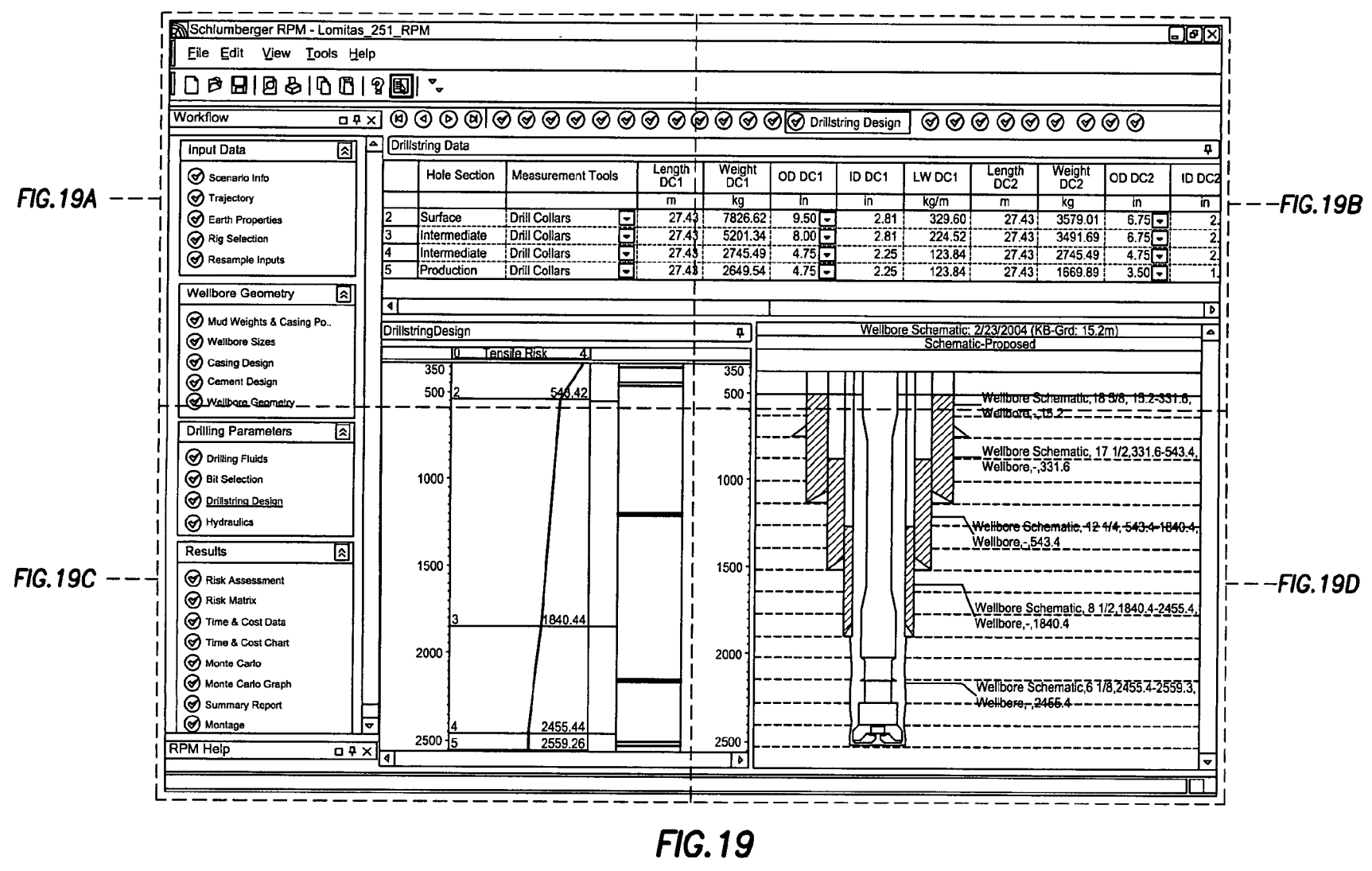
Figure 19A:
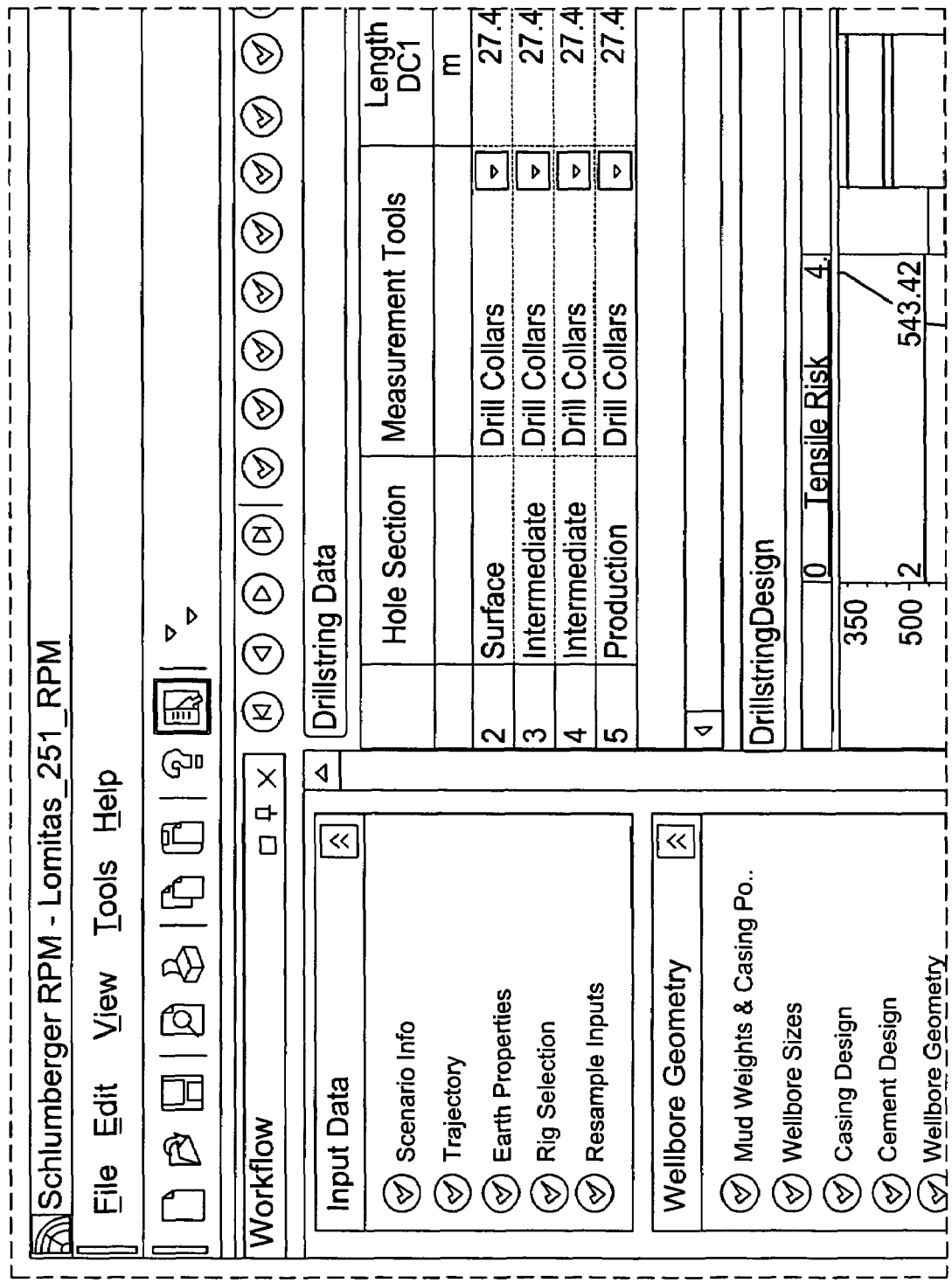
FIG. 19 illustrates a typical 'Drillstring Design output display' which can be recorded or displayed on the recorder or display device 62b in FIG. 16 and which displays the Drillstring Design Output Data 62b in FIG. 16.
Figure 19C:
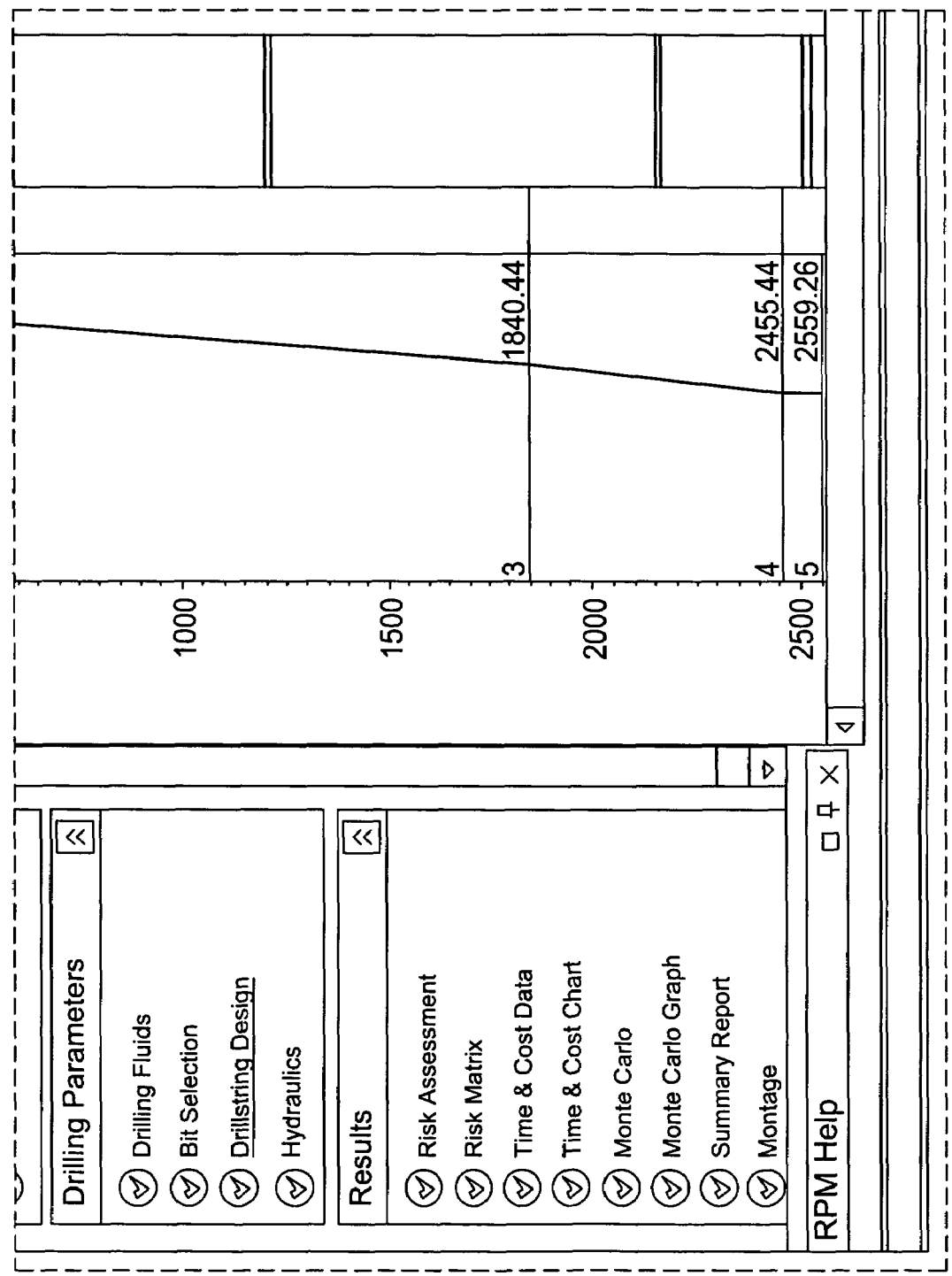
Figure 19D:
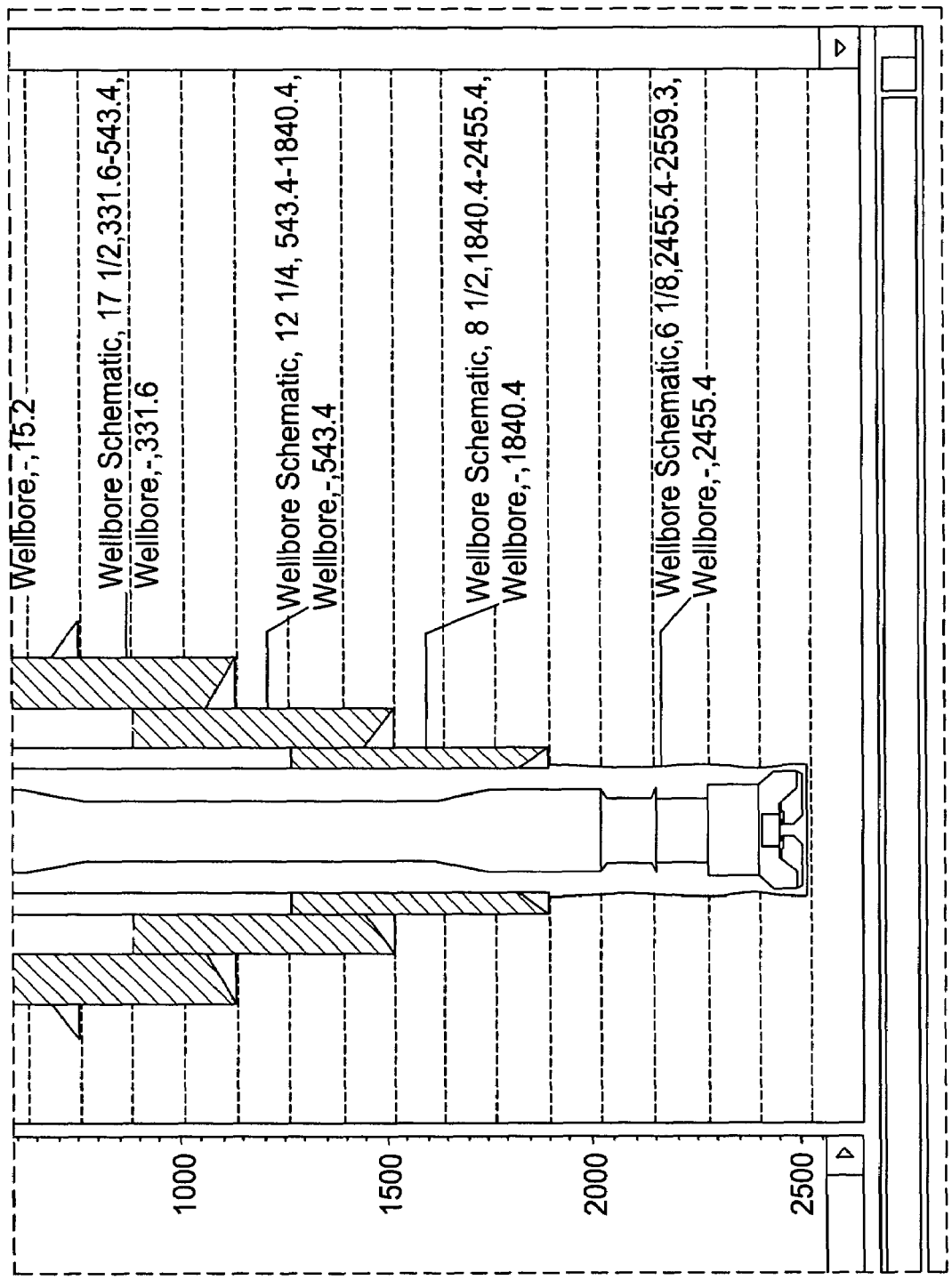

Referring to FIG. 19, a typical 'Drillstring Design output display' is illustrated which can be recorded or displayed on the recorder or display device 62b of FIG. 16 and which displays the Drillstring Design Output Data 62b1 in FIG. 16.

A functional description of the operation of the 'Automatic Well Planning Drillstring Design Software' 62c1 will be set forth in the following paragraphs with reference to FIGS. 1 through 19 of the drawings.

In the order of the workflow in FIG. 8, we know the wellbore 'hole size' and we know where the hole starts and where it finishes. The drill bits have been selected, and, from the drill bit, we know the drilling parameters, such as, how much 'weight on bit' is required to drill that bit, and how many revolutions per minute (RPM) are required to spin that bit. The last engineering task is the hydraulics task. This is the task where, based on the rate of penetration (ROP) for the particular drill bit, it is necessary to determine how much fluid do we need to pump in order to clean the hole free of cuttings. The hydraulics task reflects the 'pressure losses', and, in order to calculate the 'pressure losses', we need to know the structure of the drill string. As a result, drill string design takes place after bit selection and before hydraulics. From the bit selection, we know the sizes of the drill bits that are being used, we know how much 'weight on bit' is required for that particular bit, and we know, from the wellbore geometry, the casing size. All of the drill string components must be smaller than the drill bit size because all of the drill string components will be lowered into a newly drilled wellbore, and there needs to be sufficient room for the cuttings to be transported up to the surface between the wellbore and the Bottom Hole Assembly (BHA) components of the drillstring.

Recall the drillstring and compare the drillstring with an injection needle. Recalling the depths that are being drilled (e.g., 20,000 feet) using a five-inch Drill Pipe (DP), and comparing these dimensions, by analogy, with the injection needle, it would appear that the injection needle should be approximately 20 feet long. The drillstring is a very flexible hollow tube, since it is so much longer than the other dimensions of the drillstring pipe. The drillstring extends from a surface pipe to a bit pipe located downhole. The surface pipe is a common pipe, such as a five (5) inch pipe. If we are drilling a seventeen and one half (17½) inch wellbore, different components of the drillstring are needed to extend the drillstring from a 5 inch diameter surface pipe to a 17½ inch drill bit located downhole. Although most of the drillstring is in tension, we still need to have a 'weight on bit'. Therefore, we need to include 'components' in the drillstring which have a 'high-density' or a 'high-weight' that are located near to the drill bit, since those 'components' are in 'compression'. Those drillstring 'components' that are located near to the drill bit need to be 'stiffer' and therefore the outer diameter of those 'components' must have an outer diameter (OD) which is larger than the OD of the surface pipe (that is, the OD of the surface pipe is smaller than the OD of the 'components' near the drill bit). As a result, the 'components' located near the drill bit have a 'high-weight' and therefore a 'high outer diameter' (certainly higher than the surface pipe).

However, at an interface between a big OD pipe located near the drill bit (hereinafter called a 'drill collar' or 'DC') and a much smaller OD drill pipe (DP) located near the surface, a great deal of tension will accumulate (called, the 'stress bending ratio'). Therefore, a 'transition' is required between the big-OD drill collar located near the drill bit and the 'smaller-OD' drill pipe located near the surface. In order provide for the aforementioned 'transition', two different sizes of 'big-OD' drill collers are used; that is, Drill Coller 1 (DC1) and Drill Collar 2 (DC2). Between the Drill Collar 2 (DC2) and the 'smaller OD' drill pipe located near the surface, one more 'additional transition' is needed, and that 'additional transition' is called a 'heavy-weight' drill pipe or 'HW' drill pipe'. The HW drill pipe is the same in size relative to the 'smaller OD' drill pipe; however, the HW drill pipe has a smaller inner diameter (ID). As a result, the HW drill pipe is heavier than the 'smaller OD' drill pipe. This helps in producing a smooth 'stress transition' between a big OD pipe at the bottom of the wellbore and a smaller OD pipe at the surface of the wellbore. The 'stress bending ratio' (which must be a certain number) can be calculated, and, if that 'stress bending ratio' number is within certain limits, the aforementioned 'stress transition' (between the big OD pipe at the bottom of the wellbore and the smaller OD pipe at the surface of the wellbore) is smooth.

The drill bits must have a 'weight on bit' and that is delivered by the weights of the drill collars. The drill collars must fit within the open-hole size, therefore, the maximum size of the drill collars can be calculated. When the maximum size of the drill collars are known, we would know the number of 'pounds per foot' or 'weight' of the (drill collar) pipes. When one knows the amount of weight that is required to drill, we can back-calculate the length of the drill collars. In addition, we can also calculate the length of the heavy-weight 'HW' drill pipe that must be run into the wellbore in order to provide the aforementioned 'weight on bit'. The drill pipe (DP) located near the surface is not delivering any 'weight on bit' for the drill bit, however, the drill pipe (DP) is needed to provide a flow-path for fluids produced from downhole.

All of these drill-collar components, which hang off the drill pipes in the wellbore, are heavy. As a result, there exists a 'tension factor' pulling on the last drill pipe at the surface of the wellbore. Since the drill pipe at the surface of the wellbore can only handle a certain tension, one can calculate the 'applied or actual tension' and compare that 'applied or actual tension' with the 'available tension' or the 'designed tension'. That comparison can be expressed as a 'ratio'. As long as the 'available tension' is higher than the 'applied or actual tension', the 'ratio' is larger than '1'. If the 'available tension' is not higher than the 'applied or actual tension', that is, if the 'tension applied' is actually larger than the 'tension which the drill pipe possesses as a material characteristic', the 'ratio' will be smaller than '1' and consequently the pipe will break.

In addition, if we drill other than vertically in an Earth formation, special tools are needed. While drilling, if we need to turn the drillstring a certain 'degree' in a horizontal plane (such as, turning the drillstring from a north direction to an east direction), the aforementioned 'degree' of 'turn' of the drill string downhole is called an 'inclination'. A motor (called a Positive Displacement Motor, or PDM) is needed to make the 'turn'. Therefore, when a change of 'inclination' is needed, a motor is needed to produce that change of 'inclination'. When the motor is being used to produce that change of 'inclination', at any point in time, we need to know the 'direction' in which the motor is drilling and that 'direction' must be compared with a 'desired direction'. In order to measure the 'direction' of the motor, and therefore, the 'direction' of the drill bit, a 'measurement device' is needed, and that 'measurement device' is called an 'MWD' or a 'Measurement While Drilling' measurement device. The 'Algorithm' 68 associated with the 'Automatic Well Planning Drillstring Design software' 62c1 knows that, if the drill bit is drilling 'directionally', a PDM motor is needed and an MWD measurement device is also needed.

Another logging tool is used, which is known as 'LWD' or 'Logging While Drilling'. In certain wellbore 'hole sections', it is advantageous to include an 'LWD' logging tool in the tool string. In connection with the 'Algorithm' 68, in the last hole section of a wellbore being drilled (known as the 'production hole section'), a maximum number of measurements is desired. When a maximum number of measurements is needed in the last hole section of the wellbore being drilled, the 'LWD' tool is utilized. Therefore, in connection with the logic of the 'Algorithm' 68, the 'trajectory' of the wellbore being drilled is measured, and the 'hole sections' of the wellbore being drilled are noted. Depending on the 'hole section' in the wellbore where the drill bit is drilling the wellbore, and depending on the 'trajectory' and the 'inclination' and an 'azimuth' change, certain 'drillstring components' are recommended for use, and those 'drillstring components' include the Measurement While Drilling (MWD) measurement device, the Logging While Drilling (LWD) tool, and the Positive Displacement Motor (PDM).

Therefore, we know: (1) the 'weight on bit' that the drill bit requires, (2) the size of the bit, (3) the wellbore geometry, (4) the size of the 'drillstring components', (5) the 'trajectory' of the 'hole section', (6) whether we need certain measurement tools (such as MWD and LWD), (7) the size of those measurement tools, and (8) the size of the drill pipe (since it has a rating characteristic). A Drillstring Design Algorithm 68 computes the size of the smaller drillstring components (located near the surface) in order to provide a smooth stress transition from the drill bit components (located downhole) to the smaller components (located near the surface).

In connection with the Drillstring Design Output Data 62b1 of FIG. 17 which is generated by the Drillstring Design Algorithm 68, since we use drill pipe, the Drillstring Design Output Data 62b1 includes: (1) the size of the drill pipe, (2) the length of the drill pipe (including the heavy weight drill pipe), (3) the size and the length of the drill collars, and (4) the identity and the size and the length of any PDM or MWD or LWD tools that are utilized. In connection with all of the aforementioned PDM and MWD and LWD 'components', we also know the weight of these 'components'. Therefore, we can compute the 'total tension' on the drill string, and we compare the computed 'total tension' with 'another tension' which represents a known tension rating that the drill string is capable of handling.

The 'Input Data' 64 of FIG. 17 includes: (1) the trajectory, (2) the wellbore geometry including the casing size and the hole size, (3) the inclination associated with the trajectory, and (4) the drilling parameters associated with the drill bit that was previously selected.

The Drillstring Design Catalogs 70 of FIG. 17 include: the sizes of all the Drillstring components, and the OD and the ID and the linear weight per foot, and the tension characteristics (the metal characteristics) associated with these Drillstring components.

The Constants 70 of FIG. 17 include: Gravitational constants and the length of one drilling stand.

The Logical Expressions 66 of FIG. 17 will indicate whether we need the measurement tools (LWD, MWD) in connection with a particular wellbore to be drilled.

In addition, the rules in the Logical Expressions 66 are compared with the actual 'trajectory' of the drill bit in a hole section when drilling a deviated wellbore. In addition, the hole sections in the wellbore being drilled are compared with the requirements of those hole sections. For example, in a production hole section, an LWD tool is suggested for use. In hole sections associated with a directional well, a PDM motor and an LWD tool is suggested for use. In addition, the Logical Expressions 66 indicate that, if these PDM or LWD or MWD components are used, it is necessary to pay for such components. That is, the PDM and LWD and MWD components must be rented. Therefore, in the Logical Expressions 66, a cost/day is assigned, or, alternatively, a cost/foot.

In connection with the Drillstring Design Algorithms 68, a 'smooth transition' in size from the larger size pipe at the bottom near the bit to the smaller size pipe at the surface is provided; and, from the drill bit, we know, for each bit, how much 'weight on bit' that bit requires. That weight is delivered by the DC1, and the DC2 and the HW (heavy weights). Therefore, for each component, we must determine what length we need to have in order to provide that 'weight on bit'. If we are drilling a vertical well, all components are hanging. One factor associated with a vertical wellbore is that the entire weight of the drill string is hanging from all those components. However, if the well is deviated (such as 45 degrees), about 30% of the weight is lost. When drilling inside a certain inclination, longer drillstring components are required in order to provide the same weight. Therefore, the Algorithm 68 corrects for the inclination.

In connection with the 'tensile risk', if we know the total weight that is hanging on the drill pipe, we also need to know the 'tensile capacity' that the drill pipe has at the surface. As a result, we compare the 'total tension' with the 'maximum allowable (or potential) tension'. If the 'total tension' and the 'maximum allowable (or potential) tension' are expressed as a 'ratio', as the 'ratio' approaches '1', the greater the likelihood that the pipe will fail. Therefore, in connection with 'tensile risk', we compute the 'amount of tension applied', and compare that with the 'maximum allowable tension to be applied'.

In connection with cost, drill pipes and drill collars come with a rig, and we already paid for the rig on a per-day basis. If we need the specialized tools (e.g., PDM or MWD or LWD), we need to rent those tools, and the rental fee is paid on a daily basis. We need to compute how long we are going to use those tools for each drill section. If we know the time in days, we can calculate how much we need to pay. If we use a PDM motor, for example, a back up tool is needed for stand by. The stand by tool is paid at a lower rate.

In connection with the kick tolerance, the 'kick tolerance' is a volume of gas that can flow into the wellbore without any devastating effects. We can handle gas flowing into the well as long as the gas has a small volume. We can compute the 'volume' of gas that we can still safely handle and that volume is called the 'kick tolerance'. When computing the 'volume', during volumetric calculations, the 'volume' depends on: (a) hole size, and (b) the components in the drill string, such as the OD of the drill collars, the OD of the drill pipe, and the HW and the hole size. The 'kick tolerance' takes into account the pore pressure and the fracture pressure and the inclination and the geometric configuration of the drill string. The Drillstring Design Algorithm 68 receives the pore pressure and the fracture pressure and the inclination and the geometric configuration of the drill string, and computes the 'volume of gas' that we can safely handle. That 'volume of gas' is compared with the 'well type'. Exploration wells and development wells have different tolerances for the 'maximum volume' that such wells can handle.

Therefore, the 'Automatic Well Planning Drillstring Design software' 62c1 receives as 'input data': the trajectory and the wellbore geometry and the drilling parameters, the drilling parameters meaning the 'weight on bit'. When the software 62c1 is executed by the processor 62a of the computer system of FIG. 16, the 'Automatic Well Planning Drillstring Design software' 62c1 will generate as 'output data': information pertaining to the drill string 'components' that are needed, a description of those 'components', such as the Outer Diameter (OD), the Inner Diameter (ID), the linear weight, the total weight, and the length of those 'components', the kick tolerance and the tensile risk. In particular, the Drillstring Design Output Data 62b1 includes a 'summary of the drill string in each hole section'; that is, from top to bottom, the 'summary of the drill string in each hole section' includes: the size and the length of the drill pipe, the size and the weight of the heavy weight (HW) drill pipe, the size and the weight of the Drill Collar 2 (DC2), the size and the weight of the Drill Collar 1 (DC1), and the identity of other tools that are needed in the drill string (e.g., do we need to have: a PDM, or a LWD, or an MWD in the drill string). For each 'component' in the drillstring, the following information is reported: the inner diameter, the length/weight, the total weight for each 'component', the kick tolerance (that volume of gas that we can safely handle).

Automatic Well Planning Software System—Workflow Control System Software

The 'Automatic Well Planning Workflow Control System software' represents a software system that is the first and only product to integrate the various tasks required to explicitly design an oil and gas well for the purposes of estimating the time and costs required along with the associated risks. The process dependencies allow the system to take advantage of the impact of each task's results on any task downstream in the workflow. The workflow can be modified to support the application of different technical solutions that could require a different sequence of tasks.

The 'Automatic Well Planning Workflow Control System software' integrates the entire well planning process from the Geoscientists interpretation environment of mechanical earth properties through the technical well design and operational activity planning resulting in the delivery of time estimates, cost estimates, and assessment, categorization, and summary of risk.

Figure 21:
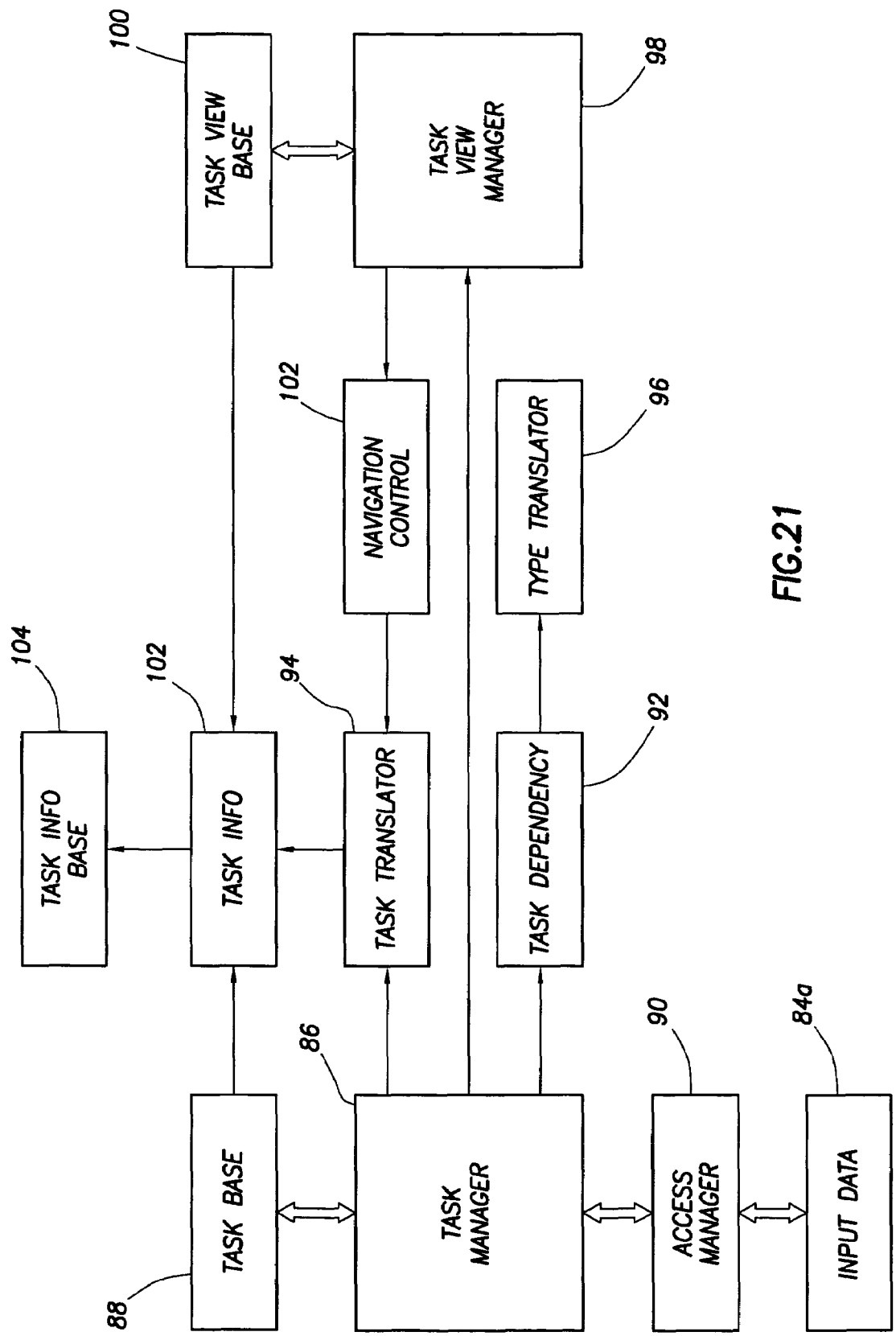
FIG. 21 illustrates a block diagram of the Automatic Well Planning Workflow Control System software.
Figure 22:
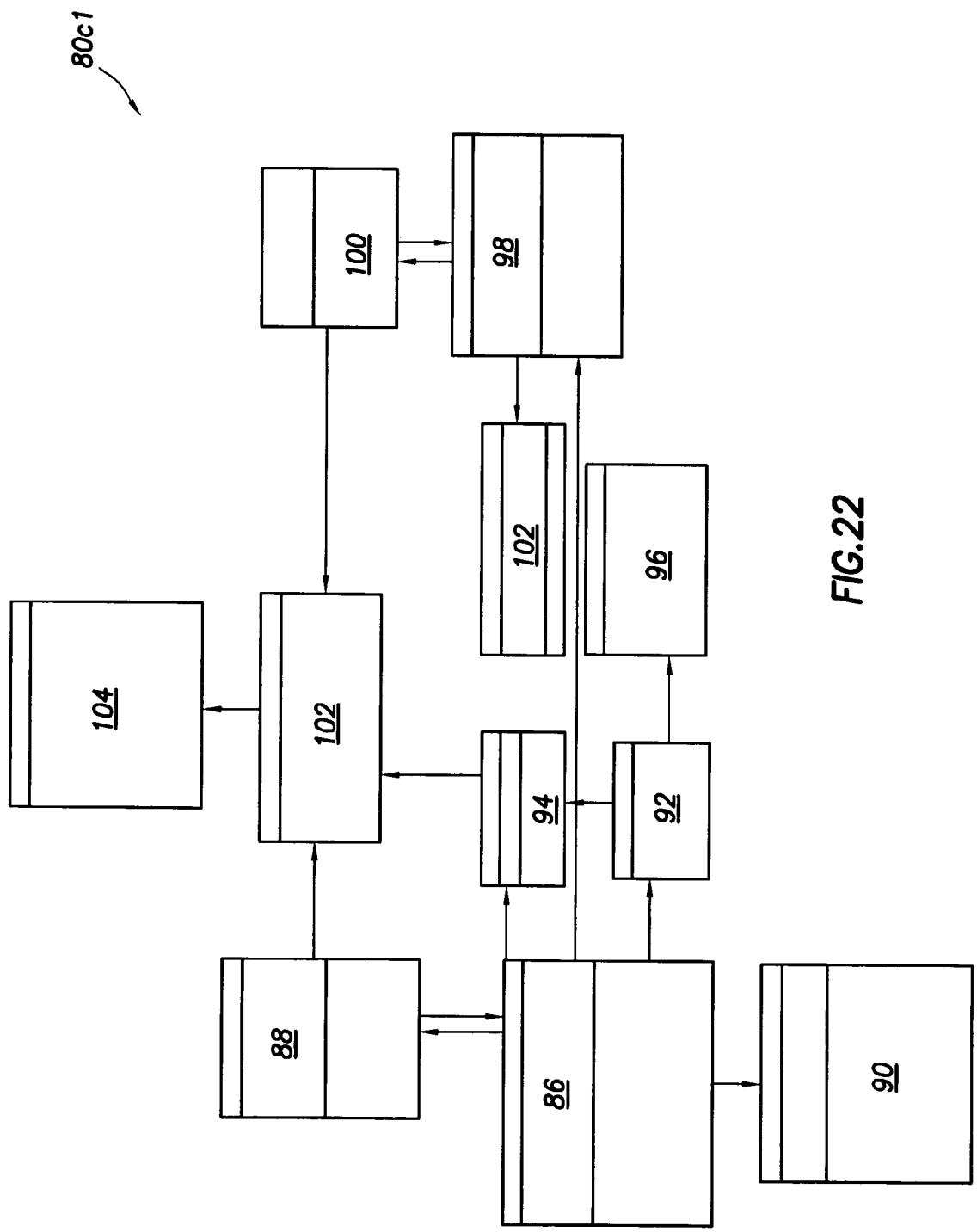
FIGS. 22A through 22F illustrate a more detailed construction of each of the blocks which comprise the Automatic Well Planning Workflow Control System software of FIG. 21.
Figure 22A:
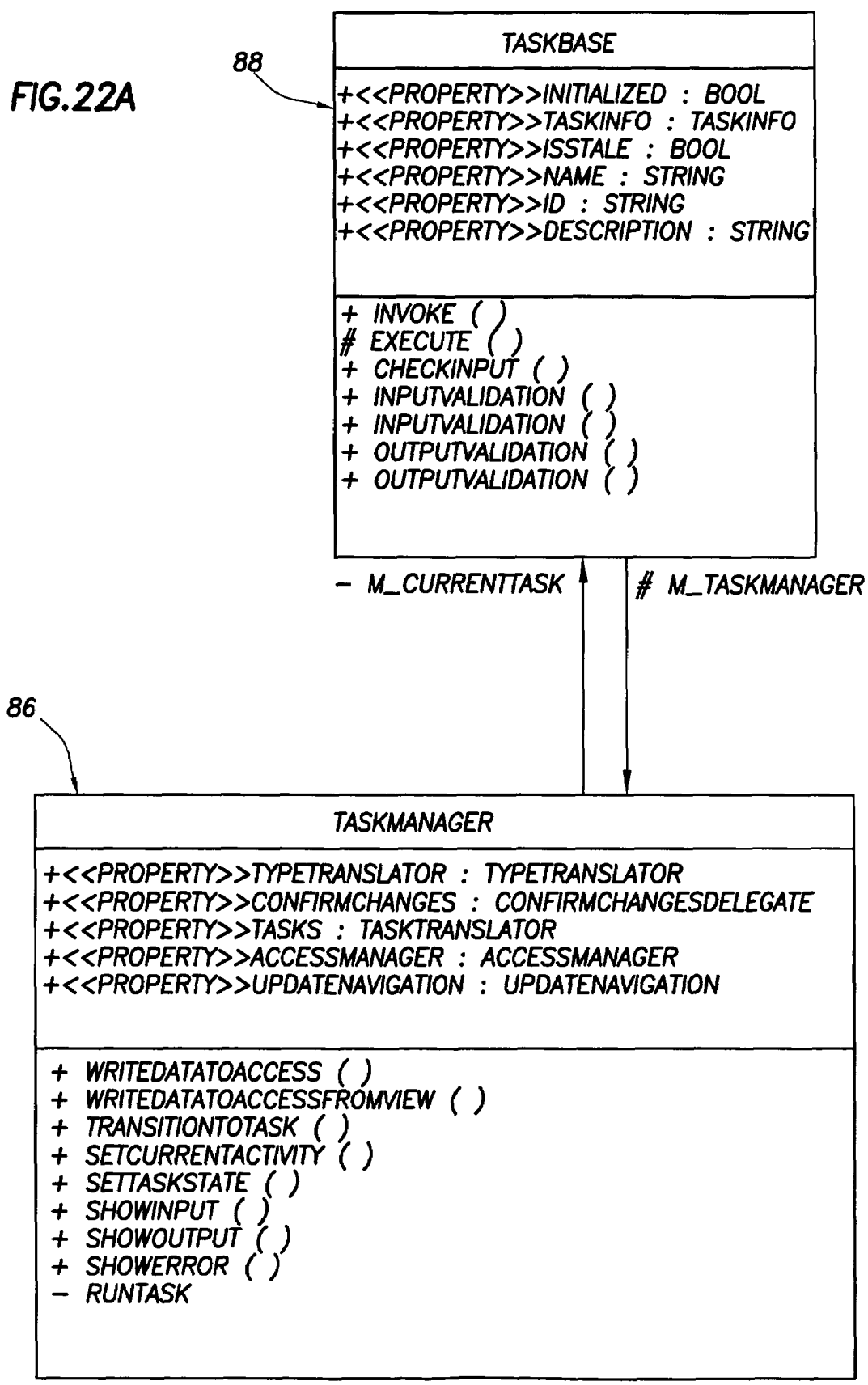
Figures 22B, 22C:
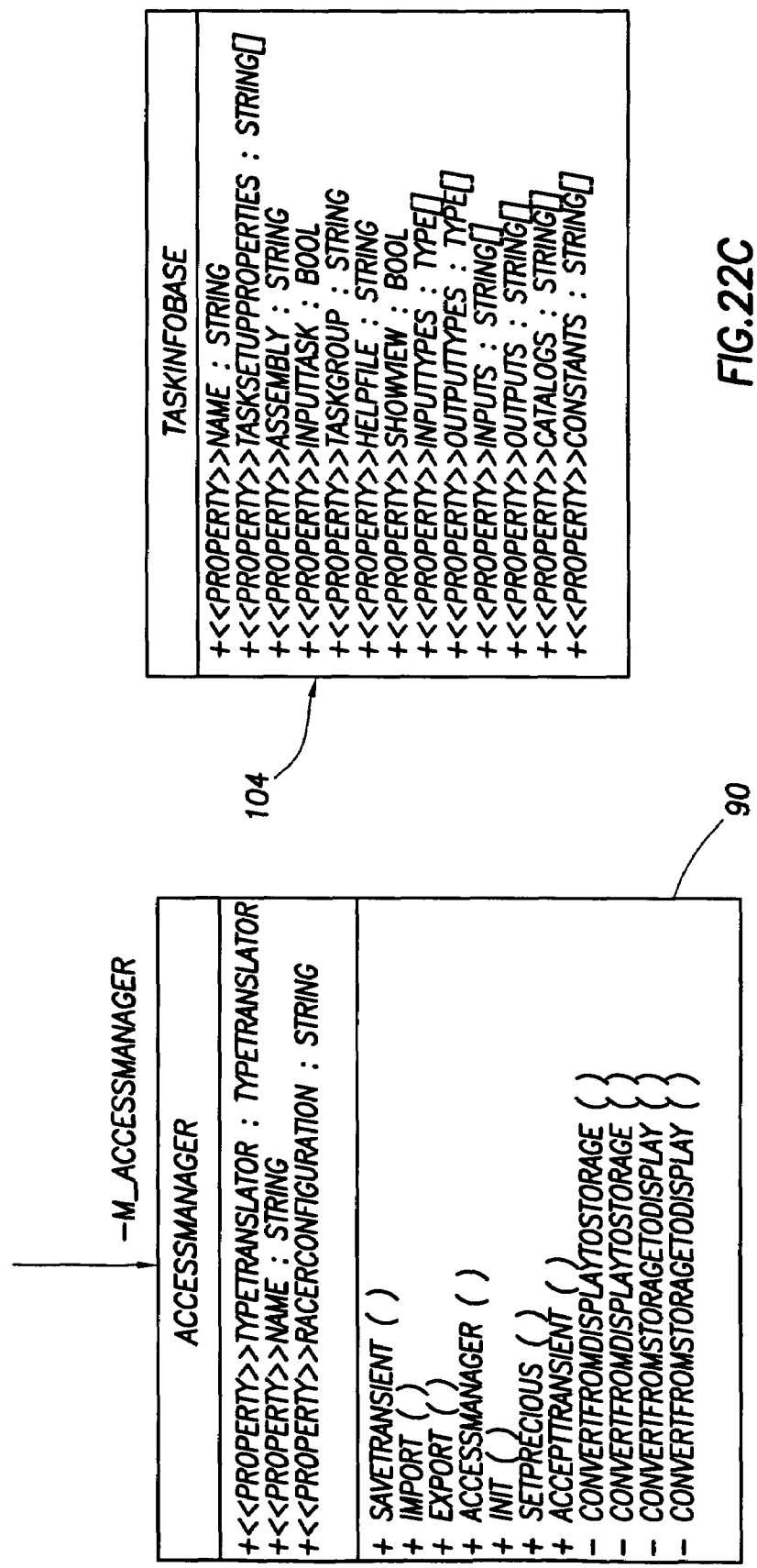
Figure 22D:
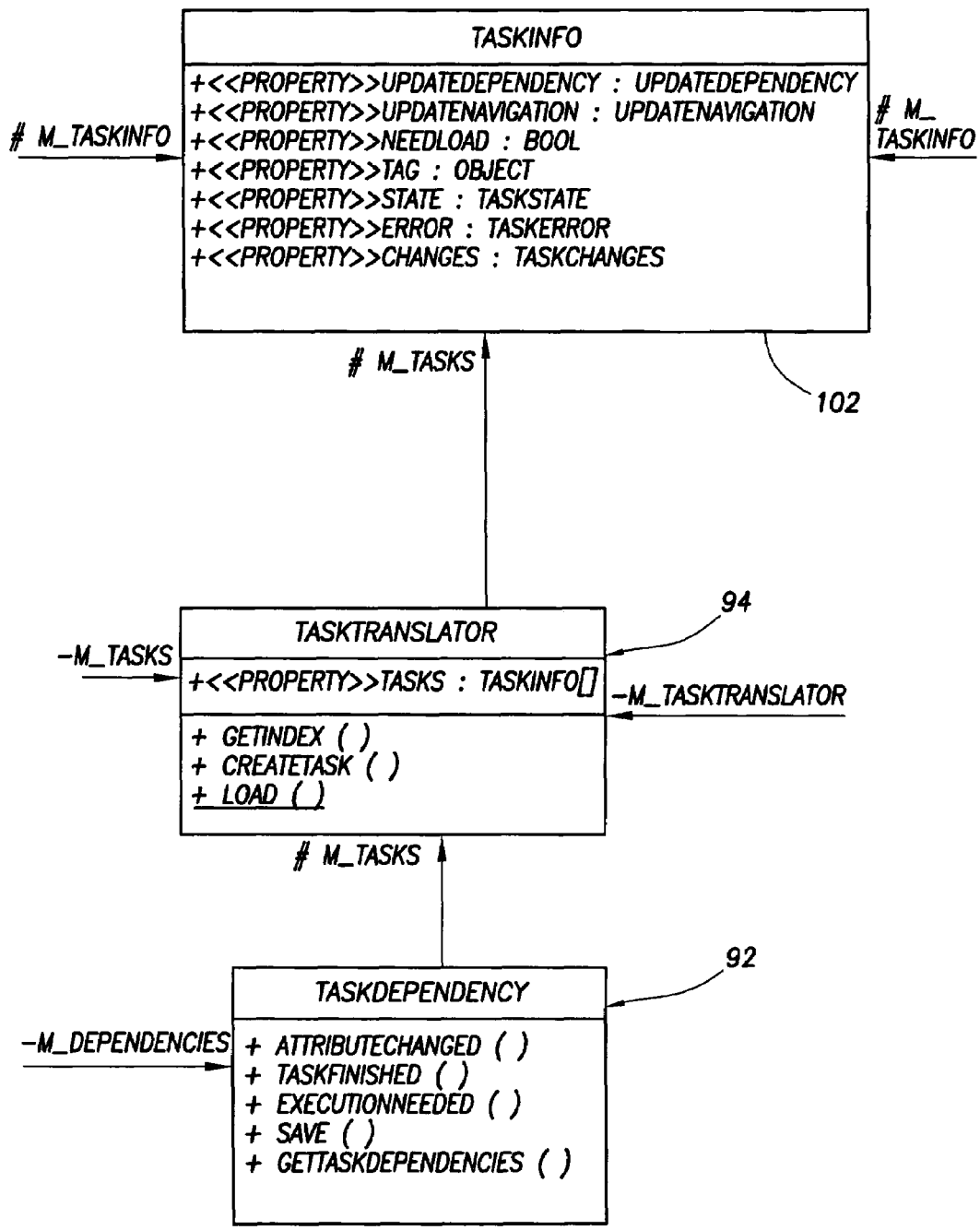
Figure 22F:
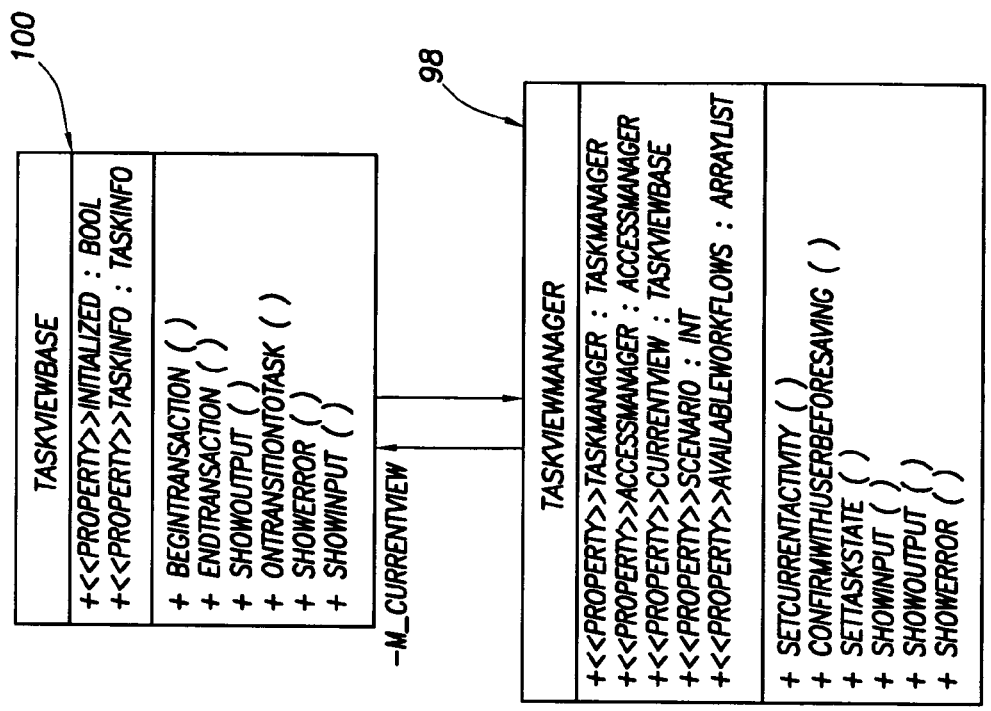
Figure 22E:
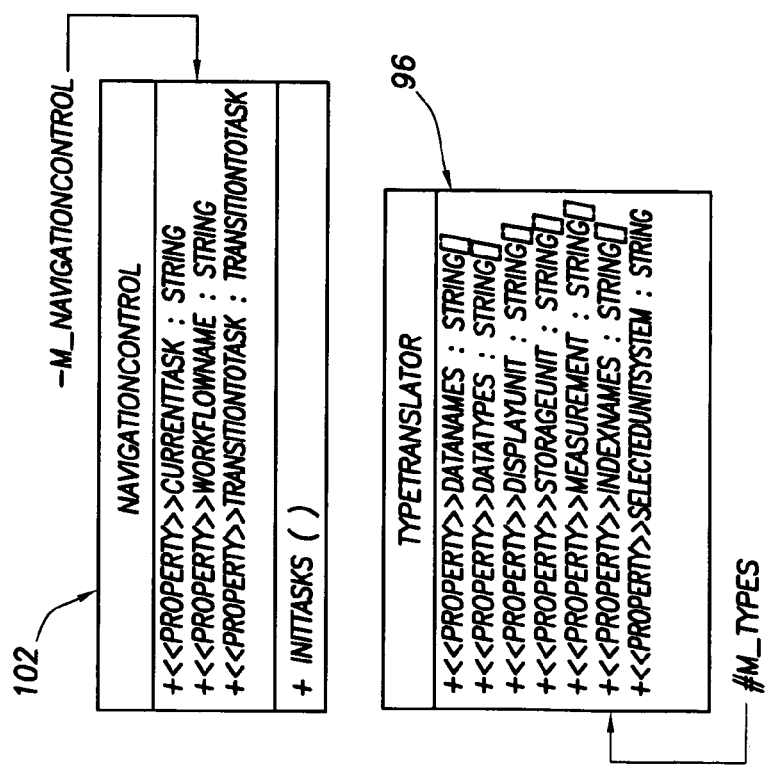

The solution that is provided by the 'Automatic Well Planning Workflow Control System software' is achieved with a open and flexible workflow control system which is illustrated in FIGS. 21 and 22. FIGS. 21 and 22 will be discussed later in this specification.

The 'Automatic Well Planning Workflow Control System software', illustrated in FIGS. 21 and 22, includes the following entities:

The workflow is defined in the tasks definition file. Each task has the following information: Name, Assembly, Type of Task, Help File Name, and Information if the associated task view should be shown Tasks define the data dependencies by defining which parameters are used as Input, Output or as constant attributes. Constant attributes are system wide defined attributes. To specify the attributes, the same names similar to that which is specified in the parameter definition are used.

After loading a new workflow definition into the system, the task dependency map (TaskDependencies) is created. This map is a 2 dimensional array where the rows are defining the attributes while the columns define the tasks. This map enables a very performing check of task dependencies and it can ensure that all necessary input attributes are available as a task is loaded.

Task follow a strict model/view/Control pattern, where the view part is a subclass of TaskViewBase, the Model part is a subclass of TaskInfo, and the Control is subclassed from TaskBase. The system is architectured in such a way that every task can run in batch and the TaskManager is the control for performing a workflow.

During the workflow, each task execution includes several steps. Each step returns a 'state' to the system to keep the user informed. The states are:

```
public enum TaskState
{
/// The Task has not run yet
    NotStarted,
    BeforeInput,
    InputFailed,
/// Input finished
    InputSucceeded
/// Input validation has failed
    InputCheckFailed,
/// Input validation has succeeded
    InputCheckSucceeded,
/// The Task is running
    Running,
/// The Task is running
    Recompute,
/// The Task execution was aborted
    ExecutionFailed,
/// The Task has successfully completed execution
    ExecutionSucceeded,
/// Output validation has failed
    OutputCheckFailed,
/// Output validation has succeeded
    OutputCheckSucceeded,
Finished
```

| LoadScenario | Slb.RPM.Task.LoadScenario | TaskInfo_InputData | LoadScenario.xml | TRUE |
| Trajectory | Slb.RPM.Task.Trajectory | TaskInfo_InputData | Trajectory.Xml | TRUE |

This file is loaded into a task registry (TaskTranslator) which is ensuring that the specified order of tasks is consistent (all input attributes have to be defined as a task is loaded) and to ensure that all tasks can be loaded into the system. The flexibility of the registry enables to load any task which inherits the task api's.

Parameters and Types are introduced into the system by loading them into a registry (TypeTranslator). The types declaration includes the Name, datatype (both native of derived types are possible), measurement type, display unit, storage unit CasingTop double[ ] Length m m MeasuredDepth As a result, it is very simple to introduce tasks which need additional parameters.

If the user decides to run 'n' steps at once, the system will run 'n−1' tasks in batch (no user interface) and will only show the results of the last task in its view. In the event that one of the 'n−1' tasks shows a sever problem, the system will load the view of the affected tasks and will resume at this stage until the user takes corrective measures.

Figure 20:
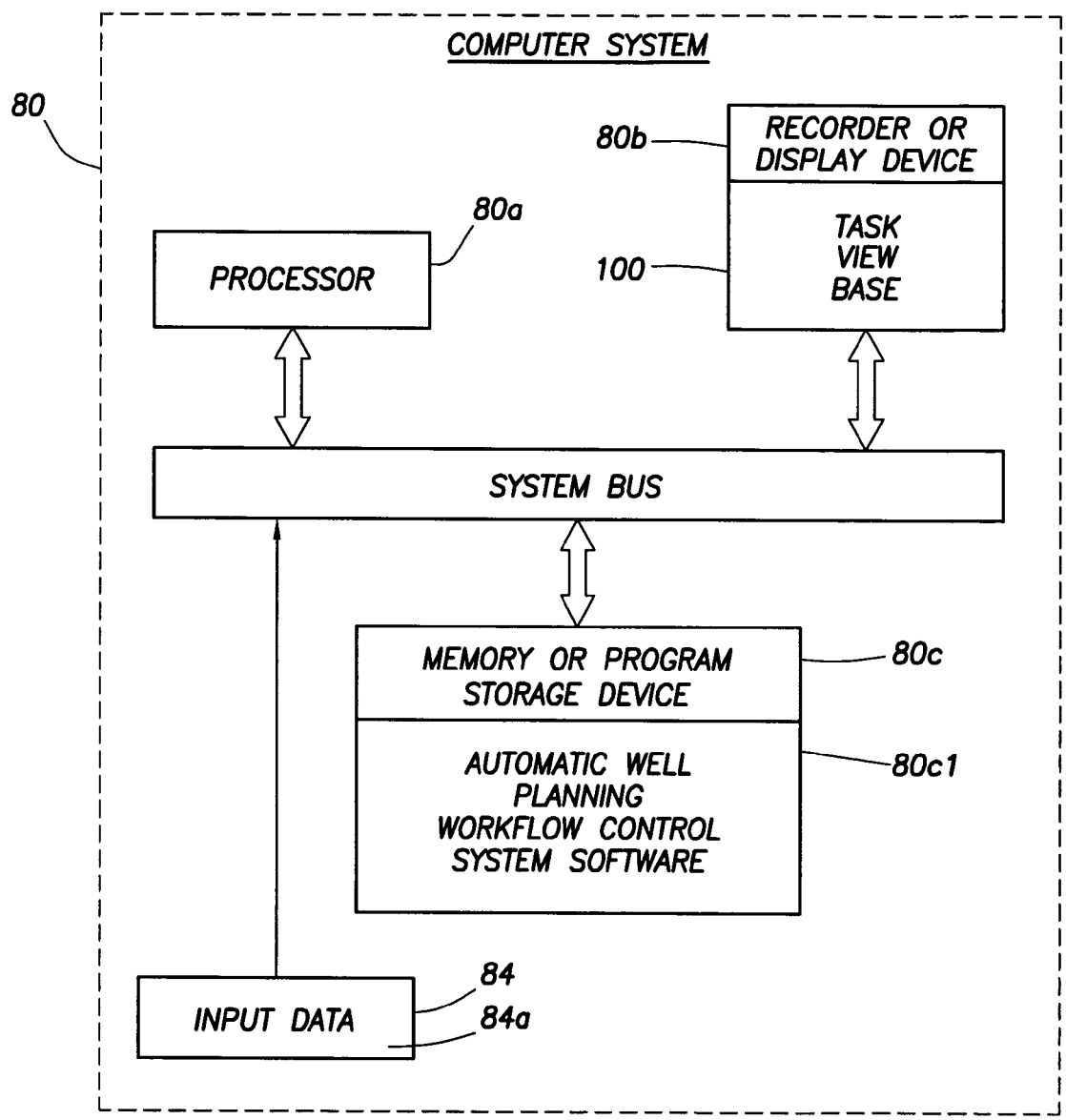
FIG. 20 illustrates a computer system of the types illustrated in FIGS. 9A, 12, and 16 which stores the Automatic Well Planning Workflow Control System software.

Referring to FIG. 20, a computer system 80 is illustrated. The computer system 80 is similar to the computer systems 18, 42, and 62 illustrated in FIGS. 9A, 12, and 16, respectively. In FIG. 20, the computer system 80 includes a processor 80a, a recorder or display device 80b, and a memory or program storage device 80c. The computer system 80 is adapted to receive Input Data 84a from a memory or other storage device 84 which stores that Input Data 84a. The recorder or display device 80b is adapted to record or display a 'task view base' 100, the 'task view base' being discussed later in this specification. The memory or program storage device 80c is adapted to store an 'Automatic Well Planning Workflow Control System software' 80c1. The 'Automatic Well Planning Workflow Control System software' 80c1 was initially stored on 'another storage device', such as a 'hard disk' or CD-Rom, the 'Automatic Well Planning Workflow Control System software' 80c1 being loaded from that 'hard disk' (or other storage device) into the 'memory or program storage device' 80c in FIG. 20. The Input Data 84a can be the Input Data 20a of FIG. 9A, or it can be the Input Data 44a of FIG. 16, or it can be the Input Data 64a of FIG. 16. The Computer System 80 of FIG. 20 may be a personal computer (PC). The Memory or Program Storage Device 80c is a computer readable medium or a program storage device which is readable by a machine, such as the processor 80a. The processor 80a may be, for example, a microprocessor, a microcontroller, or a mainframe or workstation processor. The Memory or Program Storage Device 80c, which stores the 'Automatic Well Planning Workflow Control System Software' 80c1, may be, for example, a hard disk, ROM, CD-ROM, DRAM, or other RAM, flash memory, magnetic storage, optical storage, registers, or other volatile and/or non-volatile memory.

Figure 23:
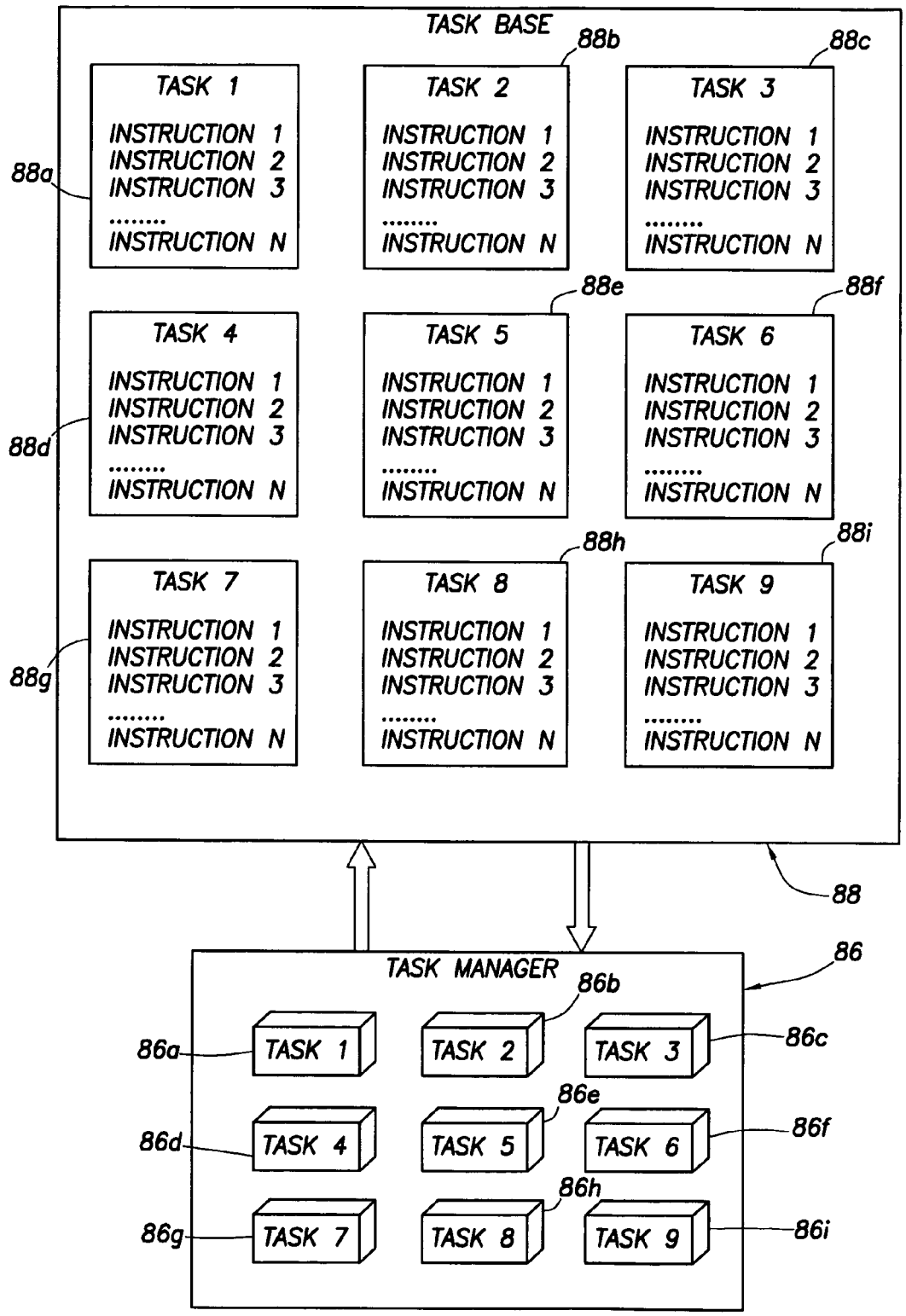
FIG. 23 illustrates a more detailed construction of the Task Base and the Task Manager associated with the Automatic Well Planning Workflow Control System software of FIGS. 20-22.

Referring to FIG. 21, a detailed construction of the 'Automatic Well Planning Workflow Control System software' 80c1 (hereinafter called 'Workflow Control System 80c1') is illustrated. In FIG. 21, the Workflow Control System 80c1 includes a 'Task Manager' 86, a 'Task base' 88, and an 'Access Manager' 90. The Task Manager 86 is the 'brain' of the Workflow Control System 80c1, the Task Manager 86 performing the function of a processor, similar to the processor 80a in FIG. 20. The Task Manager 86 stores a plurality of Tasks associated with the Workflow Control System 80c1; however, the Task Base 88 stores a plurality of 'instruction sets' associated, respectively, with the plurality of the Tasks in the Task Manager 86, one 'instruction set' in the Task Base 88 being reserved for each Task in the Task Manager 86. This concept is illustrated in FIG. 23, to be discussed later. The Access Manager 90 stores all of the data that is needed by each of the plurality of 'instruction sets' in the Task Base 88 associated with each of the Tasks in the Task Manager 86. Since the Task Manager 86 stores the plurality of Tasks, when a user selects a 'plurality of Tasks' via the Task Manager, the Task Manager 86 will receive and store the 'selected plurality of Tasks' which were selected by the user.

The Workflow Control System 80c1 also includes a 'Task Dependency' block 92, a 'Task Translator' block 94, and a 'Type Translator' block 96. As noted earlier, when the user selects a 'plurality of Tasks' via the Task Manager 86, the 'selected plurality of Tasks' will be stored in the Task Manager 86. The Task Manager 86 will then access the Task Base 88 to locate and execute the plurality of 'instruction sets' stored in the Task Base 88 which are associated with the 'selected plurality of Tasks'. However, the Task Dependency block 92 will ensure that the plurality of 'instruction sets' located in the Task Base 88 by the Task Manager 86 are located and executed in the 'proper order', where the term 'proper order' is defined by the 'order' of the 'plurality of Tasks' that were previously selected by the user. When the plurality of 'instruction sets' are located in the Task Base 88 by the Task Manager 86, and when the 'proper order' of the plurality of 'instruction sets' in the Task Base 88 is established by the Task Dependency block 92, the Task Translator block 94 and the Type Translator block 96 will ensure that each of the plurality of 'instruction sets' located in the Task Base 88, associated with the selected plurality of Tasks in the Task Manager 86 (as selected by the user), will receive its corresponding 'set of input data' from the Access Manager 90, and that corresponding 'set of input data' will be received by each of the 'instruction sets' in the Task Base 88 in the 'proper form'.

The Workflow Control System 80c1 also includes a 'Task View Manager' 98, a 'Task View Base' 100, and a 'Navigation Control' 102. Therefore, when the plurality of 'instruction sets' are located in the Task Base 88 and the 'proper order' of the 'instruction sets' are established by the Task Dependency block 92, the Task Manager 86 will execute the plurality of 'instruction sets' in the 'proper order' (as selected by the user), and, during the execution of the plurality of 'instruction sets' by the Task Manager 86, the Task Translator 94 and the Type Translator 96 will ensure that each of the plurality of 'instruction sets' will, during its execution, receive its 'set of input data' from the Access Manager 90 in the 'proper form'. During and after the execution, by the Task Manager 86, of the plurality of 'instruction sets' in the Task Base 88, a 'set of results' will be generated by the Task Manager 86, the 'set of results' being received by the Task View Manager 98. The Task View Manager 98 will convert a 'first unit of measure' associated with the 'set of results' generated by the Task Manager 86 into a 'second unit of measure' associated with the 'set of results'. The 'second unit of measure' associated with the 'set of results' is then transferred from the Task View Manager 98 to the Task View Base 100, where the Task View Base 100 will record or display the 'set of results' in the 'second unit of measure' on the recorder or display device 80b of the computer system 80 of FIG. 20. In the above description, the plurality of Tasks in the Task Base 88 were executed by the Task Manager 86 in the 'proper order', in accordance with the function of the Task Dependency block 92; and, during that execution, each of the plurality of Tasks received its 'set of input data' in the 'proper form' in accordance with the functions of the Task Translator 94 and the Type Translator 96. Assume that the user wants to change 'some of the sets of input data' associated with some of the plurality of Tasks (thereby creating 'changed sets of input data'), and then reexecute (by the Task Manager 86) the plurality of 'instruction sets' (stored in the Task Base 88) corresponding to the plurality of Tasks (in the Task Manager 86) while using the 'changed sets of input data' during the re-execution of the 'instruction sets' thereby creating a 'new set of results'. The Navigation Control 102 will allow the user to change 'some of the sets of input data' and then re-execute the plurality of 'instruction sets' to thereby create the 'new set of results'. In fact, the user can change any of the 'sets of input data' associated with any of the plurality of Tasks, and then re-execute the plurality of 'instruction sets' associated with the plurality of Tasks to create the 'new set of results'. This concept will be discussed later in this specification with reference to FIGS. 23-28.

The Workflow Control System 80c1 also includes a 'Task Info' block 102 and a 'Task Info Base' block 104. The Task Info Base block 104 is used only when setting-up the 'workflow' comprised of the plurality of Tasks selected by the user. When the 'workflow' is set-up, the Task Info Base block 104 is no longer used. The Task Info block 102 will generate a 'state', associated with 'each Task' of the plurality of Tasks, after 'each Task' has been executed by the Task Manager 86. A plurality of the 'states', associated with the execution of 'each Task' which are generated by the Task Info block 102, are set forth above and are duplicated below, as follows:

```
public enum TaskState
{
    /// The Task has not run yet
        NotStarted,
        BeforeInput,
        InputFailed,
    /// Input finished
        InputSucceeded
    /// Input validation has failed
        InputCheckFailed,
    /// Input validation has succeeded
        InputCheckSucceeded,
    /// The Task is running
        Running,
    /// The Task is running
        Recompute,
    /// The Task execution was aborted
        ExecutionFailed,
    /// The Task has successfully completed execution
        ExecutionSucceeded,
    /// Output validation has failed
        OutputCheckFailed,
    /// Output validation has succeeded
        OutputCheckSucceeded,
    Finished
```

Referring to FIGS. 22A through 22F, a more detailed construction of each of the blocks which comprise the Automatic Well Planning Workflow Control System software 80c1 of FIG. 21 is illustrated.

Referring to FIG. 23, a more detailed construction of the Task Manager 86 and the Task Base 88 of FIGS. 21 and 22 is illustrated. In FIG. 23, a 'concept' was presented earlier, as follows: the Task Manager 86 stores a plurality of Tasks associated with the Workflow Control System 80c1; however, the Task Base 88 stores a plurality of 'instruction sets' associated, respectively, with the plurality of the Tasks in the Task Manager 86, one 'instruction set' in the Task Base 88 being reserved for each Task in the Task Manager 86. FIG. 23 illustrates that 'concept'. In FIG. 23, the Task Base 88 includes a plurality of 'instruction sets' including: a 'task 1 instruction set' 88a, a 'task 2 instruction set' 88b, a 'task 3 instruction set' 88c, a 'task 4 instruction set' 88d, a 'task 5 instruction set' 88e, a 'task 6 instruction set' 88f, a 'task 7 instruction set' 88g, a 'task 8 instruction set' 88h, and a 'task 9 instruction set' 88i. The Task Manager 86 includes: a 'task 1' 86a corresponding to the 'task 1 instruction set 88a', a 'task 2' 86b corresponding to the 'task 2 instruction set 88b', a 'task 3' 86c corresponding to the 'task 1 instruction set 88c', a 'task 4' 86d corresponding to the 'task 1 instruction set 88d', a 'task 5' 86e corresponding to the 'task 1 instruction set 88e',a 'task 6' 86f corresponding to the 'task 1 instruction set 88f', a 'task 7' 86g corresponding to the 'task 1 instruction set 88g', a 'task 8' 86h corresponding to the 'task 1 instruction set 88h', and a 'task 9' 86i corresponding to the 'task 1 instruction set 88i'. When the Task Manager 86 executes 'task 1' 86a in the Task Manager, the Task Manager 86 is really executing the 'task 1 instruction set 88a' in the Task Base 88; similarly, when the Task Manager 86 executes 'task 2' 86b in the Task Manager, the Task Manager 86 is really executing the 'task 2 instruction set 88b' in the Task Base 88; and when the Task Manager 86 executes 'task 3' 86c in the Task Manager, the Task Manager 86 is really executing the 'task 3 instruction set 88c' in the Task Base 88; and when the Task Manager 86 executes 'task 4' 86d in the Task Manager, the Task Manager 86 is really executing the 'task 4 instruction set 88d' in the Task Base 88; and when the Task Manager 86 executes 'task 5' 86e in the Task Manager, the Task Manager 86 is really executing the 'task 5 instruction set 88e' in the Task Base 88; and when the Task Manager 86 executes 'task 6' 86f in the Task Manager, the Task Manager 86 is really executing the 'task 6 instruction set 88f' in the Task Base 88; and when the Task Manager 86 executes 'task 7' 86g in the Task Manager, the Task Manager 86 is really executing the 'task 7 instruction set 88g' in the Task Base 88; and when the Task Manager 86 executes 'task 8' 86h in the Task Manager, the Task Manager 86 is really executing the 'task 8 instruction set 88h' in the Task Base 88, and when the Task Manager 86 executes 'task 9' 86i in the Task Manager, the Task Manager 86 is really executing the 'task 9 instruction set 88i' in the Task Base 88.

Figure 24:
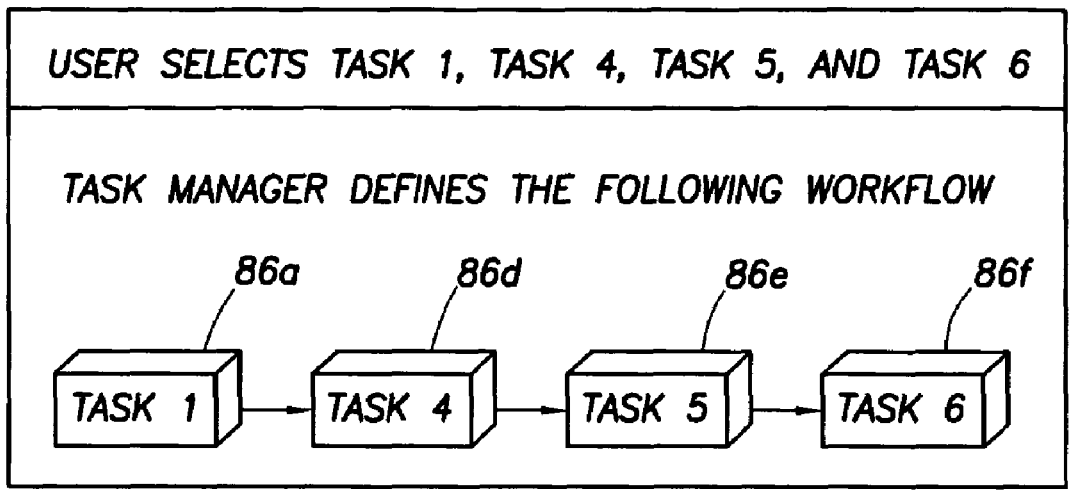
FIGS. 24 and 25 illustrate a function associated with the Task manager of the Automatic Well Planning Workflow Control System software pertaining to the selection by a user of one or more tasks to be performed in sequence.
Figure 25:
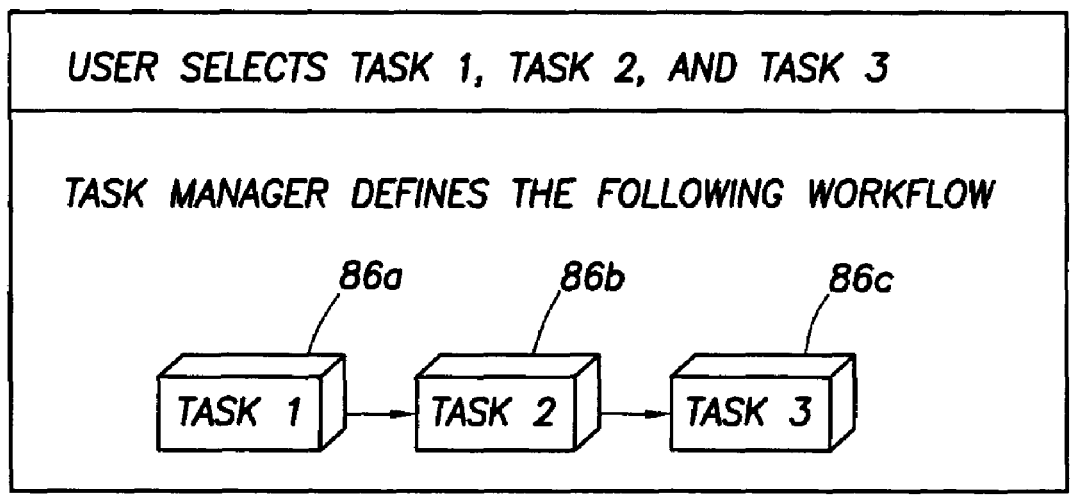

Referring to FIGS. 24 and 25, assume that the user selects task 1, task 4, task 5, and task 6 in the Task Manager 86 of FIG. 23; in that case, the Task Manager 86 defines the workflow shown in FIG. 24, as follows: 'task 1' followed by 'task 4' followed by 'task 5' followed 'task 6'. Similarly, assume that the user selects task 1, task 2, and task 3 in the Task Manager 86 of FIG. 23; in that case, the Task Manager 86 defines the workflow shown in FIG. 25, as follows: 'task 1' followed by 'task 2' followed by 'task 3'.

Figure 26:
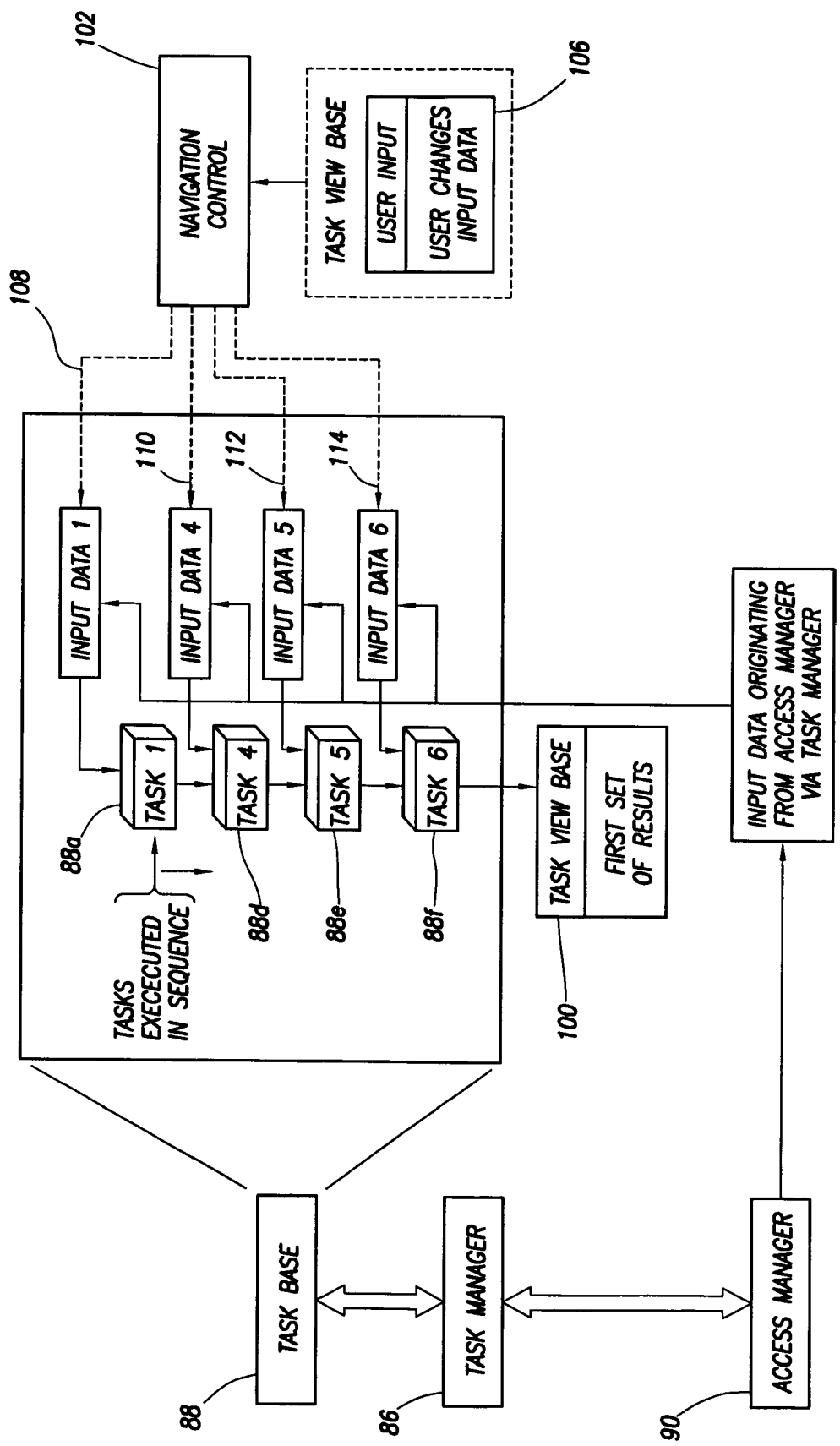
FIG. 26 illustrates a more detailed construction of the task base including its interface with a Navigation Control, an Access Manager, and a Task View Base.

Referring to FIG. 26, another construction of the 'Automatic Well Planning Workflow Control System software' 80c1 of FIGS. 21 and 22 (that is, the 'Workflow Control System 80c1') is illustrated. In FIG. 26, assuming from FIG. 24 that the user selects: 'task 1', 'task 4', 'task 5', and 'task 6', the Task Manager 86 defines the workflow shown in FIG. 24: 'task 1' 86a followed by 'task 4' 86d followed by 'task 5' 86e followed by 'task 6' 86f. In that case, in FIG. 23, in accordance with the workflow shown in FIG. 24, the Task Manager 86 will execute the following 'instruction sets' which are stored in the Task Base 88 in the following order, as follows: 'task 1 instruction set 88a' followed by 'task 4 instruction set 88d' followed by 'task 5 instruction set 88e' followed by 'task 6 instruction set 88f'. In FIG. 26, the Task Manager 86 executes, in sequence, the 'task 1 instruction set' 88a, the 'task 4 instruction set' 88d, the 'task 5 instruction set' 88e, and the 'task 6 instruction set' 88f which are stored in the Task Base 88 as shown in FIG. 26. The Access Manager 90 (via the task translator 94 and the type translator 96 of FIG. 21) will provide the required input data to each of the tasks, as follows: 'Input Data 1' is provided to 'task 1 instruction set' 88a, 'Input Data 4' is provided to 'task 4 instruction set' 88d, 'Input Data 5' is provided to 'task 5 instruction set' 88e, and 'Input Data 6' is provided to 'task 6 instruction set' 88f. When the tasks ('task 1' 88a followed by 'task 4' 88d followed by 'task 5' 88e followed by 'task 6' 88f) are executed in sequence as shown in FIG. 26, the Task View Base 100 will record or display (on the recorder or display device 80b in FIG. 20) a 'First Set of Results' as shown in FIG. 26. However, the user can change any of the above sets of input data by interfacing with the Task View Base 100 to use the Navigation Control 102; in that case, the Task Manager 86 will re-execute 'only those tasks which were affected by the changed input data' (i.e., 'task 1' 88a followed by 'task 4' 88d followed by 'task 5' 88e followed by 'task 6' 88f in FIG. 27; and 'task 5' 88e followed by 'task 6' 88f in FIG. 28) and use the 'changed input data' during the re-execution of 'only those tasks which were affected by the changed input data'. In FIG. 26, for example, the user can interface with the Task View Base 100 to change the input data to each task (block 106 in FIG. 26) thereby producing 'changed input data'. That is, the user can change 'Input Data 1' for 'Task 1' 88a or 'Input Data 4' for 'Task 4' 88d or 'Input Data 5' for 'Task 5' 88e or 'Input Data 6' for 'Task 6' 88f. The Navigation Control 102 will receive that 'changed input data' from block 106. In FIG. 26, however, lines 108, 110, 112, and 114 which extend from the Navigation Control 102 to the 'Input Data' for each 'Task' are 'dotted lines' which indicate that the Navigation Control 102 has not yet changed any of the input data for any task.

Figure 27:
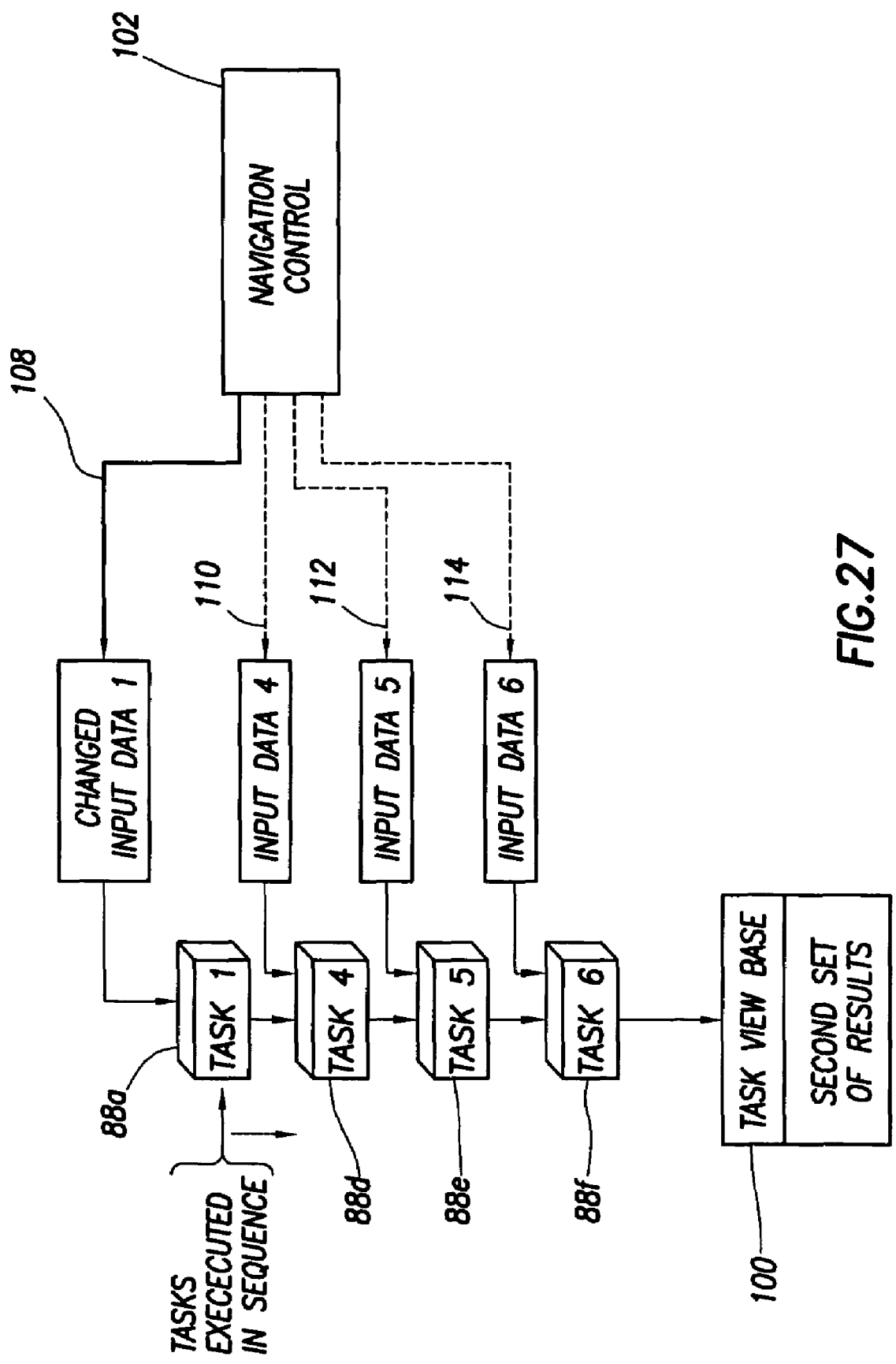
FIGS. 27 and 28 illustrate a function associated with the Navigation Control

Referring to FIG. 27, recall that the user can interface with the Task View Base 100 to change the input data to each task (block 106 in FIG. 26) thereby producing 'changed input data'; that is, the user can change 'Input Data 1' for 'Task 1' 88a, or 'Input Data 4' for 'Task 4' 88d, or 'Input Data 5' for 'Task 5' 88e, or 'Input Data 6' for 'Task 6' 88f; and, responsive thereto, the Navigation Control 102 will receive that 'changed input data' from block 106. In FIG. 27, assume that the user (via block 106 in FIG. 26) wants to change 'Input Data' 1 for 'Task 1' 88a. In that case, the user will interface with the Task View Base 100 to change 'Input Data 1' for 'Task 1' 88a; and, responsive thereto, the Navigation Control 102 will energize line 108 and change the 'Input Data 1' for 'Task 1' 88a. In that case, in FIG. 27, a 'Changed Input Data 1' will represent the input data for the 'task 1 instruction set 88a' ('Task 1' 88a) in the Task Base 88. At this point, since tasks 1, 4, 5, and 6 are all affected by the changed input data, the Task Manager 86 will reexecute each of the designated tasks in the Task Base 88 in sequence [i.e., the Task Manager 86 will reexecute again, in sequence, the 'task 1 instruction set' 88a ('Task 1' 88a) followed by the 'task 4 instruction set' 88d ('Task 4' 88d) followed by the 'task 5 instruction set' 88e ('Task 5' 88e) followed by 'the task 6 instruction set' 88f ('Task 6' 88f)] while using a 'new set of input data' as follows: 'Changed Input Data 1' and 'Input Data 4' and 'Input Data 5' and 'Input Data 6'. When those tasks in the Task Base 88 (that have been affected by the changed input data) have been re-executed again, in sequence, in response to the 'new set of input data', the Task View Base 100 will record or display (on the recorder or display device 80b in FIG. 20) a 'Second Set of Results', as shown in FIG. 27.

Figure 28:
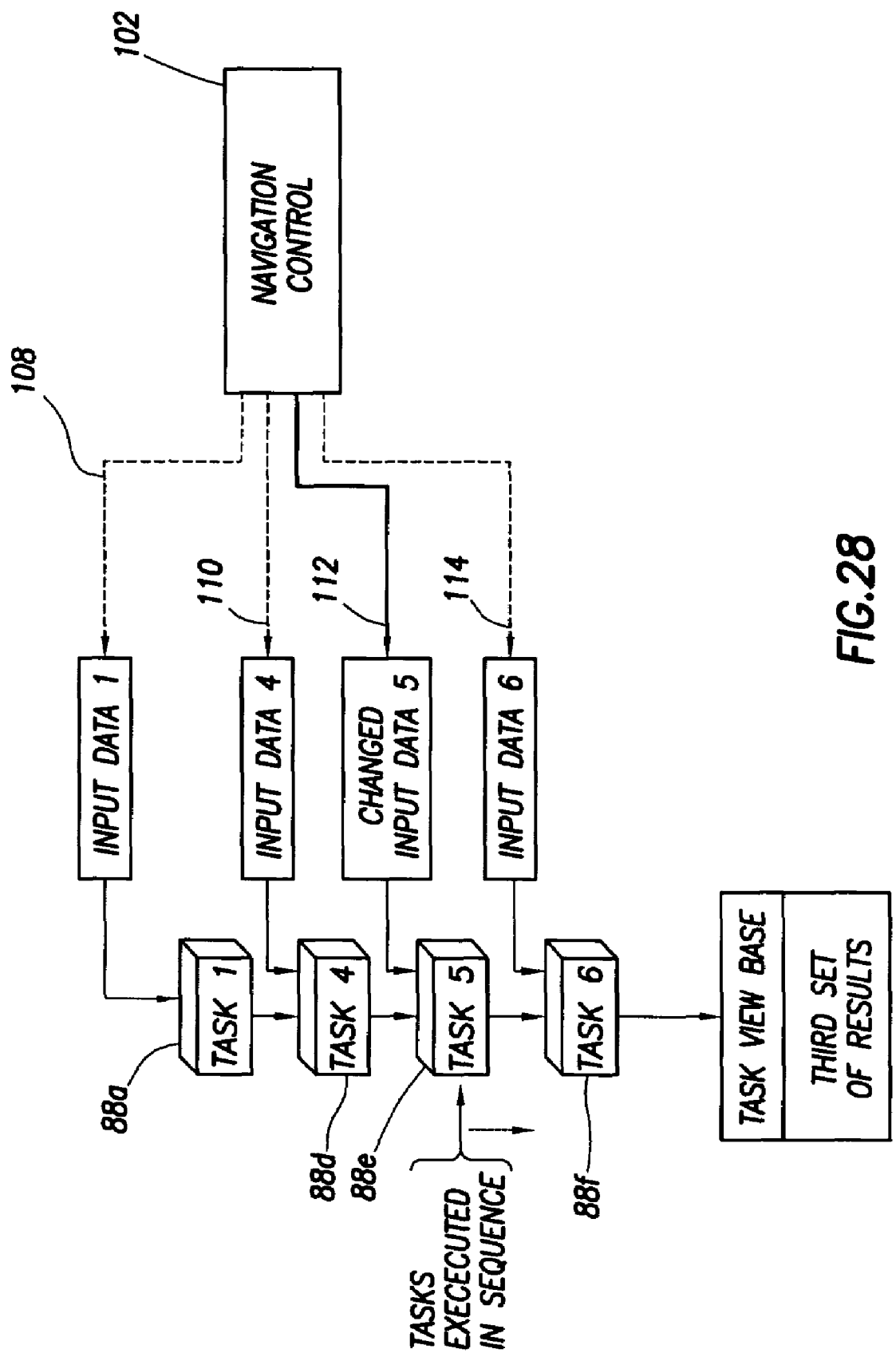

Referring to FIG. 28, assume that the user (via block 106 in FIG. 26) wants to interface with the Task View Base 100 to change 'Input Data' 5 for 'Task 5' 88e. In that case, the Navigation Control 102 will energize line 112 in FIG. 28 and change the 'Input Data 5' for 'Task 5' 88e to a 'Changed Input Data 5'. As a result, in FIG. 28, a 'Changed Input Data 5' will represent the input data for the 'task 5 instruction set 88e' ('Task 5' 88e) in the Task Base 88. At this point, the Task Manager 86 will reexecute 'only those tasks in the Task Base 88 which were affected by the changed input data'. Since 'Task 5' and 'Task 6' are the 'only tasks that are affected by the changed input data', in FIG. 28, the Task Manager 86 will re-execute again, in sequence, the 'task 5 instruction set' 88e ('Task 5' 88e) followed by 'the task 6 instruction set' 88f ('Task 6' 88f); in addition, the Task Manager 86 will use a 'new set of input data' during the re-execution of 'Task 5' 88e and 'Task 6' 88f, as follows: 'Changed Input Data 5' and 'Input Data 6'. When the designated tasks in the Task Base 88, which were affected by the changed input data, have been reexecuted again, in sequence, in response to the 'new set of input data' (which was changed by the Navigation Control 102), the Task View Base 100 will record or display (on the recorder or display device 80b in FIG. 20) a 'Third Set of Results', as shown in FIG. 28.

A functional description of the operation of the 'Automatic Well Planning Software System', including the 'Automatic Well Planning Workflow Control System software' 80c1, will be set forth in the following paragraphs with reference to FIGS. 1 through 28 of the drawings, with emphasis on FIGS. 20 through 28 of the drawings.

A user will begin by selecting one or more tasks via the Task Manager 86 of the Automatic Well. Planning Workflow Control System of FIG. 21 which is stored in memory 80c of the computer system 80 shown in FIG. 20, such as (by way of example) 'Task 1' 86a in FIG. 23 or 'Task 2' 86b or 'Task 3' 86c or 'Task 4' 86d or 'Task 5' 86e or 'Task 6' 86f or 'Task 7' 86g or 'Task 8' 86h or 'Task 9' 86i. If the user selects (via the Task Manager 86) the 'Task 1' followed by 'Task 4' followed by 'Task 5' followed by 'Task 6' in FIG. 23, then, a workflow consisting of 'Task 1' followed by 'Task 4' followed by 'Task 5' followed by 'Task 6' will be executed by the Task Manager 86 of the processor 80a of the computer system 80 in FIG. 20 (see FIGS. 24 and 25 for an example of tasks selected by the user and workflows which could be executed by the Task Manager 86). If a workflow consisting of 'Task 1' followed by 'Task 4' followed by 'Task 5' followed by 'Task 6' is executed by the Task Manager 86, in FIG. 23, a 'task 1 instruction set' 88a stored in the Task Base 88 will first be executed by the Task Manager 86, then a 'task 4 instruction set' 88d stored in the Task Base 88 will then be executed by the Task Manager 86, then a 'task 5 instruction set' 88e stored in the Task Base 88 will then be executed by the Task Manager 86, then a 'task 6 instruction set' 88f stored in the Task Base 88 will then be executed by the Task Manager 86. In FIG. 21, the Task Dependency 92 (of the Automatic Well Planning Workflow Control System 80c1 stored in memory 80c of the computer system 80 in FIG. 20) will ensure that the tasks are executed by the Task Manager 86 in the 'proper order', that is, Task Dependency 92 will ensure that the 'Task 1 instruction set' 88a is executed first, then the 'Task 4 instruction set' 88d is executed second, and the 'Task 5 instruction set' 88e is executed third, and the the 'Task 6 instruction set' 88f is executed last by the Task Manager 86 of the processor 80a of the computer system 80 in FIG. 20. In FIG. 21, the Task Translator 94 and the Type Translator 96 will jointly ensure that each task receives its required 'input data' in the 'proper form'; that is, in FIG. 26, the Task Translator 94 and the Type Translator 96 will jointly ensure that 'Task 1' 88a receives its 'Input Data 1' from line 108 in 'proper form', and 'Task 4' 88d receives its 'Input Data 4' from line 110 in 'proper form', and 'Task 5' 88e receives its 'Input Data 5' from line 112 in 'proper form', and 'Task 6' 88f receives its 'Input Data 6' from line 114 in 'proper form'. In FIG. 26, when the Task Manager 86 and processor 80a executes 'Task 1' 88a, a 'first state' is generated by the 'Task Info' block 102 in FIG. 21; and when the Task Manager 86 and processor 80a executes 'Task 4' 88d, a 'second state' is generated by the 'Task Info' block 102 in FIG. 21; and when the Task Manager 86 and processor 80a executes 'Task 5' 88e, a 'third state' is generated by the 'Task Info' block 102 in FIG. 21; and when the Task Manager 86 and processor 80a executes 'Task 6' 88a, a 'fourth state' is generated by the 'Task Info' block 102 in FIG. 21. The 'first state' and the 'second state' and the 'third state' and the 'fourth state' can each include one of the following 'states', as follows:

```
/// The Task has not run yet
    NotStarted,
    BeforeInput,
    InputFailed,
/// Input finished
    InputSucceeded
/// Input validation has failed
    InputCheckFailed,
/// Input validation has succeeded
    InputCheckSucceeded,
/// The Task is running
    Running,
/// The Task is running
    Recompute,
```

-continued

```
/// The Task execution was aborted
    ExecutionFailed,
/// The Task has successfully completed execution
    ExecutionSucceeded,
/// Output validation has failed
    OutputCheckFailed,
/// Output validation has succeeded
    OutputCheckSucceeded,
```

In FIG. 21, it was noted earlier that the Task Dependency 92 (of the Automatic Well Planning Workflow Control System 80c1 stored in memory 80c of the computer system 80 in FIG. 20) will ensure that the 'task instruction sets' stored in the Task Base 88 (i.e., 'Task 1' 88a and 'Task 4' 88d and 'Task 5' 88e and 'Task 6' 88f in FIG. 26) are executed by the Task Manager 86 in the 'proper order'. When the execution of these 'task instruction sets' by the Task Manager 86 is completed, a 'first set of results' will be transmitted to the Task View Manager 98, the Task View Manager 98 ensuring that a 'first unit of measure' associated with the 'first set of results' is converted into a 'second unit of measure' prior to transmitting the 'first set of results' to the Task View Base 100. The 'first set of results' will then be recorded or displayed by the Task View Base 100 on the Recorder or Display device 80b of the computer system 80 in FIG. 20. If the user is not satisfied with one or more of the 'first set of results', in FIG. 26, the user can change one or more of the 'input data' being provided to one or more of the tasks, that is, in FIG. 26, the user can interface with the Task View Base 100 to use the Navigation Control 102 to change the 'Input Data 1' associated with 'Task 1' 88a, or the user can interface with the Task View Base 100 to use the Navigation Control 102 to change the 'Input Data 4' associated with 'Task 4' 88d, or the user can interface with the Task View Base 100 to use the Navigation Control 102 to change the 'Input Data 5' associated with 'Task 5' 88e, or the user can interface with the Task View Base 100 to use the Navigation Control 102 to change the 'Input Data 6' associated with 'Task 6' 88f. At that time, only those tasks that were affected by the changed input data (i.e., 'Task 1' followed by 'Task 4' followed by 'Task 5' followed by 'Task 6' in FIG. 27; or 'Task 5' followed by 'Task 6' in FIG. 28) will be re-executed in sequence by the Task Manager 86. For example, in FIG. 27, the user can interface with the Task View Base 100 to use the Navigation Control 102 to change 'Input Data 1' associated with 'Task 1' 88a, thereby providing 'Changed Input Data 1' to Task 1' 88a and producing a 'second set of results' on the Task View Base 100 of the recorder or display device 80b. When the 'Input Data 1' has been changed to 'Changed Input Data 1', since Tasks 1, 4, 5, and 6 are affected by the changed input data, the following tasks will be reexecuted in sequence: 'Task 1', 'Task 4', 'Task 5', and 'Task 6'. In FIG. 28, the user can interface with the Task View Base 100 to use the Navigation Control 102 to change 'Input Data 5' associated with 'Task 5' 88e, thereby providing 'Changed Input Data 5' to Task 5' 88e and producing a 'third set of results' on the Task View Base 100 of the recorder or display device 80b. When the 'Input Data 5' has been changed to 'Changed Input Data 5', since Tasks 5 and 6 are affected by the changed input data, the following tasks will be reexecuted in sequence: 'Task 5', and 'Task 6'.

In FIG. 23, the 'tasks' in the Task Manager 86 (i.e., 'Task 1' 86a through 'Task 9' 86i) can include the following: (1) the 'Risk Assessment' task of FIGS. 9A through 11, and (2) the 'Bit Selection' task of FIGS. 12 through 15, and (3) the 'Drillstring Design' task of FIGS. 16 through 19, and (4) the 'Monte Carlo' task of FIGS. 30-58.

In FIGS. 20 and 21, the Input Data 84a stored in memory 80c and accessed by the Access Manager 90 of the Automatic Well Planning Workflow Control System software 80c1 of FIGS. 20 and 21 can include the following: (1) In FIG. 10, the Input Data 20a being provided to the Risk Assessment Logical Expressions 22 and the Risk Assessment Algorithms 24, (2) In FIG. 13, the Input Data 44a being provided to the Bit Selection Logical Expressions 46 and the Bit Selection Algorithms 48, and (3) In FIG. 17, the Input Data 64a being provided to the Drillstring Design Logical Expressions 66 and the Drillstring Design Algorithms 68.

In FIG. 23, the 'instruction sets' stored in the Task Base 88 (that is, the 'Task 1 instruction set' 88a through and including the 'Task 9 instruction set' 88i) can include the following: (1) In FIG. 10, the Risk Assessment Logical Expressions 22 and the Risk Assessment Algorithms 24, (2) In FIG. 13, the Bit Selection Logical Expressions 46 and the Bit Selection Algorithms 48, and (3) In FIG. 17, the Drillstring Design Logical Expressions 66 and the Drillstring Design Algorithms 68.

In FIGS. 20 and 21, the 'set of results' which are recorded or displayed by the Task View Base 100 on the Recorder or Display device 80b of the computer system 80 of FIG. 20, such as the 'first set of results' that is recorded or displayed by the Task View Base 100 in FIG. 26 or the 'second set of results' that is recorded or displayed by the Task View Base 100 in FIG. 27 or the 'third set of results' that is recorded or displayed by the Task View Base 100 in FIG. 28, can include the following: (1) In FIG. 10, the Risk Assessment Output Data 18b1, (2) In FIG. 13, the Bit Selection Output Data 42b1, and (3) In FIG. 17, the Drillstring Design Output Data 62b1.

In FIGS. 26, 27, and 28, if a user wanted to interface with the Task View Base 100 to use the Navigation Control 102 to change any of the 'input data' being provided to the 'tasks' (such as 'Input Data 1' for 'Task 1' 88a or 'Input Data 4' for 'Task 4' 88d, or 'Input Data 5' for 'Task 5' 88e, or 'Input Data 6' for 'Task 6' 88f), the user can do one of the following: (1) In FIG. 10, the user could use the Navigation Control 102 to change one or more of the 'Input Data' 20a being input to the Risk Assessment Logical Expressions 22 and the Risk Assessment Algorithms 24, (2) In FIG. 13, the user could use the Navigation Control 102 to change one or more of the 'Input Data' 44a being input to the Bit Selection Logical Expressions 46 and the Bit Selection Algorithms 48, and (3) In FIG. 17, the user could use the Navigation Control 102 to change one or more of the 'Input Data' 64a being input to the Drillstring Design Logical Expressions 66 and the Drillstring Design Algorithms 68.

Figure 29:
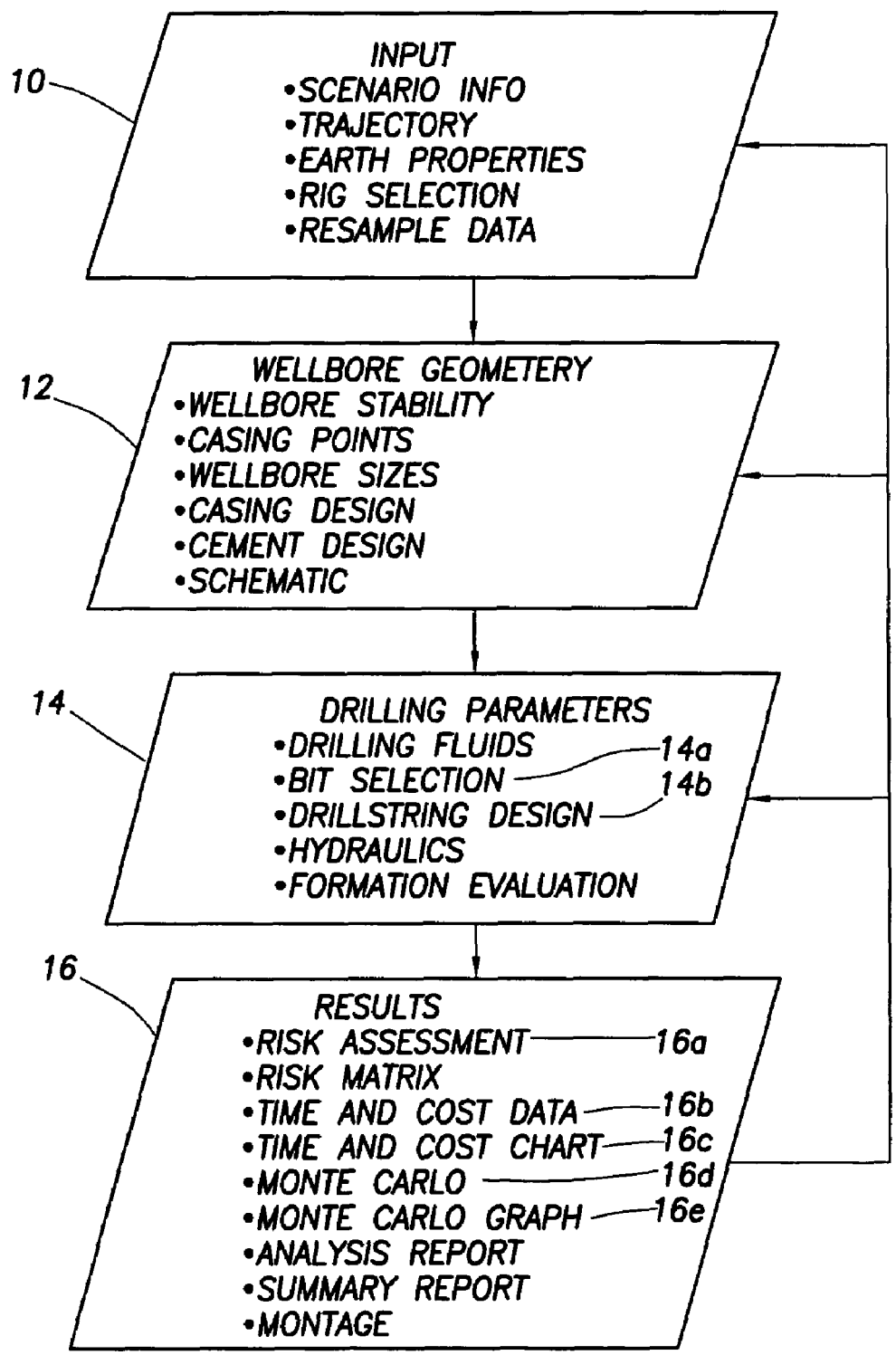
FIG. 29 illustrates a workflow in an 'Automatic Well Planning Software System'.

Automatic Well Planning Monte Carlo Simulation Software, Tasks 16b, 16c, 16d, 16e Referring to FIG. 29, as can be seen on the left side of the displays illustrated in FIGS. 2 through 6, the 'Automatic Well Planning Software System' includes a plurality of 'tasks'. Each of those tasks are illustrated in FIG. 29. One of these 'tasks' will be discussed below in detail with reference to FIGS. 30-57 when the 'Automatic Well Planning Monte Carlo Simulation Software' is discussed. In FIG. 29, those plurality of 'tasks' are divided into four groups: (1) Input task 10, where input data is provided, (2) Wellbore Geometry task 12, (3) Drilling Parameters task 14, where calculations are performed, and (4) a Results task 16, where a set of results are calculated and presented to a user. The Input task 10 includes the following sub-tasks: (1) scenario information, (2) trajectory, (3) Earth properties, (4) Rig selection, (5) Resample Data. The Wellbore Geometry task 12 includes the following sub-tasks: (1) Wellbore stability, (2) Casing Points, (3) Wellbore sizes, (4) Casing design, (5) Cement design, (6) Schematic. The Drilling Parameters task 14 includes the following sub-tasks: (1) Drilling fluids, (2) Bit selection 14a, (3) Drillstring design 14b, (4) Hydraulics, and (5) Formation Evaluation. The Results task 16 includes the following sub-tasks: (1) Risk Assessment 16a, (2) Risk Matrix, (3) Time and cost data 16b, (4) Time and cost chart 16c, (5) Monte Carlo 16d, (6) Monte Carlo graph 16e, (7) Analysis Report, (8) Summary report, and (9) montage.

In FIG. 29, recalling that the Results task 16 includes a 'Time and cost data' task 16b, a 'Time and cost chart' task 16c, a 'Monte Carlo' task 16d, and a 'Monte Carlo Graph' task 16e, the 'Time and cost data' task 16b and the 'Time and cost chart' task 16c and the 'Monte Carlo' task 16d and the 'Monte Carlo Graph' task 16e will be discussed in detail below with reference to FIGS. 30-57.

Figure 30:
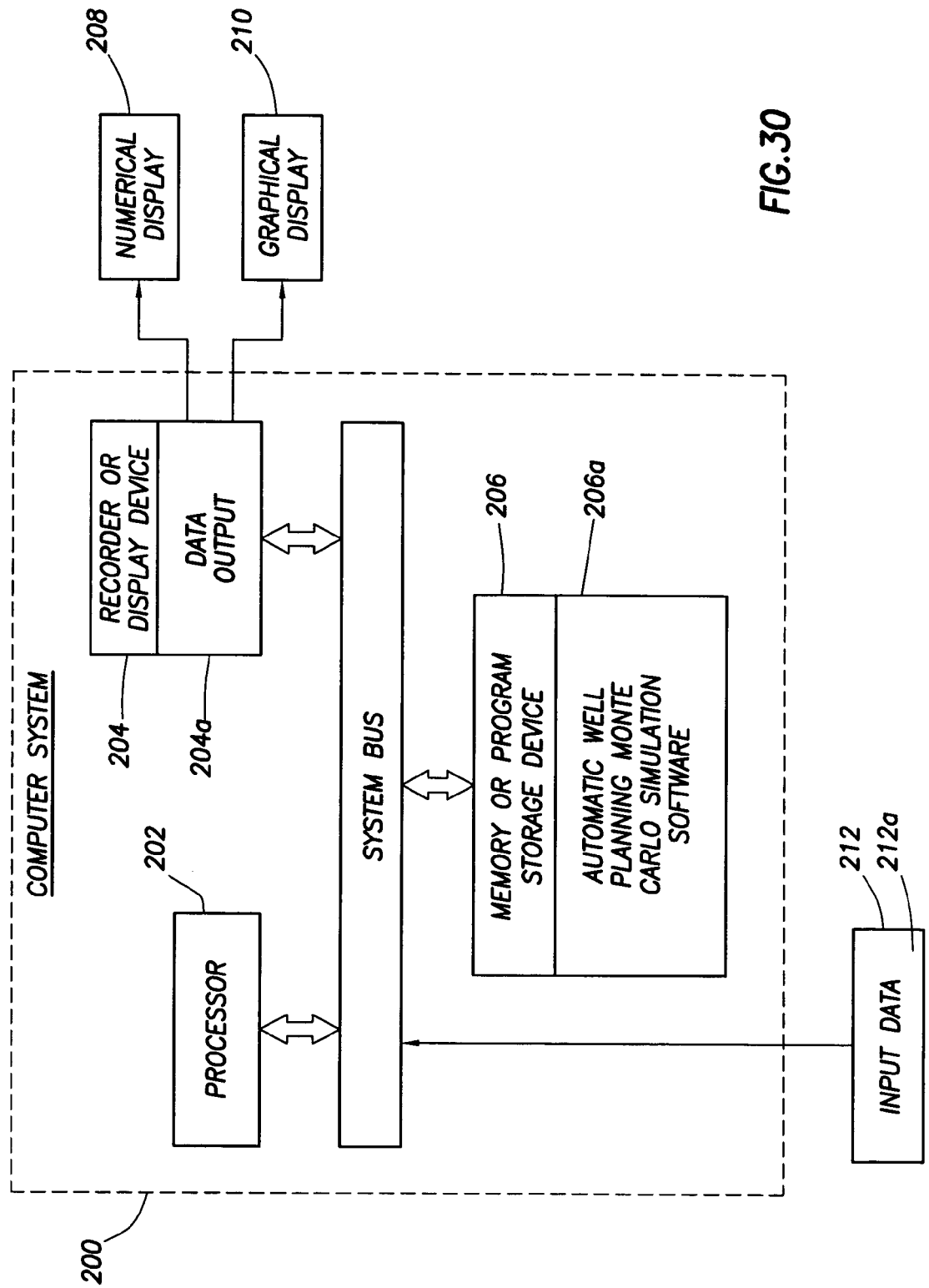
FIG. 30 illustrates a computer system storing an 'Automatic Well Planning Monte Carlo Simulation Software'.

Referring to FIG. 30, a Computer System 200, which stores the 'Automatic Well Planning Monte Carlo Simulation Software', is illustrated.

In FIG. 30, the Computer System 200 includes a Processor 202 connected to a system bus, a Recorder or Display Device 204 connected to the system bus, and a Memory or Program Storage Device 206 connected to the system bus. The Recorder or Display Device 204 is adapted to display a 'Data Output' 204a, the 'Data Output' 204a being illustrated in the form of the display-types shown in FIGS. 49 through 52, a first display type being a 'numerical display' 208 in FIGS. 49 through 51, and a second display type being a 'graphical display' 210 in FIG. 52. The Memory or Program Storage Device 206 is adapted to store an 'Automatic Well Planning Monte Carlo Simulation Software' 206a. The 'Automatic Well Planning Monte Carlo Simulation Software' 206a is originally stored on another 'program storage device', such as a CD-Rom or a hard disk; however, the CD-Rom or hard disk was inserted into the Computer System 200 and the 'Automatic Well Planning Monte Carlo Simulation Software' 206a was loaded from the CD-Rom or hard disk into the Memory or Program Storage Device 206 of the Computer System 200 of FIG. 30. In addition, a Storage Medium 212 containing a plurality of 'Input Data' 212a is adapted to be, connected to the system bus of the Computer System 200, the 'Input Data' 212a being accessible to the Processor 202 of the Computer System 200 when the Storage Medium 212 is connected to the system bus of the Computer System 200. In operation, the Processor 202 of the Computer System 200 will execute the 'Automatic Well Planning Monte Carlo Simulation Software' 206a stored in the Memory or Program Storage Device 206 of the Computer System 200 while, simultaneously, using the 'Input Data' 212a stored in the Storage Medium 212 during that execution. When the Processor 202 completes the execution of the 'Automatic Well Planning Monte Carlo Simulation Software' 206a stored in the Memory or Program Storage Device 206 (while using the 'Input Data' 212a), the Recorder or Display Device 204 will record or display the 'Data Output' 204a, as shown in FIG. 30. For example, the 'Data Output' 204a can be displayed on a display screen of the Computer System 200, or the 'Data Output' 204a can be recorded on a printout which is generated by the Computer System 200. The Computer System 200 of FIG. 30 may be a workstation or a personal computer (PC). The Memory or Program Storage Device 206 is a computer readable medium or a program storage device which is readable by a machine, such as the processor 202. The processor 202 may be, for example, a microprocessor, microcontroller, or a mainframe or workstation processor. The Memory or Program Storage Device 206, which stores the 'Automatic Well Planning Monte Carlo Simulation Software' 206a, may be, for example, a hard disk, ROM, CD-ROM, DRAM, or other RAM, flash memory, magnetic storage, optical storage, registers, or other volatile and/or non-volatile memory.

Figure 31:
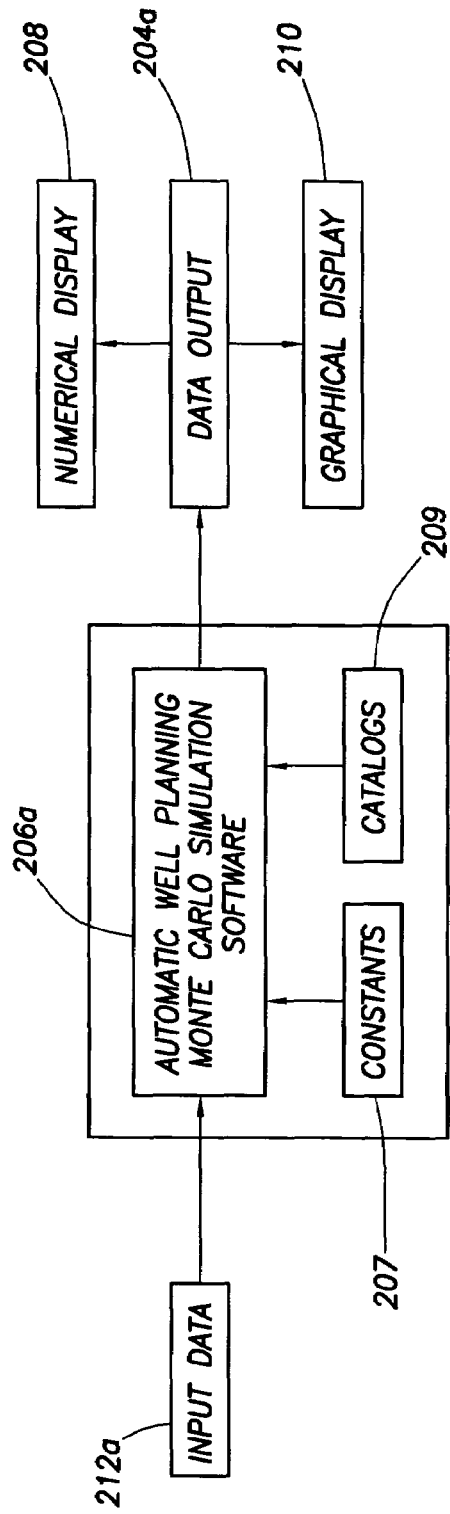
FIG. 31 illustrates structure block diagram of the 'Automatic Well Planning Monte Carlo Simulation Software' which is responsive to input data, constants, and catalogs, and which generates a data output.

Referring to FIG. 31, the 'Automatic Well Planning Monte Carlo Simulation software' 206a receives the input data 212a, a set of constants 207, a set of catalogs 209, and, when the software 206a is executed by the processor 202, a 'Data Output' 204a is generated, the 'Data Output' 204a being presented in the form of a 'novel display', the 'novel display' including the numerical display 208 (see FIGS. 49 through 51) and the graphical display 210 (see FIG. 52) of FIG. 30 which will be discussed later in this specification.

Figure 32:
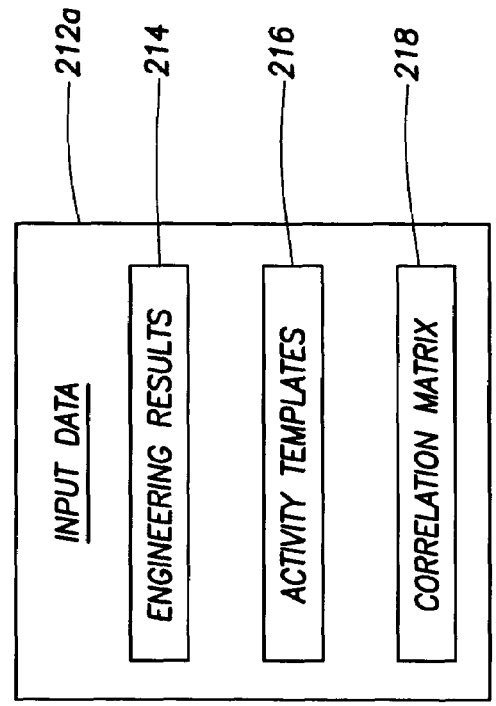
FIG. 32 illustrates a more detailed construction of the input data.

Referring to FIG. 32, the input data 212a includes: engineering results 214, activity templates 216, and a correlation matrix 218. The activity templates 216 and the correlation matrix 218 will be discussed later in this specification. However, the engineering results 214 of FIG. 32, the constants 207 of FIG. 31, the catalogs 209 of FIG. 31, and the Data Output 204a of FIG. 31 will be outlined in detail below, as follows.

In FIG. 32, the 'engineering results' 214 of FIG. 32 include a plurality of data representing 'wellbore geometry' and 'drilling parameters' and, as a result, the 'engineering results' 214 will generate a 'plurality of Subactivities' which are based on the 'wellbore geometry' and the 'drilling parameters'. The 'wellbore geometry' and 'drilling parameters' include the following: Well name, Surface Location, Offshore Well, GL Elevation, Water Depth, Well Type, RKB Elevation, Openhole Or Case hole completion, Conductor, Presence of H2S, Presence of CO2, Unit System, Client Name, Field Name, Tubing Size, Default Unit System, Boit Constant Raw, Ucs Calibration Factor Raw, Friction Angle Raw, Pore Pressure Raw, Poisson Ratio Raw, Unconfined Compressive Strength Raw, Density Raw, Stress Azimuth Raw, Inclination Min Stress Raw, Inclination Intermediate Stress Raw, Vertical Stress Raw, Horizontal Stress Minimum Raw, Horizontal Stress Maximum Raw, True Vertical Depth Raw, Measured Depth Traj Raw, Inclination Raw, Azimuth Raw, True Vertical Depth Traj Raw, Northing Southing Raw, Easting Westing Raw, Dog Leg Severity Raw, Build Rate Raw, Turn Rate Raw, True Vertical Depth, Elevation Reference Traj, Elevation Depth Traj, Elevation Reference Earth Model, Elevation Depth Earth Model, Measured Depth, True Vertical Depth, Dog Leg Severity, Build Rate, Turn Rate.

The constants 207 of FIG. 31 include the following: Resample Interval, Null Value, Boit Constant Raw Orig, Ucs Calibration Factor Raw Orig, Elevation Depth Decimal, Monte Carlo Default Probability 1, Monte Carlo Default Probability 2, Monte Carlo Default Probability 3, and Monte Carlo Default Num Iterations.

The catalogs 209 of FIG. 31 include the following: Activity Cost BHA Catalog File, BHA Catalog File, Bits Catalog File, Clearance Factor File, Cost Calculation Catalog File, Data Relationship File, Drill Bit Catalog File, Drill Collar Catalog File, Drill Fluid Design Parameter File, Drill Pipes Catalog File, Grade List File, Heavy Weight Drill Pipes Catalog File, Hole Min Max Flow File, Liner Hanger Cost File, Mud Type And Cost File, Mud Volume Excess File, MWD Linear Weight D Data File, Non-Productive Time Calculation Catalog File, PDM Data File, Pump Data File, Rig Catalog File, Risk Calculation File, Risk Factor File, Risk Matrix File, Swordfish Settings File, Swordfish Settings File Default, and Tubular Catalog File.

Figure 49:
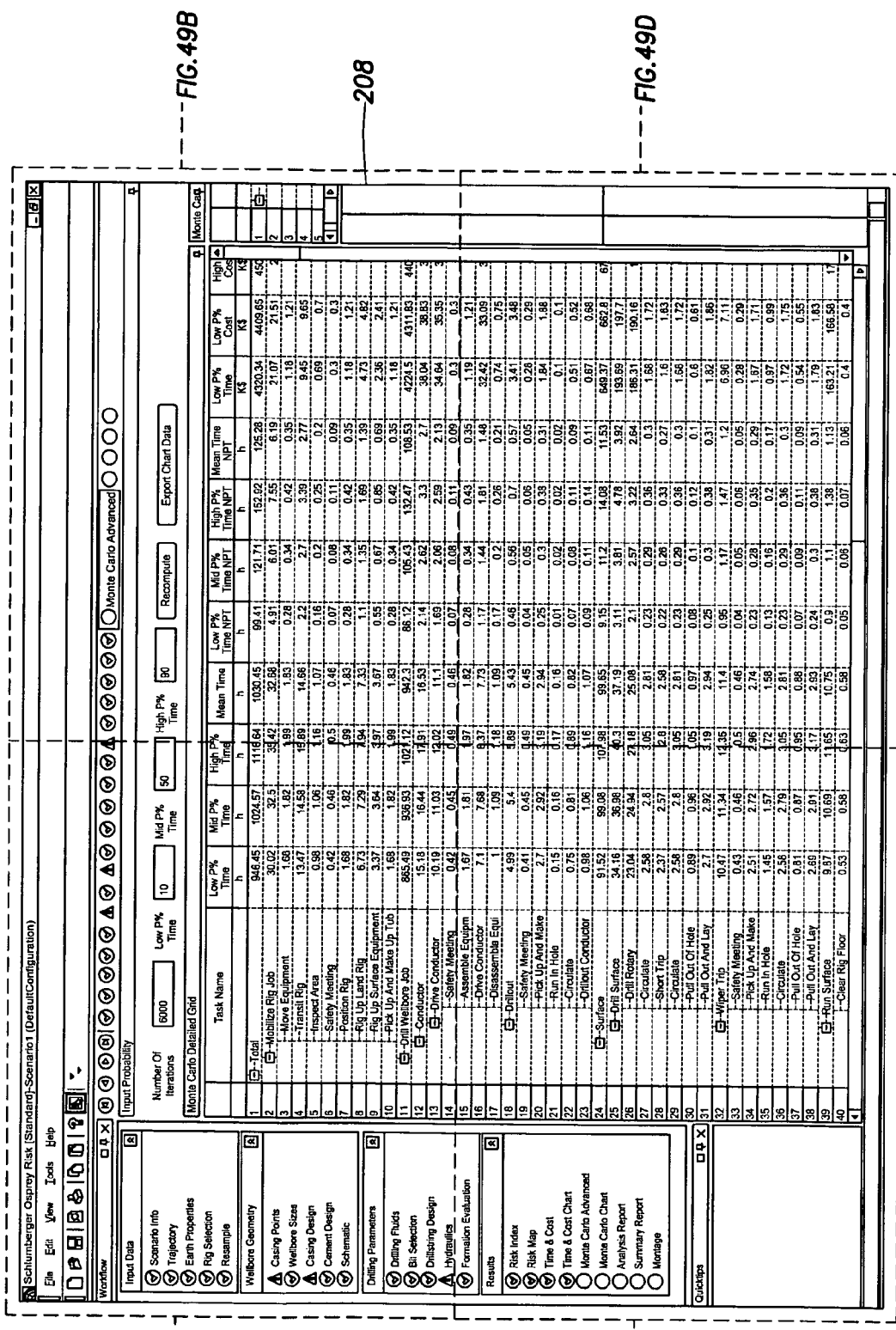
FIG. 49 including FIGS. 49A, 49B, 49C, and 49D which support FIG. 49, and FIG. 50 including FIGS. 50A, 50B, 50C, and 50D which support FIG. 50, and FIG. 51 including FIGS. 51A, 51B, 51C, and 51D which support FIG. 51 illustrate examples of the numerical display 21 of FIG. 30 which is generated and displayed in response to the execution of the 'Automatic Well Planning Monte Carlo Simulation Software' of FIGS. 30 and 31.
Figure 49A:
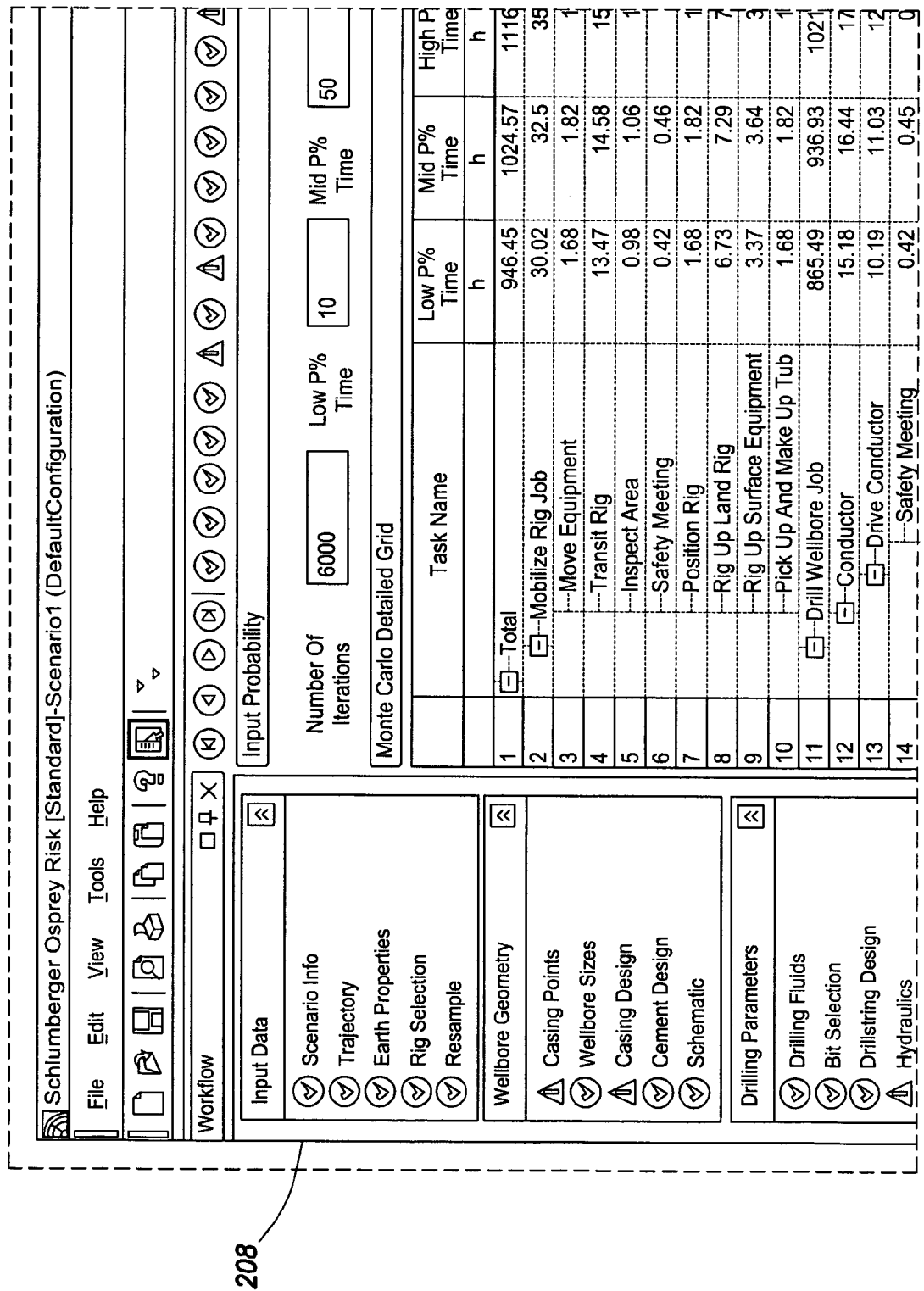
Figure 49B:
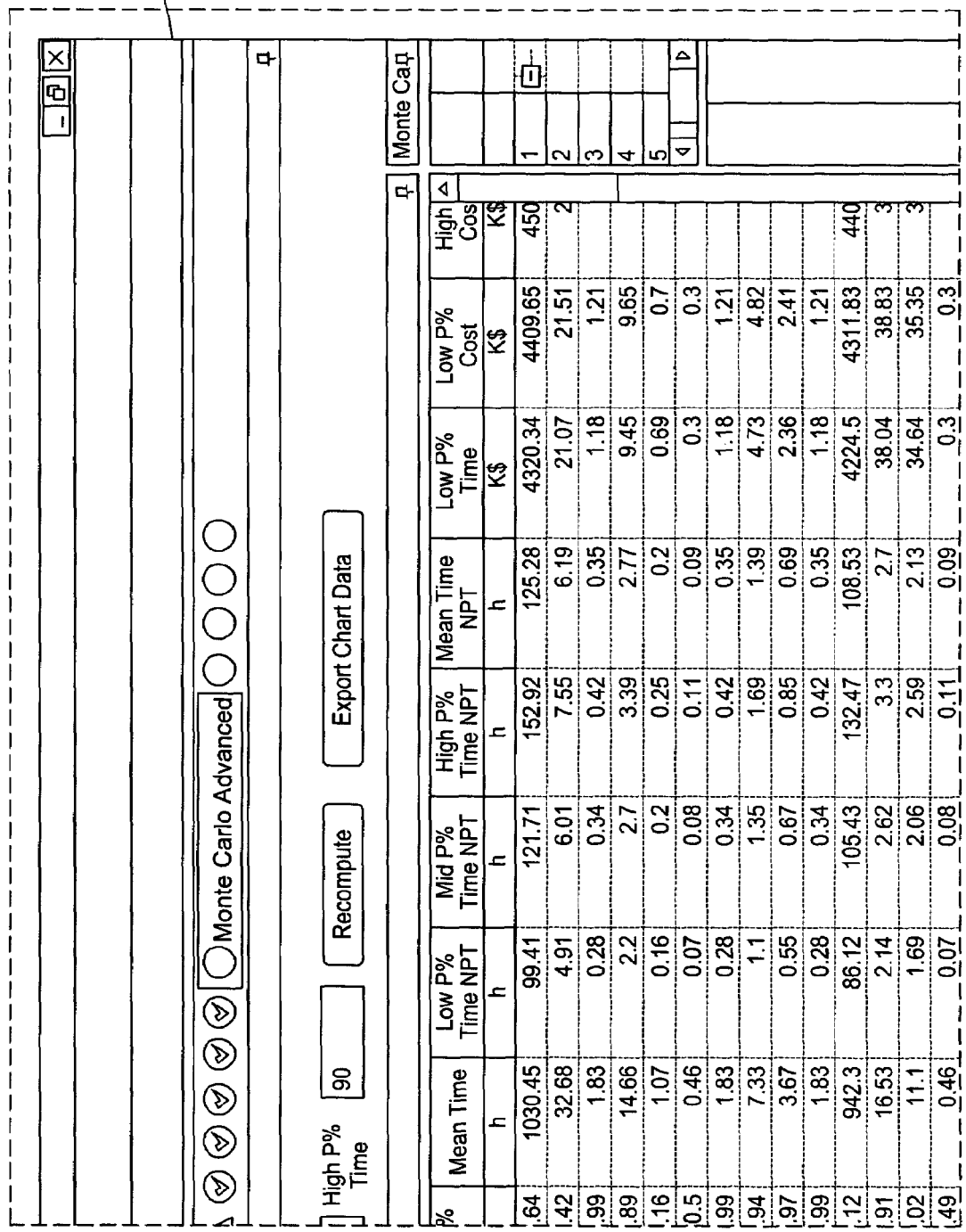
Figure 49D:
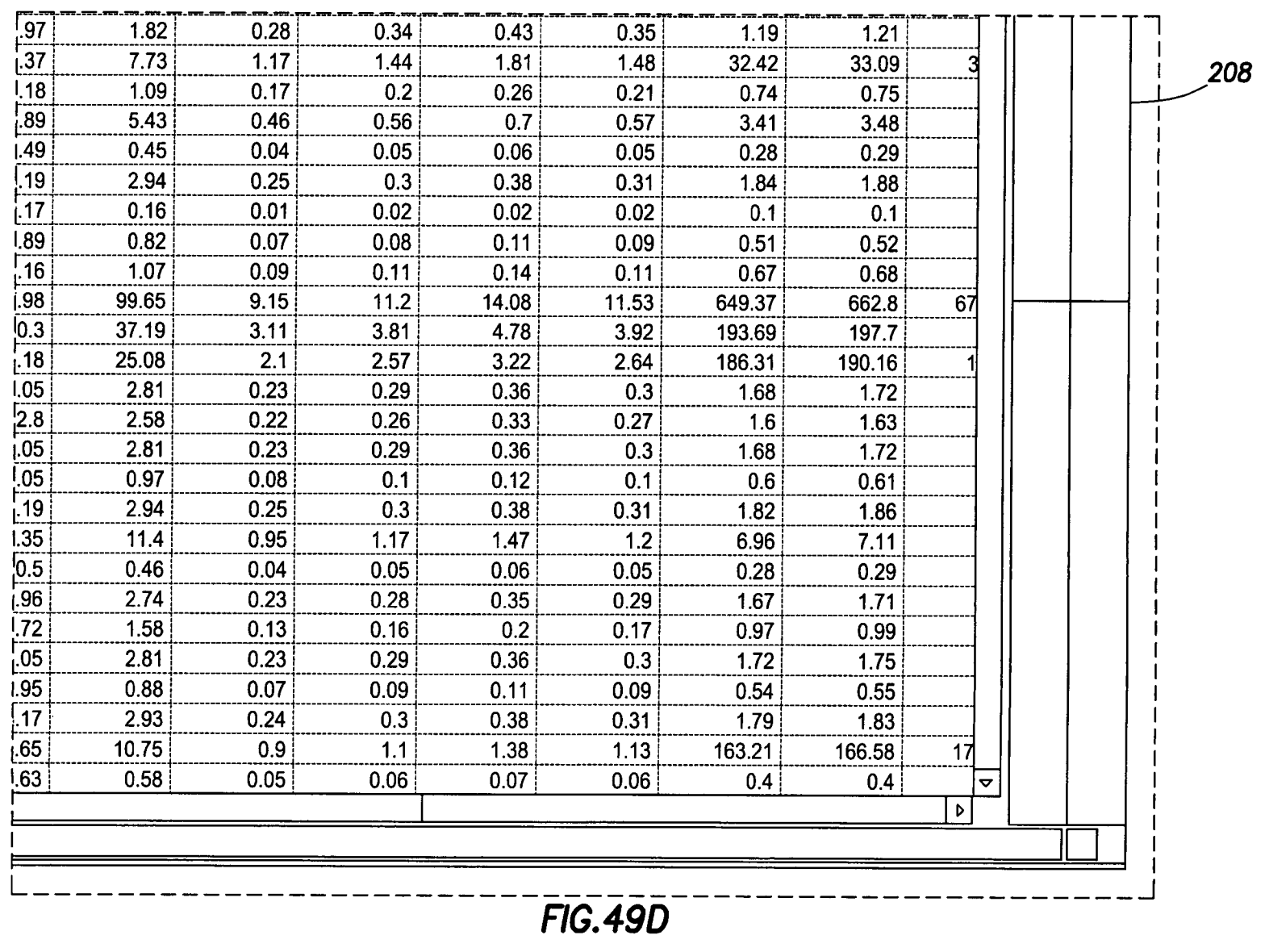

The Data Output 204a of FIG. 31 (i.e., the numerical display 208 and the graphical display 210) includes the following information: Mean, p10 time (or Minimal Time), p50 time (or Average Time), p90 time (or Maximum Time), p10 cost (or Minimal Cost), p50 cost (or Average Cost), p90 cost (or Maximum Cost), p10 Non-Productive Time (or Minimal Non-Productive Time), p50 Non-Productive Time (or Average Non-Productive Time), p90 Non-Productive Time (or Maximum Non-Productive Time), p10 Non-Productive Cost (or Minimal Non-Productive Cost), p50 Non-Productive cost (or Average Non-Productive Cost), and p90 Non-Productive Cost (or Maximum Non-Productive Cost). The Data Output 204a is presented in the form of a 'numerical' type of display 208 as shown in FIGS. 49 through 51 and a 'graphical' type of display 210 as shown in FIG. 52 of the drawings.

Figure 33:
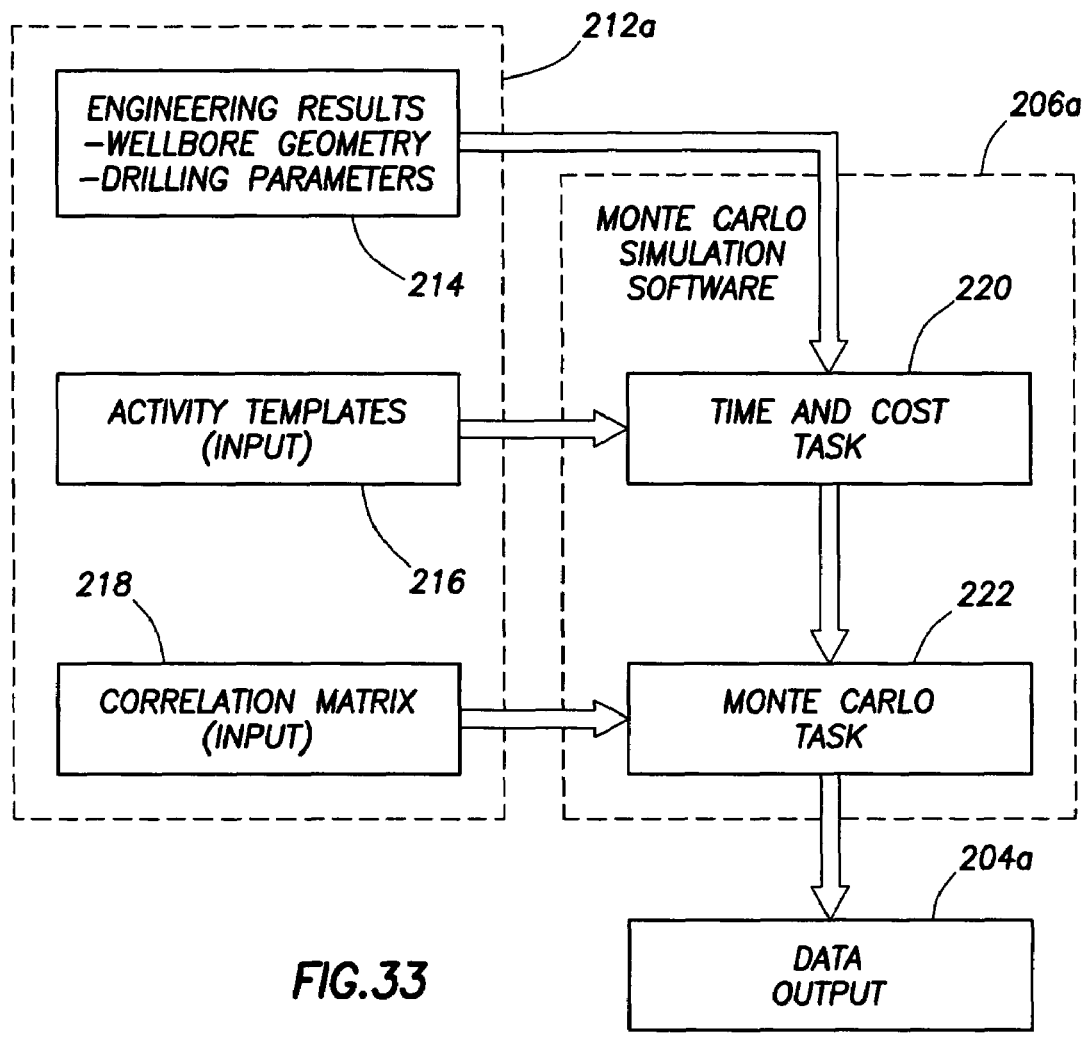
FIG. 33 illustrates a more detailed construction of the 'Automatic Well Planning Monte Carlo Simulation Software' responsive to the input data for generating the data output.

Referring to FIG. 33, a more detailed construction of the 'Automatic Well Planning Monte Carlo Simulation Software' 206a of FIGS. 30 and 31 is illustrated. In FIG. 33, the 'Automatic Well Planning Monte Carlo Simulation Software' 206a includes a Time and Cost Task 220 and a Monte Carlo Task 222.

In FIG. 33, the Time and Cost Task 220, associated with the 'Automatic Well Planning Monte Carlo Simulation Software' 206a, receives the 'plurality of Subactivities' associated with the Engineering Results 214 (representing the 'wellbore geometry' data and the 'drilling parameters' data) and the Activity Templates 216 associated with the input data 212a. The Engineering Results 214 will generate a 'plurality of Subactivities' which are based on the aforementioned 'wellbore geometry' and 'drilling parameters'. In response to the 'plurality of Subactivities' generated by the engineering results 214, the Time and Cost Task 220 will use the Activity Templates 216 to associate a set of 'time and cost data' (obtained from the Activity Templates 216) for each 'Subactivity' of the 'plurality of Subactivities' received from the engineering results 214 thereby generating a 'plurality of Subactivities' and a 'plurality of time and cost data' associated, respectively, with the 'plurality of Subactivities'. Then, the 'plurality of Subactivities' will be assimilated by step 250 in FIG. 38 into a corresponding 'plurality of summary activities'. The 'summary activities' will be displayed on the 'numerical' type of display 208 shown in FIGS. 49-51. The aforementioned steps practiced by step 250 in FIG. 38 for assimilating the 'plurality of Subactivities' into a corresponding 'plurality of summary activities', will be discussed in more detail later in this specification.

In FIG. 33, the Monte Carlo Task 222, associated with the 'Automatic Well Planning Monte Carlo Simulation Software' 206a, receives the 'plurality of Subactivities' and the 'plurality of time and cost data' associated, respectively, with the 'plurality of Subactivities' that was previously generated by the Time and Cost Task 36, and, in addition, the Monte Carlo Task 222 receives an output from the Correlation Matrix 218. Responsive thereto, the Monte Carlo Task 222 generates the 'Data Output' 204a outlined above, where the 'Data Output' 204a includes the 'numerical' type of display 208 as shown in FIGS. 49 through 51 and the 'graphical' type of display 210 as shown in FIG. 52, the 'numerical' display 208 further including the following data which is associated with each 'summary activity' and each 'non-summary activity' on the 'numerical display' 208: Mean, p10 time (or Minimal Time), p50 time (or Average Time), p90 time (or maximum time), p10 cost (or minimal cost), p50 cost (or average cost), p90 cost (or maximum cost), p10 non-productive time (or minimal non-productive time), p50 non-productive time (or average non-productive time), p90 non-productive time (or maximum non-productive time), p10 non-productive cost (or minimal non-productive cost), p50 non-productive cost (or average non-productive cost), and p90 non-productive cost (or maximum non-productive cost). In addition, the Monte Carlo Task 222 uses the previously-generated 'numerical' display 208 of FIGS. 49-51 to generate the 'graphical' type of display 210 which is shown in FIG. 52 of the drawings.

Referring to FIGS. 34 and 35, two examples of an 'activity template' 216 of the input data 212a shown in FIG. 33 are illustrated. In FIGS. 34 and 35, the 'activity templates' 216 must provide the 'times' and the 'cost' for completing each 'Subactivity' of the 'plurality of Subactivities' which are generated by the 'engineering results' 214 of FIG. 33.

For example, in FIG. 34, a first example of an 'activity template' 216 is illustrated. In FIG. 34, a typical 'activity template' will include the following information: the minimum time for clean or productive activities (i.e., the 'Min Time' or 'p10' time), the average time for clean or productive activities (i.e., the 'Avg Time' or 'p50' time), the maximum time for clean or productive activities (i.e., the 'Max Time' or 'p90' time); and, in addition, the minimum cost, the average cost, and the maximum cost for clean or productive activities (see 'cost attribute') are provided for each of the following 'Subactivities' in the 'activity template' of FIG. 34: rig up surface equipment, safety meeting, test equipment, circulate, pump spacer, mix and pump slurry, set seal and test, and rig down surface equipment. In addition, the minimum time for nonproductive activities ('Min Time' or 'p10' time), the average time for nonproductive activities ('Avg Time' or 'p50' time), the maximum time for nonproductive activities ('Max Time' or 'p90' time); and the minimum cost, the average cost, and the maximum cost for nonproductive activities (see 'cost attribute') are also provided for each of the 'Subactivities' on the 'activity template' 216.

In FIG. 35, a second example of an 'activity template' 216 is illustrated. In FIG. 35, the minimum time for clean or productive activities (i.e., the 'Min Time' or 'p10' time), the average time for clean or productive activities (i.e., the 'Avg Time' or 'p50' time), the maximum time for clean or productive activities (i.e., the 'Max Time' or 'p90' time); and the minimum cost, the average cost, and the maximum cost for clean or productive activities (see 'cost attribute') are provided for each of the following 'Subactivities' on the 'activity template' 216 of FIG. 35: safety meeting, pick up and make up bottom hole assembly (Bha), run in hole, circulate, drill rotary, circulate, short trip, circulate, pull out of hole, and pull out and lay down bottom hole assembly (Bha). In addition, the minimum time for nonproductive activities ('Min Time' or 'p10' time), the average time for nonproductive activities ('Avg Time' or 'p50' time), the maximum time for nonproductive activities ('Max Time' or 'p90' time), and the minimum cost, the average cost, and the maximum cost for nonproductive activities (see 'cost attribute') are also provided for each of the 'Subactivities' on the 'activity template' 216.

The 'Automatic Well Planning Monte Carlo Simulation software' 206a of FIG. 31 will group each of the 'Subactivities' of the 'plurality of Subactivities', which are required to complete a particular task, into a set of 'summary activities'. With respect to each of the 'summary activities', a 'probabilistic analysis' associated with each 'summary activity' is performed. The calculation method used in connection with each 'probabilistic analysis' is called either the 'Monte Carlo' calculation method or the 'Monte Carlo Advanced' calculation method. A 'summary activity' is an activity which can be broken down or subdivided into further summary activities or into further 'Subactivities'. In this specification, the term 'Subactivity' and the term 'non-summary activity' are used interchangibly. A 'Subactivity' or 'non-summary activity' is one which cannot be further broken down or further subdivided into several constituent (or subordinate) activities. Examples of a 'summary activity' will be provided later in this specification with reference to FIGS. 41, 42, and 43 of the drawings. In addition, further examples of a 'Subactivity/non-summary activity' will be provided later in this specification with reference to FIGS. 41, 42, and 43 of the drawings. The 'activity templates' 216 (examples of which are shown in FIGS. 34 and 35) are used in the Time and Cost Task 220 of the 'Automatic Well Planning Monte Carlo Simulation software' 206a of FIG. 38 in a manner which will be discussed below with reference to FIG. 38.

Figure 36:
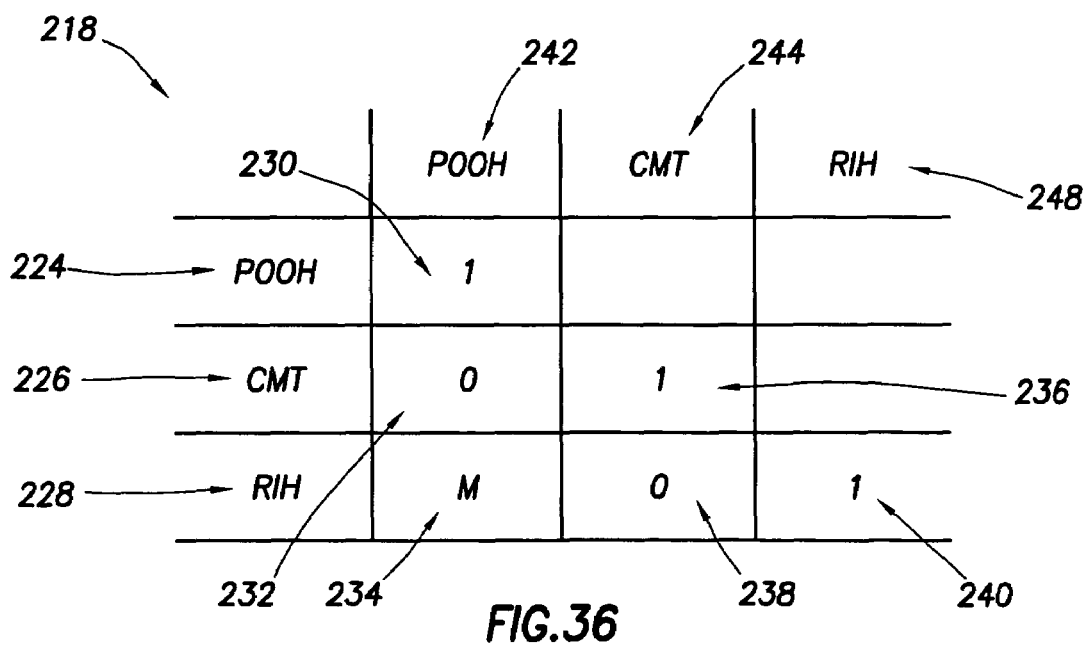
FIGS. 36 and 37 including FIGS. 37A, 37B, 37C, and 37D which support FIG. 37 illustrate examples of the 'Correlation Matrix' of FIGS. 32 and 33 and which form a part of the input data of FIGS. 30-33.
Figure 37:
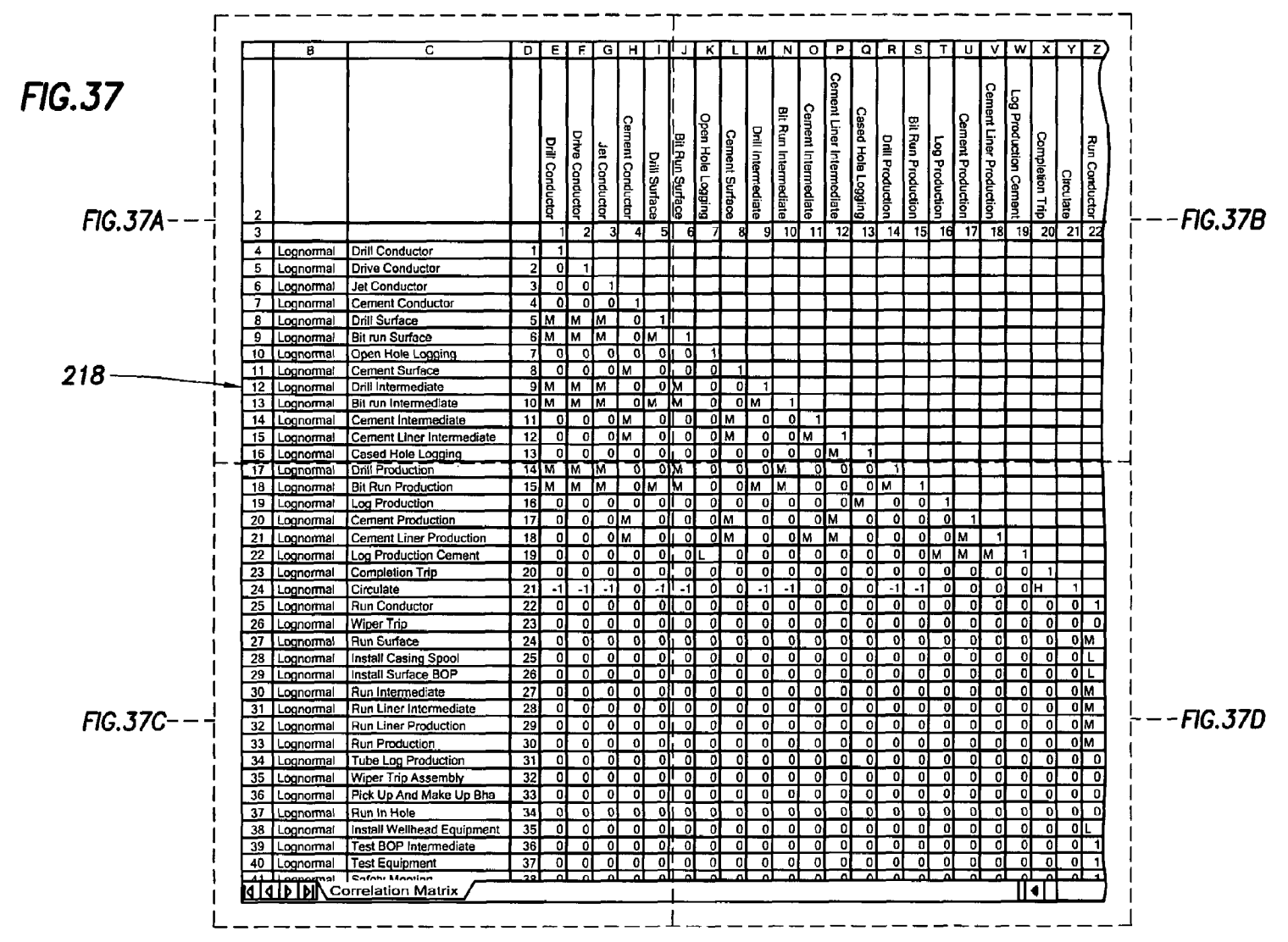
Figure 37D:
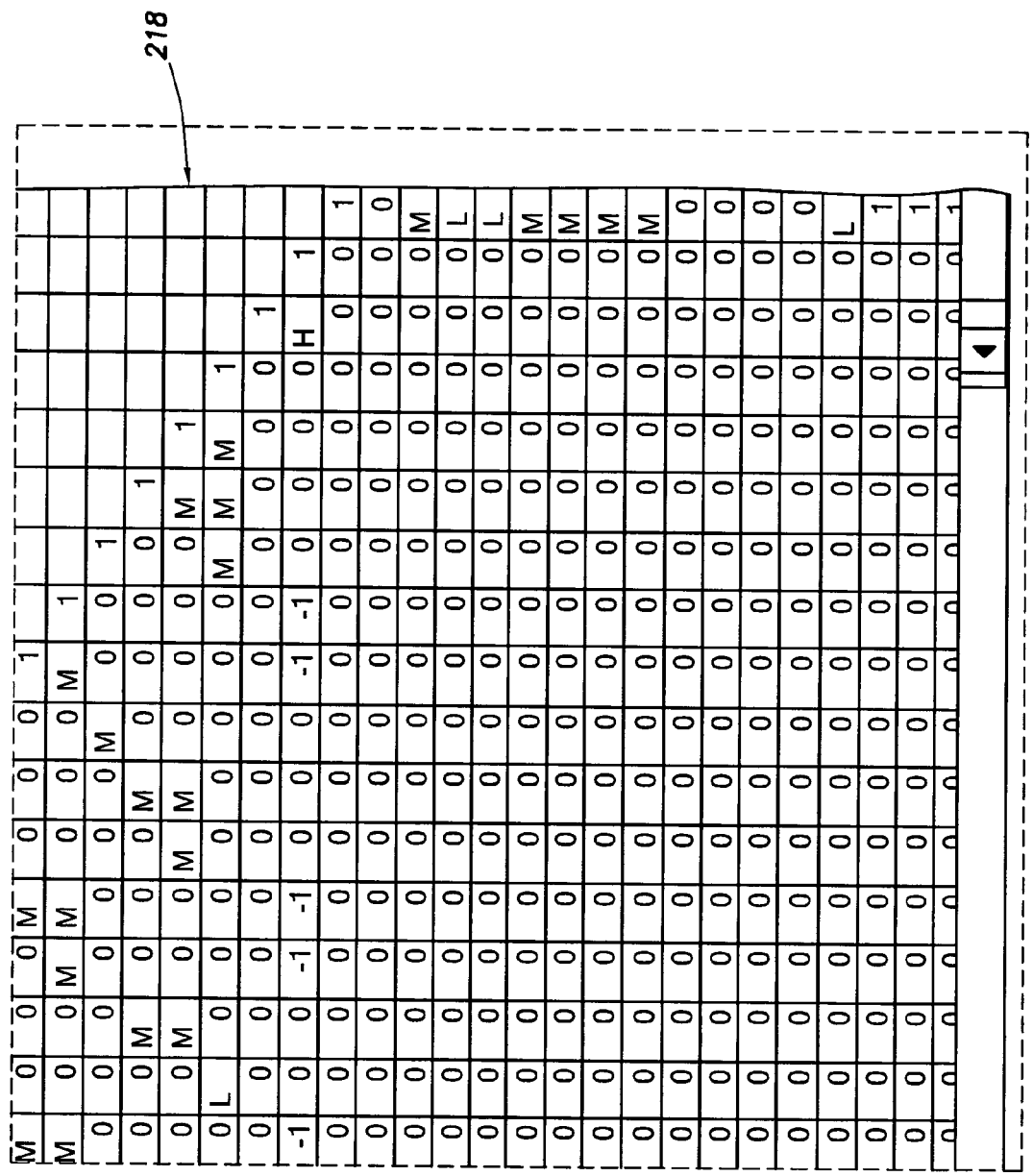

Referring to FIGS. 36 and 37 (including FIGS. 37A, 37B, 37C, and 37D), an example of the 'correlation matrix' 218 of the input data 212a of FIGS. 32 and 33 is illustrated. In FIG. 36, a simple correlation matrix 218 is illustrated. Three variables or 'Subactivities' are listed, in FIG. 36, on a row and in a column: the 'pull-out of hole' Subactivity (POOH), the 'cementing' Subactivity (CMT), and the 'running-in hole' Subactivity (RIH). For example, in the row, the POOH Subactivity 242, the CMT Subactivity 244, and the RIH Subactivity 248 are listed. In the column, the POOH Subactivity 224, the CMT Subactivity 226, and the RIH Subactivity 228 are listed. In operation, the correlation matrix 218 of FIG. 36 provides the relationship between a first Subactivity and a second Subactivity. The correlation matrix 218 operates as follows: The POOH Subactivity 242 and the POOH Subactivity 224 correlate well together because they are the same Subactivity, therefore, a '1' is placed in the box 230 at the intersection between the POOH Subactivity 242 and the POOH Subactivity 224. Similarly, the CMT Subactivity 226 and the CMT Subactivity 244 correlate well together because they are the same Subactivity, therefore, a '1' is placed in box 236. Similarly, the RIH Subactivity 228 and the RIH Subactivity 248 correlate well together because they are the same Subactivity, therefore, a '1' is placed in box 240. However, the CMT Subactivity 226 and the POOH Subactivity 242 do not correlate well because they are unrelated Subactivities, therefore, a '0' is placed in box 232. In addition, the RIH Subactivity 228 and the CMT Subactivity 244 do not correlate well because they are unrelated Subactivities, therefore, a '0' is placed in box 238. On the other hand, the RIH Subactivity 228 and the POOH Subactivity 242 correlate 'moderately well', therefore, an 'M' for 'moderate' or 'medium' is placed in the box 234 in the correlation matrix 218 of FIG. 36. In FIG. 37, an example of a more complete 'correlation matrix' 218 is illustrated. The functional operation of the 'correlation matrix' 218 of FIG. 37 is the same as the functional operation of the 'correlation matrix' 218 of FIG. 36 as described above. However, be advised that the correlation coefficients are user definable and are not automatically defined (except by default) by the software, and that the discussion in this paragraph is an example of how the correlation matrix can be applied by the user.

Figure 38:
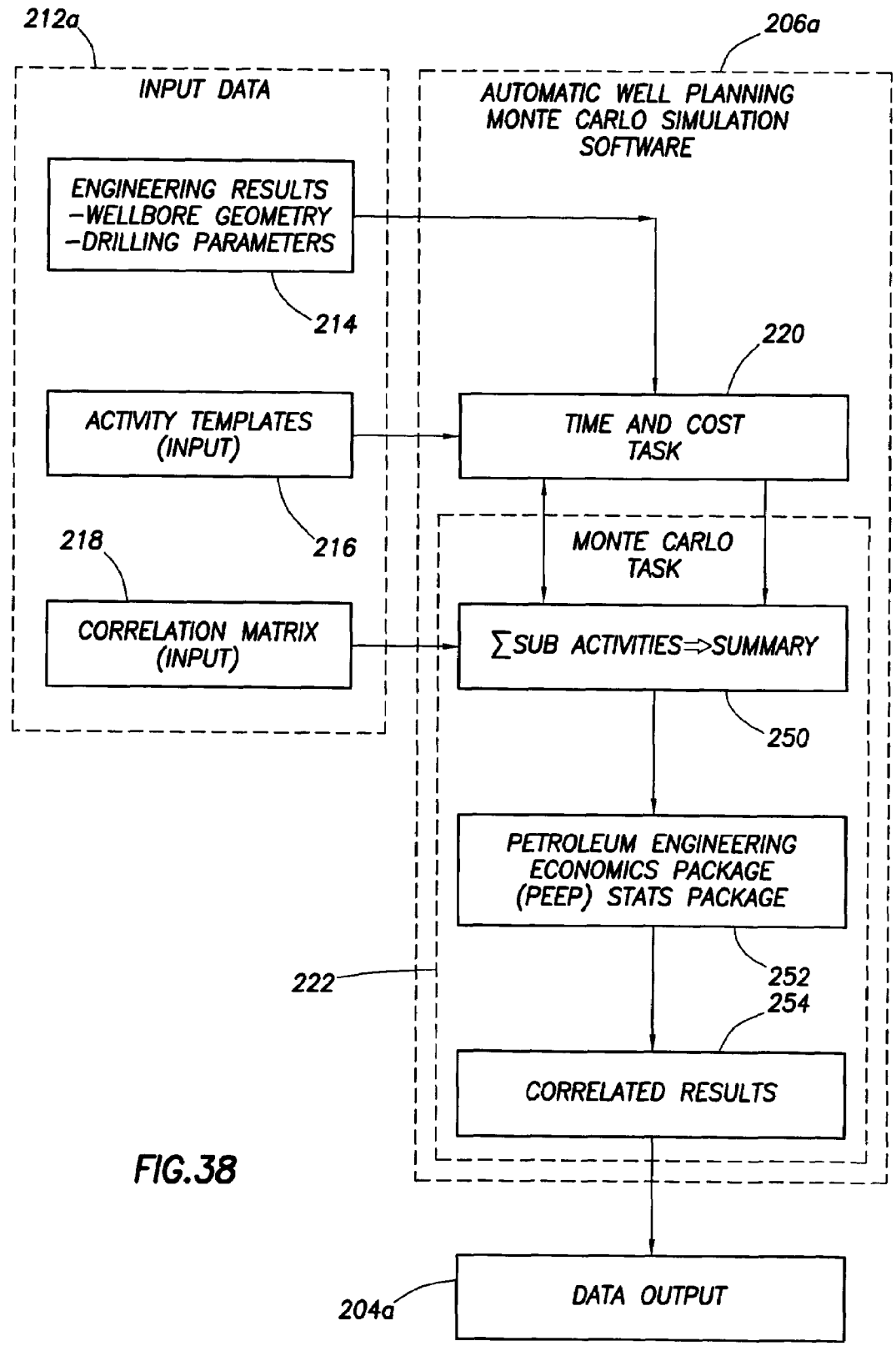
FIG. 38 illustrates a more detailed construction of the 'Automatic Well Planning Monte Carlo Simulation Software', which is shown in FIG. 33, responsive to the input data for generating the data output.

Refer now to FIG. 38. A more detailed construction of the 'Automatic Well Planning Monte Carlo Simulation Software' 206a of FIG. 33 is illustrated in FIG. 38.

In FIG. 38, the 'Automatic Well Planning Monte Carlo Simulation Software' 206a in FIG. 38 includes: (1) the 'Time and Cost Task' 220, responsive to the 'plurality of Subactivities' from the engineering results 214 and to a 'plurality of time and cost data' from the activity templates 216 which will be associated, respectively, with the 'plurality of Subactivities', adapted for generating a 'plurality of Subactivities and a corresponding plurality of time and cost data' which is associated, respectively, with the 'plurality of Subactivities'; and (2) the Monte Carlo Task 222, responsive to output from the correlation matrix 218 and to the 'plurality of Subactivities and the corresponding plurality of time and cost data' which has been associated, respectively, with the 'plurality of Subactivities' generated by the Time and Cost Task 220 (as shown in FIG. 33), adapted for generating the Data Output 204a from which the numerical display 208 and the graphical display 210 are generated.

In particular, the Monte Carlo Task 222 of FIG. 38 further includes: (1) a first subtask 250 entitled "ΣSub Activities⇒Summary " 250 which will receive the 'plurality of Subactivities and the corresponding plurality of time and cost data' from the Time and Cost Task 220, and, responsive thereto, will assimilate or group the received 'plurality of Subactivities including their corresponding plurality of time and cost data' into a 'one or more primary summary activities', 'one or more subordinate or included summary activities' which underlie the primary summary activities, and 'one or more Subactivities' which underlie the 'subordinate or included summary activities'; (2) a second subtask 252 entitled "Petroleum Engineering Economics Package (PEEP) Stats Package" 252 which will use the aforementioned 'primary summary activities', 'subordinate or included summary activities', and 'Subactivities' and the 'corresponding time and cost data' to plot lognormal distributions similar to the lognormal distribution shown in FIG. 44; and (3) a third subtask 254 including a set of 'correlated results' 254. The 'correlated results' 254 are back allocated from the 'summary activities' to the 'Subactivities', a step which will be described in more detail later in this specification. When the correlated results 254 are back allocated from the 'summary activities' to the 'Subactivities', the Data Output 204a is generated; and, when the Data Output 204a is generated, the numerical display 208 and the graphical display 210 of FIGS. 30 and 31 are further generated.

In operation, referring to FIG. 38, the engineering results 214 will generate a 'plurality of Subactivities' representing 'wellbore geometry' and 'drilling parameters', the 'plurality of Subactivities' being provided as an input to the Time and Cost Task 220. In addition, the activity templates 216 are also provided as an input to the Time and Cost Task 220. Recall that the activity templates 216 contain a 'plurality of Subactivities' and a corresponding 'plurality of time and cost data' that associated, respectively, with the 'plurality of Subactivities'. As a result, the activity templates 216 can be used to associate a 'plurality of time and cost data' with each Subactivity of the 'plurality of Subactivities' which are received from the engineering results 214. The correlation matrix 218 is provided as input data to step 250 in the Monte Carlo Task 222.

In response to a 'first plurality of Subactivities' received from the engineering results 214 (that are based on 'wellbore geometry' and 'drilling parameters') and in response to an output from the activity templates 216, the Time and Cost Task 220 will compare the 'first plurality of Subactivities' from the engineering results 214 with the 'second plurality of Subactivities' stored in the activity templates 216. When a match is found, by the Time and Cost Task 220, between a first Subactivity of the 'first plurality of Subactivities' from the engineering results 214 with a second Subactivity of the 'second plurality of Subactivities' stored in the activity templates 216, the Time and Cost Task 220 will locate, in the activity templates 216, a 'second plurality of time and cost data' that is associated with the second Subactivity in the activity templates 216. At this point, the Time and Cost Task 220 will read the 'second plurality of time and cost data' from the activity templates 216. The Time and Cost Task 220 will then associate the 'second plurality of time and cost data' with the 'first plurality of Subactivities' received from the engineering results 214. As a result, when execution of the Time and Cost Task 220 is complete: (1) the Time and Cost Task 220 will generate a 'plurality of Subactivities and a corresponding plurality of time and cost data' which is associated, respectively, with the 'plurality of Subactivities'; and (2) a 'p10' time and cost data figure (both 'clean' and 'nonproductive') and a 'p50' time and cost data figure (both 'clean' and 'nonproductive') and a 'p90' time and cost data figure (both 'clean' and 'nonproductive') will be associated with each 'Subactivity' of the 'plurality of Subactivities' received from the engineering results 214.

Step 250 in the Monte Carlo Task 222 entitled "ΣSubActivities⇒Summary" will: (1) receive the 'plurality of Subactivities and a corresponding plurality of time and cost data' from the Time and Cost Task 220, (2) use the Correlation Matrix 218 to determine (in the manner described above with reference to FIG. 36) which of the 'Subactivities' of the 'plurality of Subactivities' received from the Time and Cost Task 220 correlate well with other 'Subactivities' of the 'plurality of Subactivities' received from the Time and Cost Task 220, and, based on the results of the aforementioned analysis of the Correlation Matrix 218 set forth in step (2) above, (3) assimilate or group the 'plurality of Subactivities and the corresponding plurality of time and cost data', that are received from the Time and Cost Task 220, into: one or more 'primary summary activities', one or more 'subordinate or included summary activities' which underlie the 'primary summary activities', and one or more 'Subactivities' which underlie the 'subordinate or included summary activities'. Step 250 will also determine a 'p10' position, a 'p50' position, and a 'p90' position associated with each of the one or more 'primary summary activities', each of the one or more 'subordinate or included summary activities' which underlie the 'primary summary activities', and each of the one or more 'Subactivities' which underlie the 'subordinate or included summary activities'. When step 250 entitled ΣSub Activities⇒Summary is complete, a 'p10' time and cost data figure (both 'clean' and 'nonproductive') and a 'p50' time and cost data figure (both 'clean' and 'nonproductive') and a 'p90' time and cost data figure (both 'clean' and 'nonproductive') will be associated with each 'primary summary activity' and each 'subordinate or included summary activity' and each 'Subactivity' of the 'plurality of Subactivities' received from the engineering results 214. Examples of 'primary summary activities', 'subordinate or included summary activities', and 'Subactivities' will be given below with reference to FIGS. 41, 42, and 43 of the drawings.

Step 252 in the Monte Carlo Task 222 of FIG. 38 entitled the 'PEEP Stats Package' will then plot a 'lognormal distribution' between the above referenced 'p10' and the 'p90' positions (determined during the 'ΣSubActivities⇒Summary' step 250) associated with each of the 'primary summary activities' and each of the 'subordinate or included summary activities' and each of the 'Subactivities'. See FIG. 44 for an example of a lognormal distribution.

Step 254 in the Monte Carlo Task 222 of FIG. 38 will generate a plurality of 'correlated results'. The Data Output 204a is generated from the plurality of 'correlated results'. However, before the Data Output 204a can be generated, the correlated results 254 must first be back allocated from the 'summary activities' to the 'Subactivities'. When the correlated results 254 are back allocated from the summary activities to the Subactivities, the Data Output 204a is generated. When the Data Output 204a is generated, the numerical display 208 and the graphical display 210 of FIGS. 30 and 31 are further generated. The numerical display 208 will include a 'p10' time and cost data figure (both 'clean' and 'nonproductive') and a 'p50' time and cost data figure (both 'clean' and 'nonproductive') and a 'p90' time and cost data figure (both 'clean' and 'nonproductive') associated with each 'primary summary activity' and each 'subordinate or included summary activity' and each 'Subactivity' of the 'plurality of Subactivities'.

Figure 39:
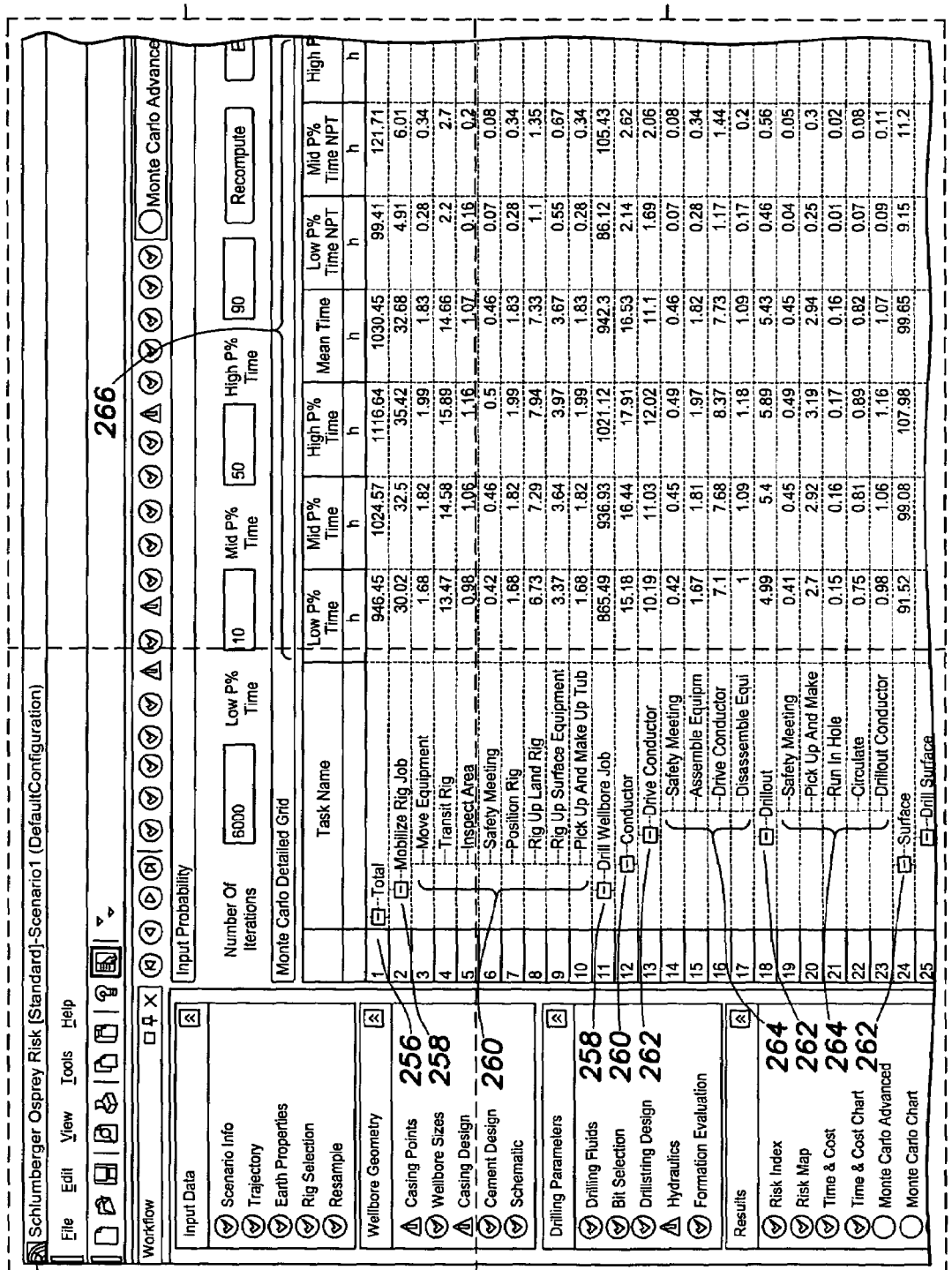
FIG. 39 including FIGS. 39A, 39B, 39C, and 39D which support FIG. 39, and FIG. 40 including FIGS. 40A, 40B, 40C, and 40D which support FIG. 40 are examples of the numerical display 21 of FIG. 30 which is generated when the Time and Cost task and the Monte Carlo Task of FIG. 38 are executed, FIGS. 39 and 40 illustrating how the selection by a user of a first summary activity on the display of FIGS. 39 and 40 will subsequently generate and display one or more additional summary activities and will eventually generate and display one or more additional non-summary activity.
Figure 39A:
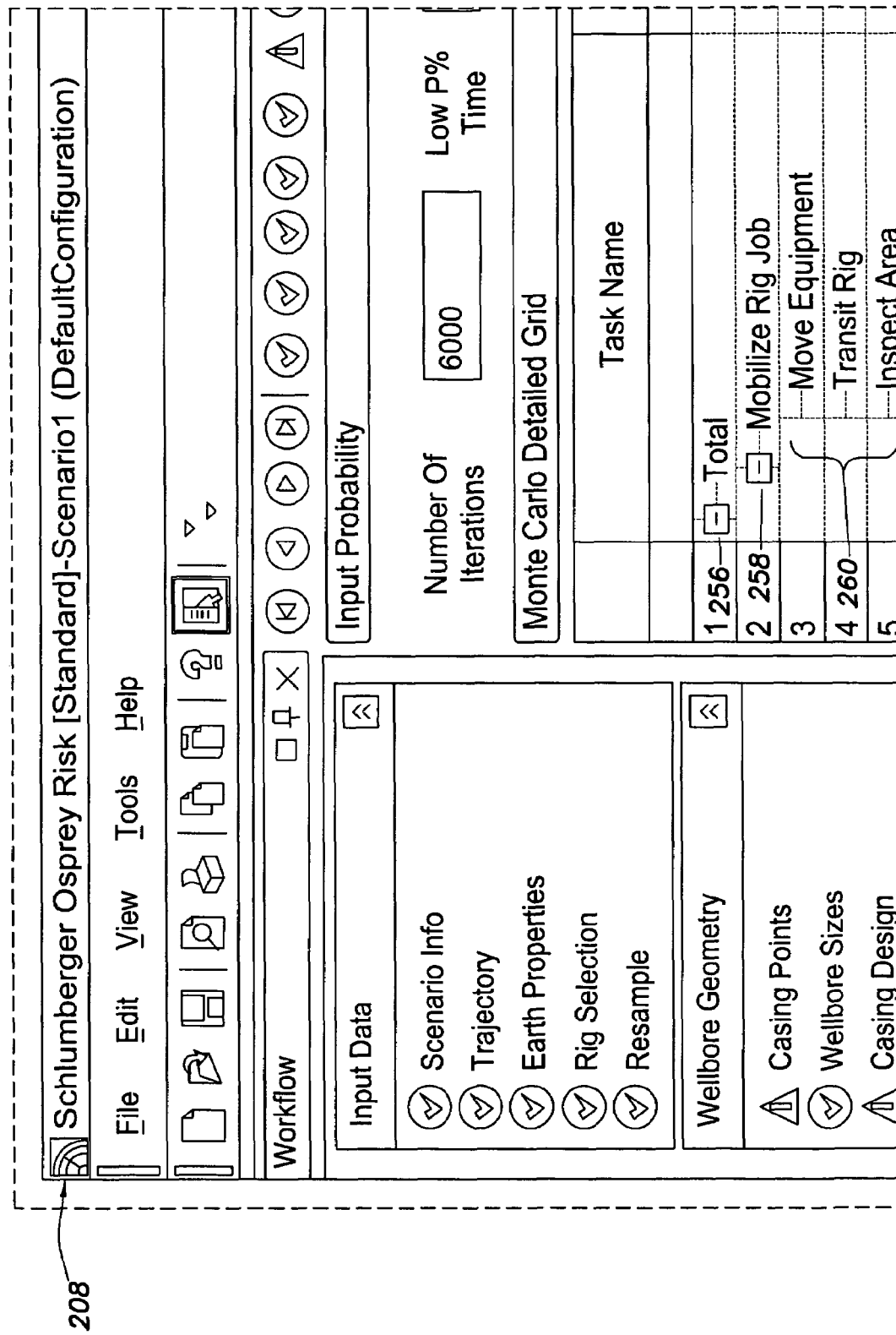
Figure 39B:
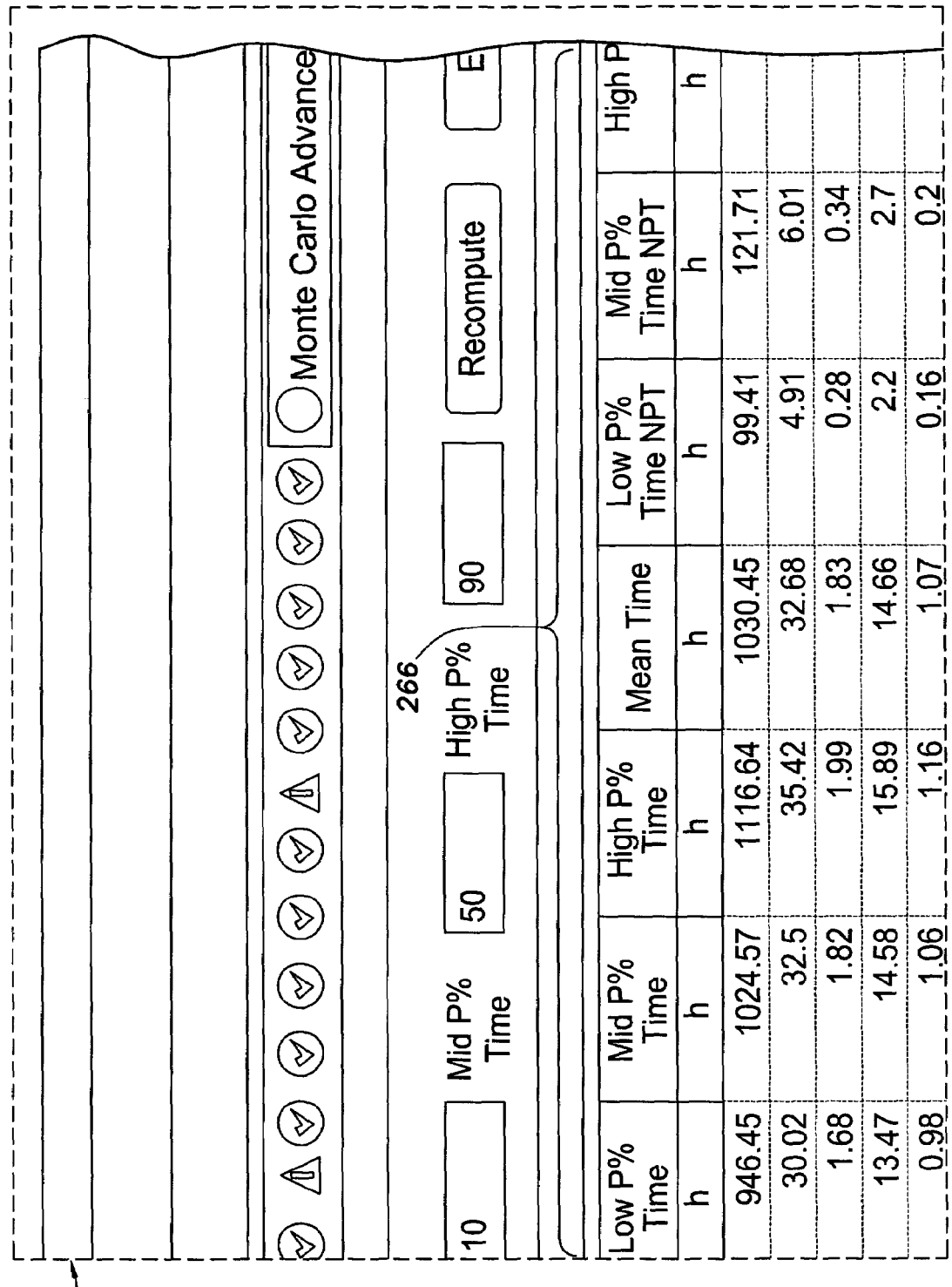
Figure 39C:
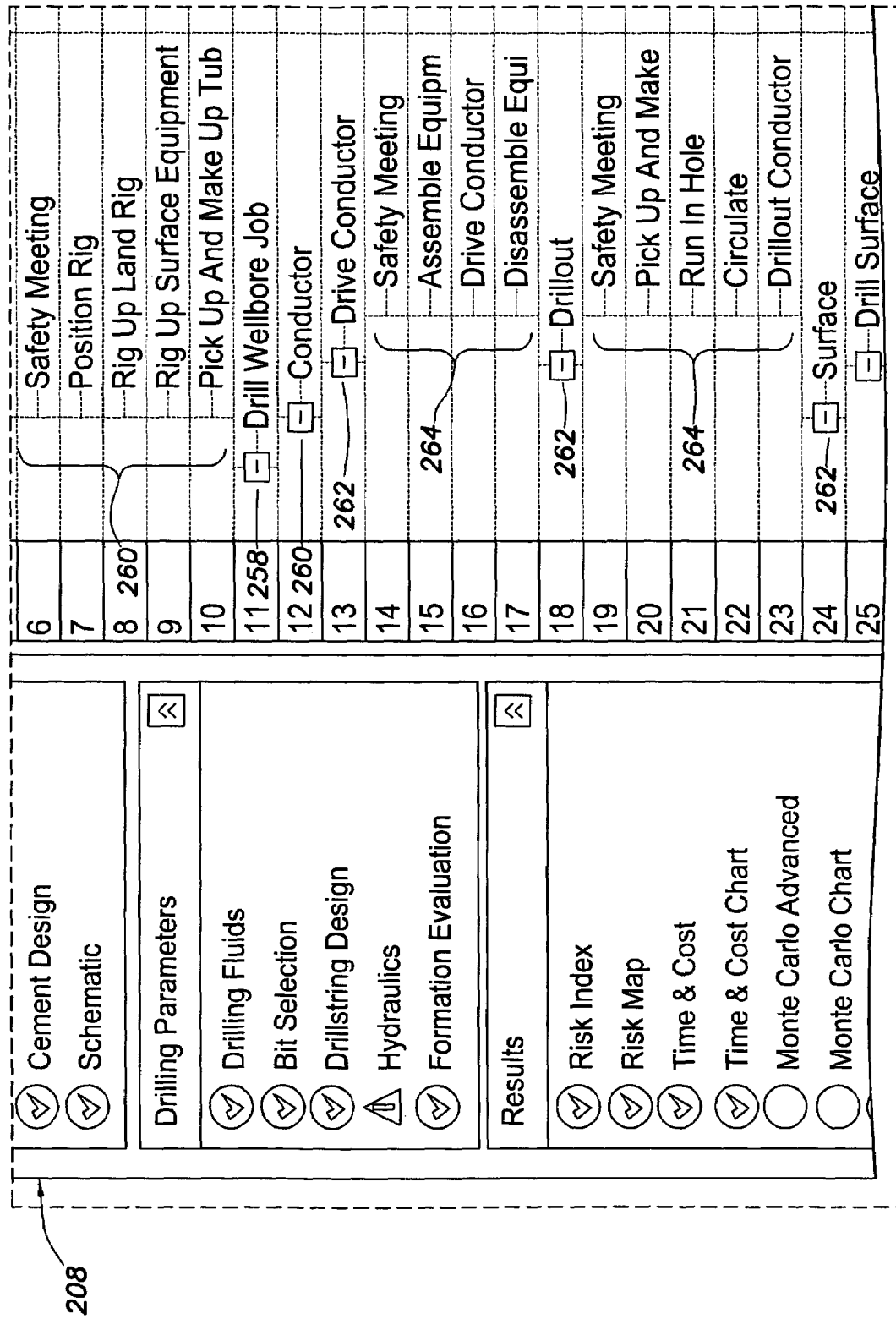
Figure 40C:
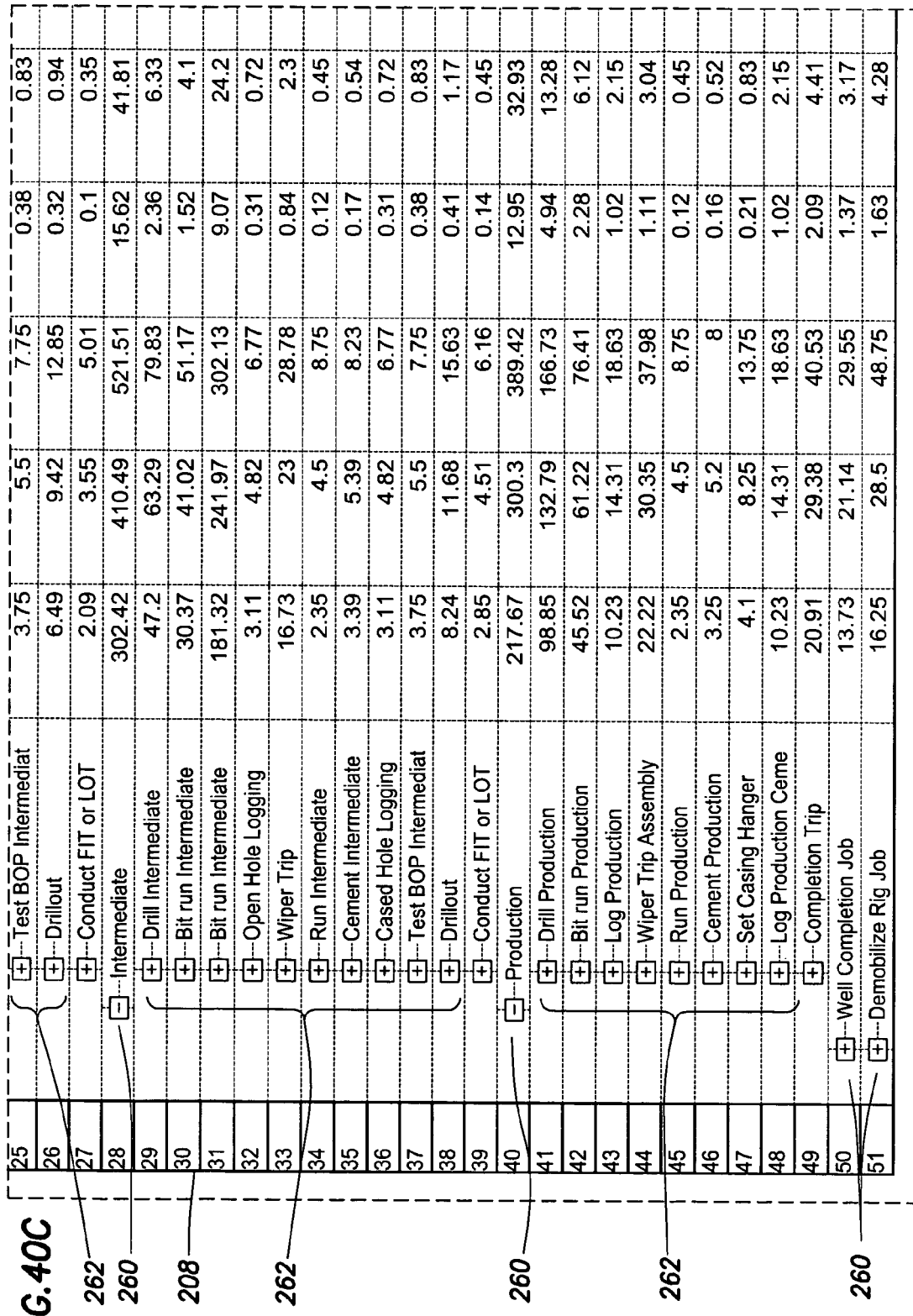

Referring to FIGS. 39 (including FIGS. 39A, 39B, 39C, and 39D) and 40 (including FIGS. 40A, 40B, 40C, and 40D), the 'numerical display' 208 of FIGS. 30 and 31 will display a first set of probabilistic results in a 'numerical' manner. In FIGS. 39 and 40, the 'numerical display' 208 will display 'time' and 'cost' information in connection with each 'primary summary activity', each 'subordinate or included summary activity' which underlies the 'primary summary activity', and each 'Subactivity' which underlies the 'subordinate or included summary activity'.

In FIG. 39, a first embodiment of the 'numerical display' 208 of FIG. 30 is illustrated. The 'numerical display' 208 of FIG. 39 includes a 'Total' time and cost figure 256, a first plurality of subordinate or included summary activities 258 which underlie the 'Total' time or cost figure 256, a second plurality of further subordinate or included summary activities 260 which underlie the corresponding first plurality of subordinate or included summary activities 258, a third plurality of subordinate or included summary activities 262 which underlie some of the second plurality of subordinate or included summary activities 260, a fourth plurality of subordinate or included summary activities 264 which underlie some of the third plurality of subordinate or included summary activities 262, and perhaps some further Subactivities which underlie the fourth plurality of subordinate or included summary activities 264, etc. In the 'numerical display' 208 of FIG. 39, each summary activity 258 and each included summary activity 260, 262, and 264 has associated therewith a plurality of times 266. The 'numerical display' 208 will include the following plurality of times 266 associated with the 'Total' 256 and each included summary activity 258 and each further included summary activity 260, 262, 264: the 'Low p % time' (or minimum time), the 'Mid p % time' (or average time), the 'High p % time' (or maximum time), the 'Low p % NPT' (or minimum nonproductive time), the 'Mid p % NPT' (or average nonproductive time), and the 'High p % NPT' (or maximum nonproductive time). The plurality of times 266 represent a 'first set of probabilistic results' which include: a 'p10' time and cost data figure (both 'clean' and 'nonproductive'), and a 'p50' time and cost data figure (both 'clean' and 'nonproductive'), and a 'p90' time and cost data figure (both 'clean' and 'nonproductive') associated with each 'primary summary activity' and each 'subordinate or included summary activity' and each 'Subactivity' of the 'plurality of Subactivities'. These plurality of times 266 are better illustrated in the second embodiment of the 'numerical display' 208 shown in FIG. 40.

In FIG. 40, a second embodiment of the 'numerical display' 208 of FIG. 30 is illustrated. In FIG. 40, the 'numerical display' 208 includes the plurality of times 266 associated with the 'Total' 256 and each subordinate or included summary activity 258 and each further subordinate or included summary activity 260, 262, 264, as follows: (1) minimum (clean or productive) time 'Min Time', (2) average (clean or productive) time 'Avg Time', (3) maximum (clean or productive) time 'Max Time', (4) minimum nonproductive time 'Min NPT', (5) average nonproductive time 'Avg NPT', and (6) maximum nonproductive time 'Max NPT'. The 'numerical display' 208 of FIGS. 39 and 40 also includes a plurality of costs 268 associated with the 'Total' time or cost figure 256 and each subordinate or included summary activity 258 and each further subordinate or included summary activity 260, 262, 264, as follows: (1) a minimum (clean or productive activity) cost 'Min Cost', (2) an average (clean or productive activity) cost 'Avg Cost', (3) a maximum (clean or productive activity) cost 'Max Cost', (4) a minimum nonproductive-activity cost 'Min NPC', (5) an average nonproductive-activity cost 'Avg NPC', and (6) a maximum nonproductive-activity cost 'Max NPC'.

In operation, referring to FIGS. 39 and 40, the 'numerical display' 208 of FIGS. 39 and 40 will represent the 'Data Output' 204a that is recorded or displayed on the Recorder or Display device 204 of FIG. 30. The user, using a computer-mouse, will click on one of the 'summary activities' of FIGS. 39 and 40 that are being displayed on the Recorder or Display device 204. For example, assume the user, using the mouse, clicks on the 'Mobilize Rig Job' summary activity 258 shown in FIG. 39. In response thereto, the computer system 200 will cause the following 'subordinate or included summary activities' 260 in FIG. 39 to be displayed below the 'Mobilize Rig Job' summary activity 258 on the Recorder or Display device 204: the Move Equipment summary activity, the Transit Rig summary activity, the Inspect Area summary activity, the Safety Meeting summary activity, the Position Rig summary activity, the Rig Up Land Rig summary activity, the Rig Up Surface Equipment summary activity, and the Pick Up And Make Up Tub summary activity. On the Recorder or Display device 204, adjacent to the 'Mobilize Rig Job' primary summary activity 258 in FIGS. 39 and 40 and adjacent to each of the subordinate or included summary activities 260 which underline the primary summary activity 258, the following 'time' and 'cost' data 266 and 268 will be displayed: the minimum time (Min Time or Low p % time), the average time (Avg Time or Mid p % time), the maximum time (Max Time or High p % time), the mean time, the minimum nonproductive time (Min NPT or Low p % time NPT), the average nonproductive time (Avg NPT or Mid p % time NPT), the maximum nonproductive time (Max NPT or High p % time NPT), the minimum cost (Min Cost or Low p % cost), the average cost (Avg Cost or Mid p % cost), and the maximum cost (Max Cost or High p % cost). Above the 'Mobilize Rig Job' summary activity 258 in FIG. 39, a 'Total' time and cost figure 256 will also be displayed. This 'Total' time or cost figure 256 represents the 'total time' and the 'total cost' associated with each of the primary summary activities 258 and each of the subordinate or included summary activities 260, 262, and 264.

Figure 41:
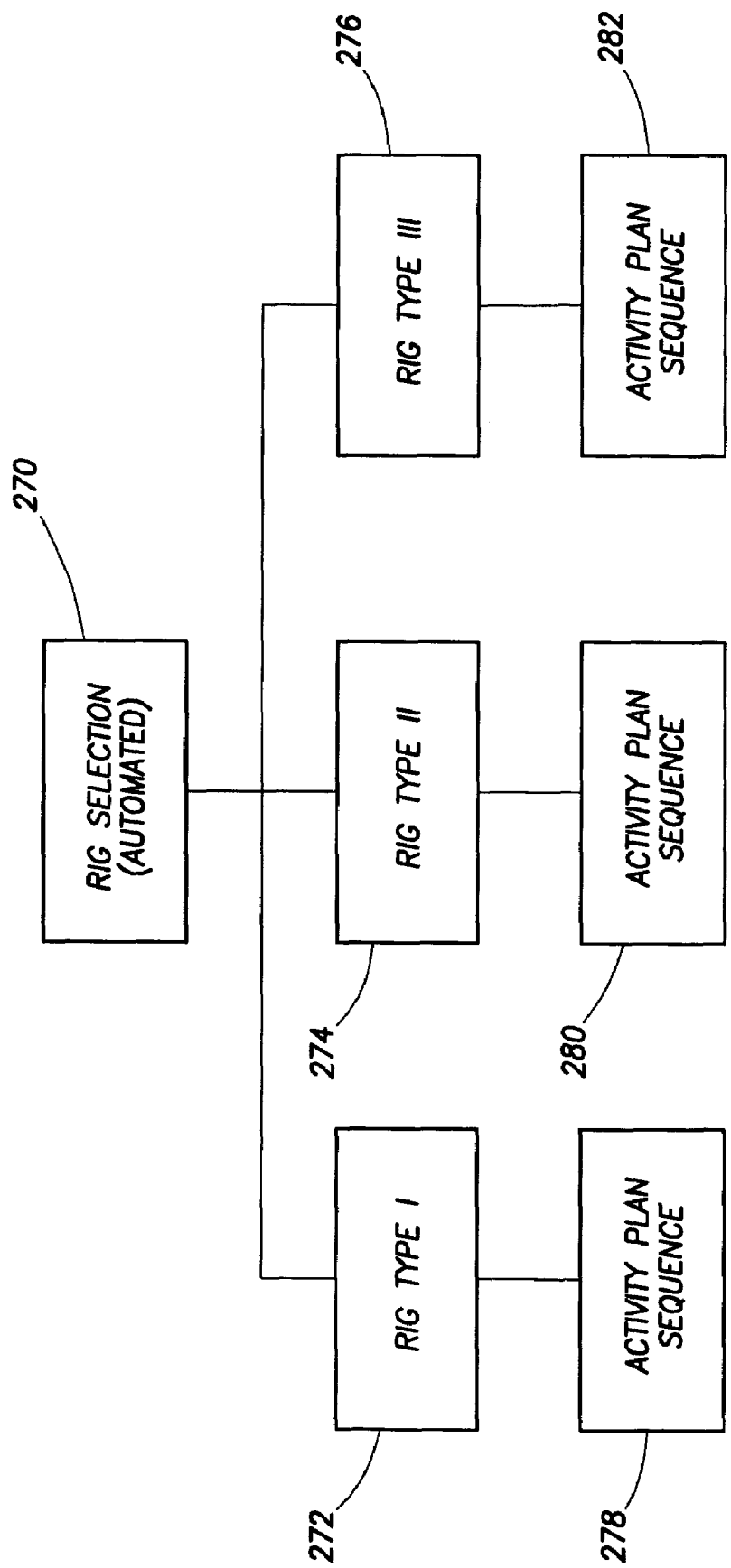
FIGS. 41-43 illustrate in greater detail, by way of example, how the selection by a user of a first summary activity on the display of FIGS. 39 and 40 will subsequently generate and display one or more additional summary activities and will eventually generate and display one or more additional non-summary activity.
Figure 42:
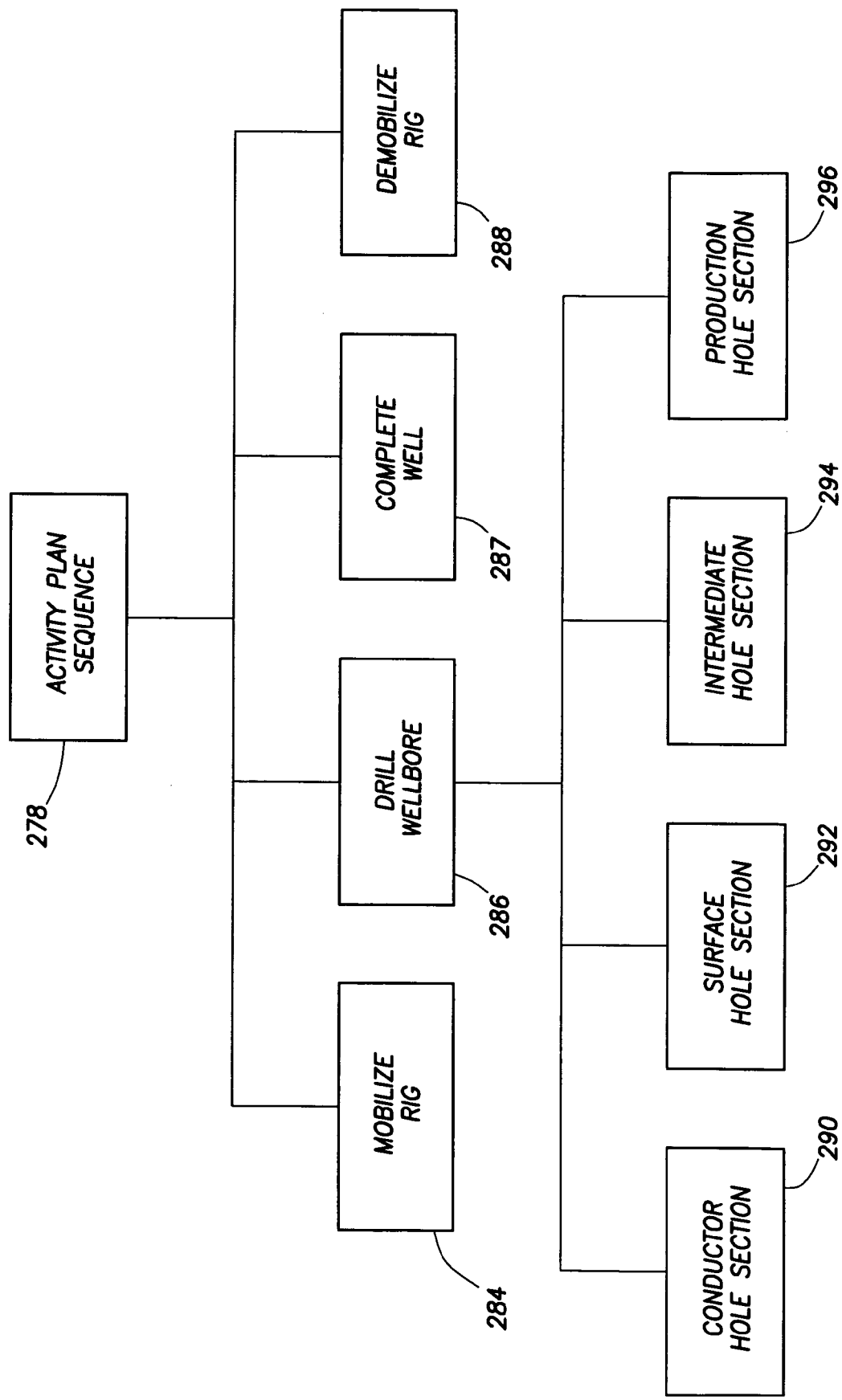
Figure 43:
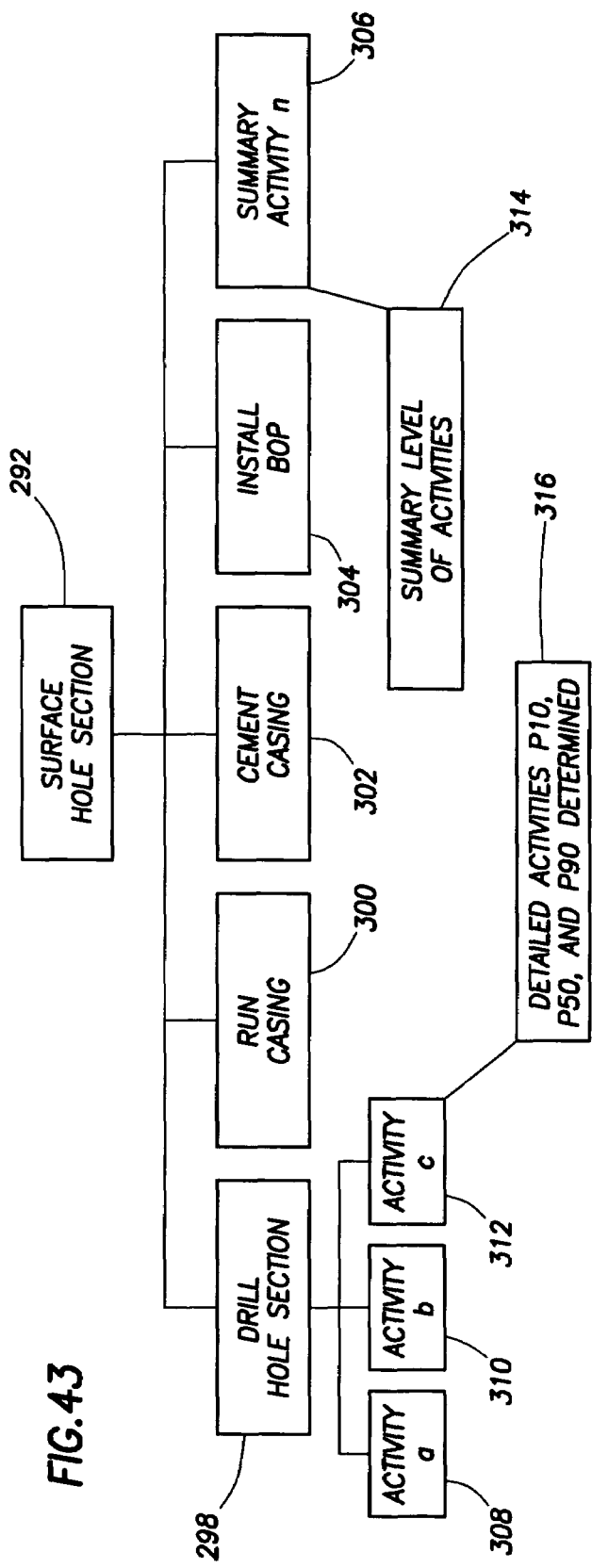

Referring to FIGS. 41, 42, and 43, recall that step 250 in the Monte Carlo Task 222 entitled "ΣSubActivities⇒Summary" will "assimilate or group" the 'plurality of Subactivities and the corresponding plurality of time and cost data', that are received from the Time and Cost Task 220, into one or more 'primary summary activities', one or more 'subordinate or included summary activities' which underlie the 'primary summary activities', and one or more 'Subactivities' which underlie the 'subordinate or included summary activities'. An example of this "assimilate or group" step, which is practiced by step 250 of the Monte Carlo Task 222, is discussed below with reference to FIGS. 41, 42, and 43 of the drawings.

When the user, using the computer-mouse, clicks on one of the summary activities 258, 260, 262, 264 of FIGS. 39 and 40 that are being displayed on the Recorder or Display device 204, 'time and cost data' associated with the 'Total' 256 and each of the included summary activities 258 and each of the further included summary activities 260, 262, 264 will be displayed on the Recorder or Display device 204. This functional sequence of operations will be discussed in greater detail below with reference to FIGS. 41, 42, and 43.

In FIG. 41, when the user clicks on one of the summary activities 258, 260, 262, 264 of FIGS. 39 and 40 that are being displayed on the Recorder or Display device 204, the activity templates 216 (examples of which are shown in FIGS. 34 and 35) are used to derive the 'time and cost data' for each 'summary activity' selected by the user. The 'time and cost data' is used in connection with the 'Time and Cost Task'. 220 in FIG. 38. In FIG. 41, assume for the purposes of this discussion that the 'times' in the 'activity templates' 216 of FIGS. 34 and 35 are based on a drilling-rig selection. In FIG. 41, a rig selection step 270 begins when the user selects a rig-type, i.e., rig type I (272), a rig type II (274), and a rig type III (276). The user will select the 'rig selection' step 270 and then the user will select one of the rig types 272, 274, and 276. Depending upon the rig type selected (i.e., one of rig types 272, 274, 276), an 'activity plan' sequence 278, 280, or 282 will be automatically selected by the 'Automatic Well Planning Monte Carlo Simulation software' 206a, the 'activity plan' sequence 278 being associated with rig type I (272), the 'activity plan' sequence 280 being associated with rig type II (274), the 'activity plan' sequence 282 being associated with rig type III (276). Each 'activity plan' 278, 280, 282 is comprised of a plurality of productive and nonproductive 'primary summary activities' and 'further subordinate or included summary activities', each 'primary summary activity' and each 'further subordinate or included summary activity' of each 'activity plan' 278, 280, 282 having a 'p10' minimum time, an 'p50' average time, a 'p90' maximum time, a 'p10' minimum cost, an 'p50' average cost, and a 'p90' maximum cost which are derived from the 'activity templates' 216. An 'activity plan', such as the 'activity plan' 278, 280, 282 in FIG. 41, will be defined and described below with reference to FIGS. 42 and 43.

In FIG. 42, assuming that the user selects 'Rig Type 1' 272 of FIG. 41, the activity plan sequence 278 of FIG. 41 will be automatically selected by the Monte Carlo Simulation software 206a. In FIG. 42, the activity plan sequence 278 includes four 'primary summary activities': the 'mobilize rig' primary summary activity 284, the 'drill wellbore' primary summary activity 286, the 'complete well' primary summary activity 287, and the 'demobilize rig' primary summary activity 288. Each of these primary summary activities 284, 286, 287, and 288 will have a 'p10' minimum time, a 'p50' average time, a 'p90' maximum time, a 'p10' minimum cost, a 'p50' average cost, and a 'p90' maximum cost which are derived from the 'activity templates' 216. Assuming that a user selects the 'Drill Wellbore' primary summary activity 286 (by clicking on 'Drill Wellbore' on the Recorder or Display device 204 using the mouse), the following four 'subordinate or included summary activities' will be automatically generated by the 'Automatic Well Planning Monte Carlo Simulation software' 206a and will be automatically displayed on the 'numerical display' 208: the 'conductor hole section' subordinate or included summary activity 290, the 'surface hole section' subordinate or included summary activity 292, the 'intermediate hole section' subordinate or included summary activity 294, and the 'production hole section' subordinate or included summary activity 296. Each of these 'subordinate or included summary activities' 290, 292, 294, and 296 will have a corresponding 'p10' minimum time, a 'p50' average time, a 'p90' maximum time, a 'p10' minimum cost, a 'p50' average cost, and a 'p90' maximum cost which are derived from the 'activity templates' 216.

In FIG. 43, assume that a user selects the 'surface hole section' subordinate or included summary activity 292 of FIG. 42 on the 'numerical display' 208. In response to that selection: (1) the 'Automatic Well Planning Monte Carlo Simulation software' 206a will automatically generate and display on the 'numerical display' 208 the following additional 'subordinate or included summary activities': the 'drill hole section' subordinate or included summary activity 298, the 'run casing' subordinate or included summary activity 300, the 'cement casing' subordinate or included summary activity 302, the 'install blow-out preventer (BOP)' subordinate or included summary activity 304, and 'any additional subordinate or included summary activities' 306 which may underlie the 'surface hole section' subordinate or included summary activity 292. Each of these additional 'subordinate or included summary activities' 298, 300, 302, 304, 306 represent a 'summary level of activities' 314 (i.e., ones which can be broken down into further subordinate or included summary activities) which have a corresponding 'p10' minimum time, 'p50' average time, 'p90' maximum time, 'p10' minimum cost, 'p50' average cost, and 'p90' maximum cost' that are derived from the 'activity templates' 216. If a user selects the 'drill hole section' additional subordinate or included summary activity 298, the 'Automatic Well Planning Monte Carlo Simulation software' 206a will automatically generate and display on the 'numerical display' 208 the following subordinate or included 'Subactivities' or 'non-summary activities' (recall that a 'Subactivity' or 'non-summary activity' is one which cannot be broken down into any additional subordinate or included summary activities): the 'activity a' Subactivity 308, the 'activity b' Subactivity 310, and the 'activity c' Subactivity 312. Each of these 'Subactivities/non-summary activities' 308, 310, and 312 will have a 'p10' minimum time, a 'p50' average time, a 'p90' maximum time, a 'p10' minimum cost, a 'p50' average cost, and a 'p90' maximum cost (that is required to complete each Subactivity) which are derived from the 'activity templates' 216. In FIG. 43, each of the 'Subactivities' or 'non-summary activities' 308, 310, and 312 represent detailed Subactivities 316 where each Subactivity has a 'p10' time or cost figure and a 'p50' time or cost figure and a 'p90' time and cost figure since, by definition, each 'Subactivity' or 'non-summary activity' cannot be broken down into any further subordinate or included activities. The notations 'p10', 'p50' and 'p90' will be discussed again later in this specification with reference to FIG. 44.

Referring to FIGS. 44 through 48, the 'graphical display' 210 of FIGS. 30 and 31 will display a second set of probabilistic results in a 'graphical' manner. In FIGS. 44 through 48, the 'graphical display' 210 will display a plurality of 'lognormal distributions'. Examples of 'lognormal distributions' are illustrated in FIGS. 44-48. The 'lognormal distributions' of FIGS. 44-48 represent the 'graphical display' 210 of FIG. 30 which is generated by and displayed/recorded on the Recorder or Display device 204 of FIG. 30.

Figure 44:
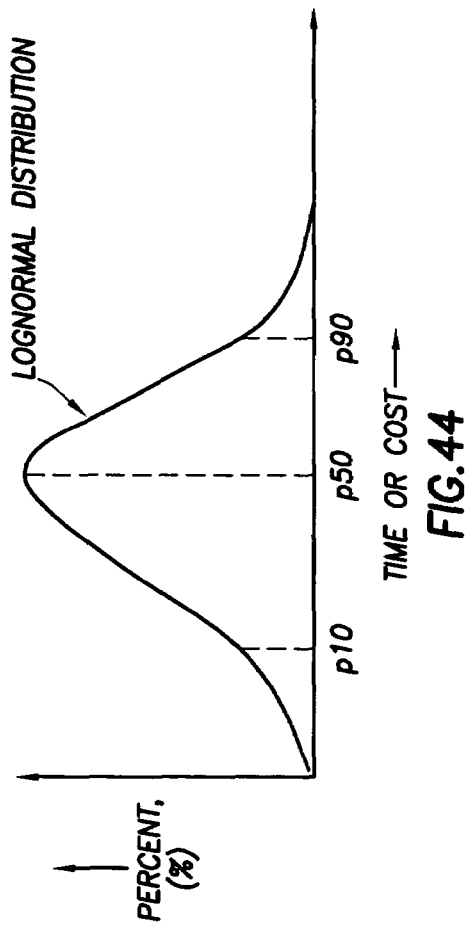
FIGS. 44-48 are examples of how the graphical display 23 of FIG. 30 is generated when the Time and Cost task and the Monte Carlo Task of FIG. 38 are executed.

In FIG. 44, a simple example of a 'lognormal distribution' is illustrated. Time or cost appears on the x-axis, and percent (%) appears on the y-axis. The notation 'p10' refers to a location along the 'time or cost' axis which relates to a first area under the lognormal distribution curve located to the left of a vertical line connected to 'p10' in FIG. 44 where the first area is equal to 10%. The notation 'p50' refers to a location along the 'time or cost' axis which relates to a second area under the lognormal distribution curve located to the left of a vertical line connected to 'p50' in FIG. 44 where the second area is equal to 50%. The notation 'p90' refers to a location along the 'time or cost' axis which relates to a third area under the lognormal distribution curve located to the left of a vertical line connected to 'p90' in FIG. 44 where the third area is equal to 90%.

Figure 45:
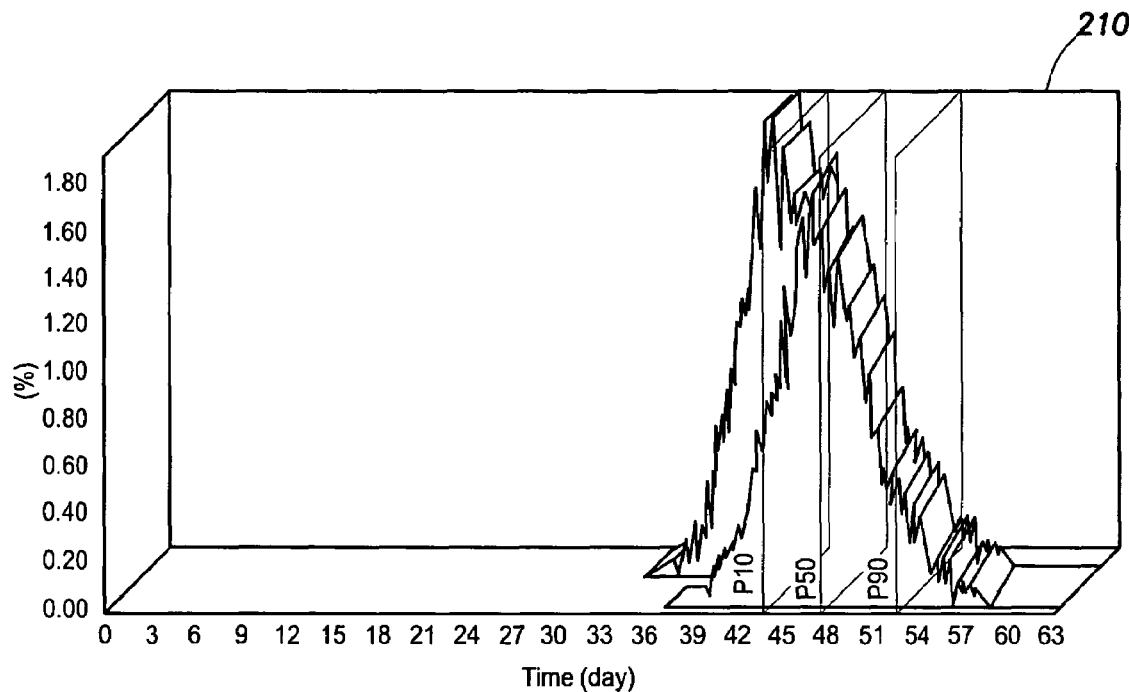
Figure 46:
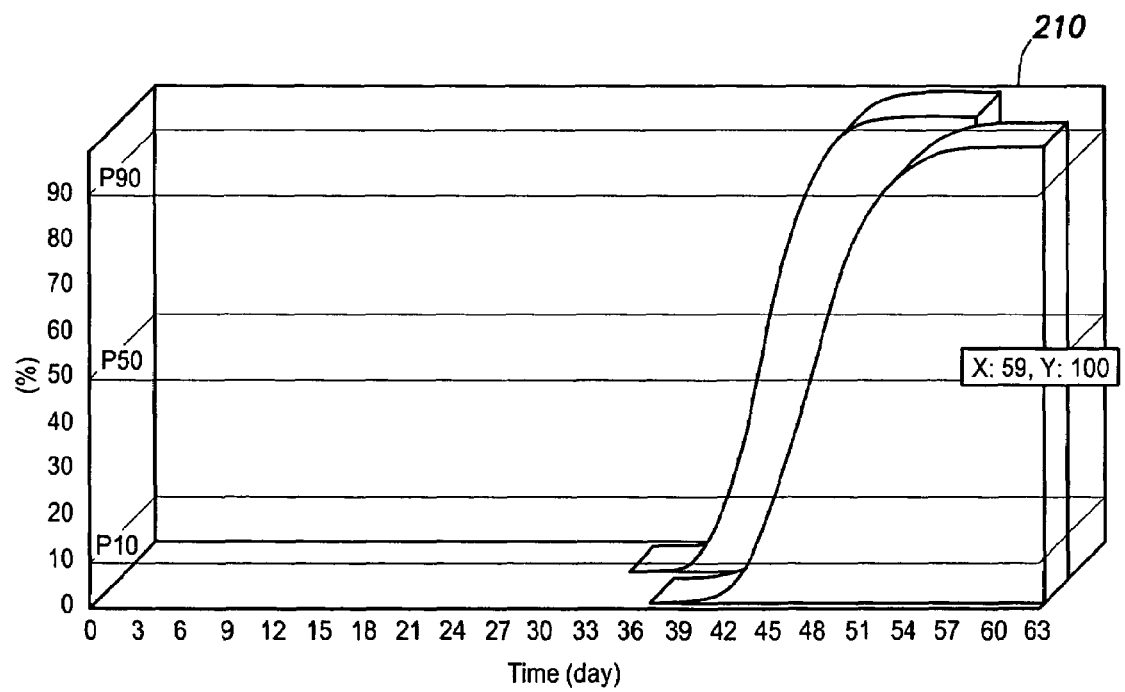
Figure 47:
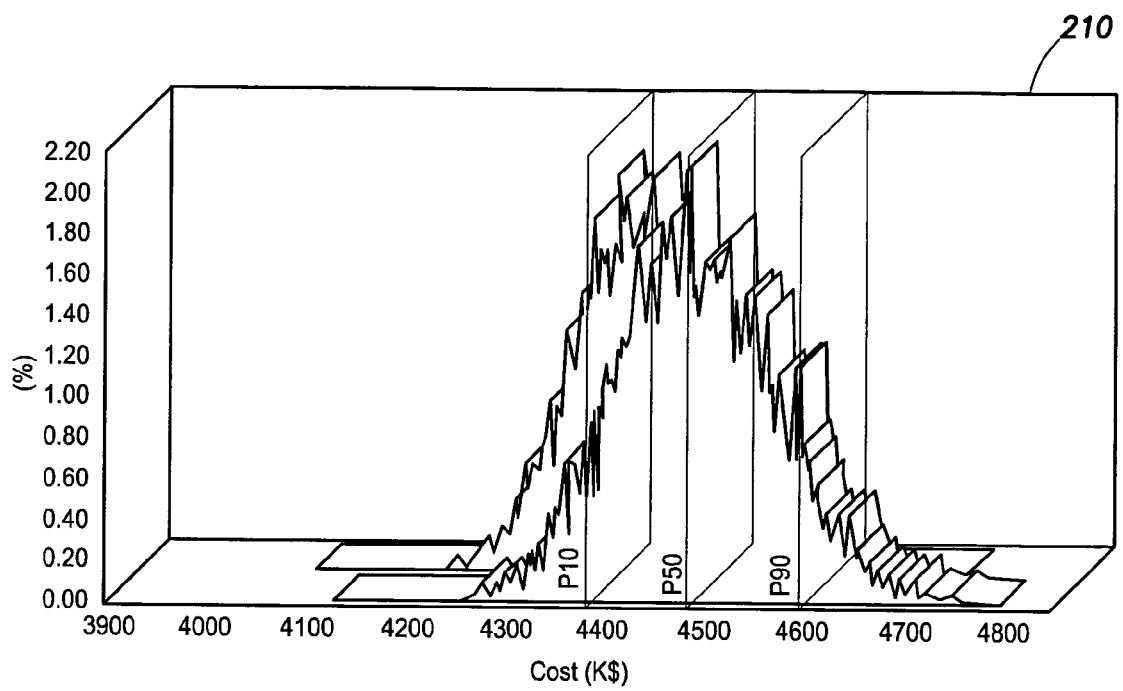
Figure 48:
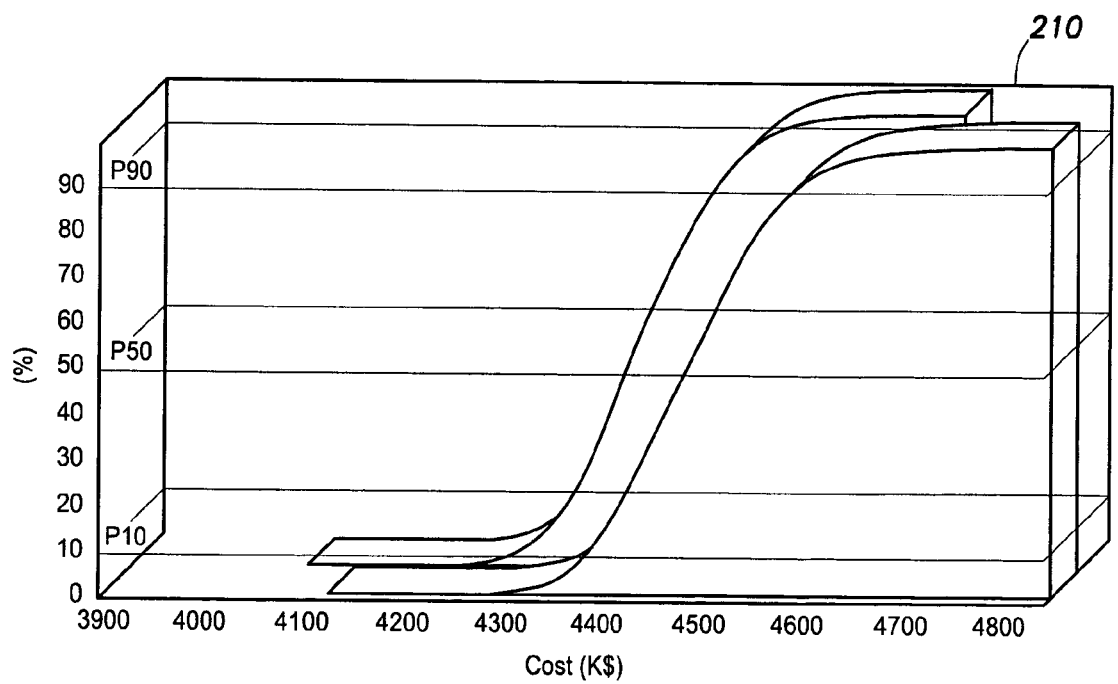

FIGS. 45-48 represent a 'second type of output display' known as the 'graphical display' 210 of FIG. 30 which is generated by the recorder or display device 204 of FIG. 30 and illustrates the second set of probabilistic results displayed in a 'graphical' manner. In FIGS. 45-48, the lognormal distribution curves of FIGS. 45-48, representing the 'graphical display' 210 of FIG. 30, include: a 'time frequency distribution' curve, a 'time cumulative probability' curve, a 'cost frequency distribution' curve, and a 'cost cumulative probability' curve. The following type of conclusions can be drawn from an examination of the 'time frequency distribution', the 'time cumulative probability', the 'cost frequency distribution', and the 'cost cumulative probability' lognormal distribution curves of FIGS. 45-48. Assume that the 'p54' location on the 'time frequency distribution' curve of FIG. 45 is 33 days. When examining the 'time frequency distribution' curve of FIG. 45 and the 'time cumulative probability' curve of FIG. 46, if the 'p54' of the 'time frequency distribution' curve of FIG. 45 is 33 days, then, eighty-nine percent (89%) of the wells are drilled in fourty-seven (47) days or less. Alternatively, one can conclude that eleven percent (11%) of the wells takes longer than fourth-seven (47) days to drill. When examining another part of the 'time frequency distribution' curve of FIG. 45, one could conclude that only four percent (4%) of the wells takes longer than 55 days. In connection with the 'cost frequency distribution' curve in FIG. 47 and the 'cost cumulative probability' curve in FIG. 48, ninety-four percent (94%) of the wells can be drilled for less than ten-million dollars ($10,000,000.00).

Figure 51A:
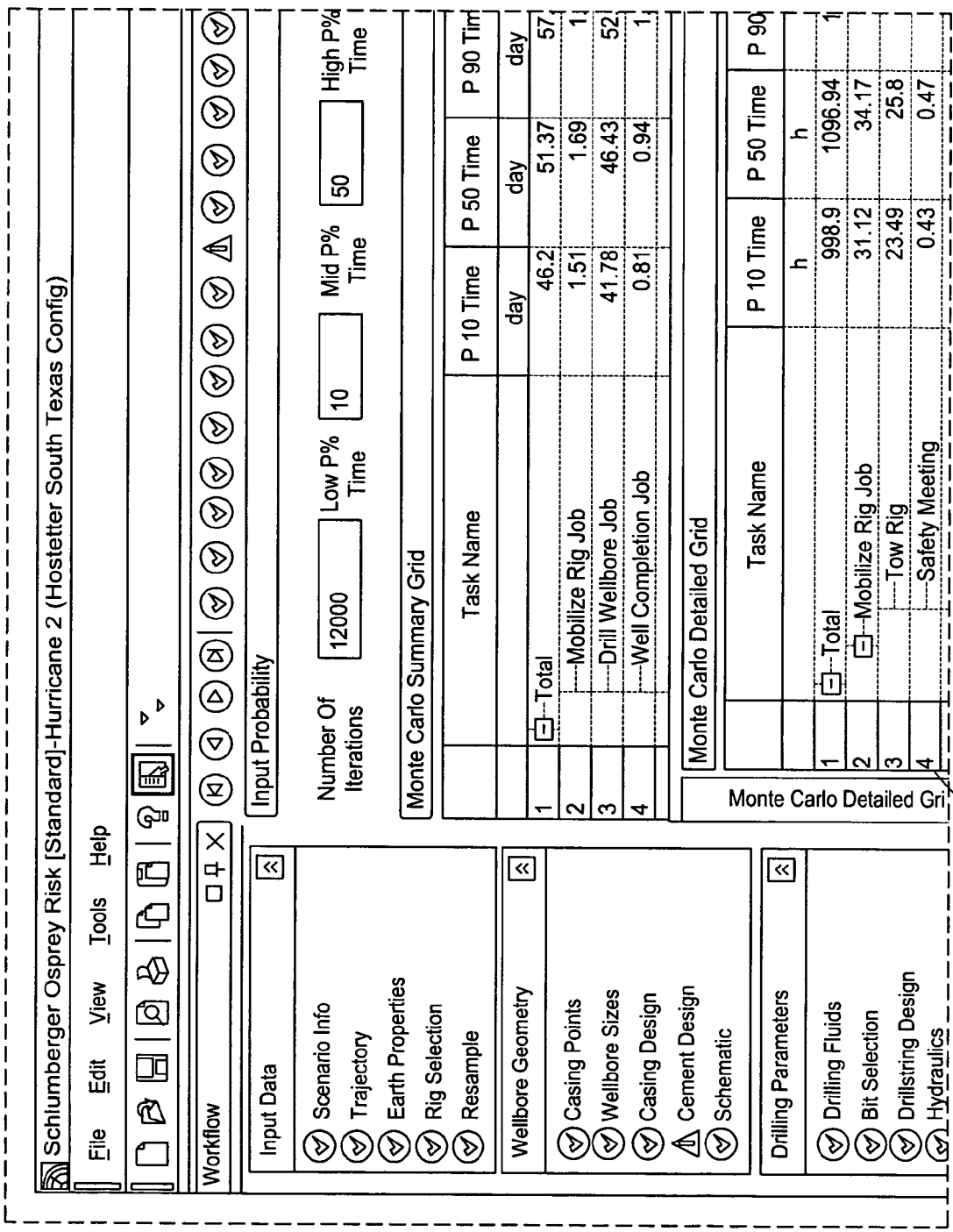
Figure 51B:
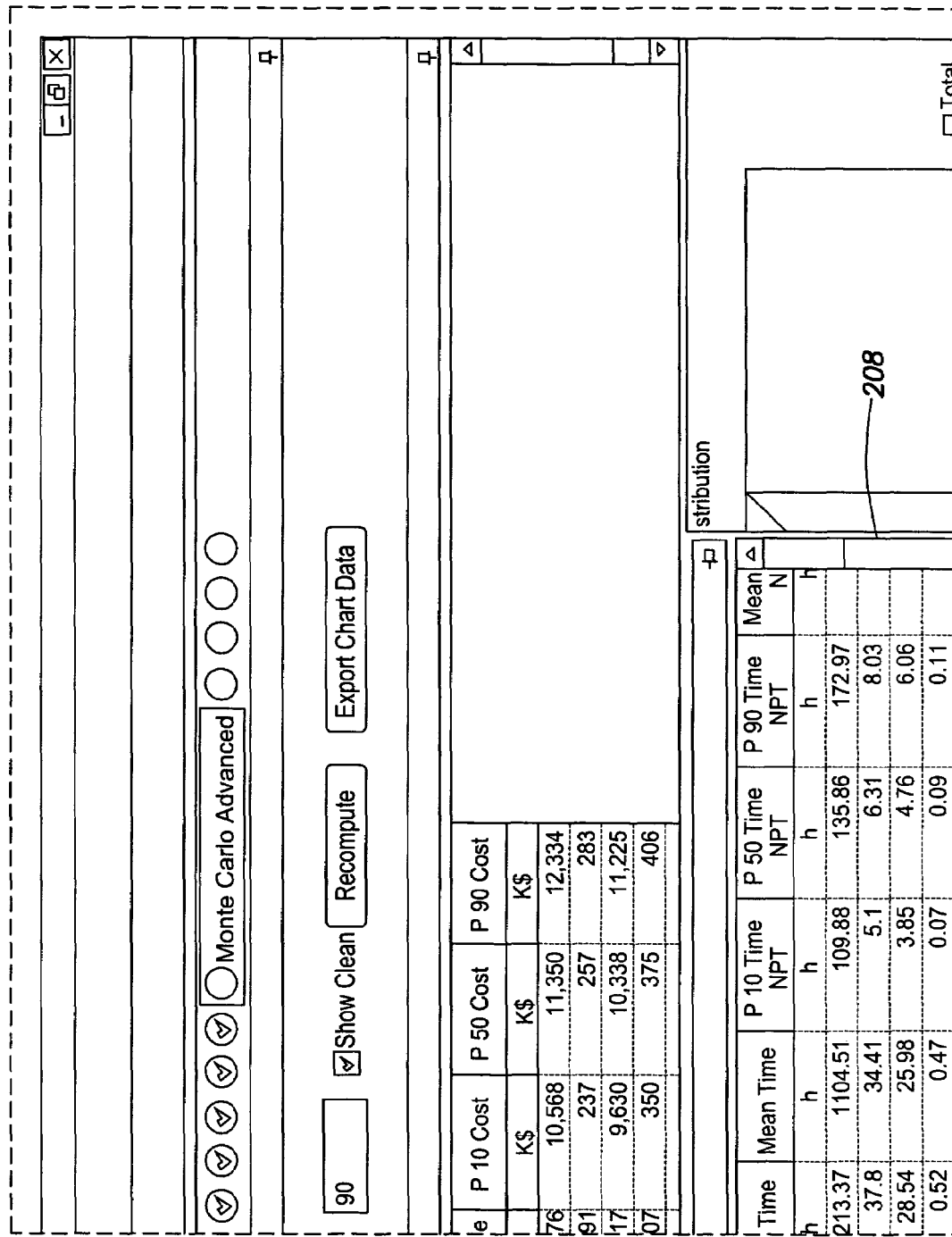
Figure 51D:
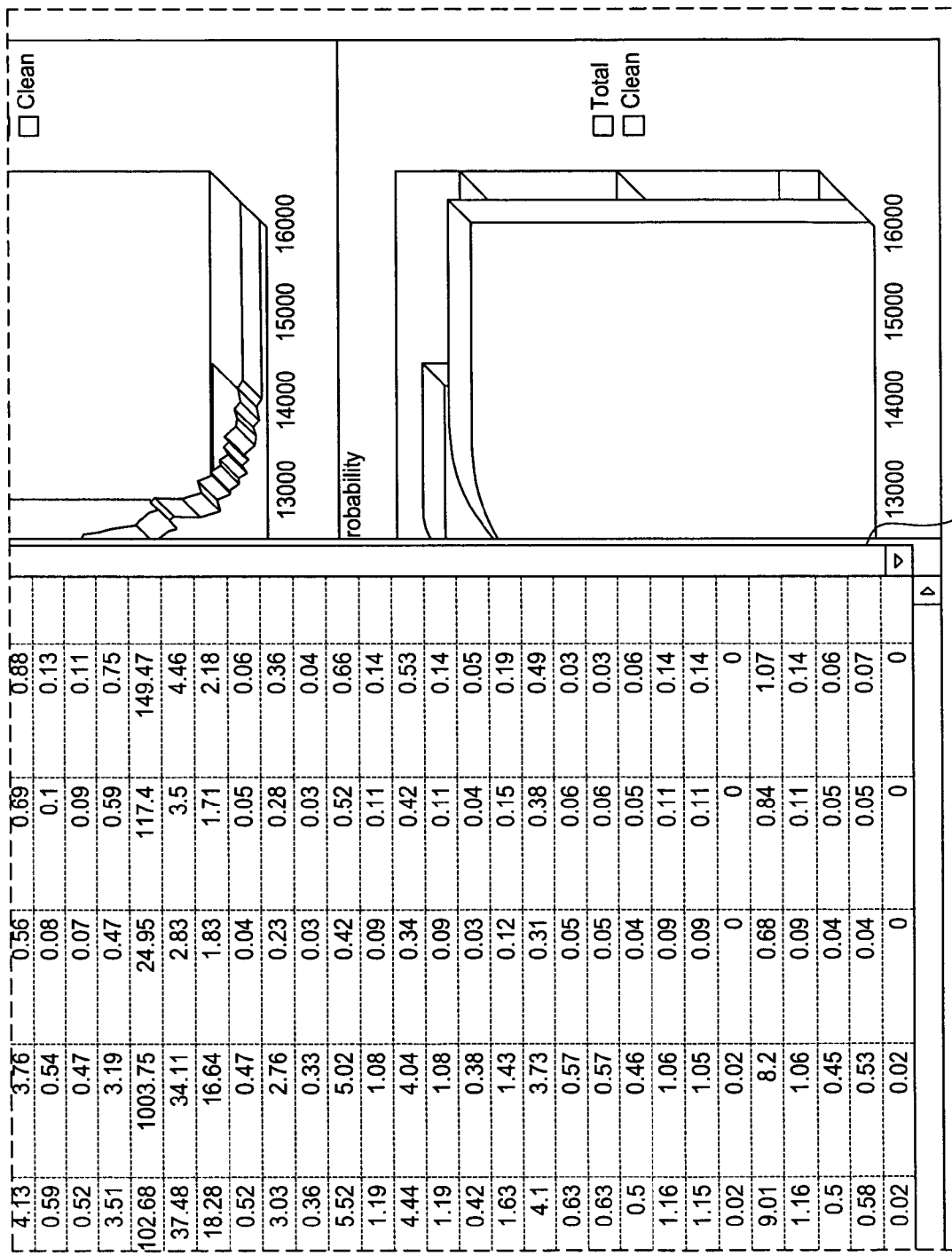
Figure 52:
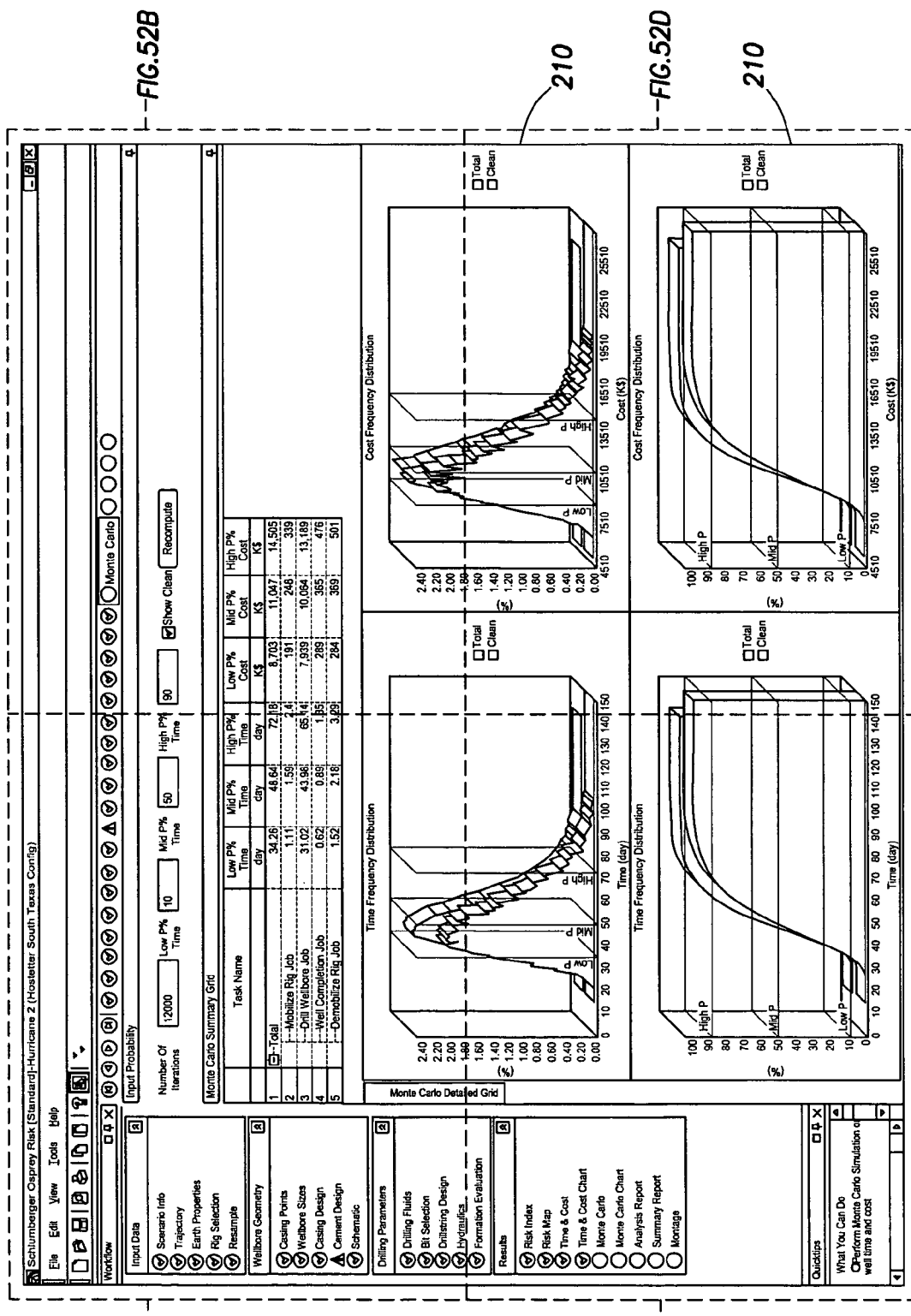
FIG. 52 including FIGS. 52A, 52B, 52C, and 52D which support
Figure 52A:
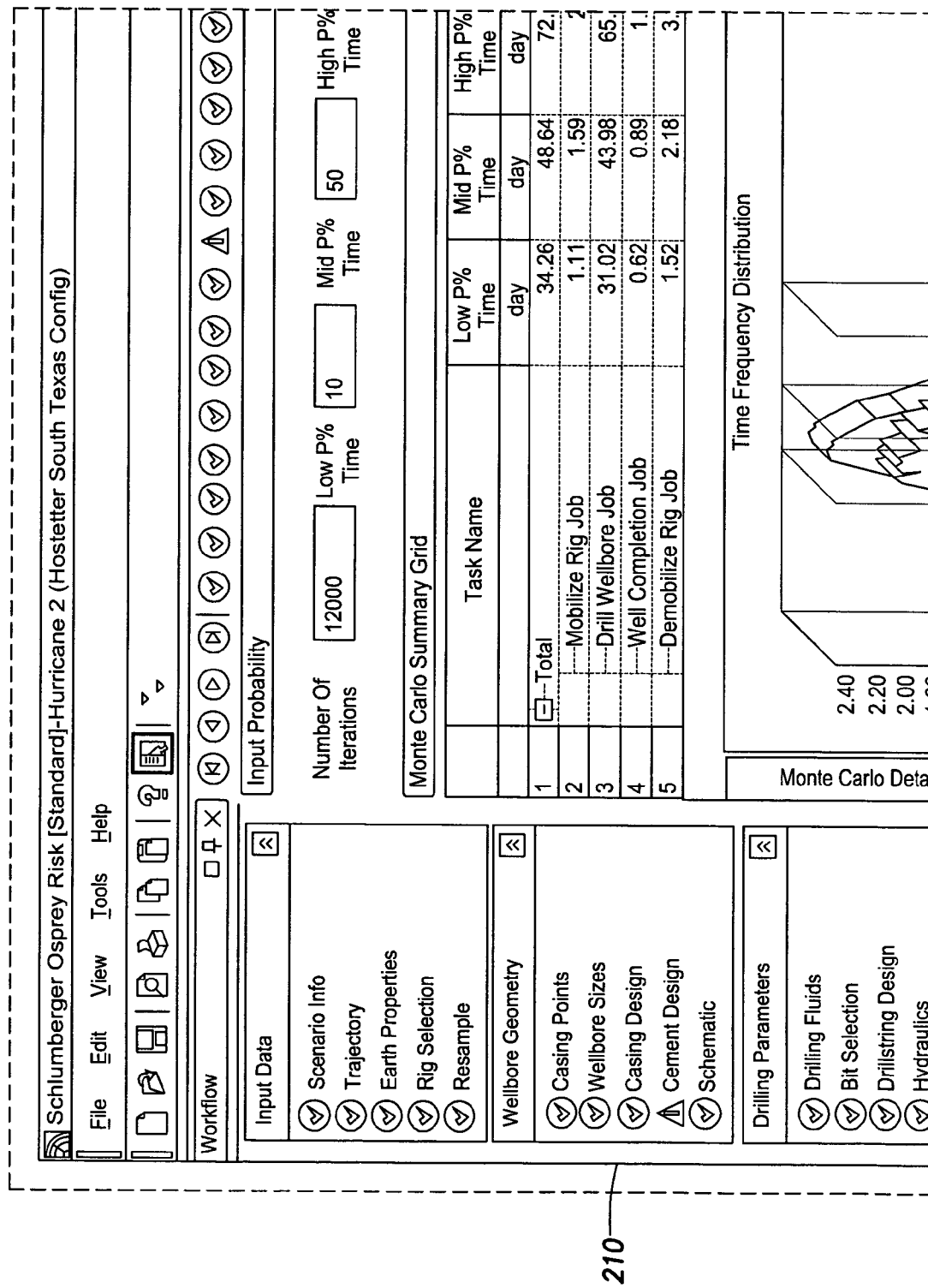
Figure 52B:
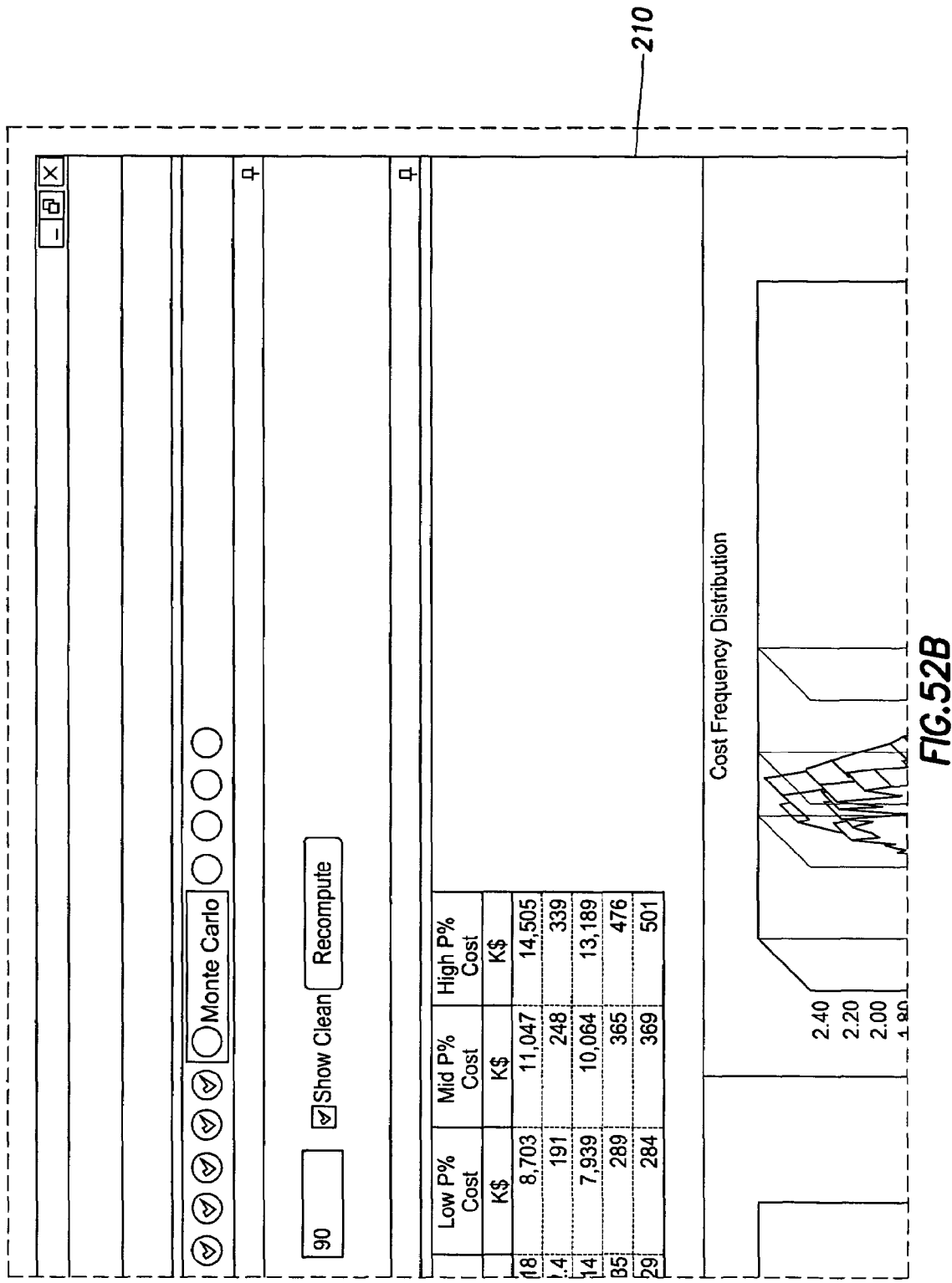
Figure 52C:
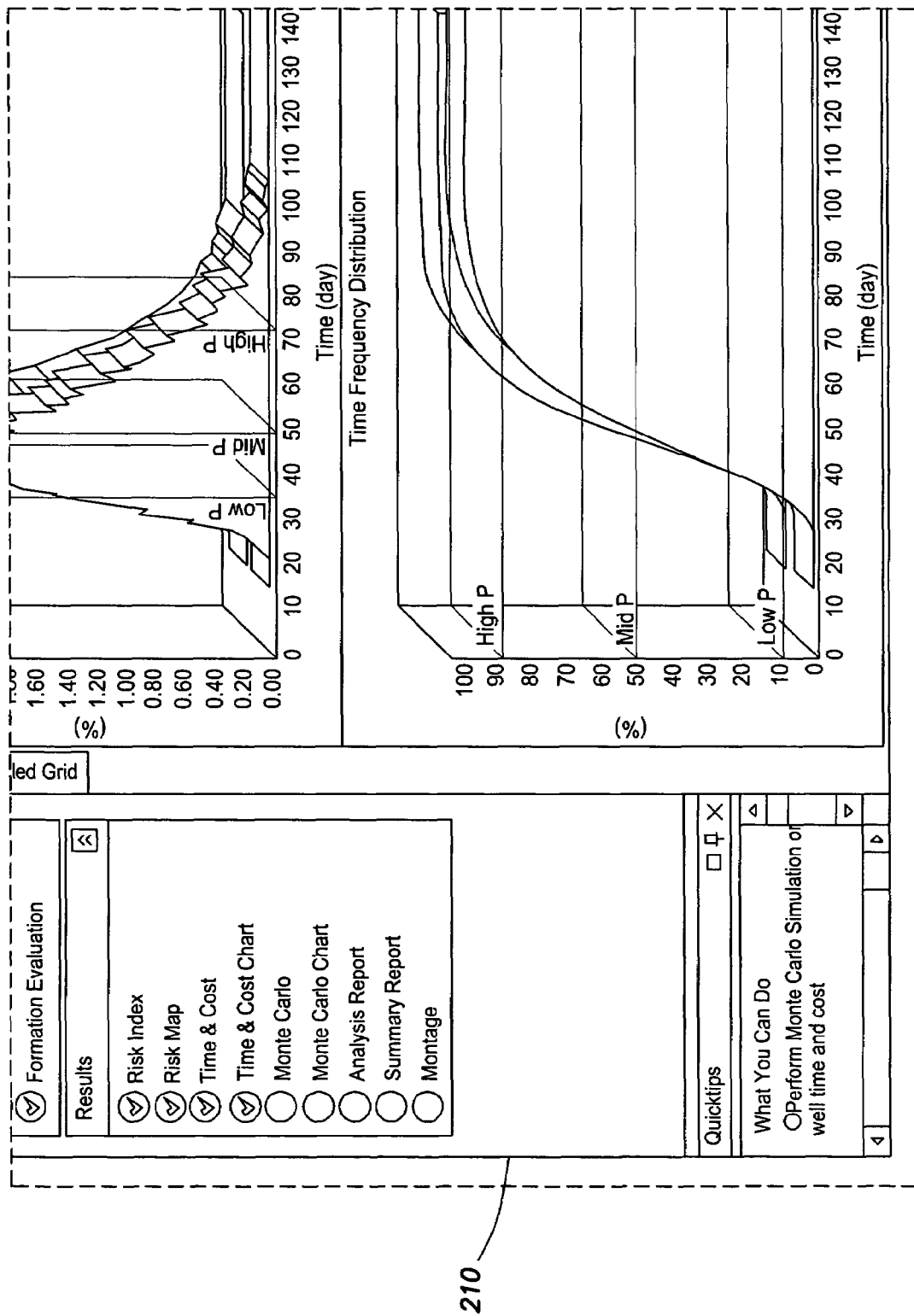

FIGS. 49 (including FIGS. 49A, 49B, 49C, 49D), 50 (including FIGS. 50A, 50B, 50C, 50D), and 51 (including FIGS. 51A, 51B, 51C, 51D) illustrate different embodiments of the 'numerical display' 208 of FIGS. 30 and 31 which will display a first set of probabilistic results in a numerical manner. The 'Monte Carlo' method which produces the 'numerical display' 208 of FIGS. 49-51 will produce a detailed display of all summary activities and non-summary activities and subactivities. However, in addition to the 'Monte Carlo' method, a 'Monte Carlo Advanced' method, which also produces the 'numerical display' 208, will also produce a display which includes the 'mean time' and the 'mean cost'. The 'Monte Carlo' method and the 'Monte Carlo Advanced' method will be discussed in more detail later in this specification.

FIG. 52 (including FIGS. 52A, 52B, 52C, 52D) illustrates an embodiment of the 'graphical display' 210 of FIGS. 30 and 31 which will display a second set of probabilistic results in a graphical manner. Note that the 'shape of the curves' in FIG. 52 can be slightly narrower than the 'shape of the curves' in another embodiment of FIG. 52. This difference in curve shape results because one embodiment of the graphical display 210 in FIG. 52 is produced by using the 'Monte Carlo Advanced' method, whereas another embodiment of the graphical display 210 in FIG. 52 is produced by using the 'Monte Carlo' method. The 'Monte Carlo' method and the 'Monte Carlo Advanced' method will be discussed in more detail later in this specification.

Figure 53:
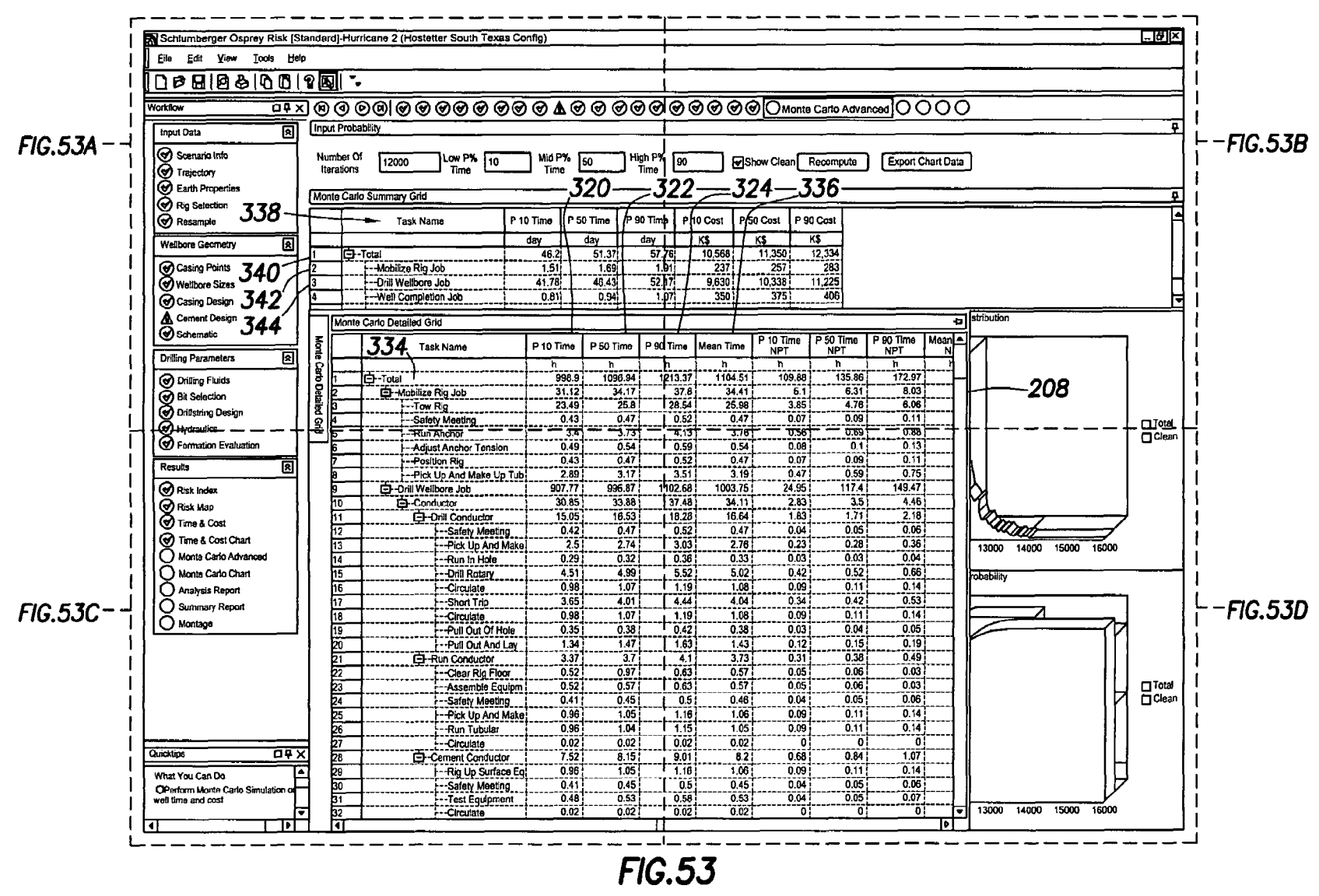
Figure 53A:
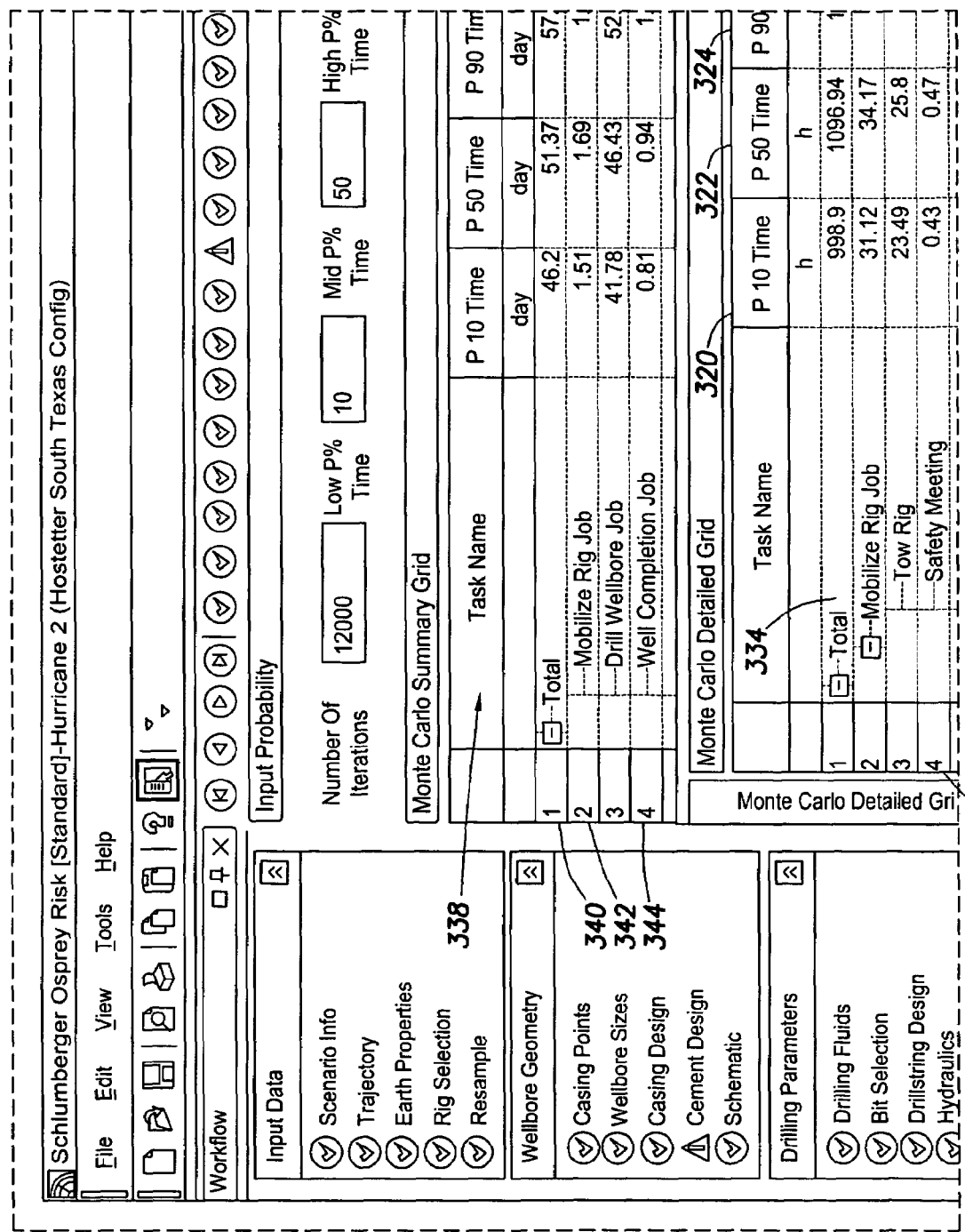
FIG. 53 including FIGS. 53A, 53B, 53C, and 53D which support FIG. 53, FIG. 54 including FIGS. 54A, 54B, 54C, and 54D which support
Figure 53B:
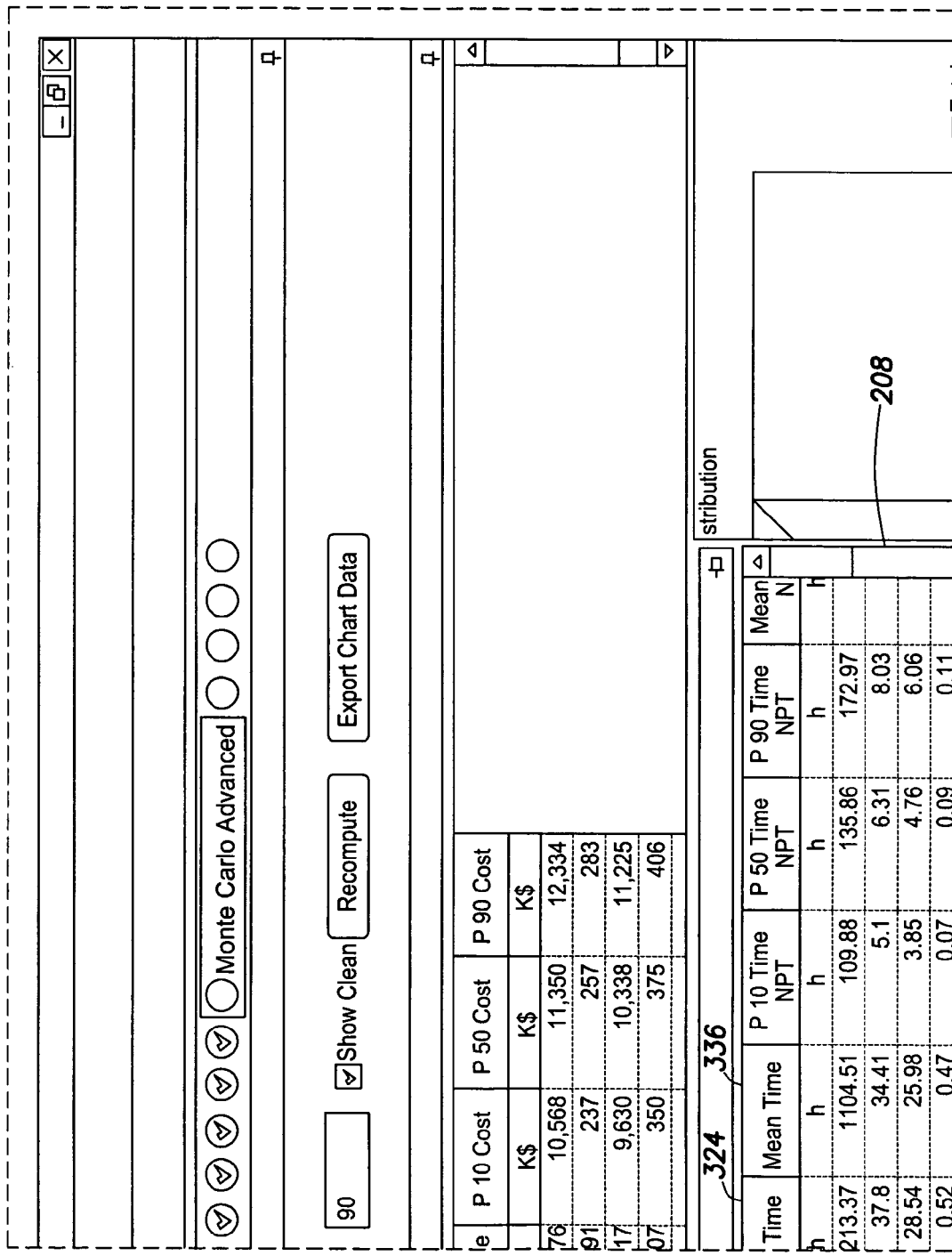
Figure 53D:
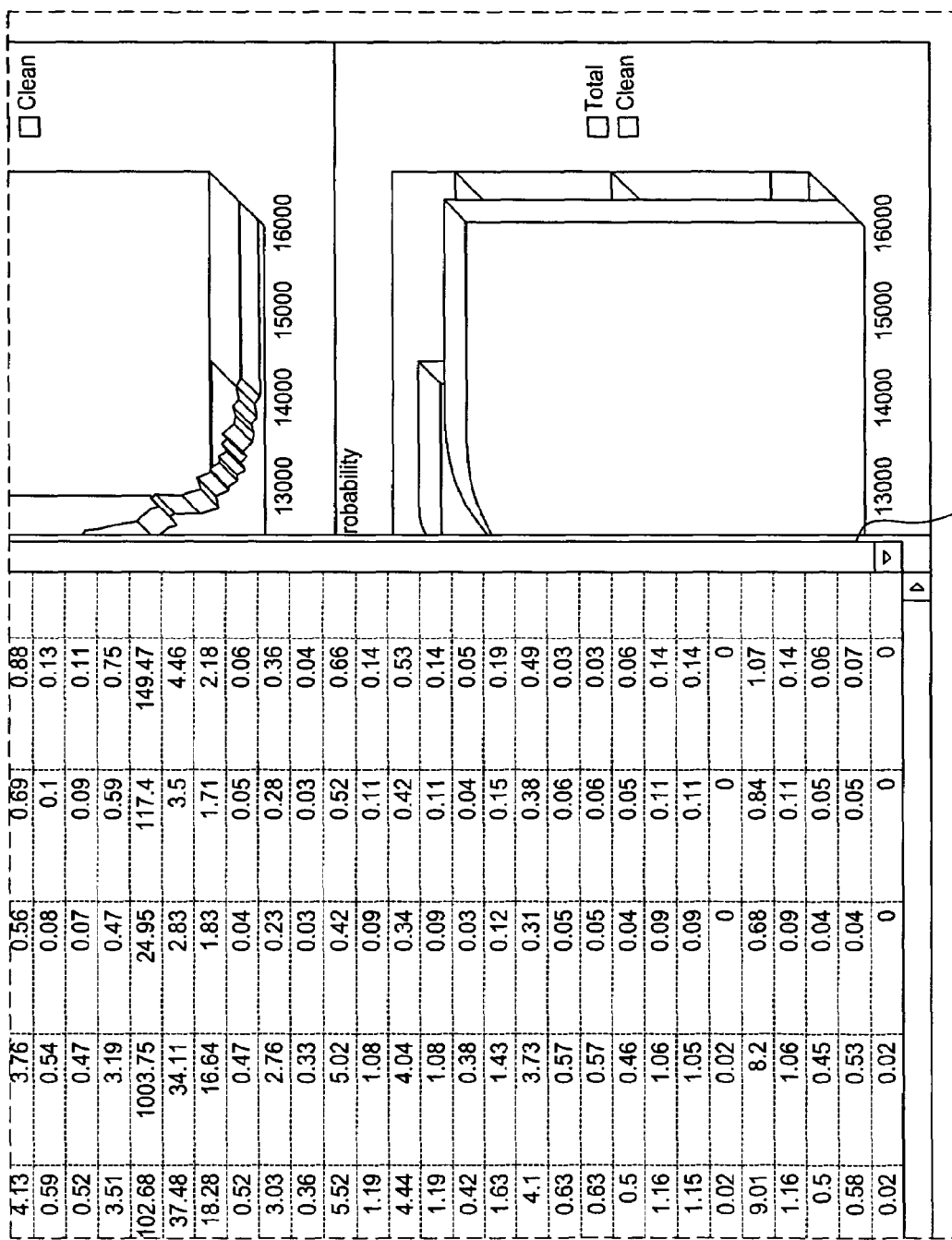

Refer now to FIGS. 53 (including FIGS. 53A, 53B, 53C, 53D), 54 (including FIGS. 54A, 54B, 54C, 54D), 55, and 56.

A workflow responds to linear input data for calculating wellbore geometry, drilling parameters, and a 'set of results'. One 'set of results' includes 'time and cost' data. The 'time and cost' data is obtained as a result of a set of 'activity templates', such as the 'activity templates' illustrated in FIGS. 34 and 35. For each activity in an 'activity template', we calculate the minimum 'p10' time, the maximum 'p90' time, and the average 'p50' time to complete that activity; and the minimum 'p10' cost, the maximum 'p90' cost, and the average 'p50' cost incurred to complete that activity. In addition to the 'minimum, maximum, and average time' and the 'minimum, maximum, and average cost', a 'nonproductive time' and a 'nonproductive cost' is also calculated. The 'nonproductive time' is a percentage of the total time to complete that activity, and the 'nonproductive cost' is a percentage of the total cost incurred to complete that activity. When we include all the 'summary activities' and 'subactivities' associated with a particular task, we calculate a final number which is the minimum, maximum and average time and the minimum, maximum, and average cost. In the oilfield, instead of talking about the 'minimum, maximum, and average' time and cost to complete a certain task, we instead talk about 'probabilities'. As a result, the 'Automatic Well Planning Monte Carlo Simulation software' 206a of FIGS. 30 and 31 will group each of the 'Subactivities' required to complete a particular task into one activity which is known as a 'summary activity'. With respect to each 'summary activity', a 'probabilistic analysis' associated with each 'summary activity' is performed. The calculation method used in connection with each 'probabilistic analysis' is called 'Monte Carlo'. There are two calculation methods used in connection with each 'probabilistic analysis': (1) the 'Monte Carlo' method, and (2) the 'Monte Carlo Advanced' method.

Figure 54:
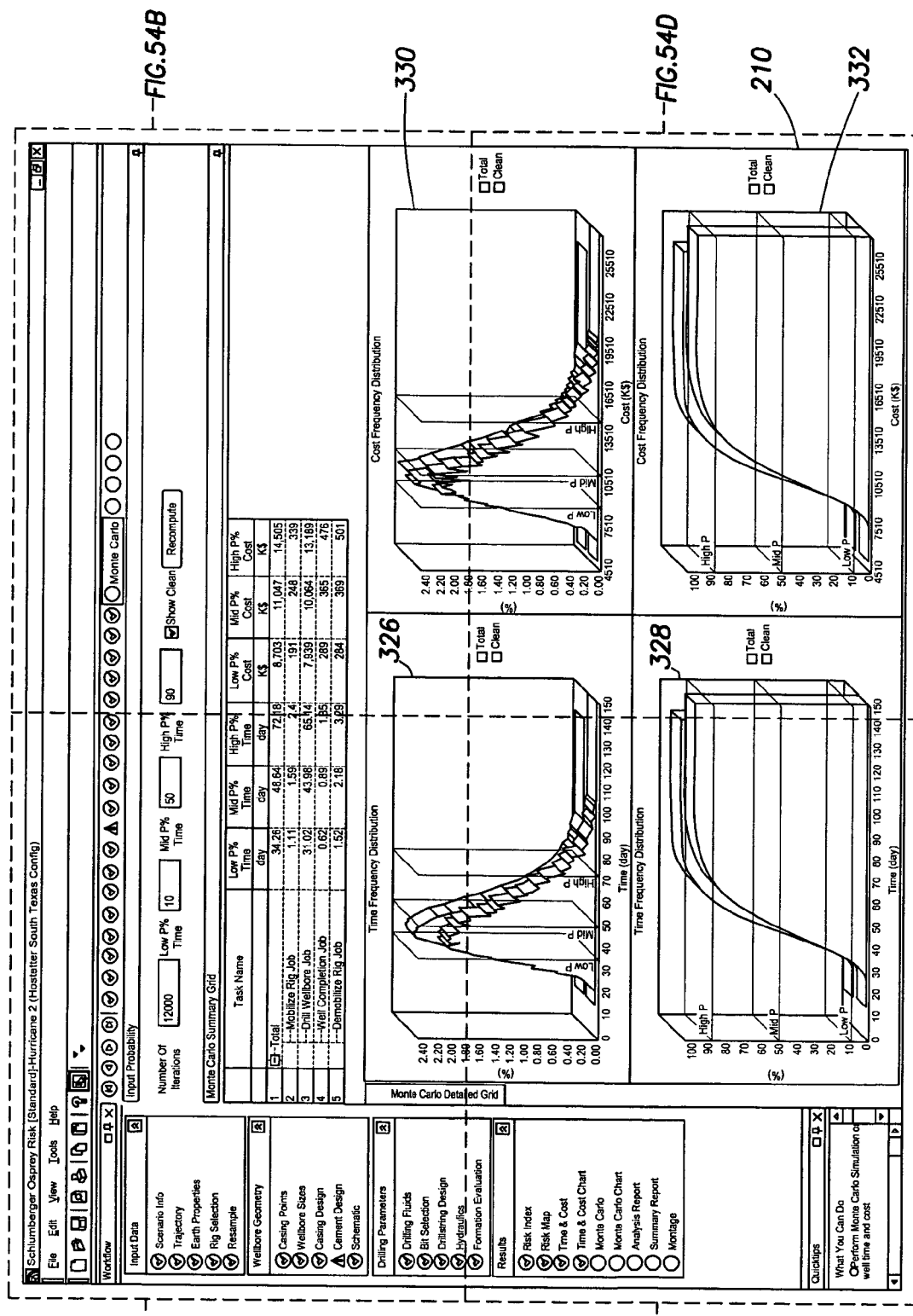
FIG. 54, FIG. 55, and FIG. 56 illustrate further embodiments of the numerical display and the graphical display representing the Data Output of FIG. 30, these FIGS. 53-56 being used during a discussion of the 'Monte Carlo' and the 'Monte Carlo Advanced' methods used by the 'Automatic Well Planning Monte Carlo Simulation Software'.
Figure 54A:
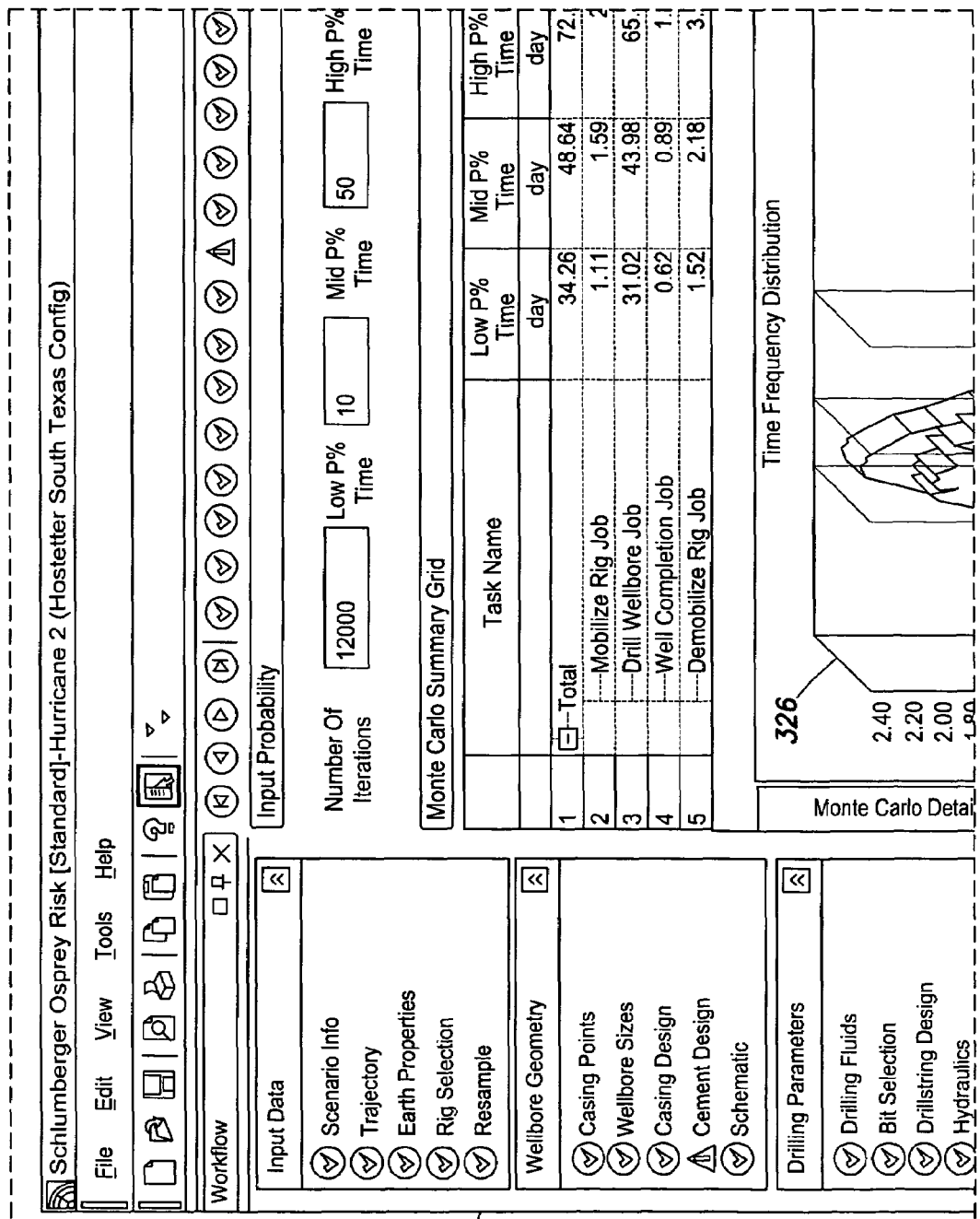
Figure 54B:
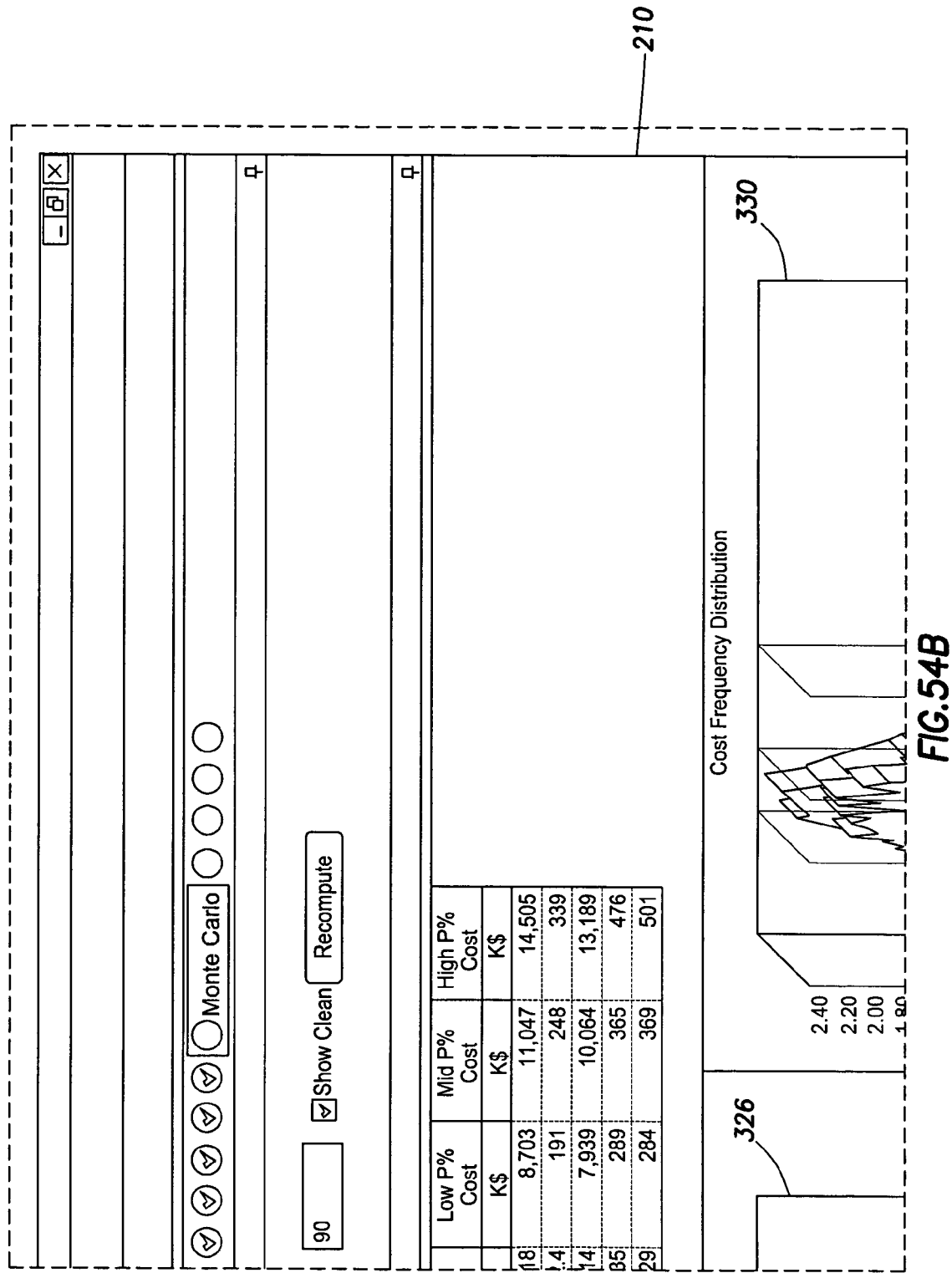
Figure 54C:
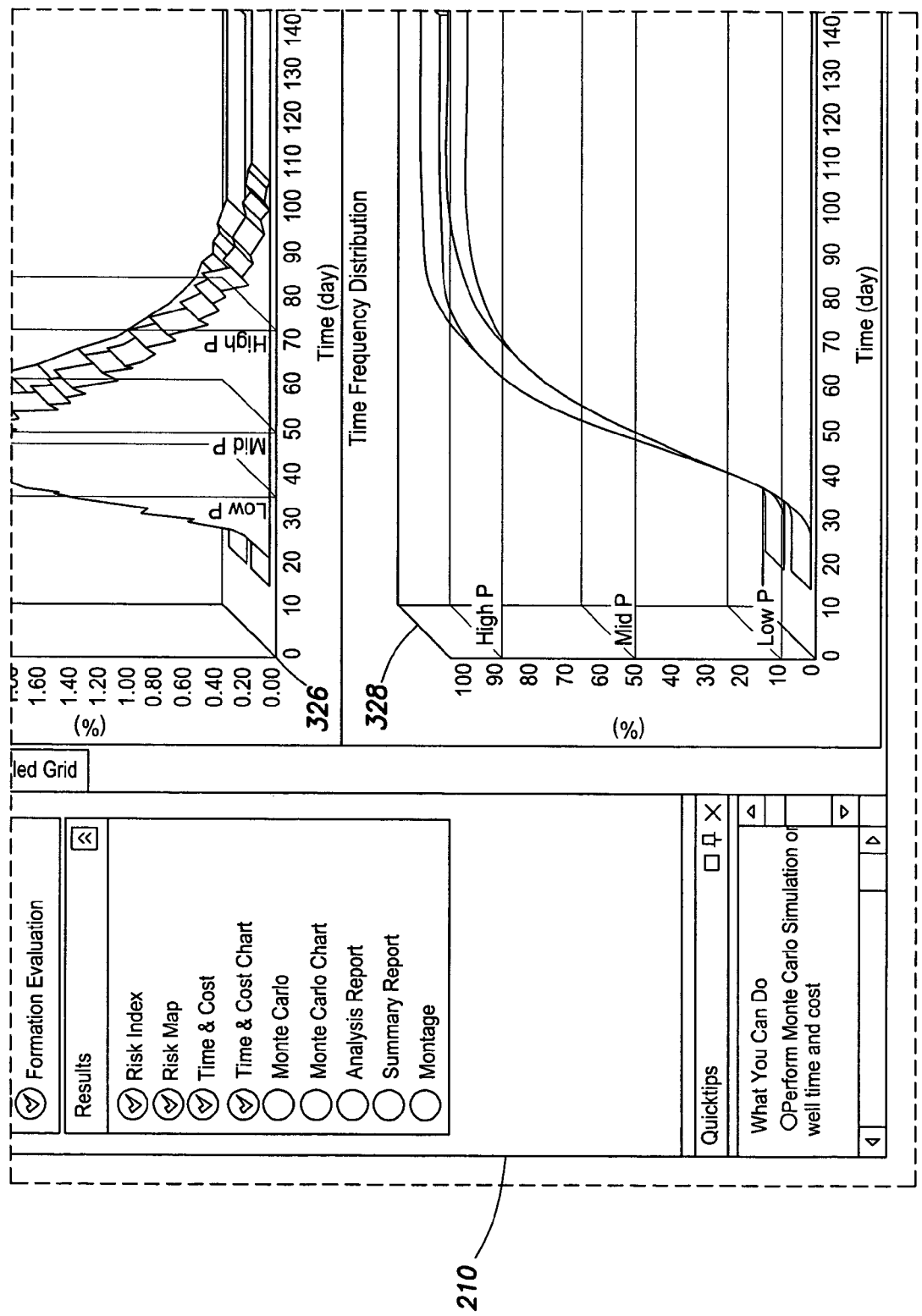
Figure 54D:
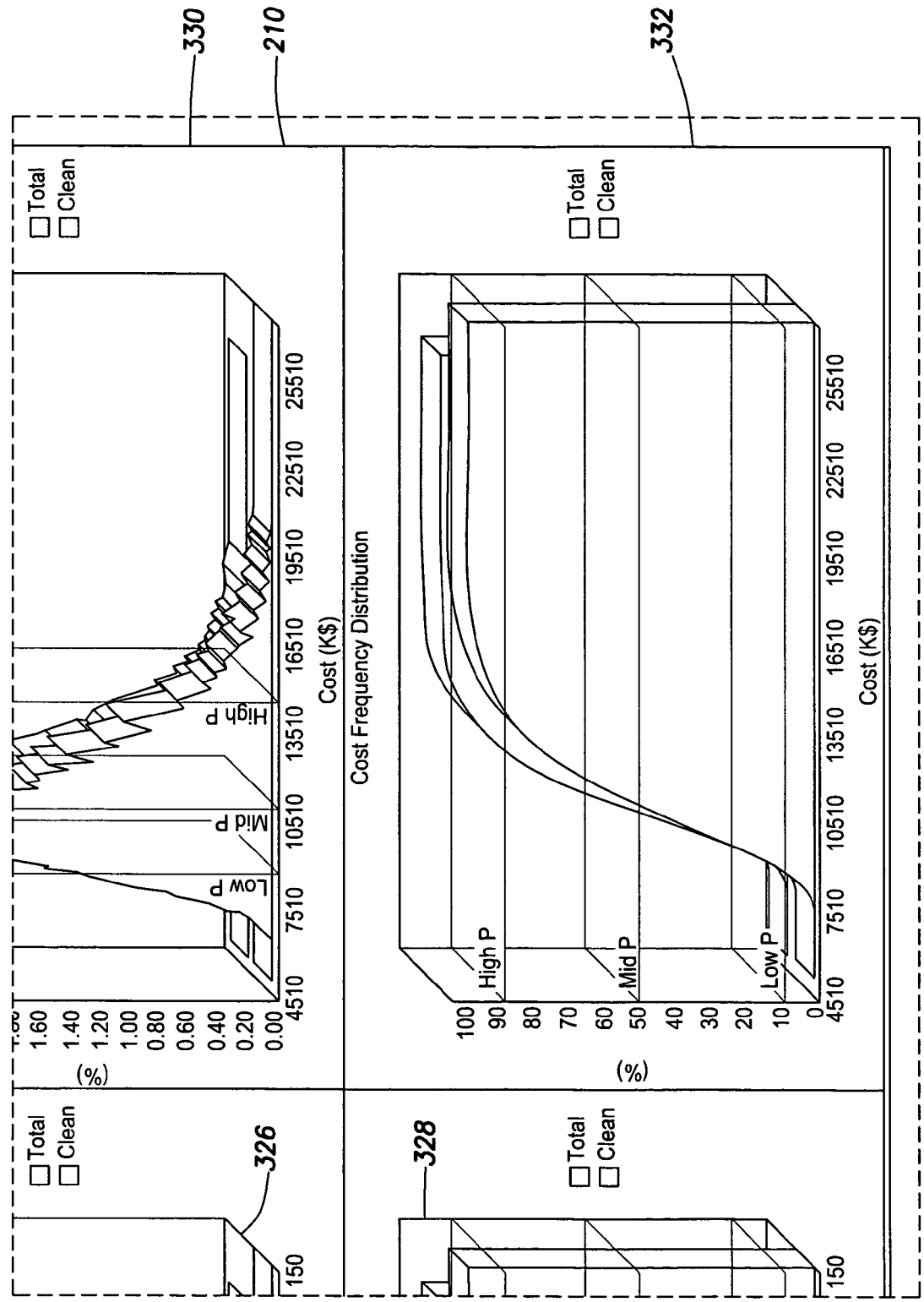

Refer now to FIG. 53 (including FIGS. 53A, 53B, 53C, 53D) and FIG. 54 (including FIGS. 54A, 54B, 54C, 54D). FIG. 53 represents another example of the 'numerical display' 208 of FIG. 31. FIG. 54 represents another example of the 'graphical display' 210 of FIG. 31.

In FIG. 53, column 320 refers to the 'P10' time, column 322 refers to the 'P50' time, and column 324 refers to the 'P90' time. The 'P10' in column 320 correlates to the 10% fastest wells (i.e., 10% of the wells are drilled for less than this time or this cost); the 'P50' in column 322 correlates to 50% where 50% of the wells are drilled for this time or this cost; the 'P90' in column 324 correlates to 90% where only 10% of the wells are drilled in excess of this number of days, or 90% of the wells are drilled in less that this number of days. In addition, the 'Total' time 334 is equal to the sum of the 'clean' time and the 'nonproductive' time. Therefore, the difference between the 'Total' time and the 'clean' time is the 'nonproductive' time. Furthermore, the 'Total' cost 334 is equal to the sum of the 'clean' cost and the 'nonproductive' cost. Therefore, the difference between the 'Total' cost and the 'clean' cost is the 'nonproductive' cost.

In FIG. 54, the data which appears in FIG. 54 are shown in graphs (i.e., in a graphical manner). In FIG. 54, the 'time' data shown in FIG. 53 are shown in the graphs 326 and 328, whereas the 'cost' data shown in FIG. 53 are shown in the graphs 330 and 332.

The 'Monte Carlo' Method and the 'Monte Carlo Advanced' Method

As previously mentioned, the calculation method used by the 'Automatic Well Planning Monte Carlo simulation software' 206a of FIG. 30 in connection with each 'probabilistic analysis', adapted for calculating 'time and cost', is called 'Monte Carlo'. There are two such 'Monte Carlo' calculation methods: (1) a first calculation method known as the 'Monte Carlo' method, and (2) a second calculation method known as the 'Monte Carlo Advanced' method.

In the 'Monte Carlo Advanced' calculation method, the 'time and cost' numbers of FIG. 53 change (relative to the 'Monte Carlo' method), and the shape of the curves of FIG. 54 also change (relative to the 'Monte Carlo' method). Using the 'Monte Carlo Advanced' method, the shape of the curves as shown in FIG. 54 are narrower (relative to another embodiment of FIG. 54) indicating a lower degree of uncertainty. In FIG. 53, column 336 shows the 'mean time'. The numerical display 208 of FIG. 53 includes the 'mean time' 336, the 'mean cost', etc. The 'Monte Carlo Advanced' includes the 'mean time' 336 and the 'mean cost'. However, the 'Monte Carlo' method and the 'Monte Carlo Advanced' method, as shown in FIG. 53, both include a detailed display of all activities.

In connection with each 'probabilistic analysis' calculation method adapted for calculating 'time and cost', the 'Monte Carlo' calculation method and the 'Monte Carlo Advanced' calculation method will be discussed in the following paragraphs with reference to FIGS. 53, 55 and 56. However, be advised that the 'Monte Carlo Advanced' output is effectively identical to the 'Monte Carlo' output when all correlation coefficients in the Correlation Matrix 218 is equal to '1', and the extent to which the curve 'narrows' depends on the specification of correlation coefficients.

The 'Monte Carlo' Method

In the case of both the 'Monte Carlo' and the 'Monte Carlo Advanced' calculation methods adapted for calculating 'time and cost', we have a multitude of 'summary activities'. Each of these 'summary activities' can be subdivided into 'one or more summary activities', and each of the 'one or more summary activities' can be further subdivided into one or more 'further summary activities', as discussed above with reference to FIGS. 41, 42, and 43 of the drawings where a selection of the 'Drill Wellbore' 286 summary activity included subordinate or included summary activities 290, 292, 294, and 296; and a further selection of the 'Surface Hole Section' subordinate or included summary activity 292 included further subordinate or included summary activities 298, 300, 302, 304, and 306; and a further selection of the subordinate and included summary activity 298 included Subactivities/non-summary activities 308, 310, and 312.

In FIG. 53, under the 'task name' 338, locate the 'Total' 340 activity, and, under the 'Total' 340 activity, locate the 'Mobilize Rig Job' 342 summary activity, and the 'Drill Wellbore Job' 344 summary activity.

Figure 55:
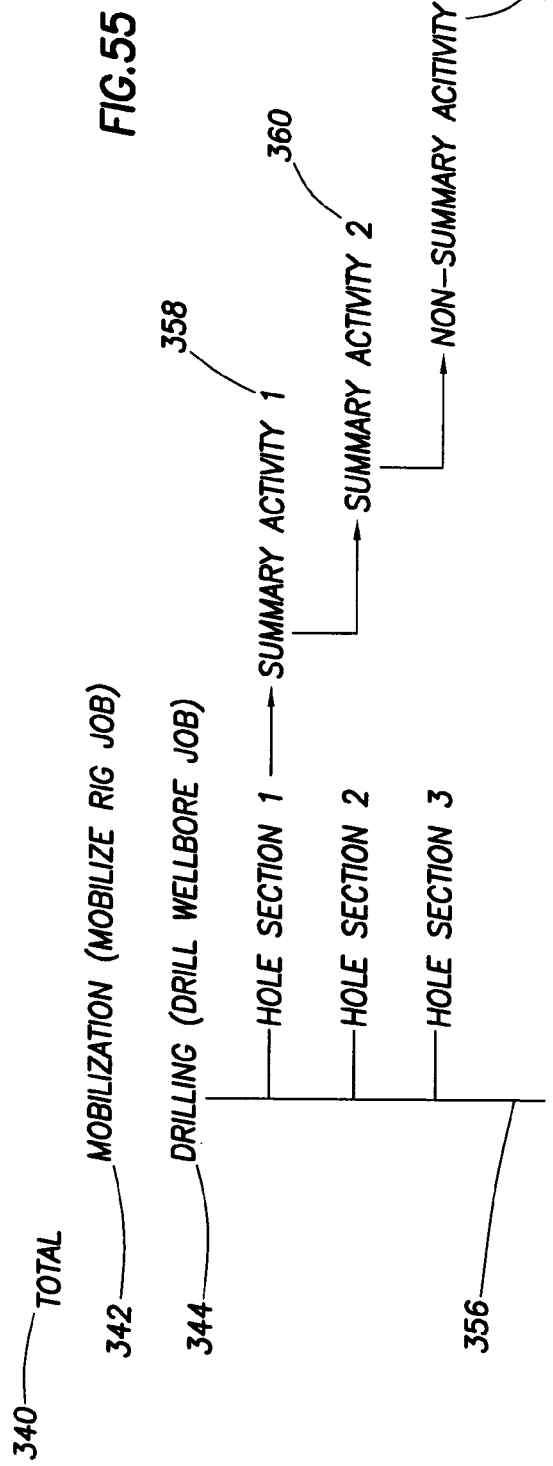

In FIG. 55, the 'Total' 340 activity, the 'Mobilize Rig Job' 342 summary activity, and the 'Drill Wellbore Job' 344 summary activity of FIG. 53 are illustrated again. In FIG. 55, under the 'Drilling' or 'Drill Wellbore Job' 344 summary activity, the 'Drill Wellbore Job' 344 summary activity involves the practice of drilling a wellbore, where the wellbore includes a plurality of hole sections 356, such as 'Hole Section 1', 'Hole Section 2', 'Hole Section 3', etc. The drilling of 'Hole Section 1', for example, may involve the practice of 'Summary Activity 1' 358; however, the 'Summary Activity 1' 358 can be broken down or subdivided into a subordinate 'Summary Activity 2' 360; and the 'Summary Activity 2' 360 can be broken down or subdivided into a further subordinate and included 'Subactivity' or 'Non-Summary Activity' 362. A 'Non-Summary Activity' or 'Subactivity' 362 cannot be further broken down or subdivided into any further summary activities. The term 'Summary Activity' can be defined to be those activities which can be broken down or subdivided into further subordinate summary activities, and the term 'Subactivity' or 'Non-Summary Activity' can be defined as those activities which cannot be further broken down or subdivided into any further subordinate activities.

Figure 56:
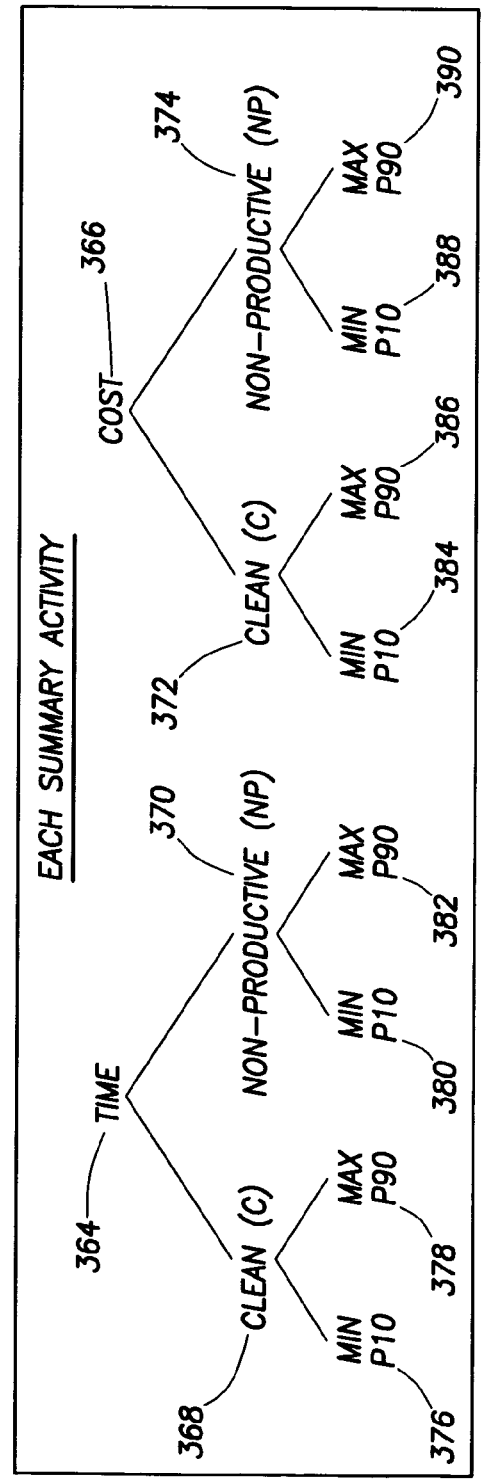

In FIG. 56, assume that, in the 'Total' 340 of FIG. 55, we have 'N' (for example, 25) 'Summary Activities'. In FIG. 56, each of the 'N' 'Summary Activities' (under the 'Total' 340 of FIG. 55) will have its own 'Time' 364 and 'Cost' 366, as shown in FIG. 56. The 'Time' 364 for each 'Summary Activity' can be broken down into a 'clean' time 368 and a 'nonproductive' time 370. The 'Cost' 366 for each 'Summary Activity' can be broken down into a 'clean' cost 372 and a 'non-productive' cost 374. The 'clean' time 368 includes a 'minimum time' 376, which is also known as a 'p10' time 376, and a 'maximum time' 378, which is also known as a 'p90' time 378. The 'non-productive' time 370 includes a 'minimum time' 380, which is also known as a 'p1' time 380, and a 'maximum time' 382, which is also known as a 'p90' time 382. The 'clean' cost 372 includes a 'minimum cost' 384, which is also known as a 'p10' cost 384, and a 'maximum cost' 386, which is also known as a 'p90' cost 386. The 'non-productive' cost 374 includes a 'minimum cost' 388, which is also known as a 'p10' cost 388, and a 'maximum cost' 390, which is also known as a 'p90' cost 390.

Assume now that we have 'N' Summary (and Non-Summary) Activities. Considering only 'Time' in the following discussion, for these 'N' Summary and Non-summary activities, we calculate a corresponding '2N' distributions, where the '2N' distributions include 'N' distributions for 'clean' time and 'N' distributions for 'non-productive' time (NPT). The term 'distribution' refers to the distributions shown in FIG. 54. Now that we have '2N' distributions, in any summary (or non-summary) activity, the 'clean time' can be correlated to the 'non-productive time' via a 'correlation factor'. That is, if a particular activity takes a long period of time to complete, during the completion of that activity, certain 'non-productive' activities will also take place, the 'non-productive' activities possibly taking an equally longer period of time to complete. Therefore, in any 'Summary Activity', the 'clean time' and the 'non-productive time' (NPT) are proportional. As a result, in any 'Summary (or Non-summary) Activity' which includes a 'clean time' and a 'non-productive time', since the 'clean time' and the 'non-productive time' are proportional, a certain 'Correlation Factor' will relate the 'clean time' to the 'non-productive time' for that 'Summary Activity'. The 'clean time' of one activity will have no relation to the 'non-productive time of another activity; however, the 'clean time' of one activity will have a positive correlation to the 'non-productive time' of the same activity.

Therefore, for the above referenced '2N' distributions, which include 'N' distributions for the 'clean' time and 'N' distributions for 'non-productive' time (NPT), since a single 'Correlation Factor' will relate a 'clean time' to a corresponding 'non-productive time', it follows that 'N' Correlation Factors will relate the 'N' distributions of 'clean time' to the 'N' distributions of 'non-productive time'.

In view of the above discussion, it follows that: (1) we can combine (e.g, add) the 'N' distributions of 'clean time' to obtain the 'Total Clean Time', and (2) we can combine (e.g., add) the 'N' distributions of 'clean time' with the 'N' distributions of 'non-productive time' with the 'N' Correlation factors to obtain the 'Total Time'.

For example, we can state item (2) mathematically, as follows:

N (Clean)+N (NPT)+N (Correlation Factors between 'Clean' and 'NPT') $\Rightarrow$ Total Time, or Combine [N(Clean), N(NPT), N(Correlation Factors between 'Clean' and 'NPT')] $\Rightarrow$ Total Time In addition, we can state item (1) mathematically, as follows:

Combine [N (Clean)] $\Rightarrow$ Total Clean Time

The 'Monte Carlo Advanced' Method

The above discussion of the 'Monte Carlo' method also pertains, in its entirety, to the 'Monte Carlo Advanced' method. However, in the 'Monte Carlo Advanced' method, each 'Summary Activity' can be correlated to each other 'Summary Activity' via the 'Correlation Matrix', such as the 'Correlation Matrix' discussed above with reference to FIGS. 36 and 37 of the drawings. There is a difference between the 'Correlation Factor' and the 'Correlation Matrix'. Recall that the 'Correlation Factor' (referenced in the above discussion) will provide a correlation between a 'Clean Time' and a corresponding 'Non-Productive Time' for one particular Summary Activity. However, the 'Correlation Matrix' will provide a correlation between 'one particular summary activity' and 'another particular summary activity'. For example, if we are going to take a long time to drill, we will also probably take a long time to cement and take a long time to clean the borehole. The relationship between the various 'Summary Activities' are presented in the 'Correlation Matrix'. Therefore, if there are 'N' Summary Activities, then, the corresponding 'Correlation Matrix' will be an 'N by N' Correlation Matrix. Therefore, in the 'Monte Carlo Advanced' method, in view of the above discussion, it follows that: we can combine (e.g., add) the 'N' distributions of 'clean time' and the results obtained from the 'Correlation Matrix' to obtain the 'Total Clean Time', and (2) we can combine (e.g., add) the 'N' distributions of 'clean time' with the 'N' distributions of 'non-productive time' with the 'N' Correlation factors (between the corresponding 'clean times' and 'non-productive times') with the results obtained from the 'Correlation Matrix' to obtain the 'Total Time'.

For example, we can state item (2) mathematically, as follows:

N(Clean)+N(NPT)+N(Correlation Factors between 'Clean' and 'NPT') +Correlation Matrix $\Rightarrow$ Total Time, or Combine [N(Clean), N(NPT), N(Correlation Factors), Correlation Matrix] $\Rightarrow$ Total Time In addition, we can state item (1) mathematically, as follows:

Combine [N(Clean), Correlation Matrix] $\Rightarrow$ Total Clean Time

A functional description of the operation of the 'Automatic Well Planning Monte Carlo Simulation software' 206a of FIG. 30 will be set forth in the following paragraphs with reference to FIGS. 30 through 56 of the drawings.

Referring to FIG. 38, the engineering results 214 will generate a 'first plurality of Subactivities' representing 'wellbore geometry' and 'drilling parameters', the 'first plurality of Subactivities' being provided as an input to the Time and Cost Task 220. In addition, the activity templates 216 are also provided as an input to the Time and Cost Task 220. Recall that the activity templates 216 include a 'second plurality of Subactivities' and a 'second plurality of time and cost data' associated, respectively, with the 'second plurality of Subactivities'. In response to the 'first plurality of Subactivities' received from the engineering results 214 (that are based on 'wellbore geometry' and 'drilling parameters') and in response to an output from the activity templates 216, the Time and Cost Task 220 will compare the 'first plurality of Subactivities' from the engineering results 214 with the 'second plurality of Subactivities' stored in the activity templates 216. When a match is found, by the Time and Cost Task 220, between a first Subactivity of the 'first plurality of Subactivities' from the engineering results 214 with a second Subactivity of the 'second plurality of Subactivities' stored in the activity templates 216, the Time and Cost Task 220 will locate, in the activity templates 216, a 'second plurality of time and cost data' that is associated with the second Subactivity. At this point, the Time and Cost Task 220 will read the 'second plurality of time and cost data' from the activity templates 216.

As a result, when the Time and Cost Task 220 compares the 'first plurality of Subactivities' received from the engineering results 214 with the 'second plurality of Subactivities' stored in the activity templates 216, and when a match is found, by the Time and Cost Task 220, between the 'first plurality of Subactivities' and the 'second plurality of Subactivities', the Time and Cost Task 220 will read, from the activity templates 216, a 'second plurality of time and cost data' which is associated, respectively, with the 'second plurality of Subactivities' stored in the activity templates 216. The Time and Cost Task 220 will then associate the 'second plurality of time and cost data' with the 'first plurality of Subactivities' received from the engineering results 214. Consequently, when execution of the Time and Cost Task 220 is complete, the Time and Cost Task 220 will generate a 'resultant plurality of Subactivities' and a 'resultant plurality of time and cost data' which is associated, respectively, with the 'resultant plurality of Subactivities'. The 'resultant plurality of time and cost data', which is generated by the Time and Cost Task 220, will include: a 'p10' clean time data figure, a 'p10' clean cost data figure, a 'p10' nonproductive time data figure, a 'p10' nonproductive cost data figure, a 'p50' clean time data figure, a 'p50' clean cost data figure, a 'p50' nonproductive time data figure, a 'p50' nonproductive cost data figure, a 'p90' clean time data figure, a 'p90' clean cost data figure, a 'p90' nonproductive time data figure, and a 'p90' nonproductive cost data figure.

The correlation matrix 218 is provided as input data to step 250 in the Monte Carlo Task 222. Step 250 in the Monte Carlo Task 222 entitled "ΣSubActivities⇒Summary" will: receive the 'resultant plurality of Subactivities and the 'resultant plurality of time and cost data' from the Time and Cost Task 220, and then use the Correlation Matrix 218 to determine (in the manner described above with reference to FIG. 36) which of the 'Subactivities' associated with the 'resultant plurality of Subactivities' received from the Time and Cost Task 220 correlate well with other 'Subactivities' associated with the 'resultant plurality of Subactivities' received from the Time and Cost Task 220. For example, the 'ΣSubActivities⇒Summary' step 250 will receive the 'resultant plurality of Subactivities' from the Time and Cost Task, and then consult the Correlation Matrix 218 to determine which Subactivities of the 'resultant plurality of Subactivities' will 'correlate well' with other Subactivities of the 'resultant plurality of Subactivities'. Refer to the discussion above with reference to FIG. 36 to determine how the above referenced 'correlate well' step is practiced. However, if a 'first set' of the 'resultant plurality of Subactivities' correlates well with a 'second set' of the 'resultant plurality of Subactivities', the 'first set' and the 'second set' of Subactivities can be assimilated or grouped together, in the 'ΣSubActivities⇒Summary' step 250, to form 'summary activities' which will underlie a 'primary summary activity', such as the 'Mobilize Rig Job' primary summary activity 258 shown in FIG. 39. On the other hand, if the 'first set' of the 'resultant plurality of Subactivities' does not correlate well with the 'second set' of the 'resultant plurality of Subactivities', the 'first set' and the 'second set' of Subactivities cannot be assimilated or grouped together in step 250 to form 'summary activities'.

Therefore, based on the results of the aforementioned analysis of the Correlation Matrix 218 set forth above, step 250 in the Monte Carlo Task 222 entitled "ΣSubActivities⇒Summary" will receive the 'resultant plurality of Subactivities' and the 'resultant plurality of time and cost data' from the Time and Cost Task 220, and then assimilate or group the 'resultant plurality of Subactivities' into: one or more 'primary summary activities', one or more 'subordinate or included summary activities' which underlie the 'primary summary activities', and one or more 'Subactivities' which underlie the 'subordinate or included summary activities'. The 'resultant plurality of time and cost data' will then be associated with respective ones of the plurality of 'primary summary activities', 'subordinate or included summary activities', and 'Subactivities'. Step 250 will also determine a 'p10' position, a 'p50' position, and a 'p90' position associated with each of the one or more 'primary summary activities', each of the one or more 'subordinate or included summary activities' which underlie the 'primary summary activities', and each of the one or more 'Subactivities' which underlie the 'subordinate or included summary activities'.

When step 250 entitled ΣSubActivities⇒Summary is complete, a 'p10' clean time data figure, a 'p10' clean cost data figure, a 'p10' nonproductive time data figure, a 'p10' nonproductive cost data figure, a 'p50' clean time data figure, a 'p50' clean cost data figure, a 'p50' nonproductive time data figure, a 'p50' nonproductive cost data figure, a 'p90' clean time data figure, a 'p90' clean cost data figure, a 'p90' nonproductive time data figure, and a 'p90' nonproductive cost data figure will be associated with each 'primary summary activity', each 'subordinate or included summary activity', and each 'Subactivity'. Examples of 'primary summary activities', 'subordinate or included summary activities', and 'Subactivities' were discussed above with reference to FIGS. 41, 42, and 43 of the drawings.

Step 252 in the Monte Carlo Task 222 of FIG. 38 entitled the 'PEEP Stats Package' will then plot a 'lognormal distribution' between the above referenced 'p10' and the 'p90' positions (determined during the 'ΣSubActivities⇒Summary' step 250) associated with each of the 'primary summary activities' and each of the 'subordinate or included summary activities' and each of the 'Subactivities'.

Step 254 in the Monte Carlo Task 222 of FIG. 38 will generate a plurality of 'correlated results'. The Data Output 204a is generated from the plurality of 'correlated results'. However, before the Data Output 204a can be generated, the correlated results 254 must first be back allocated from the 'summary activities' to the 'Subactivities'. When the correlated results 254 are back allocated from the summary activities to the Subactivities, the Data Output 204a is generated. When the Data Output 204a is generated, the numerical display 208 and the graphical display 210 of FIGS. 30 and 31 are further generated. The numerical display 208 will include a 'p10' clean time data figure, a 'p10' clean cost data figure, a 'p10' nonproductive time data figure, a 'p10' nonproductive cost data figure, a 'p50' clean time data figure, a 'p50' clean cost data figure, a 'p50' nonproductive time data figure, a 'p50' nonproductive cost data figure, a 'p90' clean time data figure, a 'p90' clean cost data figure, a 'p90' nonproductive time data figure, and a 'p90' nonproductive cost data figure associated with each 'primary summary activity', each 'subordinate or included summary activity', and each 'Subactivity'.

In FIG. 53, recall that 'clean' time is 'productive' time as opposed to the 'nonproductive' time. Therefore, the 'Clean Time' would collectively include the minimum clean time 320, the average clean time 322, and the maximum clean time 324 of FIG. 53. The 'Total Clean Time' for the 'Monte Carlo' method can be calculated by using the following mathematical algorithm: Combine [N (Clean)]⇒'Total Clean Time'. Therefore, by combining the minimum clean time 320, the average clean time 322, and the maximum clean time 324, the 'Total Clean Time' for the 'Monte Carlo' method can be calculated. However, the 'Total Clean Time' for the 'Monte Carlo Advanced' method can be calculated by using the following mathematical algorithm: Combine [N (Clean), Correlation Matrix] ⇒ 'Total Clean Time'. Therefore, by combining the minimum clean time 320, the average clean time 322, the maximum clean time 324, and an output from the Correlation Matrix 218 of FIGS. 36 and 37, the 'Total Clean Time' for the 'Monte Carlo Advanced' method can be calculated. Concerning the 'Total Time', immediately above the above referenced 'plurality of summary activities' on the numerical display 208, the 'Total' 334 of FIG. 53 is displayed. In columns adjacent to the 'Total' 334 column in FIG. 53, the 'Total Time' of the minimum clean time 320, the average clean time 322, and the maximum clean time 324 [including other 'nonproductive times (NPT)' such as the 'minimum nonproductive time', the 'average nonproductive time', and the 'maximum nonproductive time'], that is associated with the 'plurality of summary activities', can be viewed by the user. The 'Total Time' for the 'Monte Carlo' method can be calculated by using the following mathematical algorithm: Combine [N (Clean), N (NPT), N (Correlation Factors between 'Clean' and 'NPT')] ⇒ Total Time, where 'N' is the 'plurality of summary activities' and the 'Correlation Factor' is the relationship between the 'Clean Time' and the 'Nonproductive Time'. The 'Total Time' for the 'Monte Carlo Advanced' method can be calculated by using the following mathematical algorithm: Combine [N (Clean), N (NPT), N (Correlation Factors), Correlation Matrix] ⇒ Total Time, where 'N' is the 'plurality of summary activities', the 'Correlation Factor' is the relationship between the 'Clean Time' and the 'Nonproductive Time', and the 'Correlation Matrix' provides the relationship between one of the 'N' summary activities and another of the 'N' summary activities. At this point, the user can be viewing or recording (on the Recorder or Display device 204) the numerical display 208 which is shown in FIGS. 49, 50, and 51. In the meantime, in FIGS. 38 and 56, the 'ΣSubActivities ⇒ Summary' step 250 of FIG. 38 will also associate or designate a 'p10' and a 'p90' position with each of the minimum and maximum times and costs, as follows (see FIG. 56):

A 'p10' position is associated with the minimum clean time
A 'p90' position is associated with maximum clean time
A 'p10' position is associated with the minimum nonproductive time
A 'p90' position is associated with maximum nonproductive time
A 'p10' position is associated with the minimum clean cost
A 'p90' position is associated with maximum clean cost
A 'p10' position is associated with the minimum nonproductive cost
A 'p90' position is associated with maximum nonproductive cost Now that the 'p10' and 'p90' designations have been applied to each of the minimum and maximum times and cost as noted above, the 'Petroleum Engineering Economics Package (PEEP) Stats Package' of step 252 in FIG. 38 will plot a lognormal distribution, similar to the lognormal distribution of FIG. 44, between each of the 'p10' and the 'p90' locations associated with each of the minimum and maximum times and costs referenced above. That is, the PEEP Stats Package of step 252 will plot a lognormal distribution (similar to the lognormal distribution of FIG. 44) between the 'p10' and the 'p90' positions associated with the following minimum and maximum times and costs (which are outlined above):

(1) A Lognormal distribution is plotted between the 'p10' minimum clean time and the 'p90' maximum clean time;
(2) A Lognormal distribution is plotted between the 'p10' minimum nonproductive time and the 'p90' maximum nonproductive time;
(3) A Lognormal distribution is plotted between the 'p10' minimum clean cost and the 'p90' maximum clean cost;
(4) A Lognormal distribution is plotted between the 'p10' minimum nonproductive cost and the 'p90' maximum nonproductive cost.

The correlated results 254 of FIG. 38 will now be generated. When the correlated results 254 are back allocated from the summary activities to the Subactivities, the Data Output 204a of FIG. 38 can be generated, the Data Output 204a being the numerical display 208 and the graphical display 210. The numerical display 208 of FIGS. 49, 50, and 51 and the graphical display 210 of FIGS. 52 and 54 can now be viewed on or recorded by the Recorder or Display device 204 of FIG. 30.

Figure 57:
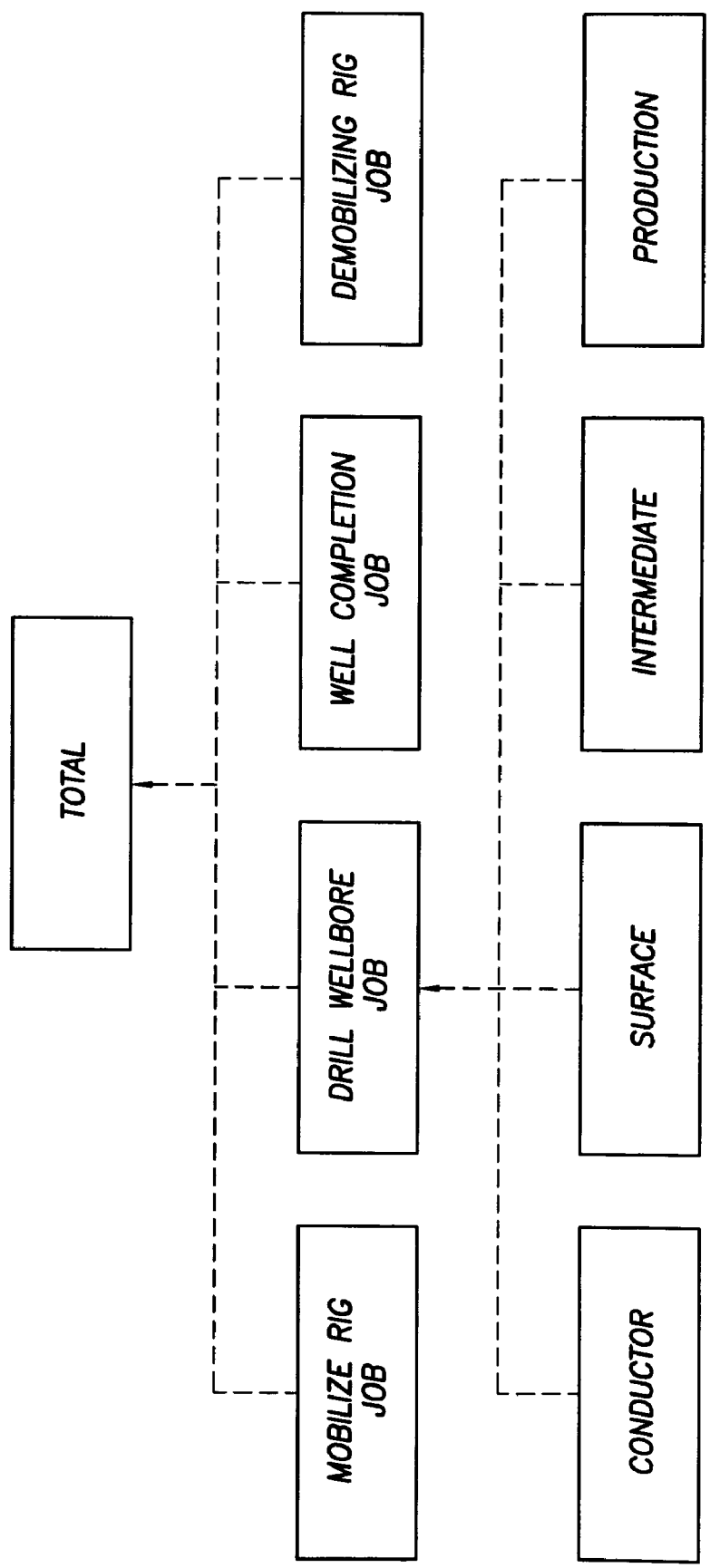
FIGS. 57 and 58 are illustrated for the purpose of describing the link between the 'engineering results' and the 'time and cost task' as shown in FIG. 38 of the drawings.
Figure 58:
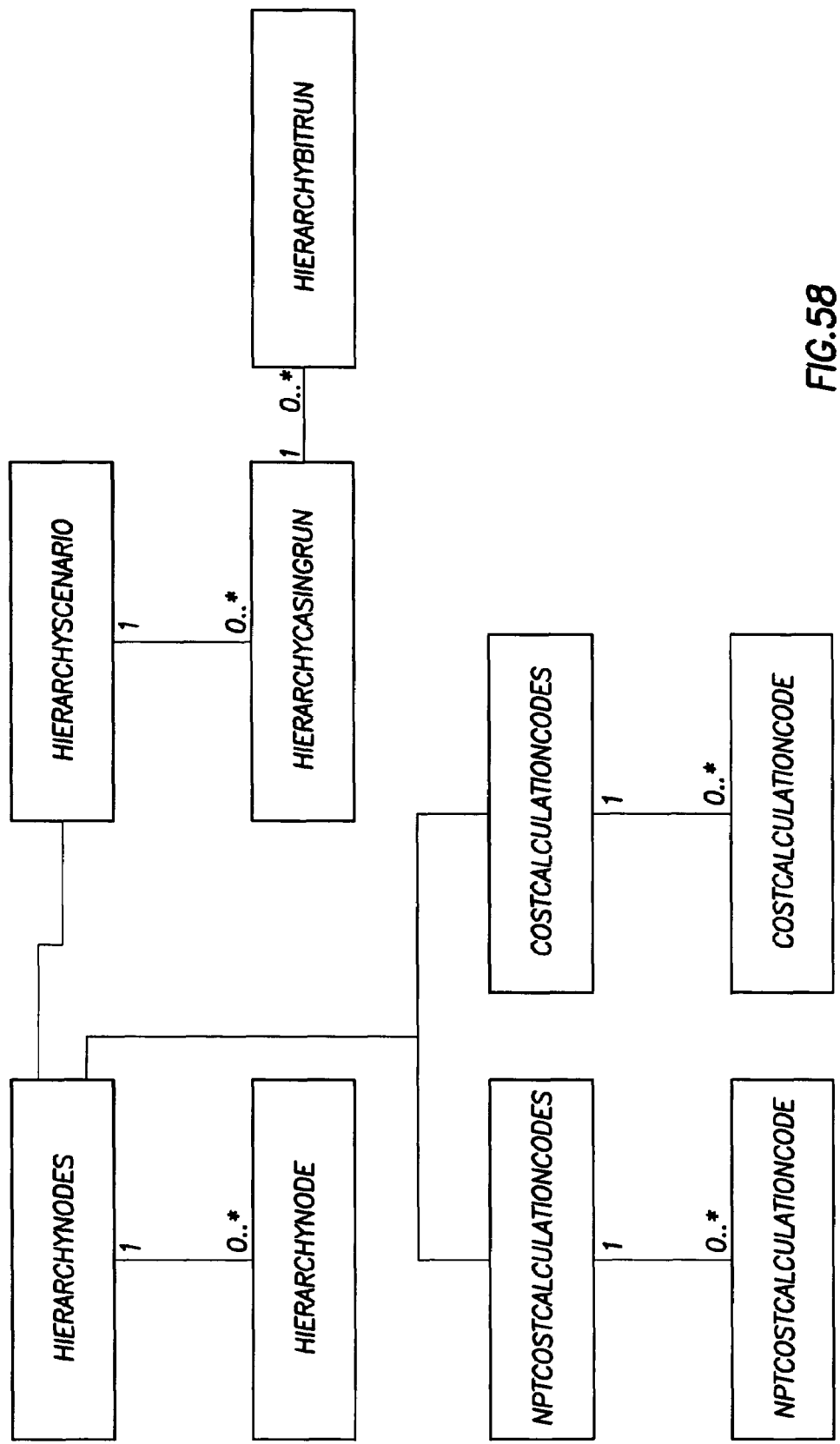

Refer now to FIGS. 57 and 58.

The Time and Cost Task 220 in FIGS. 33 and 38 will be discussed in detail in the following paragraphs.

Characteristic Information

| | |
|---|---|
| Goal In Context: | This use case describes the process to create the activity sequence and corresponding time estimate. |
| Scope: | Automatically create planned sequence of activities, time estimates for each activity, and allow editing of the activities, sequence, or times. |
| Level: | Task |
| Pre-Condition: | The user has the activity templates 22a2. The technical aspects of the well/scenario are complete. Well is sectioned into hole sections, trajectory section, and bit sections (runs). |
| Success End Condition: | The system creates a sequence of activities and time estimates for each activity and total time for min, max, & most likely. A Time vs. Depth curve is available and all activity & time data are saved successfully. |
| Failed End Condition: | The system indicated to the user that it is unable to generate the activity sequence or time estimate for any single activity or total time. |
| Primary Actor: | The User |
| Trigger Event: | The user completed the drilling parameter validation. |

Main Success Scenario

| Step | Actor Action | System Response |
|---|---|---|
| 1 | The user navigates to or through this task or completes the last technical step. | The system creates the sequence of activities for the scenario by building a structure of the well in phases (time units) - first by hole sections, then sub-divided into smaller sections as defined by templates. |
| 2 | | The system populates each activity with depth and time durations for min, max, and most likely and calculates totals. The duration data is populated from template defaults or "best practice" historical data. The system presents the activity sequence and |

-continued

| Step | Actor Action | System Response |
|---|---|---|
| | | durations in tables, pie charts, and bar charts. The data is viewable as total well, or by hole phase/section. All durations are rounded up to the nearest quarter hour (15 minutes) |
| 3 | The user reviews the activity sequence, depths, and speeds (i.e. tripping), and durations and modifies any item as necessary in the UI. | The system updates the activity sequence, recalculates the durations for activities whose speeds have changed, and recalculates the total times for min/max/most likely. |
| 4 | The user reviews the updated activity sequence, depths, speeds, and durations and reviews the min/max/most likely time vs. depth plots. The user accepts the solution and selects the next task. | The system saves all of the information and navigates to the next task. |

Scenario Extensions

| Step | Condition | Action Description |
|---|---|---|
| 1a | The sequence is not generated | The system informs the user that there is not enough information to build the sequence and advises the user to either go back in the workflow to populate the missing data or offer to allow the user to create the sequence manually adding templates or leaf activities to the sequence. |
| 2a | Time is not calculated correctly | The system should indicate if a time total includes a blank or zero value for any activity. Conceptually, all activities should have 3 values, but it is conceivable that a user will intentionally leave a zero value of time for an activity. If a total contains an activity with zero time, the system will need to inform the user which total (min, max, or most likely), and highlight which activities have zero time as an entry. |
| 2b | Tripping time not calculated | Tripping time needs both speed and depth to be calculated. |

Scenario Variations

| Step | Variable | Possible Variations |
|---|---|---|
| 2a | Activity duration | System is directed to access historical data sources to populate the durations for the created activity sequence. The system will search the user specified offset wells for activity durations or speeds for similar hole sections to populate the planned sequence. The system will collect all of the matching data and process it to calculate the min, max, and most likely (mean) durations for each activity. Where there is no information, the template default durations will be used and those activities using default data will be highlighted to the user as quality indicator. The user will rejoin in step 3. |
| 3a | Activity sequence and durations | The user will copy an entire activity sequence from a well previously drilled and data captured. If default selected, the system rejoins at step 2. |
| 3b | Activity sequence and durations | The user may add "contingency" sequences of activities and their durations that branch off of the main sequence and assign a probability level to the entire sequence, i.e. 25% probability. This probability level, if not 100%, is a method of handling contingency events such as the premature |

-continued

| Step | Variable | Possible Variations |
|---|---|---|
| | | end of a hole section requiring the use of a contingency casing string or an anticipated well control incident (well kick) and the time required to manage the event. If the probability is 100%, then it should be inserted into the main sequence. The system rejoins step 3. **The system will incorporate this contingency information in the Monte Carlo simulation of times in a subsequent use case. |
| 3c | Activity sequence and durations | The system may load historical data on a daily or more frequent basis in an attempt to update the activity sequence and durations with actual data coinciding with the actual drilling of the well. The system will use the data in place of the planned activities and append the remaining planned activities to the actual data. In this way, the system will allow a continual update of the plan and predicted total time, cost, and risk (risks are turned green or low risk either by depth unit or by hole section as actual progress replaces the plan). The user rejoins step 3. |
| 3d | Activity sequence and durations | The user will export (or cut/copy/paste) all activity and duration data to MS Excel for more detailed analysis or multi-scenario comparisons. |
| 3e | Changing values. | The user decides to change a value. The system offers the opportunity to capture user comments, which explain the user's reasons to change the value. These reasons can be listed as a separate report once the workflow is completed |

Business Rules

| | |
|---|---|
| TIME1 | Activity Sequence |
| | Create activity sequence and time estimates |
| Short Description | |
| Description | Sub-Division of activity sequence by Phases (mob, hole section, completion, demob), Hole section (drilling, evaluation, & secure sections), Drilling section (bit/drillstring sections, coring run, Leakoff tests, Pilot hole/hole opener sections), Evaluation (wireline, drillpipe conveyed), and Secure sections (evaluation, casing, cement, evaluation, install wellhead/bop). Mobilization, completion, and demobilization time estimates may be left empty (zero time)-users will need the ability to create default templates and times for these phases. |

-continued

| | |
|---|---|
| Formula | NA |
| Score | |
| TIME2 | Time for mobilization/demobilization |
| Short Description | Estimate time for mobilization, demobilization |
| Description | Time for Mon/Demob may be variable in template and dependent on scenario selections for onshore/offshore, water depth, rig type |
| Formula | Templates for onshore, offshore-rig type, deepwater-rig type |
| Score | |
| TIME3 | Tripping Time |
| Short Description | Calculate tripping time |
| Description | Length of trip will be determined by the depth interval traveled and divided by the tripping speeds defined as min/max/most likely. Speeds can be defined as feet per hour, stands per hour, or minutes per stand. |
| Formula | Trip Length = absolute value (start depth-finish depth)<br>Tripping Time = Trip Length (feet) ÷ Tripping Speed (feet/hour) |
| Score | |
| TIME6 | Fluid swap time |
| Short Description | Calculate Fluid Swap time |
| Description | If there is a change of drilling fluid type in the scenario, an activity should be added each time the fluid type is changed according to template. The concept is that after setting casing, the next drillstring is run in the hole to the bottom of the casing until it tags bottom. Then the fluid is swapped until the specified volume is circulated and then the drilling commences as normal. Fundamentally, the time required is the time to circulate the 1.5-2.0 times the entire mud system volume at the maximum pump rate available at the time (constrained only by pump type, liner size, and max circulating pressure). The user can also manually enter a number of hours or days for Fluid Swap Time. Completions will always contain a fluid swap from Mud (Drilling Fluid) to Brine (Completion Fluid). |
| Formula | V hole (bbl) = Mud system volume = Mud pit volume + (Hole volume*Out of gauge hole factor)<br>Q (gpm or bpm) = Max Circulation rate = Max Pump strokes/min * Pump volume/stroke * efficiency * Number of pumps ≦ Max Circulation pressure<br>Swap time = Mud system volume * Excess Circulation factor ÷ Circulation rate<br>Out of gauge hole factor ~ 1.0 for cased hole, 1.25 for open hole<br>Pump strokes/min ~ 100 or refer to pump specifications<br>Pump volume/stroke ~ refer to pump specifications and liner size<br>Excess Circulation factor ~ 1.5-2.0 |
| Score | |
| TIME7 | Pickup/Laydown Drillpipe time |
| Short Description | Calculate Pickup (PU) and Laydown (LD) Drillpipe time |
| Description | If there is a change of drill pipe size in the scenario, an activity should be added each time the drill pipe size is changed according to template. Fundamentally, the time required is the length of drill pipe that needs to be picked up or laid down divided by the speed to pick up a joint (30 feet), rather than a stand (90 feet), of drill pipe from the Rig Vdoor. This speed can be in feet per hour, joints per hour, or minutes per joint. The user can also manually enter a number of hours or days for PU/LD Drill Pipe activities. Completions will typically contain activities for Picking up a Workstring at the beginning and laying down the workstring at the end of the completion. Before any pipe can be picked up, pipe will have to be laid down to make room in the derrick. |
| Formula | PU/LD Time = Length of pipe ÷ PU Speeds (length per hour)<br>Or<br>PU/LD Time = PU Times/joint (minutes/joint) * Number of joints |
| Score | |
| TIME8 | Pickup & Run Casing time |
| Short Description | Calculate Pickup (PU) and Laydown (LD) Casing time |
| Description | For each casing string in the scenario, the activity for running casing includes the pickup time since typically casing is picked up and run joint by joint until the entire casing length is completely assembled and then hung in the wellhead. These strings have to be lowered into position with drillpipe so the running time will include tripping time to position.<br>The entire sequence will be defined by template (casing & liner), however, pickup and running time will vary with casing size. The larger the pipe, the slower it runs and trips into the hole.<br>Fundamentally, the time required is the length of casing (number of joints) required to be picked up divided by the speed at which each joint (40 feet) can be picked up from the Rig Vdoor, stabbed into the previous joint, screwed together or welded, torqued to specification, and latched on to the next joint to be picked up. This speed can be in feet per hour, joints per hour, or minutes per joint. For liners or subsea casing strings the tripping time must be added to trip the casing to setting depth. The user can also manually enter a number of hours or days for Running Casing/Liner activities. Completions will typically contain activities for running tubing which is similar to casing. |
| Formula | PU/LD Time = Length of pipe ÷ PU Speeds (length per hour)<br>Or<br>PU/LD Time = PU Times/joint (minutes/joint) * Number of joints |
| Score | |
| TIME9 | Circulating Time after Drilling |
| Short Description | Calculate the circulation time after drilling is completed for hole section. |
| Description | Circulation after drilling will typically be baseds on either a % of hole volume or % of annular volume. The circulation rate will be the same rate used while drilling. The duration is calculated by dividing the volume to be circulated by the circulation rate. |
| Formula | $$\text{Time (hrs)} = \frac{V_{hole(bbl)}}{Q_{(gal/min)}}$$<br>Vhole (bbl) = Mud system volume = Mud pit volume + (Hole volume*Out of gauge hole factor)<br>Vannulus (bbl) = (Hole volume * Out of gauge hole factor) − Pipe OD volume<br>Q (gpm or bpm) = Max Circulation rate = Max Pump strokes/min * Pump volume/stroke * efficiency * Number of pumps ≦ Max Circulation pressure<br>Circulating time = Vhole or Vannulus * Excess Circulation factor ÷ Circulation rate<br>Out of gauge hole factor ~ 1.0 for cased hole, 1.25 for open hole<br>Pump strokes/min ~ 100 or refer to pump specifications<br>Pump volume/stroke ~ refer to pump specifications and liner size<br>Excess Circulation factor ~ 1.5-2.0 |
| Score | |
| TIME10 | Short Tip/Wiper Trip time |
| Short Description | Calculate the time required for short trips or wiper trips |

| | -continued |
|---|---|
| Description | A short trip or wiper trip as they are commonly referred to is done while drilling and after drilling to assist in cleaning and conditioning the hole and drilling fluid prior to tripping completely out of the hole. A short trip or wiper trip is performed at the end of each bit run/drillstring run or every 40 hours of drilling or every 1500 feet, whichever comes first. The short trip will be preceded by circulating a % of hole volume or annular volume as in TIME9-Circulating after drilling. |
| Formula | Short trip time = Circulating time + Tripping time out + Tripping time in<br>Circulating time ~ TIME9<br>Tripping Time out/in ~ TIME3 |
| Score | |
| TIME11 | Circulating Time after Casing |
| Short Description | Calculate the circulation time after c asing is run in the hole section. |

-continued and liner size
Excess Circulation factor ~ 1.5-2.0

Score

Characteristic Information

| | |
|---|---|
| Goal In Context: | This use case displays the AFE |
| Scope: | Run simulation on time and cost results |
| Level: | Task |
| Pre-Condition: | The user has completed time and cost estimation |
| Success End Condition: | The system displays the results |
| Failed End Condition: | The system indicated that it failed to display the results due to missing data or improper formats etc. |
| Primary Actor: | The User |
| Trigger Event: | The user selects the Monte Carlo Task |

Main Success Scenario

| Step | Actor Action | System Response |
|---|---|---|
| 1 | The user selects Monte Carlo Task | The system displays Monte Carlo screen. The screen will include the following:<br>Clean time and total time in the Time Frequency distribution curve.<br>Clean cost and total cost in the Cost Frequency distribution curve.<br>Clean time and total time in the Time Cumulative Probability curve.<br>Clean cost and total cost in the Cost Cumulative Probability curve. |
| 2 | Calculation of distribution for the Clean time/cost | P10 and P90 values will be used for this. |
| 3 | Calculation of distribution for NPT values | P10 and P90 values will be used for this. |
| 4 | Calculation of the TOTAL probability curve | The curve for the total distribution would be got as a result of Correlating clean and NPT distributions. The correlation factor will be customizable by the user. (Default value is 50%). The curve will have labels of Plow and Phigh instead of P10 and P90. |

-continued

| | |
|---|---|
| Description | Circulation after casing will typically be based on either a % of hole volume or % of annular volume. The circulation rate will be the rate that produces annular velocity less than or equalk to that used while drilling (between open hole and drill colars). The duration is calculated by dividing the volume to be circulated by the circulation rate. |
| Formula | Time (hrs) = $\dfrac{V_{hole(bbl)}}{Q_{(gal/min)}}$<br><br>Vhole (bbl) = Mud system volume = Mud pit volume + (Hole volume*Out of gauge hole factor)<br>Vannulus (bbl) = (Hole volume * Out of gauge hole factor) − Pipe OD volume<br>Q (gpm or bpm) = Max Circulation rate = Max Pump strokes/min * Pump volume/stroke * efficiency * Number of pumps ≦ Max Circulation pressure<br>Circulating time = Vhole or Vannulus * Excess Circulation factor ÷ Circulation rate<br>Out of gauge hole factor ~ 1.0 for cased hole, 1.25 for open hole<br>Pump strokes/min ~ 100 or refer to pump specifications<br>Pump volume/sstroke ~ refer to pump specifications |

Characteristic Information

| | |
|---|---|
| Goal In Context: | This use case calculates and displays detailed (and more precise) simulation on time and cost numbers. |
| Scope: | Run simulation on time and cost results |
| Level: | Task |
| Pre-Condition: | The user has completed time and cost estimation |
| Success End Condition: | The system displays the results |
| Failed End Condition: | The system indicated that it failed to display the results due to missing data or improper formats etc. |
| Primary Actor: | The User |
| Trigger Event: | The user clicks on the "Detailed Calculation" button on the Monte Carlo Task |

Main Success Scenario

| Step | Actor Action | System Response |
|---|---|---|
| 1 | The user clicks on the "Detailed Calculation" button on the Monte Carlo Task | The system displays screen that displays the total the time and cost distribution that is gotten as a result of sampling the distributions of each summary level in the activity hierarchy. The system also displays the mean and SD for NPT and clean time for all the "summary" nodes and for each hole section. There will also be an easy way to get the "total" time and cost distribution numbers as an excel file or an ASCII file. |
| 2 | Distribution used for each of the non-leaf level activities | The distribution used will be specified in the template (catalog file). The default distribution will be "LogNormal". The distribution will be calculated using P10 and P90 values, (which will be calculated from the sum(P10), sum(P90) of the sub activities of the summary level activity). Both Clean time and NPT distribution for each summary level will be calculated. |
| 3 | Correlation of the activities | The correlation factors that relate any two activities will be provided in a catalog file. The correlation factor between "clean" time and "NPT time" will be a user configurable value (default 0.7). All these will be taken as an input for the sampling task. The curve representing the total will be generated as a result of this procedure. |
| 4 | Summary level activities | List of summary level activities is shown in the screen shot below. (FIG. 1) |
| 5 | Structure of the catalog file that specified the correlation factor | There will be a matrix of the activities where the correlation factor will be specified as one of the following values 0, 1, H, M, L. Values of H, M and L will be user configurable. |
| 6 | Adding summary activities dynamically using the UI | The correlation factor for this "new" activity will all other activities will be assumed as 0 Or "Non-existent" |
| 7 | Adding summary activities to the template | When this happens the correlation factor catalog also needs to be updated. This is considered as a complicated procedure and we do not expose this to the end user. If this needs to be done, this will be available as a service provided by SIS. |

The link between the Engineering Results 214 and the Time and Cost Task 220 of FIGS. 33 and 38 will be set forth in the following paragraphs.

Hierarchy Overview

The 'Hierarchy' is a set of classes within the application used to represent a tree structure. Activities grouped by function and listed in chronological order create the hierarchy. The 'Time and Cost' task within the application is the first place in the application where the hierarchy is used. Monte Carlo, Analysis Report and Summary Report are all directly influenced by the hierarchy.

The 'Hierarchy' is a set of classes which were used to create structure that would be used within the application to calculate time and cost for each activity. The hierarchy contains the following classes:
1) HierarchyNode (Data Class)
2) HierarchyNodes (Collection Class)
3) HierarchyBitRun (Data Class)
4) HierarchyCasingRun (Data Class)
5) HierarchyDataChangedEventHandler (Delegate)
6) HierarchyGuidComparer (Guid Comparer—IComparer)
7) HierarchyGuidSorter (Guid Sorter—IComparer)
8) HierarchyNameComparer (Name Comparer—IComparer)
9) HierarchyNameSorter (Name Sorter—IComparer)
10) HierarchyOrderComparer (Order Comparer—IComparer)
11) HierarchyOrderSorter (Order Sorter—IComparer)
12) HierarchyParentComparer (Parent Comparer—IComparer)
13) HierarchyParentSorter (Parent Sorter—IComparer)
14) Hierarchy Scenario (Data Class—Parameter)
15) HierarchyTag (Data Class)
16) HierarchyTypeEnum (Enumeration)
17) IHierarchyRun (Interface)
18) NptCostCalculationCode (Data Class)
19) NptCostCalculationCodes (Collection Class)
20) CostCalculationCode (Data Class)
21) CostCalculationCodes (Collection Class)

Hierarchy Design
File Format

| Column Name | Purpose | Currently Used |
|---|---|---|
| Key | Provides unique identifier for an activity. Note: If an activity is in more than one file the key will be repeated for the same activity. | Yes |

-continued

| Column Name | Purpose | Currently Used |
|---|---|---|
| Operation | The name of the activity as the user will see it. | Yes |
| Order | Originally this was to provide ordering of node within a parent. Note: Currently this is not being used in the Hierarchy; however, it is being loaded from the file. | No |
| Filename | If a record in the file is a summary of activities then activities which this record summarizes will be located in the file specified in this column. Note: This field signifies if a record is a summary record. | Yes |
| Min Time | This is the minimum time for this activity. | Yes |
| Avg Time | This is the average time for this activity. | Yes |
| Max Time | This is the maximum time for this activity. | Yes |
| Unit | This field is intended to specify the catalog unit of measure for the Min, Avg and Max Time columns. Note: Currently this column is not being used. | No |
| Attribute | Used to calculate time based on different formulas. | Yes |
| CostAttribute | | Yes |
| NPT Attribute | | Yes |
| Rule Attribute | | Yes |
| VariableName | | Yes |

Time and Cost Aggregation

The Hierarchy aggregates time and cost values to the parent node. Each hierarchy node is either a child or parent node. The parent node does not contain attributes and does not contain a value within the node. Parent nodes obtain their values as the sum of their immediate children. When the Hierarchy is constructed a node is added through a parent node. When the child node is added an event handler is added to the parent node for the child nodes data changed event. If a child fires a data changed event the values are passed to the parent as an event argument. If this parent has a parent when it is done updating itself it will fire its data changed event. Below is flow diagram showing the linking within the top two level of nodes.

Refer now to FIG. 57.

Simple Relationship Diagram

This is a simple relationship diagram, which shows the relationship between the major classes. A number classes listed in the introduction may not be found here due to them being comparer or sort classes. Referring to FIG. 57, you will see a 'HierarchyScenario' class, which is populated with relevant information from the Osprey Risk scenario. This class contains the casing and bit runs as well as costs etc. When the 'HierarchyNodes' class is created, the 'HierarchyScenario' class is passed into the 'HierarchyNodes' class. 'HierarchyNodes' will load a number of catalog files containing activity definitions based on the rig selected. Each activity will be loaded as a 'HierarchyNode' class and added to the 'HierarchyNodes' class. The 'CostCalculationCode' class will hold a cost calculation record. This class will tell the application which cost should be applied for a given cost attribute. This class will be contained within the collection class named 'CostCalculationCodes'. The 'NptCostCalculationCode' class will hold an npt attribute, which will define the percentage of an activities time that will be non-productive. This class will be contained in a collection class name 'NptCostCalculationCodes'.

Refer now to FIG. 58.

Calculating Non-Productive Time

NPT Attribute and Time Calculation

Non-productive time is defined in a file named 'NPTCalculationCode.cvs'. This file contains the NPT Attribute, min, avg and max percentage as non-productive time. To add a new NPT attribute you must add the attribute and percentages to this file. Then in the rig catalog files you may add the attribute to the NPT Attribute column.

Calculating Time

Attribute Column Value

The following are valid values for the attribute column in the rig catalog files. The calculations are given for each value and any conditions that apply to the calculation. Each record may contain only one of the attributes and this value is multiplied by the minimum, average, and maximum time factor found in the file for the record.

(1) TimeToCircMud

If flow rate upper limit is zero this calculation will not take place.

Mud Volume/Flow Rate Upper Limit (2) TimeToTripIn

If completion trip speed is zero this calculation will not take place.

End Depth/Trip Speed (3) TimeToTripOut

If trip speed is zero this calculation will not take place.

End Depth/Trip Speed (4) TimeToShortTrip

If trip speed is zero this calculation will not take place.

(End Depth−Start Depth)* 2/Trip Speed (5) TimeToTrip

If trip speed is zero, this calculation will not take place.

If the section is a liner, then the following calculation applies.

(Case Top Md/Trip Speed)

If the section is not a liner, then the following calculation applies.

(End Depth/Trip Speed)

(6) TimeToDrill

If rate of penetration is zero this calculation will not take place.

(End Depth−Start Depth)/Rate of Penetration

Note: This value will not be converted from seconds to hours.

(7) TimeToCircCasing

First we calculate the casing volume through the following formula.

If the casings circulate rate is not zero and the section is a liner then following formula is applied.

(((Casing Size* Casing Size* PI* Section Length)/4)/
   Casing Circulation Rate)*((End Depth−Case Top
   Md)/End Depth)

If the casings circulate rate is not zero and the section is not a liner then following formula is applied.

((Casing Size* Casing Size* PI* Section Length)/4)/
   Casing Circulation Rate)

(8) TimeToCircTail

If the casings circulate rate is not zero then following formula is applied.

(Tail Volume/Casing Circulate Rate)

(9) TimeToJet

First we need to compute the jet time through the following formula.

(End Depth−(Air Gap+Water Depth))/Jet Speed

Second calculate the run in hole on DP.

(End Depth−(End Depth−Case Top Md))/Casing Run Rate On Dp

Next if this is not a surface node calculate the tubular run time with the following formula.

(Tubular Run Time+Jet Time)

If this is a surface node calculate the tubular run time with the following formula.

(Run in Hole on Dp+Tubular Run Time+Jet Time)

(10) TimeToLog

If the log speed and log trip speed is not zero then the following formula is applied.

(Open Hole Length/Log Speed)+(2* End Depth/Log Trip Speed)

(11) TimeToRunConductor

If the conductors run rate is not zero and it is not a surface node the following formula is applied.

(Section Length/Conductor Run Rate)

If the conductors run rate and the casing run rate on dp is not zero and it is a surface node the following formula is applied.

(Section Length/Conductor Run Rate)+(Water Depth+Air Gap)/Casing Run Rate On Dp)

(12) TimeToRunSurface

If the surface run rate is not zero, then the following value is calculated.

Temporary Value=(Section Length/Surface Run Rate)

If the activity belongs to the surface section and the casing run rate on dp is not zero, the following formula is applied.

Temporary Value+((Water Depth+Air Gap)/Casing Run Rate On Dp)

(13) TimeToRunIntermediate

If the intermediate run rate is not zero then the following value is calculated.

Temporary Value=(Section Length/Intermediate Run Rate)

If the node is not a surface node then the following calculation will take place.

Temporary Value=Temporary Value+(Water Depth+Air Gap)/Casing Run Rate On Dp

(14) TimeToRunProd

If the productions run rate is not zero then the following calculation will take place.

Temporary Value=Section Length/Production Run Rate

If this node is not a surface node then the following calculation will be applied.

Temporary Value=Temporary Value+((Water Depth+Air Gap)/Casing Run Rate On Dp)

(15) TimeToRunRiser

If the riser run rate is not zero then the following calculation will take place.

(Water Depth+Air Gap)/Riser Run Rate

(16) TimeToTripToML

If the trip speed is not zero then the following calculation will take place.

(Water Depth+Air Gap)/Trip Speed

(17) TimeToDriveConductor

The following calculation is applied.

Temporary Value=(End Depth−Case Top Md)/Conduct Run Rate

Temporary Value=Temporary Value+((End Depth−(Air Gap+Water Depth))/Drive Speed)

(18) TimeToRunOnDP

If the casing run rate on dp is not zero then the following calculation will take place.

(Case Top Md/Casing Run Rate On Dp)

(19) TimeToRunLiner

If this node is part of the production section the following will be applied.

(End−Case Top Md)/Production Run Rate

If this node is not part of the production section the following will be applied.

(End−Case Top Md)/Intermediate Run Rate

(20) TotalLoggingTrippingInTime

The following calculation is applied.

Logging Trip In Time+Logging Open Hole Time

(21) LoggingTime

The logging time is added.

(22) LoggingTrippingOutTime

The logging tripping out time is added.

Calculating Costs

Cost Types

There are two types of costs that get applied to activities. First are the costs that are a product of time. This includes the rig day rate, rig spread rate and the BHA cost. These costs are applied to every activity in the 'Hierarchy'. The following is how the calculations are computed for these costs.

(Time*(Rig Day Rate+Rig Spread Rate))+(BHA Jewel Cost+(End Depth−Start Depth))

The second types of cost are independent of the time of the activity. These are costs like cement or drill bit costs. These costs are calculated in the scenario and passed to the 'Hierarchy' through the 'HierarchyScenario' class. These cost are defined by the cost attribute of the rig catalog file. An activity can have costs associated to it by assigning a cost attribute.

Cost Attribute Column Value

The cost attribute is used to calculate costs based on the time calculated for the activity. A cost attribute identifies different costs associated to an activity. Costs are stored in the 'HierarchyScenario' class, which is populated in the scenario and passed into the hierarchy.

Drilling Cost—This attribute adds the mud cost and bit cost to the activity.

Run Casing Cost—This attribute adds the tubular costs to the activity.

Cement Casing Cost—This attribute adds the cement and spacer costs to the activity.

Bit Run Cost—This attribute adds the mud and bit costs to the activity.

WH Cost—This attribute adds the well head cost to the activity.

Open Hole Logging Cost—This attribute adds the open hole logging cost to the activity.

Cased Hole Logging Cost—This attribute adds the cased hole logging cost to the activity.

Calculating Non-Productive Costs

NPT Cost Calculation

Non-productive cost is defined the same way as non-productive time. When a non-productive cost is calculated the percentage is applied to the rig rate only and this give the non-productive cost for an activity.

Constants

The 'Constants' include: Trip Speed, Jet Speed, Casing Run Rate On Dp, Log Speed, Log Trip Speed, Intermediate Run Rate, Production Run Rate, Riser Run Rate, Drive Speed, and Conduct Run Rate The above description of the 'Automatic Well Planning Software' being thus described, it will be obvious that the same may be varied in many ways. Such variations are not to be regarded as a departure from the spirit and scope of the claimed method or apparatus or program storage device, and all such modifications as would be obvious to one skilled in the art are intended to be included within the scope of the following claims.

We claim:

1. A computer readable medium storing computer-executable instructions for generating and displaying a plurality of time and cost data associated with activities, the instructions, when executed, cause a computer to:
   obtain a plurality of non-summary activities based on wellborne geometry and drilling parameters in an oilfield operation;
   obtain an activity template comprising a plurality of minimum times, a plurality of maximum times, and a plurality of costs for the plurality of non-summary activities;
   generate a correlation matrix having columns for each of the plurality of non-summary activities and rows for each of the plurality of non-summary activities;
   group a first non-summary activity and a second non-summary activity into a first summary activity based on a first entry in the correlation matrix corresponding to the first non-summary activity and the second non-summary activity, wherein the plurality of non-summary activities includes the first non-summary activity and the second non-summary activity;
   identify a minimum time for the first non-summary activity, a maximum time for the first non-summary activity, and a cost for the first non-summary activity from the activity template;
   generate a distribution, for the first non-summary activity, bounding a first area corresponding to the minimum time for the first non-summary activity and a second area corresponding to the maximum time for the first non-summary activity, wherein the second area is greater than the first area and includes the first area;
   identify a minimum time for the second non-summary activity, a maximum time for the second non-summary activity, and a cost for the second non-summary activity from the activity template;
   calculate a minimum time for the first summary activity based on the minimum time for the first non-summary activity and the minimum time for the second non-summary activity;
   calculate a maximum time for the first summary activity based on the maximum time for the first non-summary activity and the maximum time for the second non-summary activity; and
   display the first non-summary activity, the second non-summary activity, the first summary activity, the minimum time for the first summary activity, and the maximum time for the first summary activity.

2. The computer readable medium of claim 1, wherein the wellborne geometry and drilling parameters in the oilfield operation comprise at least one selected from a group consisting of Well name, Surface Location, Offshore Well, GL Elevation, Water Depth, Well Type, RKB Elevation, Openhole Or Case hole completion, Conductor, Presence of H2S, Presence of CO2, Unit System, Client Name, Field Name, Tubing Size, Default Unit System, Boit Constant Raw, Ucs Calibration Factor Raw, Friction Angle Raw, Pore Pressure Raw, Poisson Ratio Raw, Unconfined Compressive Strength Raw, Density Raw, Stress Azimuth Raw, Inclination Min Stress Raw, Inclination Intermediate Stress Raw, Vertical Stress Raw, Horizontal Stress Minimum Raw, Horizontal Stress Maximum Raw, True Vertical Depth Raw, Measured Depth Traj Raw, Inclination Raw, Azimuth Raw, True Vertical Depth Trajectory Raw, Northing Southing Raw, Easting Westing Raw, Dog Leg Severity Raw, Build Rate Raw, Turn Rate Raw, True Vertical Depth, Elevation Reference Trajectory, Elevation Depth Trajectory, Elevation Reference Earth Model, Elevation Depth Earth Model, Measured Depth, True Vertical Depth, Dog Leg Severity, Build Rate, and Turn Rate.

3. The computer readable medium of claim 1, wherein the plurality of non-summary activities comprises at least one selected from a group consisting of pick up bottom hole assembly, drill rotary, and pull out bottom hole assembly.

4. The computer readable medium of claim 1, the instructions further comprising functionality to:
   group a third non-summary activity and a fourth non-summary activity into a second summary activity based on a second entry in the correlation matrix corresponding to the third non-summary activity and the fourth non-summary activity, wherein the plurality of non-summary activities further comprises the third non-summary activity and the fourth non-summary activity;
   calculate a minimum time for the second summary activity based on a minimum time for the third non-summary activity and a minimum time for the fourth non-summary activity;
   calculate a maximum time for the second summary activity based on a maximum time for the third non-summary activity and a maximum time for the fourth non-summary activity; and
   display the second summary activity, the minimum time for the second summary activity, and the maximum time for the second summary activity.

5. The computer readable medium of claim 4, the instruction further comprising functionality to:
   calculate a total minimum time based on the minimum time for the first summary activity and the minimum time for the second summary activity, wherein the first summary activity and the second summary activity are primary activities.

6. The computer readable medium of claim 1, the instructions further comprising functionality to:
   calculate a cost for the first summary activity based on the cost for the first non-summary activity and the cost of the second non-summary activity; and
   display the cost for the first summary activity.

7. The computer readable medium of claim 1, wherein the minimum time for the first non-summary activity is an amount of time needed for 10% of a plurality of wells in an oilfield to have completed the first non-summary activity.

8. The computer readable medium of claim 1, wherein the maximum time of the first non-summary activity is an amount of time needed for 90% of a plurality of wells in an oilfield to have completed the first non-summary activity.

9. The computer readable medium of claim 1, wherein the distribution for the first non-summary activity is a lognormal distribution.

10. The computer readable medium of claim 1, the instructions further comprising functionality to:
generate a distribution for the first summary activity based on the minimum time and the maximum time for the first summary activity,
wherein a first area bounded by the distribution for the first summary activity corresponds to the minimum time for the first summary activity, and
wherein a second area bounded by the distribution for the first summary activity corresponds to the maximum time for the first summary activity.

11. The computer readable medium of claim 10, wherein the distribution for the first summary activity is a lognormal distribution.

12. The computer readable medium of claim 10, the instructions further comprising functionality to display the distribution for the first summary activity.

13. The computer readable medium of claim 1, wherein the first non-summary activity is a productive activity and the second non-summary activity is a non-productive activity.

14. The computer readable medium of claim 1, wherein the display further comprises the minimum time of the first non-summary activity, the maximum time of the first non-summary activity, the minimum time of the second non-summary activity, and the maximum time of the second non-summary activity.

15. The computer readable medium of claim 1, wherein the minimum time for the first non-summary activity, the maximum time for the first non-summary activity, and the cost for the first non-summary activity are identified from the activity template prior to combining the first non-summary activity and the second non-summary activity.

16. A method of generating and displaying a plurality of time and cost data associated with a plurality of activities, comprising the computer-executed steps of:
obtaining a plurality of non-summary activities based on wellbore geometry and drilling parameters in an oilfield operation;
obtaining an activity template comprising a plurality of minimum times, a plurality of maximum times, and a plurality of costs for the plurality of non-summary activities;
generating a correlation matrix having columns for each of the plurality of non-summary activities and rows for each of the plurality of non-summary activities;
grouping a first non-summary activity and a second non-summary activity into a first summary activity based on a first entry in the correlation matrix corresponding to the first non-summary activity and the second non-summary activity, wherein the plurality of non-summary activities includes the first non-summary activity and the second non-summary activity;
identifying a minimum time for the first non-summary activity, a maximum time for the first non-summary activity, and a cost for the first non-summary activity from the activity template;
generating a distribution, for the first non-summary activity, bounding a first area corresponding to the minimum time for the first non-summary activity and a second area corresponding to the maximum time for the first non-summary activity, wherein the second area is greater than the first area and includes the first area;
identifying a minimum time for the second non-summary activity, a maximum time for the second non-summary activity, and a cost for the second non-summary activity from the activity template;
calculating a minimum time for the first summary activity based on the minimum time for the first non-summary activity and the minimum time for the second non-summary activity;
calculating a maximum time for the first summary activity based on the maximum time for the first non-summary activity and the maximum time for the second non-summary activity; and
displaying the first non-summary activity, the second non-summary activity, the first summary activity, the minimum time for the first summary activity, and the maximum time for the first summary activity.

17. The method of claim 16, wherein the wellborne geometry and drilling parameters in the oilfield operation comprise at least one selected from a group consisting of Well name, Surface Location, Offshore Well, GL Elevation, Water Depth, Well Type, RKB Elevation, Openhole Or Case hole completion, Conductor, Presence of H2S, Presence of CO2, Unit System, Client Name, Field Name, Tubing Size, Default Unit System, Boit Constant Raw, Ucs Calibration Factor Raw, Friction Angle Raw, Pore Pressure Raw, Poisson Ratio Raw, Unconfined Compressive Strength Raw, Density Raw, Stress Azimuth Raw, Inclination Min Stress Raw, Inclination Intermediate Stress Raw, Vertical Stress Raw, Horizontal Stress Minimum Raw, Horizontal Stress Maximum Raw, True Vertical Depth Raw, Measured Depth Traj Raw, Inclination Raw, Azimuth Raw, True Vertical Depth Trajectory Raw, Northing Southing Raw, Easting Westing Raw, Dog Leg Severity Raw, Build Rate Raw, Turn Rate Raw, True Vertical Depth, Elevation Reference Trajectory, Elevation Depth Trajectory, Elevation Reference Earth Model, Elevation Depth Earth Model, Measured Depth, True Vertical Depth, Dog Leg Severity, Build Rate, and Turn Rate.

18. The method of claim 16, wherein the plurality of non-summary activities comprises at least one selected from a group consisting of pick up bottom hole assembly, drill rotary, and pull out bottom hole assembly.

19. The method of claim 16, further comprising:
grouping a third non-summary activity and a fourth non-summary activity into a second summary activity based on a second entry in the correlation matrix corresponding to the third non-summary activity and the fourth non-summary activity, wherein the plurality of non-summary activities further includes the third non-summary activity and the fourth non-summary activity;
calculating a minimum time for the second summary activity based on a minimum time for the third non-summary activity and a minimum time for the fourth non-summary activity;
calculating a maximum time for the second summary activity based on a maximum time for the third non-summary activity and a maximum time for the fourth non-summary activity; and
displaying the second summary activity, the minimum time for the second summary activity, and the maximum time for the second summary activity.

20. The method of claim 19, further comprising:
calculating a total minimum time based on the minimum time for the first summary activity and the minimum time for the second summary activity, wherein the first summary activity and the second summary activity are primary activities.

21. The method of claim 16, further comprising:
calculating a cost for the first summary activity based on the cost for the first non-summary activity and the cost of the second non-summary activity; and
displaying the cost for the first summary activity.

22. The method of claim 16, wherein the minimum time for the first non-summary activity is an amount of time needed for 10% of a plurality of wells in an oilfield to have completed the first non-summary activity.

23. The method of claim 16, wherein the maximum time of the first non-summary activity is an amount of time needed for 90% of a plurality of wells in an oilfield to have completed the first non-summary activity.

24. The method of claim 16, wherein the distribution for the first non-summary activity is a lognormal distribution.

25. The method of claim 16, the instructions further comprising functionality to:
generating a distribution for the first summary activity based on the minimum time and the maximum time for the first summary activity,
wherein a first area bounded by the distribution for the first summary activity corresponds to the minimum time for the first summary activity,
wherein a second area bounded by the distribution for the first summary activity corresponds to the maximum time for the first summary activity.

26. The method of claim 25, wherein the distribution for the first summary activity is a lognormal distribution.

27. The method of claim 16, further comprising:
displaying the distribution for the first summary activity.

28. The method of claim 16, wherein the first non-summary activity is a productive activity and the second non-summary activity is a non-productive activity.

29. The method of claim 16, wherein the display further comprises the minimum time of the first non-summary activity, the maximum time of the first non-summary activity, the minimum time of the second non-summary activity, and the maximum time of the second non-summary activity.

30. The method of claim 16, wherein the minimum time for the first non-summary activity, the maximum time for the first non-summary activity, and the cost for the first non-summary activity are identified from the activity template prior combining the first non-summary activity and the second non-summary activity.

31. A system for generating and displaying a plurality of time and cost data associated with a plurality of activities, comprising:
a processor;
a memory operatively connected to the processor and having stored thereon a plurality of instructions, the processor programmed to execute the plurality of instructions to:
obtain a plurality of non-summary activities based on wellborne geometry and drilling parameters in an oilfield operation;
obtain an activity template comprising a plurality of minimum times, a plurality of maximum times, and a plurality of costs for the plurality of non-summary activities;
generate a correlation matrix having columns for each of the plurality of non-summary activities and rows for each of the plurality of non-summary activities;
group a first non-summary activity and a second non-summary activity into a first summary activity based on a first entry in the correlation matrix corresponding to the first non-summary activity and the second non-summary activity, wherein the plurality of non-summary activities includes the first non-summary activity and the second non-summary activity;
identify a minimum time for the first non-summary activity, a maximum time for the first non-summary activity, and a cost for the first non-summary activity from the activity template;
generate a distribution, for the first non-summary activity, bounding a first area corresponding to the minimum time for the first non-summary activity and a second area corresponding to the maximum time for the first non-summary activity, wherein the second area is greater than the first area and includes the first area;
identify a minimum time for the second non-summary activity, a maximum time for the second non-summary activity, and a cost for the second non-summary activity from the activity template;
calculate a minimum time for the first summary activity based on the minimum time for the first non-summary activity and the minimum time for the second non-summary activity;
calculate a maximum time for the first summary activity based on the maximum time for the first non-summary activity and the maximum time for the second non-summary activity; and
display the first non-summary activity, the second non-summary activity, the first summary activity, the minimum time for the first summary activity, and the maximum time for the summary activity.

32. The system of claim 31, wherein the wellborne geometry and drilling parameters in the oilfield operation comprise at least one selected from a group consisting of Well name, Surface Location, Offshore Well, GL Elevation, Water Depth, Well Type, RKB Elevation, Openhole Or Case hole completion, Conductor, Presence of H2S, Presence of CO2, Unit System, Client Name, Field Name, Tubing Size, Default Unit System, Boit Constant Raw, Ucs Calibration Factor Raw, Friction Angle Raw, Pore Pressure Raw, Poisson Ratio Raw, Unconfined Compressive Strength Raw, Density Raw, Stress Azimuth Raw, Inclination Min Stress Raw, Inclination Intermediate Stress Raw, Vertical Stress Raw, Horizontal Stress Minimum Raw, Horizontal Stress Maximum Raw, True Vertical Depth Raw, Measured Depth Traj Raw, Inclination Raw, Azimuth Raw, True Vertical Depth Trajectory Raw, Northing Southing Raw, Easting Westing Raw, Dog Leg Severity Raw, Build Rate Raw, Turn Rate Raw, True Vertical Depth, Elevation Reference Trajectory, Elevation Depth Trajectory, Elevation Reference Earth Model, Elevation Depth Earth Model, Measured Depth, True Vertical Depth, Dog Leg Severity, Build Rate, and Turn Rate.

33. The system of claim 31, wherein the plurality of non-summary activities comprises at least one selected from a group consisting of pick up bottom hole assembly, drill rotary, and pull out bottom hole assembly.

34. The system of claim 31, the instructions further comprising functionality to:
group a third non-summary activity and a fourth non-summary activity into a second summary activity based on a second entry in the correlation matrix corresponding to the third non-summary activity and the fourth non-summary activity, wherein the plurality of non-summary activities further includes the third non-summary activity and the fourth non-summary activity;
calculate a minimum time for the second summary activity based on a minimum time for the third non-summary activity and a minimum time for the fourth non-summary activity;
calculate a maximum time for the second summary activity based on a maximum time for the third non-summary activity and a maximum time for the fourth non-summary activity; and display the second summary activity, the minimum time for the second summary activity, and the maximum time for the second summary activity.

35. The system of claim 31, the instructions further comprising functionality to:

calculate a total minimum time based on the minimum time for the first summary activity and the minimum time for the second summary activity, wherein the first summary activity and the second summary activity are primary activities.

36. The system of claim 31, the instructions further comprising functionality to:

calculate a cost for the first summary activity based on the cost for the first non-summary activity and the cost of the second non-summary activity; and display the cost for the first summary activity.

37. The system of claim 31, wherein the minimum time for the first non-summary activity is an amount of time needed for 10% of a plurality of wells in an oilfield to have completed the first non-summary activity.

38. The system of claim 31, wherein the maximum time of the first non-summary activity is an amount of time needed for 90% of a plurality of wells in an oilfield to have completed the first non-summary activity.

39. The system of claim 31, wherein the distribution for the first non-summary activity is a lognormal distribution.

40. The system of claim 31, the instructions further comprising functionality to:

generate a distribution for the first summary activity based on the minimum time and the maximum time for the first summary activity, wherein a first area bounded by the distribution for the first summary activity corresponds to the minimum time for the first summary activity, wherein a second area bounded by the distribution for the first summary activity corresponds to the maximum time for the first summary activity.

41. The system of claim 40, wherein the distribution for the first summary activity is a lognormal distribution.

42. The system of claim 40, the instructions further comprising functionality to:

display the distribution for the first summary activity.

43. The system of claim 31, wherein the first non-summary activity is a productive activity and the second non-summary activity is a non-productive activity.

44. The system of claim 31, wherein the display further comprises the minimum time of the first non-summary activity, the maximum time of the first non-summary activity, the minimum time of the second non-summary activity, and the maximum time of the second non-summary activity.

45. The system of claim 31, wherein the minimum time for the first non-summary activity, the maximum time for the first non-summary activity, and the cost for the first non-summary activity are identified from the activity template prior combining the first non-summary activity and the second non-summary activity.

\* \* \* \* \*